(12) United States Patent
Tsukuba et al.

(10) Patent No.: US 9,516,333 B2
(45) Date of Patent: Dec. 6, 2016

(54) ARITHMETIC DECODING DEVICE

(71) Applicant: Sharp Kabushiki Kaisha, Osaka-shi, Osaka (JP)

(72) Inventors: Takeshi Tsukuba, Osaka (JP); Tomohiro Ikai, Osaka (JP); Tomoyuki Yamamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/000,174

(22) Filed: Jan. 19, 2016

(65) Prior Publication Data

US 2016/0134884 A1    May 12, 2016

Related U.S. Application Data

(63) Continuation of application No. 14/408,699, filed as application No. PCT/JP2013/065423 on Jun. 4, 2013, now Pat. No. 9,307,264.

(30) Foreign Application Priority Data

Jun. 22, 2012  (JP) ................................. 2012-141416

(51) Int. Cl.
*G06K 9/46* (2006.01)
*H04N 19/44* (2014.01)
*H04N 19/176* (2014.01)
(Continued)

(52) U.S. Cl.
CPC ............ *H04N 19/44* (2014.11); *H04N 19/102* (2014.11); *H04N 19/124* (2014.11); *H04N 19/129* (2014.11); *H04N 19/13* (2014.11); *H04N 19/134* (2014.11); *H04N 19/157* (2014.11); *H04N 19/176* (2014.11); *H04N 19/196* (2014.11); *H04N 19/463* (2014.11); *H04N 19/60* (2014.11); *H04N 19/62* (2014.11); *H04N 19/64* (2014.11); *H04N 19/70* (2014.11); *H04N 19/90* (2014.11); *H04N 19/91* (2014.11)

(58) Field of Classification Search
CPC ...... H04N 19/62; H04N 19/64; H04N 19/44; H04N 19/91; H04N 19/176; H04N 19/436; H04N 19/129; H04N 19/60; H04N 19/89; H04N 19/00951; H04N 19/11; H04N 19/117; H04N 19/154; H04N 19/42; G06T 1/20
See application file for complete search history.

(56) References Cited

U.S. PATENT DOCUMENTS

| | | | |
|---|---|---|---|
| 6,996,280 B1* | 2/2006 | Matsukawa | H04N 1/417 382/236 |
| 2009/0002379 A1* | 1/2009 | Baeza | G06T 1/20 345/522 |
| 2009/0003446 A1* | 1/2009 | Wu | H04N 19/176 375/240.16 |

OTHER PUBLICATIONS

Tsukuba et al., "Arithmetic Decoding Device, Arithmetic Coding Device, Image Decoding Apparatus, and Image Coding Appartus", U.S. Appl. No. 14/408,699, filed Dec. 17, 2014.

*Primary Examiner* — Ali Bayat
(74) *Attorney, Agent, or Firm* — Keating & Bennett, LLP

(57) ABSTRACT

A coefficient presence/absence flag decoding unit, included in a quantized residual information decoding unit which reduces a processing amount related to coding and decoding of a transform coefficient, splits a target frequency domain or a target pixel domain into sub-blocks, and derives different context indexes with respect to each transform coefficient in a pixel domain, obtained through a transform skip or a transform/quantization bypass, and each transform coefficient which is obtained for each frequency component through frequency transform.

1 Claim, 60 Drawing Sheets

(51) Int. Cl.
*H04N 19/70* (2014.01)
*H04N 19/13* (2014.01)
*H04N 19/134* (2014.01)
*H04N 19/129* (2014.01)
*H04N 19/102* (2014.01)
*H04N 19/463* (2014.01)
*H04N 19/62* (2014.01)
*H04N 19/64* (2014.01)
*H04N 19/196* (2014.01)
*H04N 19/91* (2014.01)
*H04N 19/157* (2014.01)
*H04N 19/124* (2014.01)
*H04N 19/60* (2014.01)
*H04N 19/90* (2014.01)

FIG. 4

| | Descriptor |
|---|---|
| residual_coding_cabac( x0, y0, log2TrafoWidth, log2TrafoHeight, scanIdx, cIdx ) { | |
|   if( transquant_bypass_enabled_flag ) { | |
|     transquant_bypass_flag[ x0 ][ y0 ][ cIdx ] | ae(v) |
|   } | |
|   if( transform_skip_enabled_flag && ! transquant_bypass _flag && (PredMode = = MODE_INTRA)<br>    && ( log2TrafoWidth = = 2) && (log2TrafoHeight = = 2) ) { | |
|     transform_skip_flag[ x0 ][ y0 ][ cIdx ] | ae(v) |
|   } | |
|   last_significant_coeff_x | ae(v) |
|   last_significant_coeff_y | ae(v) |
|   numCoeff = 0 | |
|   do { | |
|     xC = ScanOrder[ log2TrafoWidth ][ log2TrafoHeight ][ scanIdx ][ numCoeff ][ 0 ] | |
|     yC = ScanOrder[ log2TrafoWidth ][ log2TrafoHeight ][ scanIdx ][ numCoeff ][ 1 ] | |
|     numCoeff++ | |
|   } while( ( xC != LastSignificantCoeffX ) \|\| ( yC != LastSignificantCoeffY ) ) | |
|   numLastSubset = (numCoeff − 1) >> 4 | |
|   for( i = numLastSubset; i >= 0; i − − ) { | |
|     offset = i << 4 | |
|     if( scanIdx = = 1 && log2TrafoWidth = = 3 && log2TrafoHeight = = 3 ) { | |
|       xCG = 0 | |
|       yCG = i | |
|     } else if( scanIdx = = 2 && log2TrafoWidth = = 3 && log2TrafoHeight = = 3 ) { | |
|       xCG = i | |
|       yCG = 0 | |
|     } else { | |
|       xCG = ScanOrder[ log2TrafoWidth ][ log2TrafoHeight ][ scanIdx ][ i << 4 ][ 0 ] >> 2 | |
|       yCG = ScanOrder[ log2TrafoWidth ][ log2TrafoHeight ][ scanIdx ][ i << 4 ][ 1 ] >> 2 | |
|     } | |
|     implicitNonZeroCoeff = 0 | |
|     if( (i < numLastSubset) && (i > 0) ) { | |
|       significant_coeff_group_flag[ xCG ][ yCG ] | ae(v) |
|       implicitNonZeroCoeff = 1 | |
|     } | |
|     for( n = 15; n >= 0; n − − ) { | |
|       xC = ScanOrder[ log2TrafoWidth ][ log2TrafoHeight ][ scanIdx ][ n + offset ][ 0 ] | |
|       yC = ScanOrder[ log2TrafoWidth ][ log2TrafoHeight ][ scanIdx ][ n + offset ][ 1 ] | |
|       if( (n + offset) < (numCoeff − 1) && significant_coeff_group_flag[ xCG ][ yCG ] &&<br>        ( n > 0 \|\| implicitNonZeroCoeff = = 0 ) ) { | |
|         significant_coeff_flag[ xC ][ yC ] | ae(v) |
|         if( significant_coeff_flag[ xC ][ yC ] = = 1 ) | |
|           implicitNonZeroCoeff = 0 | |
|       } | |
|     } // end of loop <for( n=15; n>=0; n--) > | |
|     firstNZPosInCG = 16 | |
|     lastNZPosInCG = −1 | |
|     numSigCoeff = 0 | |
|     firstGreater1CoeffIdx = −1 | |

FIG. 5

| ... | Descriptor |
|---|---|
| for( n = 15; n >= 0; n- - ) { | |
|   xC = ScanOrder[ log2TrafoWidth ][ log2TrafoHeight ][ scanIdx ][ n + offset ][ 0 ] | |
|   yC = ScanOrder[ log2TrafoWidth ][ log2TrafoHeight ][ scanIdx ][ n + offset ][ 1 ] | |
|   if( significant_coeff_flag[ xC ][ yC ] ) { | |
|     if( numSigCoeff < 8 ) { | |
|       coeff_abs_level_greater1_flag[n] | ae(v) |
|       numSigCoeff++ | |
|       if( coeff_abs_level_greater1_flag[ n ] && firstGreater1CoeffIdx = = -1 ) | |
|         firstGreater1CoeffIdx = n | |
|     } | |
|     if( lastNZPosInCG = = -1 ) | |
|       lastNZPosInCG = n | |
|     firstNZPosInCG = n | |
|   } | |
| } | |
| signHidden = ( lastNZPosInCG - firstNZPosInCG >= sign_hiding_threshold && !transquant_bypass_flag && !transform_skip_flag) ? 1 : 0 | |
| if( firstGreater1CoeffIdx != -1 ) | |
|   coeff_abs_level_greater2_flag[firstGreater1CoeffIdx] | ae(v) |
| for( n = 15; n >= 0; n- - ) { | |
|   xC = ScanOrder[ log2TrafoWidth ][ log2TrafoHeight ][ scanIdx ][ n + offset ][ 0 ] | |
|   yC = ScanOrder[ log2TrafoWidth ][ log2TrafoHeight ][ scanIdx ][ n + offset ][ 1 ] | |
|   if( significant_coeff_flag[ xC ][ yC ] && | |
|     (!sign_data_hiding_flag || !signHidden || n != firstNZPosInCG) ) | |
|     coeff_sign_flag[n] | ae(v) |
| } | |
| numSigCoeff = 0 | |
| sumAbs = 0 | |
| for( n = 15; n >= 0; n- - ) { | |
|   xC = ScanOrder[ log2TrafoWidth ][ log2TrafoHeight ][ scanIdx ][ n + offset ][ 0 ] | |
|   yC = ScanOrder[ log2TrafoWidth ][ log2TrafoHeight ][ scanIdx ][ n + offset ][ 1 ] | |
|   if( significant_coeff_flag[ xC ][ yC ] ) { | |
|     baseLevel = 1 + coeff_abs_level_greater1_flag[ n ] + coeff_abs_level_greater2_flag[ n ] | |
|     if( baseLevel = = ( ( numSigCoeff < 8 ) ? ( ( n = = firstGreater1CoeffIdx ) ? 3 : 2 ) : 1 ) ) | |
|       coeff_abs_level_remaining[n] | ae(v) |
|     transCoeffLevel[ x0 ][ y0 ][ cIdx ][ xC ][ yC ] = | |
|       ( coeff_abs_level_remaining[ n ] + baseLevel ) * ( 1 - 2 * coeff_sign_flag[ n ] ) | |
|     if( sign_data_hiding_flag && signHidden ) { | |
|       sumAbs += ( coeff_abs_level_remaining[ n ] + baseLevel ) | |
|       if( n = = firstNZPosInCG && (sumAbs%2 = = 1) ) | |
|         transCoeffLevel[x0][y0][cIdx][xC][yC] = - transCoeffLevel[x0][y0][cIdx][xC][yC] | |
|     } | |
|     numSigCoeff++ | |
|   } else | |
|     transCoeffLevel[ x0 ][ y0 ][ cIdx ][ xC ][ yC ] = 0 | |
|   } | |
| } | |
| } | |

FIG. 6
(a) 4 x 4
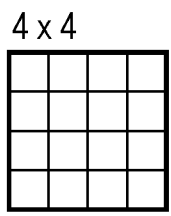
(b) 8 x 8
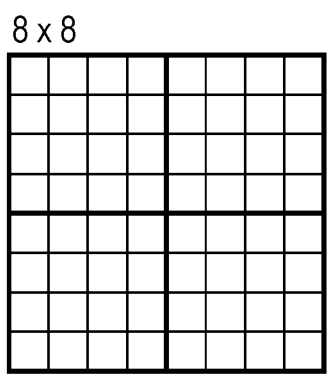
(c) 16 x 16
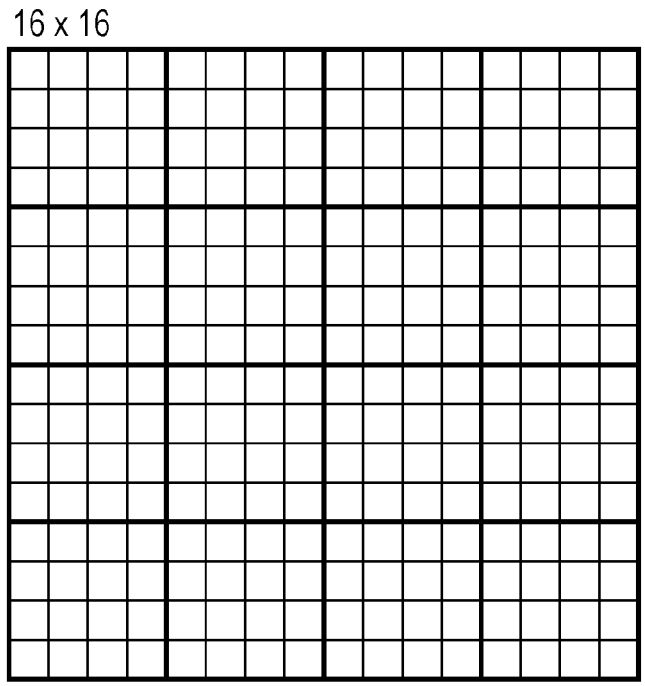

0: Intra_Planar
1: Intra_DC
35: Intra_FromLuma

| Intra prediction mode | Associated names |
|---|---|
| 0 | Intra_Planar |
| 1 | Intra_DC |
| Otherwise (2..34) | Intra_Angular |
| 35 | Intra_FromLuma (used only for chroma) |

FIG. 13

| IntraPredMode | log2TrafoSize−2 | | | |
|---|---|---|---|---|
| | 0 | 1 | 2 | 3 |
| 0 | 0 | 0 | 0 | 0 |
| 1 | 0 | 0 | 0 | 0 |
| 2 − 5 | 0 | 0 | 0 | 0 |
| 6 − 14 | 2 | 2 | 0 | 0 |
| 15 − 21 | 0 | 0 | 0 | 0 |
| 22 − 30 | 1 | 1 | 0 | 0 |
| 31 − 35 | 0 | 0 | 0 | 0 |

FIG. 14
(a)
| scanIndex | ScanType |
|---|---|
| 0 | Up-right diagonal scan |
| 1 | horizontal fast scan |
| 2 | vertical fast scan |
(b)
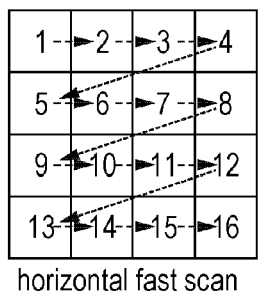
horizontal fast scan
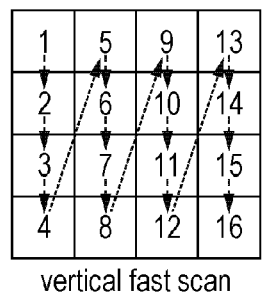
vertical fast scan
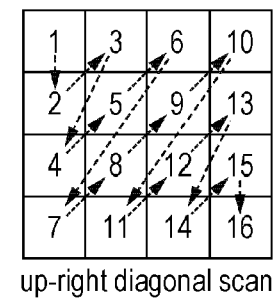
up-right diagonal scan
(c)
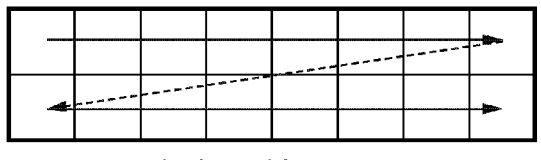
horizontal fast scan
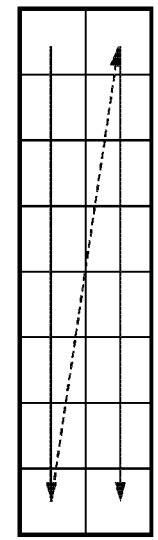
vertical fast scan

(a)
4x4 TRANSFORM BLOCK
CONTEXT INDEX OF LUMINANCE/CHROMA

| 0 | 1 | 4 | 5 |
|---|---|---|---|
| 2 | 3 |   |   |
| 6 |   | 8 |   |
| 7 |   |   |   |

(b)
8x8 TRANSFORM BLOCK
CONTEXT INDEX OF LUMINANCE/CHROMA

FIG. 27    CORRESPONDING TO SORTING IN Fig. 13

| PredMode | TU SIZE | INTRA-PREDICTION DIRECTION | SUB-BLOCK SIZE |
|---|---|---|---|
| INTRA | TU SIZE IS EQUAL TO OR LARGER THAN PREDETERMINED VALUE log2TrafoSize − 2 >= 2 | – | 4 x 4 |
| | TU SIZE IS EQUAL TO OR SMALLER THAN PREDETERMINED VALUE log2TrafoSize − 2 < 2 | NORMAL PREDICTION DIRECTION | 4 x 4 |
| | | HORIZONTAL TYPE PREDICTION DIRECTION | 8 x 2 |
| | | VERTICAL TYPE PREDICTION DIRECTION | 2 x 8 |
| INTER | TU WIDTH = TU HEIGHT log2TrafoWidth == log2TrafoHeight | – | 4 x 4 |
| | TU WIDTH > TU HEIGHT log2TrafoWidth > log2TrafoHeight | – | 8 x 2 (4 x 4) |
| | TU WIDTH < TU HEIGHT log2TrafoWidth < log2TrafoHeight | – | 2 x 8 (4 x 4) |

FIG. 28

```
if (idxCG == 0)
{
    if (xB + yB <= 0) sigCtx = 2
    else if (xB + yB <= 2) sigCtx = 1
    else sigCtx = 0
}
else if (idxCG == 1)
{
    if (yB <= 0) sigCtx = 2
    else if (yB <= 1) sigCtx = 1
    else sigCtx = 0
}
else if (idxCG == 2)
{
    if (xB <= 0) sigCtx = 2
    else if (xB <= 1) sigCtx = 1
    else sigCtx = 0
}
else if (idxCG == 3)
{
    sigCtx = 2
}
```

TBL_CTX_IDX [ log2trafoWidth-2 ] [ log2TrafoHeight-2 ]

| TU SIZE | LOGARITHMIC VALUE-2 OF TU WIDTH SIZE log2TrafoWidth-2 | LOGARITHMIC VALUE-2 OF TU HEIGHT SIZE log2TrafoHeight-2 | RELATIVE CONTEXT INDEX |
|---|---|---|---|
| 4 x 4 | 0 | 0 | 0 |
| 8 x 8 | 1 | 1 | 1 |
| 16 x 16 | 2 | 2 | 2 |
| 32 x 32 | 3 | 3 | 3 |
| 4 x 16 | 0 | 2 | 4 |
| 16 x 4 | 2 | 0 | 5 |
| 32 x 8 | 3 | 1 | 6 |
| 8 x 32 | 1 | 3 | 7 |

(b)

TBL_CTX_IDX [ log2trafoSize-2 ]

| TU SIZE | LOGARITHMIC VALUE-2 OF TU SIZE log2TrafoSize-2 | RELATIVE CONTEXT INDEX |
|---|---|---|
| 4 x 4 | 0 | 0 |
| 8 x 8 | 1 | 1 |
| 16 x 16 | 2 | 2 |
| 32 x 32 | 3 | 3 |
| 4 x 16 | 1 | 1 |
| 16 x 4 | 1 | 1 |
| 32 x 8 | 2 | 2 |
| 8 x 32 | 2 | 2 |

MAKE RELATIVE CONTEXT INDEX COMMON TO TUs HAVING THE SAME LOGARITHMIC VALUE log2TrafoSize OF TU SIZE MAKE RELATIVE CONTEXT INDEX COMMON TO TUs HAVING THE SAME LOGARITHMIC VALUE log2TrafoSize OF TU SIZE

FIG. 32

TBL_CTX_IDX [ PredType ] [ log2trafoWidth-2 ] [ log2TrafoHeight-2 ]

| PREDETERMINED TYPE PredType | TU SIZE | LOGARITHMIC VALUE-2 OF TU WIDTH SIZE log2TrafoWidth-2 | LOGARITHMIC VALUE-2 OF TU HEIGHT SIZE log2TrafoHeight-2 | RELATIVE CONTEXT INDEX |
|---|---|---|---|---|
| 0 (INTRA) | 4x4 | 0 | 0 | 0 |
| | 8x8 | 1 | 1 | 1 |
| | 16x16 | 2 | 2 | 2 |
| | 32x32 | 3 | 3 | 3 |
| 1 (INTER) | 4x4 | 0 | 0 | 4 |
| | 8x8 | 1 | 1 | 5 |
| | 16x16 | 2 | 2 | 6 |
| | 32x32 | 3 | 3 | 7 |
| | 4x16 | 0 | 2 | 8 |
| | 16x4 | 2 | 0 | 9 |
| | 32x8 | 3 | 1 | 10 |
| | 8x32 | 1 | 3 | 11 |

FIG. 33

TBL_CTX_IDX [ PredType ] [ log2trafoSize-2 ]

| PREDICTION TYPE | TU SIZE | LOGARITHMIC VALUE-2 OF TU SIZE log2TrafoSize-2 | RELATIVE CONTEXT INDEX |
|---|---|---|---|
| INTRA | 4 x 4 | 0 | 0 |
| | 8 x 8 | 1 | 1 |
| | 16 x 16 | 2 | 2 |
| | 32 x 32 | 3 | 3 |
| INTER | 4 x 4 | 0 | 4 |
| | 8 x 8 | 1 | 5 |
| | 16 x 16 | 2 | 6 |
| | 32 x 32 | 3 | 7 |
| | 4 x 16 | 1 | 5 |
| | 16 x 4 | 1 | 5 |
| | 32 x 8 | 2 | 6 |
| | 8 x 32 | 2 | 6 |

MAKE RELATIVE CONTEXT INDEX COMMON TO TUs HAVING THE SAME LOGARITHMIC VALUE log2TrafoSize OF TU SIZE MAKE RELATIVE CONTEXT INDEX COMMON TO TUs HAVING THE SAME LOGARITHMIC VALUE log2TrafoSize OF TU SIZE

FIG. 34

TBL_CTX_IDX [ index ] [ log2TrafoSize-2 ]

| IDENTIFIER index | TU SIZE | LOGARITHMIC VALUE-2 OF TU SIZE log2TrafoSize-2 | RELATIVE CONTEXT INDEX |
|---|---|---|---|
| 0 (TRANSFORM SKIP) | 4 x 4 | 0 | 0 |
| | 8 x 8 | 1 | 1 |
| | 16 x 16 | 2 | 2 |
| | 32 x 32 | 3 | 3 |
| | 4 x 16 | 1 | 1 |
| | 16 x 4 | 1 | 1 |
| | 32 x 8 | 2 | 2 |
| | 8 x 32 | 2 | 2 |
| 1 (TRANSFORM/QUANTIZATION BYPASS) | 4 x 4 | 0 | 4 |
| | 8 x 8 | 1 | 5 |
| | 16 x 16 | 2 | 6 |
| | 32 x 32 | 3 | 7 |
| | 4 x 16 | 1 | 5 |
| | 16 x 4 | 1 | 5 |
| | 32 x 8 | 2 | 6 |
| | 8 x 32 | 2 | 6 |

FIG. 41

```
if (idxCG == 0)
{
   // PATTERN 0
   sigCtx = (xB + yB <= 2) ? 1 : 0
}
else if (idxCG == 1)
{
   // PATTERN 1
   sigCtx = (yB <= 1) ? 1 : 0
}
else if (idxCG == 2)
{
   // PATTERN 2
   sigCtx = (xB <= 1) ? 1 : 0
}
else if (idxCG == 3)
{
   // PATTERN 3
   sigCtx = (xB + yB <= 4) ? 2 : 1
}
```

| 1 | 1 | 1 | 0 |
|---|---|---|---|
| 1 | 1 | 0 | 0 |
| 1 | 0 | 0 | 0 |
| 0 | 0 | 0 | 0 |

(b)

| 1 | 1 | 1 | 1 |
|---|---|---|---|
| 1 | 1 | 1 | 1 |
| 0 | 0 | 0 | 0 |
| 0 | 0 | 0 | 0 |

(c)

| 1 | 1 | 0 | 0 |
|---|---|---|---|
| 1 | 1 | 0 | 0 |
| 1 | 1 | 0 | 0 |
| 1 | 1 | 0 | 0 |

(d)

| 2 | 2 | 2 | 2 |
|---|---|---|---|
| 2 | 2 | 2 | 2 |
| 2 | 2 | 2 | 1 |
| 2 | 2 | 1 | 1 |

ARITHMETIC DECODING DEVICE

TECHNICAL FIELD

The present invention relates to an arithmetic decoding device for decoding coded data which is arithmetically coded, and an image decoding apparatus including the arithmetic decoding device. In addition, the present invention relates to an arithmetic coding device for generating coded data which is arithmetically coded, and an image coding apparatus including the arithmetic coding device.

BACKGROUND ART

In order to efficiently transmit or record moving images, a moving image coding apparatus (image coding apparatus) for generating coded data by coding a moving image, and a moving image decoding apparatus (image decoding apparatus) for generating a decoded image by decoding the coded data, are used.

As a specific moving image coding method, for example, there are methods (NPL 1) proposed in H. 264/MPEG-4. AVC, and High-Efficiency Video Coding (HEVC) which is a succeeding codec thereof.

In such moving image coding methods, an image (picture) forming a moving image is managed in a layer structure which is constituted by a slice obtained by dividing the image, a coding unit obtained by dividing the slice, and a block and a partition obtained by dividing the coding unit, and the image is commonly coded and decoded for each block.

In addition, in these coding methods, typically, a predicted image is generated on the basis of a local decoded image obtained by coding and decoding an input image, and coding is performed on a transform coefficient which is obtained by performing frequency transform such as discrete cosine transform (DCT) on a difference image (also referred to as a "residual image" or "prediction residual" in some cases) between the predicted image and the input image for each block.

As a specific coding method of a transform coefficient, context-based adaptive binary arithmetic coding (CABAC) is known.

In the CABAC, a binarization process is performed on various syntaxes indicating a transform coefficient, and binary data obtained through the binarization process is arithmetically coded. Here, the various syntaxes include a flag indicating whether or not a transform coefficient is 0, that is, a flag significant_coeff_flag (also referred to as coefficient presence/absence flag) indicating whether or not a non-zero coefficient is present, a flag coeff_abs_level_greater1_flag (also referred to as a GR1 flag) indicating whether or not an absolute value of a transform coefficient exceeds 1, a flag coeff_abs_level_greater2_flag (also referred to as a GR2 flag) indicating whether or not an absolute value of a transform coefficient exceeds 2, syntaxes last_significant_coeff_x and last_significant_coeff_y indicating a position of the last non-zero coefficient in a process order, and the like.

In addition, in the CABAC, when a single symbol (also referred to as 1 bit of binary data, or a Bin) is coded, a context index is referred to, and arithmetic coding corresponding to an occurrence probability indicated by a probability state index included in a context variable designated by the context index is performed. For example, in a case where a target syntax of arithmetic coding is a coefficient presence/absence flag, the context index is derived in accordance with a position in a frequency component of a transform coefficient. In addition, the occurrence probability designated by the probability state index is updated whenever a single symbol is coded. Further, in the following description, a process of deriving a context index which is referred to when a specific Bin is coded is also referred to as a context deriving process.

In NPL 1, as a method of coding signs indicating positive and negative transform coefficients, sign hiding is employed. The sign hiding is a method in which a sign of a transform coefficient is not explicitly coded but is calculated through computation.

In addition, in NPL 1, two-layer coding is employed as a method of coding a non-zero coefficient. In the two-layer coding, the transform unit is split into a plurality of sub-blocks, a flag (significant_coeff_flag) indicating whether or not a transform coefficient is non-zero is coded for each transform coefficient included in each sub-block, and a flag (significant_coeff_group_flag) indicating whether or not a non-zero coefficient is included in each sub-block is coded in the sub-block units.

Further, in NPL 1, the following coding is performed as follows in accordance with a size of the transform unit (TU). In other words, in the small TU (4×4 or 8×8), 4×4 or 8×2 is used as a sub-block size, and a context which is assigned to a frequency component on the basis of a position is derived. In the context derivation based on a position, a context index (also referred to as a position context) which is defined in accordance with a position of a frequency component in a frequency domain is assigned to the frequency component.

In addition, in the large TU (16×16, 32×32, 16×4, 4×16, 32×8, or 8×32), 4×4 is used as a sub-block size, and a context which is assigned to a frequency component on the basis of periphery reference is derived. In the context derivation based on periphery reference, a context index (also referred to as a periphery reference context) which is defined in accordance with the number of non-zero coefficients (that is, significant_coeff_flag is referred to) in peripheral frequency components of a corresponding frequency component is assigned to the frequency component.

In addition, NPL 2 discloses a technique for controlling whether or not a frequency transform process is skipped for each transform unit. Hereinafter, skipping of the frequency transform process is referred to as a transform skip.

Further, NPL 3 discloses a technique for controlling whether or not a frequency transform process or a quantization and loop filter process are skipped for each coding unit. Hereinafter, skipping of the frequency transform and quantization processes is referred to as a transform/quantization bypass. The transform/quantization bypass is mainly used for lossless coding. For this reason, the skipping of the frequency transform and quantization processes may not be referred to as a transform/quantization bypass but is simply referred to as a lossless mode.

CITATION LIST

Non Patent Literature

NPL 1: "Suggested bug-fixes for HEVC text specification draft6 (JCTVC-I0030)", Joint Collaborative Team on Video Coding (JCT-VC) of ITU-T SG16 WP3 and ISO/IEC JTC1/SC29/WG11 9th Meeting: Geneva, CH, 27 Apr. to 7 May 2012 (published in April, 2012)

NPL 2: #Transform Skipping (JCTVC-I0408) "Intra transform skipping (JCTVC-I0408)", Joint Collaborative Team on Video Coding (JCT-VC) of ITU-T SG 16 WP 3 and ISO/IEC JTC 1/SC 29/WG 11 9th Meeting: Geneva, CH, 27 Apr. to 7 May 2012 (published in April, 2012)

NPL 3: #cu_transquant_bypass_flag (JCTVC-10529) "AHG 13: Proposed bugfix for tickets 410 and 470 related to lossless coding (JCTVC-10529)", Joint Collaborative Team on Video Coding (JCT-VC) of ITU-T SG 16 WP 3 and ISO/IEC JTC 1/SC 29/WG 11 9th Meeting: Geneva, CH, 27 Apr. to 7 May 2012 (published in April, 2012)

SUMMARY OF INVENTION

Technical Problem

However, in the above-described related art, since contexts of a flag indicating whether or not a non-zero coefficient is present or flags (a GR1 flag and a GR2 flag) indicating whether or not a level value is a specific value are not the same in TU or a sub-block in a case where the transform skip or the transform/quantization bypass is applied, there is a problem in that a reduction in a processing amount related to coding and decoding of transform coefficients is not sufficient. In addition, there is a problem in that a process for performing sign hiding in which signs of some coefficients are not decoded in the transform skip is necessary.

Further, in a case where the transform skip and the transform/quantization bypass are applied, there is a tendency for an appearance probability of coefficients in a TU or a sub-block to be the same, but, in the related art, a context is changed depending on a position of a transform coefficient and thus there is a problem in that coding efficiency is not sufficient.

Furthermore, in a case where the same context is used in a sub-block in the lossless mode, there is a problem in that the number of context indexes increases.

In addition, in a case where sign hiding is performed in the transform skip, there is a problem in that in coding efficiency is reduced due to the sign hiding. There is a problem in that a reduction in a processing amount of coding and decoding of transform coefficients is not sufficient.

The present invention has been made in consideration of the above-described problems, and an object thereof is to implement an arithmetic decoding device, an arithmetic coding device, and the like capable of reducing a processing amount related to coding and decoding of a transform coefficient and improving coding efficiency when compared with the configuration of the related art.

Solution to Problem

In order to solve the above-described problems, according to an aspect of the present invention, there is provided an arithmetic decoding device which decodes coded data which is obtained by arithmetically coding various syntaxes indicating a transform coefficient with respect to each transform coefficient which is obtained for each frequency component by performing frequency transform on a target image for each unit domain and each transform coefficient in a pixel domain, obtained through a transform skip, the device including sub-block splitting means for splitting a target frequency domain or a target pixel domain corresponding to a process target unit domain target into sub-blocks each having a predetermined size; sub-block coefficient presence/absence flag decoding means for decoding a sub-block coefficient presence/absence flag indicating whether or not at least one non-zero coefficient is included in the sub-block with respect to the respective sub-blocks into which the frequency domain or the pixel domain is split by the sub-block splitting means; and non-zero coefficient presence/absence flag decoding means for decoding a non-zero coefficient presence/absence flag indicating whether or not a transform coefficient in each of the sub-blocks is 0, in which the non-zero coefficient presence/absence flag decoding means derives separate context indexes for each of a non-zero coefficient presence/absence flag corresponding to each transform coefficient in the pixel domain, obtained through the transform skip and a non-zero coefficient presence/absence flag corresponding to each transform coefficient which is obtained for each frequency component through the frequency transform.

In a case where the transform skip is performed, a decoding target coefficient presence/absence flag is a non-zero coefficient in a pixel domain. Since an appearance probability of a non-zero coefficient at each coefficient position in a pixel domain and an appearance probability of a non-zero coefficient at each coefficient position in a frequency domain are different from each other, it is preferable to differentiate contexts regarding coefficient presence/absence flags from each other in the pixel domain and the frequency domain.

According to the configuration, in a case where at least the transform skip is performed, it is possible to derive a context index which is suitable for a non-zero coefficient in a pixel domain. For this reason, since a code amount of a non-zero coefficient can be reduced in a TU which is a coding and decoding target, it is possible to reduce a processing amount related to decoding of the non-zero coefficient and also to improve coding efficiency.

In the arithmetic decoding device according to the aspect of the present invention, the non-zero coefficient presence/absence flag decoding means may derive a fixed context index in a transform block in relation to a non-zero coefficient presence/absence flag corresponding to each transform coefficient in the pixel domain, obtained through the transform skip.

In the arithmetic decoding device according to the aspect of the present invention, the non-zero coefficient presence/absence flag decoding means may derive a value based on a transform block size as a context index, in relation to a non-zero coefficient presence/absence flag corresponding to each transform coefficient in the pixel domain, obtained through the transform skip.

Also in a pixel domain, since appearance probabilities of a non-zero coefficient are different depending on a TU size, it is preferable to differentiate contexts regarding coefficient presence/absence flags from each other for respective TU sizes. According to the configuration, it is possible to derive a context index which is suitable for a non-zero coefficient in the pixel domain for each TU size. For this reason, since a code amount of a non-zero coefficient can be further reduced in a TU which is a coding and decoding target, it is possible to reduce a processing amount related to decoding of the non-zero coefficient and also to improve coding efficiency.

In the arithmetic decoding device according to the aspect of the present invention, the non-zero coefficient presence/absence flag decoding means may derive a predetermined context index on the basis of a prediction type and a transform block size, in relation to a non-zero coefficient presence/absence flag corresponding to each transform coefficient in the pixel domain, obtained through the transform skip.

In a case where the transform skip is performed, since appearance probabilities of a non-zero coefficient in a decoding target pixel domain are different from each other in intra-prediction and inter-prediction, it is preferable to differentiate contexts regarding coefficient presence/absence flags from each other for respective prediction types. According to the configuration, it is possible to derive a context index suitable for a non-zero coefficient in a pixel domain for each prediction type and each TU size. For this reason, since a code amount of a non-zero coefficient can be reduced in a TU which is a coding and decoding target, it is possible to reduce a processing amount related to decoding of the non-zero coefficient and also to improve coding efficiency.

In the arithmetic decoding device according to the aspect of the present invention, the non-zero coefficient presence/absence flag decoding means may derive separate context indexes for each of a non-zero coefficient presence/absence flag during the transform skip and a non-zero coefficient presence/absence flag during a transform/quantization bypass, in relation to the non-zero coefficient presence/absence flag corresponding to each transform coefficient in the pixel domain, obtained through the transform skip or the transform/quantization bypass.

Generally, since appearance probabilities of a non-zero coefficient in a pixel domain are different from each other in the transform skip and the transform/quantization bypass, it is preferable to differentiate contexts regarding coefficient presence/absence flags from each other. According to the configuration, it is possible to derive a context index which is suitable for a non-zero coefficient in a pixel domain for each of the transform skip and the transform/quantization bypass. For this reason, since a code amount of a non-zero coefficient can be reduced in a TU which is a coding and decoding target, it is possible to reduce a processing amount related to decoding of the non-zero coefficient and also to improve coding efficiency.

The arithmetic decoding device according to the aspect of the present invention may further include GR1 flag decoding means for decoding a GR1 flag indicating whether or not an absolute value of a transform coefficient in each of the sub-blocks exceeds 1, and the GR1 flag decoding means may derive separate context indexes for each of a GR1 flag corresponding to each transform coefficient in the pixel domain, obtained through the transform skip and a GR1 flag corresponding to each transform coefficient which is obtained for each frequency component through the frequency transform.

In a case where the transform skip is performed, a decoding target GR1 flag is a GR1 flag in a pixel domain. Since an appearance probability of a GR1 flag at each coefficient position in a pixel domain and an appearance probability of a GR1 flag at each coefficient position in a frequency domain are different from each other, it is preferable to differentiate contexts regarding GR1 flags from each other in the pixel domain and the frequency domain.

According to the configuration, in a case where at least the transform skip is performed, it is possible to derive a context index which is suitable for a GR1 flag in a pixel domain. For this reason, since a code amount of a GR1 flag can be reduced in a TU which is a coding and decoding target, it is possible to reduce a processing amount related to decoding of the GR1 flag and also to improve coding efficiency.

In the arithmetic decoding device according to the aspect of the present invention, the GR1 flag decoding means may derive a value based on a transform block size as a context index, in relation to a GR1 flag corresponding to each transform coefficient in the pixel domain, obtained through the transform skip.

Also in a pixel domain, since appearance probabilities of a GR1 flag are different depending on a TU size, it is preferable to differentiate contexts regarding GR1 flags from each other for respective TU sizes. According to the configuration, it is possible to derive a context index which is suitable for a GR1 flag in the pixel domain for each TU size. For this reason, since a code amount of a GR1 flag can be further reduced in a TU which is a coding and decoding target, it is possible to reduce a processing amount related to decoding of the GR1 flag and also to improve coding efficiency.

In the arithmetic decoding device according to the aspect of the present invention, the GR1 flag decoding means may derive a predetermined context index on the basis of a prediction type and a transform block size, in relation to a GR1 flag corresponding to each transform coefficient in the pixel domain, obtained through the transform skip.

In a case where the transform skip is performed, since appearance probabilities of a decoding target GR1 flag in a pixel domain are different from each other in intra-prediction and inter-prediction, it is preferable to differentiate contexts regarding GR1 flags from each other for respective prediction types. According to the configuration, it is possible to derive a context index suitable for a GR1 flag in a pixel domain for each prediction type and each TU size. For this reason, since a code amount of a GR1 flag can be reduced in a TU which is a coding and decoding target, it is possible to reduce a processing amount related to decoding of the GR1 flag and also to improve coding efficiency.

In the arithmetic decoding device according to the aspect of the present invention, the GR1 flag decoding means may derive separate context indexes for each of a GR1 flag during the transform skip and a GR1 flag during a transform/quantization bypass, in relation to the GR1 flag corresponding to each transform coefficient in the pixel domain, obtained through the transform skip or the transform/quantization bypass.

Generally, since appearance probabilities of a decoding target GR1 flag in a pixel domain are different from each other in the transform skip and the transform/quantization bypass, it is preferable to differentiate contexts regarding GR1 flags from each other for respective prediction types. According to the configuration, it is possible to derive a context index which is suitable for a GR1 flag in a pixel domain for each of the transform skip and the transform/quantization bypass. For this reason, since a code amount of a GR1 flag can be reduced in a TU which is a coding and decoding target, it is possible to reduce a processing amount related to decoding of the GR1 flag and also to improve coding efficiency.

The arithmetic decoding device according to the aspect of the present invention may further include GR2 flag decoding means for decoding a GR2 flag indicating whether or not an absolute value of a transform coefficient in each of the sub-blocks exceeds 2, and the GR2 flag decoding means may derive separate context indexes for at least each transform coefficient in the pixel domain, obtained through the transform skip and each transform coefficient which is obtained for each frequency component through the frequency transform.

In a case where the transform skip is performed, a decoding target GR2 flag is a GR2 flag in a pixel domain. Since an appearance probability of a GR2 flag at each coefficient position in a pixel domain and an appearance probability of a GR2 flag at each coefficient position in a frequency domain are different from each other, it is preferable to differentiate contexts regarding GR2 flags from each other in the pixel domain and the frequency domain.

According to the configuration, in a case where the transform skip is performed, it is possible to derive a context index which is suitable for a GR2 flag in a pixel domain. For this reason, since a code amount of a GR2 flag can be reduced in a TU which is a coding and decoding target, it is possible to reduce a processing amount related to decoding of the GR2 flag and also to improve coding efficiency.

In the arithmetic decoding device according to the aspect of the present invention, the GR2 flag decoding means may derive a value based on a transform block size as a context index, in relation to a GR2 flag corresponding to each transform coefficient in the pixel domain, obtained through the transform skip.

Also in a pixel domain, since appearance probabilities of a GR2 flag are different depending on a TU size, it is preferable to differentiate contexts regarding GR2 flags from each other for respective TU sizes. According to the configuration, it is possible to derive a context index which is suitable for a GR2 flag in the pixel domain for each TU size. For this reason, since a code amount of a GR2 flag can be further reduced in a TU which is a coding and decoding target, it is possible to reduce a processing amount related to decoding of the GR2 flag and also to improve coding efficiency.

In the arithmetic decoding device according to the aspect of the present invention, the GR2 flag decoding means may derive a predetermined context index on the basis of a prediction type and a transform block size, in relation to a GR2 flag corresponding to each transform coefficient in the pixel domain, obtained through the transform skip.

In a case where the transform skip is performed, since appearance probabilities of a decoding target GR2 in a pixel domain are different from each other in intra-prediction and inter-prediction, it is preferable to differentiate contexts regarding GR2 flags from each other for respective prediction types. According to the configuration, it is possible to derive a context index suitable for a GR2 flag in a pixel domain for each prediction type and each TU size. For this reason, since a code amount of a GR2 flag can be reduced in a TU which is a coding and decoding target, it is possible to reduce a processing amount related to decoding of the GR2 flag and also to improve coding efficiency.

In the arithmetic decoding device according to the aspect of the present invention, the GR2 flag decoding means may derive separate context indexes for each of a GR2 flag during the transform skip and a GR2 flag during a transform/quantization bypass, in relation to the GR2 flag corresponding to each transform coefficient in the pixel domain, obtained through the transform skip or the transform/quantization bypass.

Generally, since appearance probabilities of a GR2 flag in a pixel domain are different from each other in the transform skip and the transform/quantization bypass, it is preferable to differentiate contexts regarding GR2 flags from each other. According to the configuration, it is possible to derive a context index which is suitable for a GR2 flag in a pixel domain for each of the transform skip and the transform/quantization bypass. For this reason, since a code amount of a GR2 flag can be reduced in a TU which is a coding and decoding target, it is possible to reduce a processing amount related to decoding of the GR2 flag and also to improve coding efficiency.

In order to solve the above-described problems, according to another aspect of the present invention, there is provided an arithmetic decoding device which decodes coded data which is obtained by arithmetically coding various syntaxes indicating a transform coefficient with respect to each transform coefficient which is obtained for each frequency component by performing frequency transform on a target image for each unit domain and each transform coefficient in a pixel domain, obtained through a transform skip or a transform/quantization bypass, the device including coefficient sign decoding means for deriving a sign of a transform coefficient on which sign hiding is performed, by using an absolute value of a transform coefficient whose sign has been decoded or a sum of absolute values of transform coefficients whose signs have been decoded, and for deriving a sign of a transform coefficient on which the sign hiding is not performed, by decoding a syntax from coded data; and sign hiding flag deriving means for deriving a sign hiding flag used to determine whether or not the sign hiding is to be performed, on the basis of a transform skip flag, a transform/quantization bypass flag, and a difference between positions of decoded non-zero coefficients in a target sub-block, or through comparison between the number of decoded non-zero coefficients in the target sub-block and a predetermined threshold value.

In a case where the transform skip is performed, or the transform/quantization bypass is performed, performing sign hiding which is accompanied by correction of a coefficient level value on a coefficient of a pixel domain may possibly cause deterioration in subjective image quality, and thus the sign hiding is preferably prohibited. As mentioned above, in this configuration, by prohibiting sign hiding in the transform skip or the transform/quantization bypass, it is possible to improve subjective image quality.

In order to solve the above-described problems, according to still another aspect of the present invention, there is provided an image decoding apparatus including the arithmetic decoding device; inverse frequency transform means for generating a residual image by performing inverse frequency transform on a transform coefficient which is decoded by the arithmetic decoding device; and decoded image generating means for generating a decoded image by adding the residual image generated by the inverse frequency transform means to a predicted image which is predicted from a generated decoded image.

In order to solve the above-described problems, according to still another aspect of the present invention, there is provided an arithmetic coding device which generates coded data by arithmetically coding various syntaxes indicating a transform coefficient with respect to each transform coefficient which is obtained for each frequency component by performing frequency transform on a target image for each unit domain and each transform coefficient in a pixel domain, obtained through a transform skip, the device including sub-block splitting means for splitting a target frequency domain corresponding to a process target unit domain into sub-blocks each having a predetermined size; sub-block coefficient presence/absence flag coding means for coding a sub-block coefficient presence/absence flag indicating whether or not at least one non-zero coefficient is included in the sub-block with respect to the respective sub-blocks into which the frequency domain is split by the sub-block splitting means; and non-zero coefficient presence/absence flag coding means for coding a non-zero coefficient presence/absence flag indicating whether or not a transform coefficient in each of the sub-blocks is 0, in which the non-zero coefficient presence/absence flag coding means uses separate context indexes for each of a non-zero coefficient presence/absence flag corresponding to each transform coefficient in the pixel domain, obtained through the transform skip and a non-zero coefficient presence/absence flag corresponding to each transform coefficient which is obtained for each frequency component through the frequency transform.

In order to solve the above-described problems, according to still another aspect of the present invention, there is provided an image coding apparatus including transform coefficient generating means for generating a transform coefficient by performing frequency transform on a residual image between a coding target image and a predicted image for each unit domain; and the arithmetic coding device, in which the arithmetic coding device generates coded data by arithmetically coding various syntaxes indicating the transform coefficient which is generated by the transform coefficient generating means.

Advantageous Effects of Invention

As described above, the arithmetic decoding device according to the present invention includes the sub-block splitting means for splitting a target frequency domain or a target pixel domain corresponding to a process target unit domain into sub-blocks each having a predetermined size; the sub-block coefficient presence/absence flag decoding means for decoding a sub-block coefficient presence/absence flag indicating whether or not at least one non-zero coefficient is included in the sub-block with respect to the respective sub-blocks into which the frequency domain or the pixel domain is split by the sub-block splitting means; and the non-zero coefficient presence/absence flag decoding means for decoding a non-zero coefficient presence/absence flag indicating whether or not a transform coefficient in each of the sub-blocks is 0, in which the non-zero coefficient presence/absence flag decoding means uses a fixed value in a TU or a sub-block as a context index with respect to a transform coefficient in a process target transform block on which the transform skip or the transform/quantization bypass is performed. The fixed value may be derived as a value based on a prediction type and a TU size, and may be a fixed value regardless of a prediction type or a TU size.

By using a fixed value in a TU or a sub-block as a context index, it is possible to reduce a processing amount related to decoding of a non-zero coefficient and a level thereof. It is possible to derive a context index suitable for a non-zero coefficient in a pixel domain for each prediction type and each TU size. For this reason, since a code amount of a non-zero coefficient can be further reduced in a TU which is a coding and decoding target, it is possible to achieve effects of reducing a processing amount related to decoding of the non-zero coefficient and also of improving coding efficiency.

BRIEF DESCRIPTION OF DRAWINGS

FIG. 2 illustrates data configuration of coded data which is generated by the moving image coding apparatus according to the embodiment of the present invention and is decoded by the moving image decoding apparatus, in which FIGS. 2(a) to 2(d) are diagrams respectively illustrating a picture layer, a slice layer, a tree block layer, and a CU layer.

FIGS. 3(a) to 3(h) are diagrams illustrating a PU split type pattern, and respectively illustrate partition shapes in cases of 2N×2N, 2N×N, 2N×nU, 2N×nD, N×2N, nL×2N, nR×2N, and N×N; FIGS. 3(i) to 3(o) are diagrams illustrating split methods in which a square node is subdivided into square or non-square quadtrees in which FIG. 3(i) illustrates split into square shapes, FIG. 3(j) illustrates split into rectangular shapes which are transversely long, FIG. 3(k) illustrates split into rectangular shapes which are longitudinally long, FIG. 3(l) illustrates that a transversely long node is split into rectangular shapes which are transversely long, FIG. 3(m) illustrates that a transversely long node is split into square shapes, FIG. 3(n) illustrates that a longitudinally long node is split into rectangular shapes which are longitudinally long, and FIG. 3(o) illustrates that a longitudinally long node is split into square shapes.

FIG. 4 is a diagram illustrating a first half part of a syntax table indicating syntaxes included in quantized residual information of coded data according to the embodiment.

FIG. 5 is a diagram illustrating a second half part of a syntax table indicating syntaxes included in quantized residual information of coded data according to the embodiment.

FIG. 6 illustrates a relationship between a block and a sub-block, in which FIG. 6(a) illustrates an example in which a 4×4 TU is formed by a single sub-block including 4×4 components; FIG. 6(b) illustrates an example in which an 8×8 TU is formed by four sub-blocks each including 4×4 components; and FIG. 6(c) illustrates an example in which a 16×16 TU is formed by sixteen sub-blocks each including 4×4 components.

FIG. 7 illustrates a scan order in a decoding process and a coding process according to the embodiment, in which FIG. 7(a) illustrates that a sub-block scan is a forward scan, FIG. 7(b) illustrates that a scan in a sub-block is a forward scan, FIG. 7(c) illustrates that a sub-block scan is a backward scan, and FIG. 7(d) illustrates that a scan in a sub-block is a backward scan.

FIG. 8 illustrates a decoding process of a non-zero coefficient in the embodiment in which FIG. 8(a) illustrates a scan order in a case where a block having a TU size of 8×8 is split into sub-blocks each having a size of 4×4, and respective frequency components are scanned in a forward scan; FIG. 8(b) exemplifies transform coefficients (non-zero transform coefficients) which are not 0 in a frequency domain including a frequency component having a TU size of 8×8; FIG. 8(c) illustrates each value of a sub-block coefficient presence/absence flag significant_coeff_group_flag which is decoded for each sub-block in a case where decoding target transform coefficients are ones illustrated in FIG. 8(b); FIG. 8(d) illustrates each value of syntax significant_coeff_flag indicating the presence or absence of a non-zero coefficient in a case where decoding target transform coefficients are ones illustrated in FIG. 8(b); FIG. 8(e) illustrates an absolute value of each transform coefficient obtained by decoding syntaxes coeff_abs_level_greater1_flag, coeff_abs_level_greater2_flag, and coeff_abs_level_remaining in a case where decoding target transform coefficients are ones illustrated in FIG. 8(b); and FIG. 8(f) illustrates a syntax coeff_sign_flag in a case where decoding target transform coefficients are ones illustrated in FIG. 8(b).

FIG. 13 is a table illustrating an example of a scan index scanIdx designated by an intra-prediction mode index IntraPredMode and each value of log 2TrafoSize−2.

FIG. 14 illustrates a scan index, in which FIG. 14(a) illustrates a scan type ScanType designated by each value of the scan index scanIdx; FIG. 14(b) illustrates of a scan order in each of a horizontal fast scan, a vertical fast scan, and an up-right diagonal scan when a TU size is 4×4 components; and FIG. 14(c) illustrates another example of the horizontal fast scan and the vertical fast scan.

FIG. 16 illustrates a decoding process performed by the sub-block coefficient presence/absence flag decoding unit according to the embodiment, in which FIG. 16(a) illustrates a target sub-block (xCG, yCG) and an adjacent sub-block (xCG, yCG+1) which is adjacent to the lower side of the target sub-block; FIG. 16(b) illustrates the target sub-block (xCG, yCG) and an adjacent sub-block (xCG+1, yCG) which is adjacent to the right side of the target sub-block; and FIG. 16(c) illustrates the target sub-block (xCG, yCG), the adjacent sub-block (xCG, yCG+1) which is adjacent to the lower side of the target sub-block, and the adjacent sub-block (xCG+1, yCG) which is adjacent to the right side of the target sub-block.

FIG. 17 illustrates coding and decoding processes of a sub-block coefficient presence/absence flag according to the embodiment, in which FIG. 17(a) illustrates transform coefficients which are present in a frequency domain of a 16×16 TU, and FIG. 17(b) illustrates a sub-block coefficient presence/absence flag assigned to each sub-block.

FIG. 19 illustrates a decoding process of transform skip and transform/quantization bypass flags, in which FIG. 19(a) illustrates syntax examples of the transform/quantization bypass flag and the transform skip flag, and FIG. 19(b) is a flowchart specifically illustrating the decoding process.

FIG. 20 illustrates a decoding process of transform skip and transform/quantization bypass flags, in which FIG. 20(a) illustrates syntax examples of the transform/quantization bypass flag and the transform skip flag, and FIG. 20(b) is a flowchart specifically illustrating the decoding process.

FIG. 21 illustrates a decoding process of transform skip and transform/quantization bypass flags of the related art, in which FIG. 21(a) illustrates syntax examples of the transform/quantization bypass flag and the transform skip flag, and FIG. 21(b) is a flowchart specifically illustrating the decoding process.

FIG. 22 is a diagram illustrating a context index deriving process according to the embodiment, in which FIG. 22(a) illustrates a context index which is derived for each frequency component included in a frequency domain having a TU size of 4×4 and which is referred to for decoding significant_coeff_flag regarding luminance Y and chroma U and V, and FIG. 22(b) illustrates a context index which is derived for each frequency component included in a frequency domain having a TU size of 8×8 and which is referred to for decoding significant_coeff_flag regarding luminance Y and chroma U and V.

FIG. 27 is a diagram illustrating a method of deriving a sub-block size by using CU prediction type information, a TU size, and an intra-prediction mode index IntraPredMode.

FIG. 28 is a diagram illustrating another example of a pseudo-code for deriving a context index from coordinates of a process target frequency component in a sub-block according to a pattern index idxCG.

FIGS. 29(a)-29(d) illustrate arrangements of values of the context indexes in the context index derivation method using the pseudo-code illustrated in FIG. 28.

FIG. 31 illustrates a deriving process of a context index ctxIdx, in which FIG. 31(a) is a diagram illustrating a logarithmic value log 2TrafoWidth of a TU width size, a logarithmic value log 2TrafoHeight of a TU height size, and a corresponding relative context index table TBL_CTX_IDX[log 2TrafoWidth−2][log 2TrafoHeight−2], and FIG. 31(b) is a diagram illustrating a logarithmic value log 2TrafoSize of a TU size and a relative context index table TBL_CTX_IDX[log 2TrafoSize−2].

FIG. 32 is a diagram illustrating a prediction type PredType, a logarithmic value log 2TrafoWidth of a TU width size, a logarithmic value log 2TrafoHeight of a TU height size, and a corresponding relative context index table TBL_CTX_IDX[log 2TrafoWidth−2][log 2TrafoHeight−2].

FIG. 33 is a diagram illustrating a prediction type PredType, a logarithmic value log 2TrafoSize of a TU size, and a relative context index table TBL_CTX_IDX[PredType][log 2TrafoSize−2].

FIG. 34 is a diagram illustrating an identifier index for identifying a transform skip and a quantization bypass, a logarithmic value log 2TrafoSize of a TU size, and a relative context index table TBL_CTX_IDX[PredType][log 2TrafoSize−2].

FIG. 41 is a diagram illustrating a pseudo-code related to Example, for deriving a context index from coordinates of a process target frequency component in a sub-block according to a pattern index idxCG.

FIGS. 42(a)-42(d) illustrate arrangements of values of the context indexes in the context index derivation method using the pseudo-code illustrated in FIG. 41.

FIG. 53 illustrates a coding process of transform skip and transform/quantization bypass flags, in which FIG. 53(a) illustrates syntax examples of the transform/quantization bypass flag and the transform skip flag, and FIG. 53(b) is a flowchart specifically illustrating the coding process.

FIG. 54 illustrates a coding process of transform skip and transform/quantization bypass flags, in which FIG. 54(a) illustrates syntax examples of the transform/quantization bypass flag and the transform skip flag, and FIG. 54(b) is a flowchart specifically illustrating the coding process.

FIG. 55 illustrates a coding process of transform skip and transform/quantization bypass flags of the related art, in which FIG. 55(a) illustrates syntax examples of the transform/quantization bypass flag and the transform skip flag, and FIG. 55(b) is a flowchart specifically illustrating the coding process.

FIG. 62 illustrates configurations of transmission equipment equipped with the moving image coding apparatus and reception equipment equipped with the moving image decoding apparatus, in which FIG. 62(a) illustrates the transmission equipment equipped with the moving image coding apparatus, and FIG. 62(b) illustrates the reception equipment equipped with the moving image decoding apparatus.

FIG. 63 illustrates configurations of recording equipment equipped with the moving image coding apparatus and reproducing equipment equipped with the moving image decoding apparatus, in which FIG. 63(a) illustrates the recording equipment equipped with the moving image coding apparatus, and FIG. 63(b) illustrates the reproducing equipment equipped with the moving image decoding apparatus.

DESCRIPTION OF EMBODIMENTS

A coding apparatus and a decoding apparatus according to an embodiment of the present invention will be described. In addition, the decoding apparatus according to the embodiment decodes a moving image from coded data. Therefore, hereinafter, this is referred to as a "moving image decoding apparatus". Further, the coding apparatus according to the present embodiment generates coded data by coding a moving image. Therefore, hereinafter, this is referred to as a "moving image coding apparatus".

However, the scope to which the present invention is applicable is not limited thereto. In other words, as is clear from the following description, features of the present invention are established even if a plurality of frames are not premised. That is, the present invention is generally applicable to a decoding apparatus and a coding apparatus regardless of whether a target is a moving image or a still image.

(Configuration of Coded Data #1)

Figure 2:
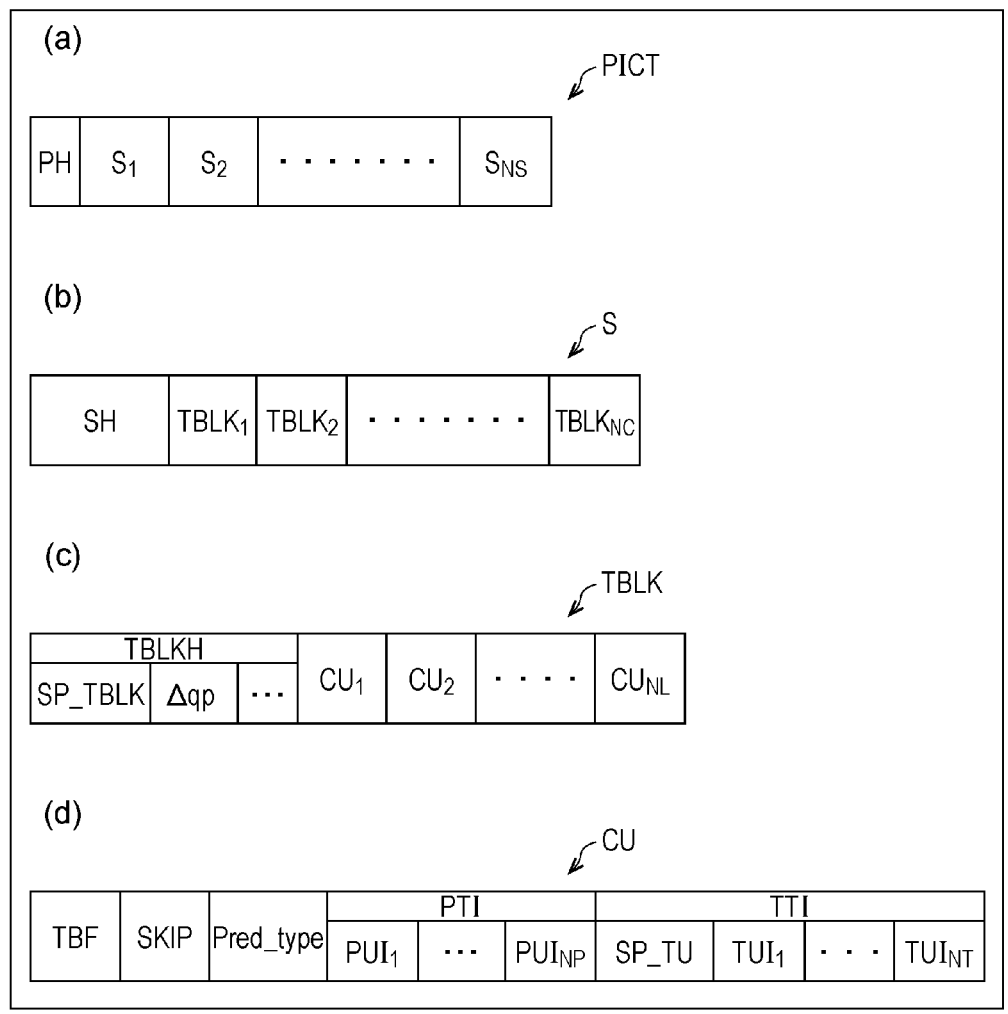

With reference to FIG. 2, a configuration example of coded data #1 which is generated by a moving image coding apparatus 2 and is decoded by a moving image decoding apparatus 1 will be described. The coded data #1 exemplarily includes a sequence and a plurality of pictures forming the sequence.

In a sequence layer, sets of data which are referred to by the moving image decoding apparatus 1 in order to decode a process target sequence are prescribed. The sequence layer includes a sequence parameter set SPS, a picture parameter set PPS, and a picture PICT.

FIG. 2 illustrates structures of hierarchies which are equal to or lower than a picture layer in the coded data #1. FIGS. 2(a) to 2(d) are diagrams respectively illustrating a picture layer which prescribes the picture PICT, a slice layer which prescribes a slice S, a tree block layer which prescribes a tree block TBLK, and a CU layer which prescribes a coding unit (CU) included in the tree block TBLK.

(Picture Layer)

In the picture layer, sets of data which are referred to by the moving image decoding apparatus 1 in order to decode a process target picture PICT (hereinafter, also referred to as a target picture) are prescribed. The picture PICT includes a picture header PH and slices S1 to SNS (where NS indicates a total number of slices included in the picture PICT) as illustrated in FIG. 2(a).

In addition, in the following, in a case where the respective slices S1 to SNS are not required to be differentiated from each other, the subscripts may be omitted. Further, this is also the same for other data which is included in the coded data #1 described below and is given a subscript.

The picture header PH includes a coding parameter group which is referred to by the moving image decoding apparatus 1 in order to determine a decoding method of a target picture. As coding parameters included in the picture header PH, there are, for example, a transform/quantization bypass enabled flag (trans qunat_bypass_enabled_flag) indicating whether or not a flag (cu_transqunat_bypass_flag; transform/quantization bypass flag) is explicitly decoded from coded data, in which the transform/quantization bypass flag indicates whether or not inverse quantization and inverse frequency transform processes are skipped for each coding unit (CU), and a transform skip enabled flag (transform_skip_enabled_flag) indicating whether or not a flag (transform_skip_flag; transform skip flag) is explicitly decoded from coded data, in which the transform skip flag indicates whether or not an inverse frequency transform process is skipped for each transform unit (TU).

In addition, since the transform/quantization bypass is mainly used in a lossless mode, the transform/quantization bypass flag may not be referred to as a transform/quantization bypass flag but be referred to as a lossless flag (cu_lossless_flag). Further, the transform/quantization bypass enabled flag and the transform skip enabled flag may be described not in the picture header PH but in a coding parameter of a higher layer (a sequence parameter set SPS or a picture parameter set PPS) or a lower layer (a slice header SH).

(Slice Layer)

In the slice layer, sets of data which are referred to by the moving image decoding apparatus 1 in order to decode a process target slice S (hereinafter, also referred to as a target slice) are prescribed. The slice S includes a slice header SH and tree blocks $TBLK_1$ to $TBLK_{NC}$ (where NC indicates a total number of tree blocks included in the slice S) as illustrated in FIG. 2(b).

The slice header SH includes a coding parameter group which is referred to by the moving image decoding apparatus 1 in order to determine a decoding method of a target slice. Slice type designation information (slice_type) for designating a slice type is an example of a coding parameter included in the slice header SH.

Slice types which can be designated by the slice type designation information may include (1) an I slice which uses only intra-prediction during coding, (2) a P slice which uses a uni-prediction or intra-prediction during coding, (3) a B slice which uses uni-prediction, bi-prediction, or intra-prediction, and the like.

In addition, the slice header SH includes a filter parameter FP which is referred to by a loop filter which is included in the moving image decoding apparatus 1. The filter parameter FP includes a filter coefficient group. The filter coefficient group includes (1) tap number designation information for designating the number of taps of filters, (2) filter coefficients a0 to aNT−1 (where NT indicates a total number of filter coefficients included in the filter coefficient group), and (3) an offset.

(Tree Block Layer)

In the tree block layer, sets of data which are referred to by the moving image decoding apparatus 1 in order to decode a process target tree block TBLK (hereinafter, also referred to as a target tree block) are prescribed.

The tree block TBLK includes a tree block header TBLKH and coding unit information $CU_1$ to $CU_{NL}$ (where NL indicates a total number of items of coding unit information included in the tree block TBLK). Here, first, a description will be made of a relationship between the tree block TBLK and the coding unit information CU.

The tree block TBLK is split into units for specifying a block size used for each process of intra-prediction or inter-prediction and transform.

The units of the tree block TBLK are obtained through recursive quadtree subdivision. A tree structure obtained through the recursive quadtree subdivision is hereinafter referred to as a coding tree.

Hereinafter, a unit corresponding to a leaf which is a terminal node of the coding tree is referred to as a coding node. In addition, the coding node is a basic unit in a coding process, and thus the coding node is hereinafter referred to as a coding unit (CU).

In other words, the coding unit information $CU_1$ to $CU_{NL}$ is information corresponding to each coding node (coding unit) which is obtained by performing recursive quadtree subdivision on the tree block TBLK.

In addition, a root of the coding tree is correlated with the tree block TBLK. In other words, the tree block TBLK is correlated with the highest node of a tree structure obtained through quadtree subdivision, recursively including a plurality of coding nodes.

In addition, a size of each coding node is a half of a size of a coding node (that is, a unit of a one hierarchy higher node of the corresponding coding node) vertically and horizontally, to which the corresponding coding node directly belongs.

Further, a size taken by each coding node depends on size designation information and a maximum hierarchical depth of a coding node, included in the sequence parameter set SPS of the coded data #1. For example, in a case where a size of the tree block TBLK is 64×64 pixels, and the maximum hierarchical depth is 3, a coding node in a hierarchy which is equal to or lower than the tree block TBLK can take any one of four types of sizes, that is, 64×64 pixels, 32×32 pixels, 16×16 pixels, and 8×8 pixels.

(Tree Block Header)

Tree block header TBLKH includes coding parameters which are referred to by the moving image decoding apparatus 1 in order to determine a decoding method of a target tree block. Specifically, as illustrated in FIG. 2(c), tree block split information SP_TBLK for designating a split pattern of a target tree block into respective CUs, and a quantization parameter difference Δqp (qp_delta) for designating a size of a quantization step, are included.

The tree block split information SP_TBLK is information indicating a coding tree for splitting a tree block, and, specifically, information for designating a shape, size, and a position in a target tree block, of each CU included in the target tree block.

In addition, the tree block split information SP_TBLK may not explicitly include a shape or a size of a CU. For example, the tree block split information SP_TBLK may be a set of flags (split_coding_unit_flag) indicating the entire target tree block or a partial domain of a tree block is split into four parts. In this case, a shape or a size of each CU can be specified by using a shape or a size of a tree block together.

In addition, the quantization parameter difference Δqp is a difference qp-qp' between a quantization parameter qp in a target tree block and a quantization parameter qp' in a tree block which is coded right before the corresponding target tree block.

(CU Layer)

In the CU layer, sets of data which are referred to by the moving image decoding apparatus 1 in order to decode a process target CU (hereinafter, also referred to as a target CU) are prescribed.

Here, prior to detailed description of content of data included in the coding unit information CU, a tree structure of data included in the CU will be described. A coding node is a node of roots of a prediction tree (PT) and a transform tree (TT). The prediction tree and the transform tree will be described.

In the prediction tree, a coding node is split into one or a plurality of prediction blocks, and a position and a size of each prediction block are prescribed. In other words, the prediction block is one domain or a plurality of domains which do not overlap each other, forming the coding node. In addition, the prediction tree includes one or a plurality of prediction blocks obtained through the above-described splitting.

A prediction process is performed for each prediction block. Hereinafter, the prediction block which is the unit of prediction is also referred to as a prediction unit (PU).

Types of splits in the prediction tree roughly include two types of intra-prediction and inter-prediction.

In a case of intra-prediction, as a split method, there are 2N×2N (which is the same size as that of a coding node) and N×N.

In addition, in a case of inter-prediction, as a split method, there are 2N×2N (which is the same size as that of a coding node), 2N×N, N×2N, N×N, and the like.

Further, in the transform tree, a coding node is split into one or a plurality of transform blocks, and a position and a size of each transform block are prescribed. In other words, the transform block is one domain or a plurality of domains which do not overlap each other, forming the coding node. In addition, the transform tree includes one or a plurality of transform blocks obtained through the above-described splitting.

A transform process is performed for each prediction block. Hereinafter, the transform block which is the unit of transform is also referred to as a transform unit (TU). A size of the TU is represented by a logarithmic value log 2TrafoWidth of a width and a logarithmic value log 2TrafoHeight of a height of a transform block. A size of the TU is also represented by a value log 2TrafoSize obtained from the following equation.

$$\log 2TrafoSize=(\log 2TrafoWidth+ \log 2TrafoHeight)>>1$$

Hereinafter, a TU having a width W×height H is referred to as W×H TU (for example, 4×4 TU).

(Data Structure of Coding Unit Information)

Next, with reference to FIG. 2(d), detailed description will be made of content of data included in the coding unit information CU. As illustrated in FIG. 2(d), the coding unit information CU includes, specifically, a transform/quantization bypass flag (transquant_bypass_flag; also abbreviated to TBF), a skip mode flag SKIP, CU prediction type information Pred_type, PT information PTI, and TT information TTI.

[Transform/Quantization Bypass Flag]

The transform/quantization bypass flag transquant_by-pass_flag is a flag indicating whether or not inverse quantization and inverse transform are applied to each TU included in a target CU. In a case where a value of the transform/quantization bypass flag is 1, inverse quantization and inverse transform processes are skipped with respect to each TU included in the target CU. In addition, in a case where a value of transquant_bypass_enable_flag is 1, the transform/quantization bypass flag transquant_bypass_flag is explicitly coded (decoded). On the other hand, in a case where a value of transquant_bypass_enable_flag is 0, coding (decoding) of a syntax of the transform/quantization bypass flag is omitted, and a value of the transform/quantization bypass flag is interpreted as 0 (transqunt_by_pass_flag==0). Further, the transform/quantization bypass flag may be coded (decoded) not in a CU layer but for each transform unit (TU) which is a lower layer.

[Skip Flag]

The skip flag SKIP is a flag indicating whether or not a skip mode is applied to a target CU, and in a case where a value of the skip flag SKIP is 1, that is, the skip mode is applied to a target CU, the PT information PTI in the coding unit information CU is omitted. In addition, the skip flag SKIP is omitted in an I slice.

[CU Prediction Type Information]

The CU prediction type information Pred_type includes CU prediction method information PredMode and PU split type information PartMode. The CU prediction type information is simply referred to as prediction type information in some cases.

The CU prediction method information PredMode is to designate one of intra-prediction (intra-CU) and inter-prediction (inter-CU) as a predicted image generation method for each PU included in a target CU. In addition, hereinafter, the types of skip, intra-prediction, and inter-prediction are referred to as CU prediction modes in a target CU.

The PU split type information PartMode is to designate a PU split type which is a pattern of split of a target coding unit (CU) into PUs. Hereinafter, as mentioned above, splitting target coding unit (CU) into PUs according to a PU split type is referred to as PU split.

For example, the PU split type information PartMode may be an index indicating the type of PU split pattern, and may designate a shape, a size, and a position in a target prediction tree, of each PU included in the target prediction tree.

In addition, a selectable PU split type is different depending on a CU prediction type and a CU size. Further, a selectable PU split type is different in each case of inter-prediction and intra-prediction. Furthermore, details of the PU split type will be described later.

[PT Information]

The PT information PTI is information regarding a PT included in a target CU. In other words, the PT information PTI is a set of information regarding each of one or a plurality of PUs included in a PT. As described above, generation of a predicted image is performed in the units of PUs, and thus the PT information PTI is referred to when the predicted image is generated by the moving image decoding apparatus 1. The PT information PTI includes PU information $PUI_1$ to $PUI_{NP}$ (where NP indicates a total number of PUs included in a target PT) including prediction information in each PU as illustrated in FIG. 2(d).

The prediction information PUI includes an intra-prediction parameter PP_Intra or an inter-prediction parameter PP_Inter according to a prediction type designated by the prediction type information Pred_mode. Hereinafter, a PU to which intra-prediction is applied is referred to as an intra-PU, and a PU to which inter-prediction is applied is referred to as an inter-PU.

The inter-prediction parameter PP_Inter includes coding parameters which are referred to when the moving image decoding apparatus 1 generates an inter-predicted image through inter-prediction.

The inter-prediction parameter PP_Inter may be, for example, a merge flag (merge_flag), a merge index (merge_idx), an estimated motion vector index (mvp_idx), a reference image index (ref_idx), an inter-prediction flag (inter_pred_flag), and a motion vector difference (mvd).

The intra-prediction parameter PP_Intera includes coding parameters which are referred to when the moving image decoding apparatus 1 generates an intra-predicted image through intra-prediction.

The intra-prediction parameter PP_Intra may be, for example, an estimated prediction mode flag, an estimated prediction mode index, and a remaining prediction mode index.

In addition, the intra-prediction parameter may include a PCM mode flag indicating whether or not a PCM mode is used. In a case where the PCM mode flag is coded, and the PMC mode flag indicates that a PCM mode is used, each of a prediction process (intra), a transform process, and an entropy coding process is omitted.

[TT Information]

The TT information TTI is information regarding a TT included in a CU. In other words, the TT information TTI is a set of information regarding each of one or a plurality of TUs included in a TT, and is referred to when the moving image decoding apparatus 1 decodes residual data. In addition, hereinafter, a TU is referred to as a block in some cases.

As illustrated in FIG. 2(*d*), the TT information TTI includes TT split information SP_TU for designating a split pattern of a target CU into transform blocks, and TU information $TUI_1$ to $TUI_{NT}$ (where NT indicates a total number of blocks included in a target CU).

The TT split information SP_TU is, specifically, information for determining a shape, a size, and a position in a target CU, of each TU included in the target CU. For example, the TT split information SP_TU may be realized by information (split_transform_flag) indicating whether or not a target node will be split, and information (trafoDepth) indicating a depth of the split.

In addition, for example, in a case where a size of a CU is 64×64, each TU which is obtained through splitting can take sizes of 32×32 pixels to 4×4 pixels.

The TU information $TUI_1$ to $TUI_{NT}$ is information regarding each of one or a plurality of TUs included in a TT. For example, the TU information TUI includes a quantized prediction residual (also referred to as a quantized residual).

Each quantized prediction residual is coded data which is generated by the moving image coding apparatus 2 performing the following process A, B, or C on a process target block.

(Process A: case where frequency transform and quantization are performed in order to perform variable length coding on a quantized transform coefficient)

Process A-1: Frequency transform (for example, discrete cosine transform (DCT)) is performed on a prediction residual obtained by subtracting a predicted image from a coding target image.

Process A-2: A transform coefficient obtained in the process A-1 is quantized.

Process A-3: Variable length coding is performed on the transform coefficient quantized in the process A-2.

(Process B: case where frequency transform is skipped, quantization is performed, and variable length coding is performed on a value of a quantized prediction residual (case of a transform skip))

Process B-1: A prediction residual obtained by subtracting a predicted image from a coding target image is quantized.

Process B-2: Variable length coding is performed on the prediction residual (coefficient) quantized in the process B-1.

(Process C: case where frequency transform and quantization are skipped, and variable length coding is performed on a value of a prediction residual (case of a transform/quantization bypass))

Process C-1: Variable length coding is performed on a prediction residual obtained by subtracting a predicted image from a coding target image.

Hereinafter, a transform coefficient of a prediction residual and a coefficient of the prediction residual are simply referred to as a "transform coefficient" without being differentiated from each other.

In addition, the quantization parameter qp indicates a size of a quantization step QP which is used for the moving image coding apparatus 2 to quantize the transform coefficient ($QP=2^{qp/6}$).

(PU Split Type)

The PU split type includes a total of the following eight types of patterns assuming that a size of a target CU is 2N×2N. In other words, there are four symmetric splitting including 2N×2N pixels, 2N×N pixels, N×2N pixels, and N×N pixels, and four asymmetric splitting including 2N×nU pixels, 2N×nD pixels, nL×2N pixels, and nR×2N pixels. In addition, N indicates 2m (where m is an integer of 1 or more). Hereinafter, a domain which is obtained by splitting a symmetric CU is also referred to as a partition.

Figure 3:
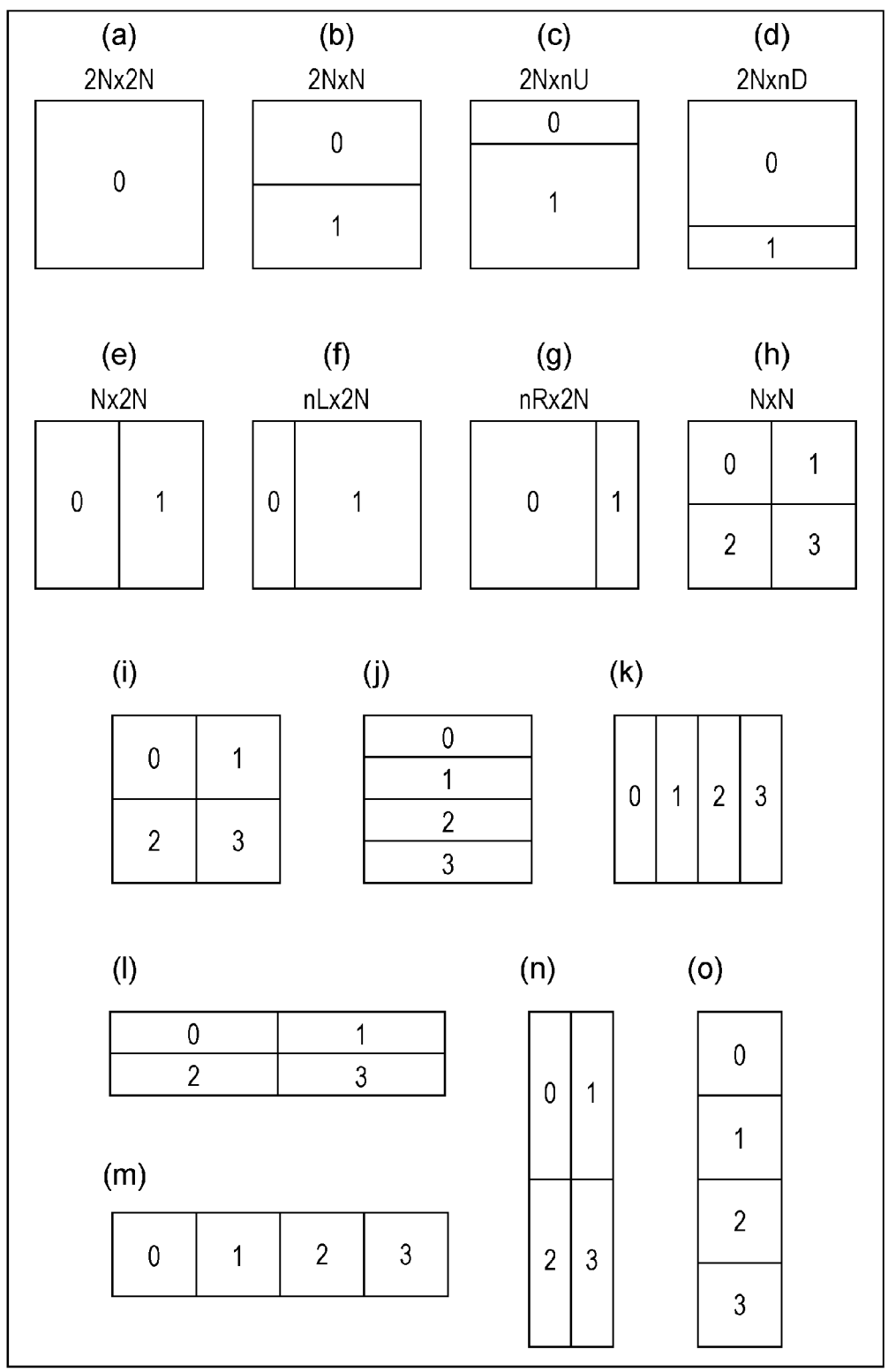

FIGS. 3(*a*) to 3(*h*) specifically illustrate positions of boundaries of PU slit in a CU, for respective slit types.

FIG. 3(*a*) illustrates a PU split type of 2N×2N in which a CU is not split. In addition, FIGS. 3(*b*), 3(*c*) and 3(*d*) respectively illustrate shapes of partitions in cases where PU split types are 2N×N, 2N×nU, and 2N×nD. Further, FIGS. 3(*e*), 3(*f*) and 3(*g*) respectively illustrate shapes of partitions in cases where PU split types are N×2N, nL×2N, and nR×2N. Furthermore, FIG. 3(*h*) illustrates a shape of a partition in a case where a PU split type is N×N.

The PU split types of FIGS. 3(*a*) and 3(*h*) are also referred to as square split on the basis of the shape of the partition. In addition, the PU split types of FIGS. 3(*b*) to 3(*g*) are also referred to as non-square split.

Further, in FIGS. 3(*a*) to 3(*h*), a number given to each domain indicates an identification number of the domain, and a process is performed on the domains in an order of the identification numbers. In other words, the identification number indicates a scan order of the domain.

[Split Type in Case of Inter-Prediction]

In an inter-PU, seven types are defined except for N×N (FIG. 3(*h*)) among the eight split types. In addition, the six asymmetric splittings are referred to as asymmetric motion partition (AMP).

Further, a specific value of N is prescribed by a size of a CU to which a corresponding PU belongs, and specific values of nU, nD, nL, and nR are determined according to a value of N. For example, an inter-CU of 128×128 pixels can be split into inter-PUs of 128×128 pixels, 128×64 pixels, 64×128 pixels, 64×64 pixels, 128×32 pixels, 128×96 pixels, 32×128 pixels, and, and 96×128 pixels.

[Split Type in Case of Intra-Prediction]

The following two split patterns are defined in an intra-PU. The patterns are a split pattern 2N×2N in which a target CU is not split, that is, the target CU is treated as a single PU, and a pattern N×N in which the target CU is symmetrically split into four PUs.

Therefore, the intra-PU can take the split patterns of FIGS. 3(a) and 3(h) in the examples illustrated in FIG. 3.

For example, an intra-CU of 128×128 pixels can be split into PUs of 128×128 pixels and 64×64 pixels.

(TU Split Type)

Next, a TU split type will be described with reference to FIGS. 3(i) to 3(o). Patterns of TU split are determined by a size of a CU, a depth (trafoDepth) of split, and a PU split type of a target PU.

In addition, patterns of TU split include square quadtree subdivision and non-square quadtree subdivision.

FIGS. 3(i) to (k) illustrate split types in which a square node is subdivided into square or non-square quadtrees. More specifically, FIG. 3(i) illustrates a split type in which a square node is subdivided into square quadtrees. In addition, FIG. 3(j) illustrates a split type in which a square node is subdivided into rectangular quadtrees each of which is transversely long. Further, FIG. 3(k) illustrates a split type in which a square node is subdivided into rectangular quadtrees each of which is longitudinally long.

In addition, FIGS. 3(l) to 3(o) illustrate split types in which a non-square node is subdivided into square or non-square quadtrees. More specifically, FIG. 3(l) illustrates a split type in which a rectangular node which is transversely long is subdivided into rectangular quadtrees each of which is transversely long. In addition, FIG. 3(m) illustrates a split type in which a rectangular node which is transversely long is subdivided into square quadtrees. Further, FIG. 3(n) illustrates a split type in which a rectangular node which is longitudinally long is subdivided into rectangular quadtrees each of which is longitudinally long. Furthermore, FIG. 3(o) illustrates a split type in which a rectangular node which is longitudinally long is subdivided into square quadtrees.

(Configuration of Quantized Residual Information QD)

The quantized residual information QD may include information such as a position of the last non-zero coefficient, the presence or absence of a non-zero coefficient in a sub-block, the presence or absence of a non-zero coefficient at each position, and a level and a sign of a transform coefficient. For example, FIGS. 4 and 5 illustrate each syntax included in the quantized residual information QD (in FIG. 4, denoted by residual_coding_cabac( )).

FIG. 4 is a diagram illustrating a first half part of a syntax table which shows syntaxes included in the quantized residual information QD. FIG. 5 is a diagram illustrating a second half part of the syntax table which shows syntaxes included in the quantized residual information QD.

As illustrated in FIGS. 4 and 5, the quantized residual information QD may include syntaxes transqunat_bypass_flag, transform_skip_flag, last_significant_coeff_x, last_significant_coeff_y, significant_coeff_group_flag, significant_coeff_flag, coeff_abs_level_greater1_flag, coeff_abs_level_greater2_flag, coeff_sign_flag, and coeff_abs_level_remaining.

Each syntax included in the quantized residual information QD is coded by context-based binary arithmetic coding (CABAC).

Transform coefficients are sequentially scanned from a low frequency side toward a high frequency side. This scan order may be referred to as a forward scan. On the other hand, reversely to the forward scan, a scan from a high frequency side to a low frequency side is also used. This scan order may be referred to as a backward scan. In addition, in a case where a transform skip or a transform/quantization bypass is to be performed, the forward scan and the backward scan are applied to a pixel domain.

The syntaxes last_significant_coeff_x and last_significant_coeff_y are syntaxes indicating a position of the last non-zero coefficient in the forward scan direction. In addition, each syntax may be subdivided into prefix and suffix and be coded. A last coefficient position may be derived by using last coefficient position prefixes last_significant_coeff_x prefix and last_significant_coeff_y prefix and last coefficient position suffixes last_significant_coeff_x suffix, and last_significant_coeff_y suffix.

The syntax significant_coeff_flag is a syntax indicating the presence or absence of a non-zero coefficient in each frequency component in the backward scan direction with a non-zero coefficient as a starting point. The syntax significant_coeff_flag is a flag which takes 0 if a transform coefficient is 0 and takes 1 if a transform coefficient is not 0, with respect to each of xC and yC. In addition, the syntax significant_coeff_flag is also referred to as a coefficient presence/absence flag. Further, significant_coeff_flag may not be treated as separate syntax but may be included in the syntax coeff_abs_level indicating an absolute value of a transform coefficient. In this case, a first bit of the syntax coeff_abs_level corresponds to significant_coeff_flag, and the following process of deriving a context index of significant_coeff_flag corresponds to a process of deriving a context index of the first bit of the syntax coeff_abs_level.

A variable length code decoding unit 11 included in the moving image decoding apparatus 1 splits a tree block into a plurality of sub-blocks, and decodes significant_coeff_group_flag in the process units of sub-blocks. The quantized residual information QD includes a flag (sub-block coefficient presence/absence flag significant_coeff_group_flag) indicating that at least one non-zero coefficient is present in the sub-block in the sub-block units.

Figure 7:
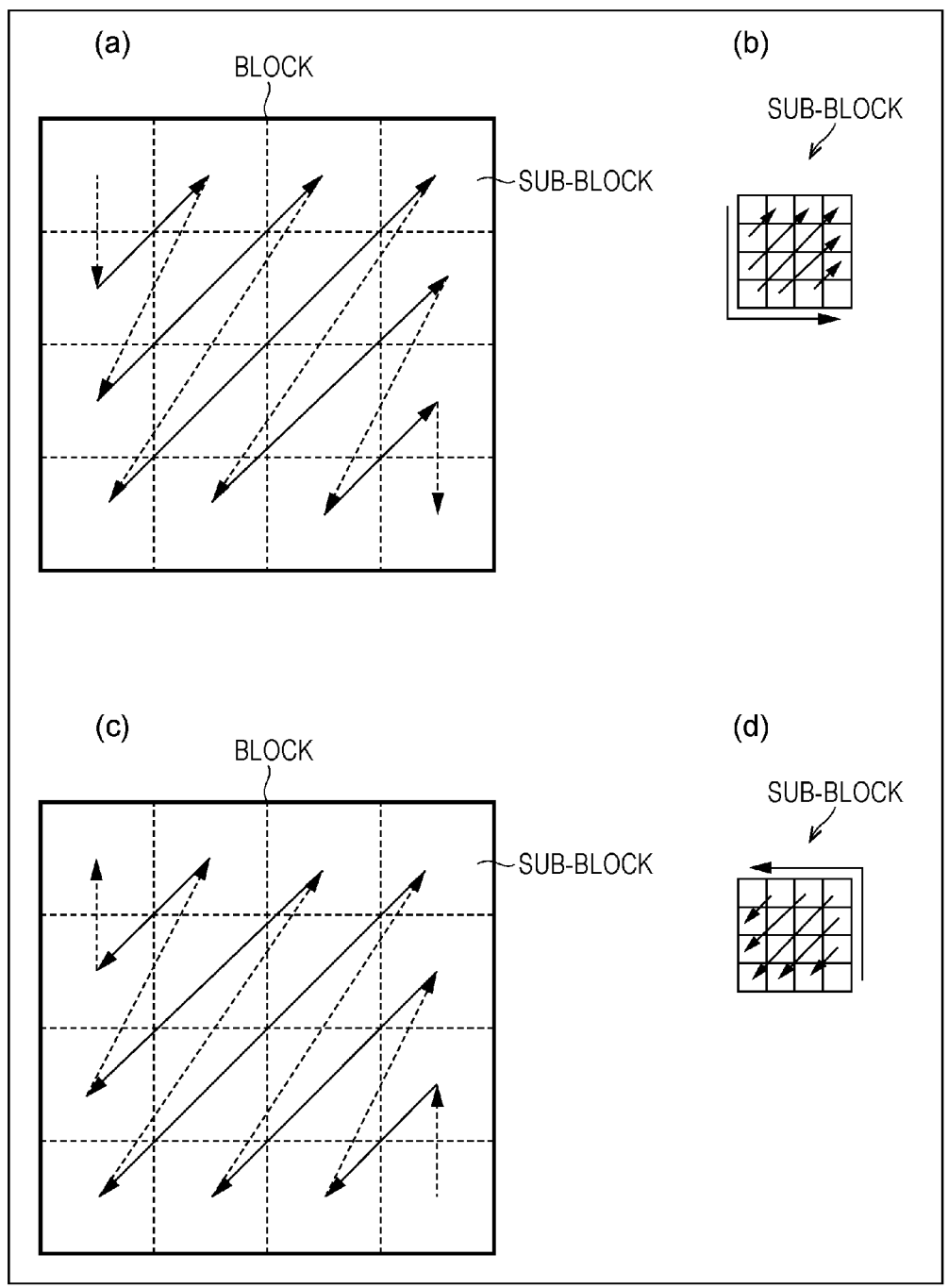

Hereinafter, with reference to FIGS. 6 to 8, a summary of a decoding process will be described.

FIG. 6 illustrates a relationship between a block and a sub-block. FIG. 6(a) illustrates an example in which a 4×4 TU is formed by a single sub-block including 4×4 components. FIG. 6(b) illustrates an example in which an 8×8 TU is formed by four sub-blocks each including 4×4 components. FIG. 6(c) illustrates an example in which a 16×16 TU is formed by sixteen sub-blocks each including 4×4 components. In addition, a relationship between a TU size and a sub-block size and a splitting method are not limited to these examples.

FIG. 7(a) is a diagram illustrating a scan order for a plurality of (in FIG. 7(a), 4×4=16) sub-blocks obtained by splitting a block. Hereinafter, a scan in the units of sub-blocks is also referred to as a sub-block scan. In a case where the sub-blocks are scanned as in FIG. 7(a), respective frequency domains in the sub-blocks are scanned in a scan order illustrated in FIG. 7(b). The scan order illustrated in FIGS. 7(a) and 7(b) is referred to as a "forward scan".

FIG. 7(c) is a diagram illustrating a scan order for a plurality of (in FIG. 7(b), 4×4=16) sub-blocks obtained by splitting a block. In a case where the sub-blocks are scanned as in FIG. 7(c), respective frequency domains in the sub-blocks are scanned in a scan order illustrated in FIG. 7(d). The scan order illustrated in FIGS. 7(c) and 7(d) is referred to as a "backward scan".

A transverse axis of each of FIGS. 8(a) to 8(f) expresses a horizontal frequency xC (where $0 \leq xC \leq 7$), and a longitudinal axis thereof expresses a vertical frequency yC (where 0≤yC≤7). In the following description, among partial domains included in a frequency domain, a partial domain designated by the horizontal frequency xC and the vertical frequency yC is also referred to as a frequency component (xC, yC). In addition, a transform coefficient for the frequency component (xC, yC) is also denoted by Coeff (xC, yC). A transform coefficient Coeff (0, 0) indicates a DC component, and other transform coefficients indicate components other than the DC component. In the present specification, (xC, yC) may be denoted as (u, v). Further, in a case where the those skilled in the art or the transform/quantization bypass is applied, the horizontal frequency xC is assumed to be interpreted as a horizontal pixel position xC, and the vertical frequency yC is assumed to be interpreted as a vertical pixel position yC. A pixel designated by the horizontal pixel position xC and the vertical pixel position yC is referred to as a pixel (xC, yC). Furthermore, a prediction residual for the pixel (xC, yC) is denoted by Coeff(xC, yC).

Figure 8:
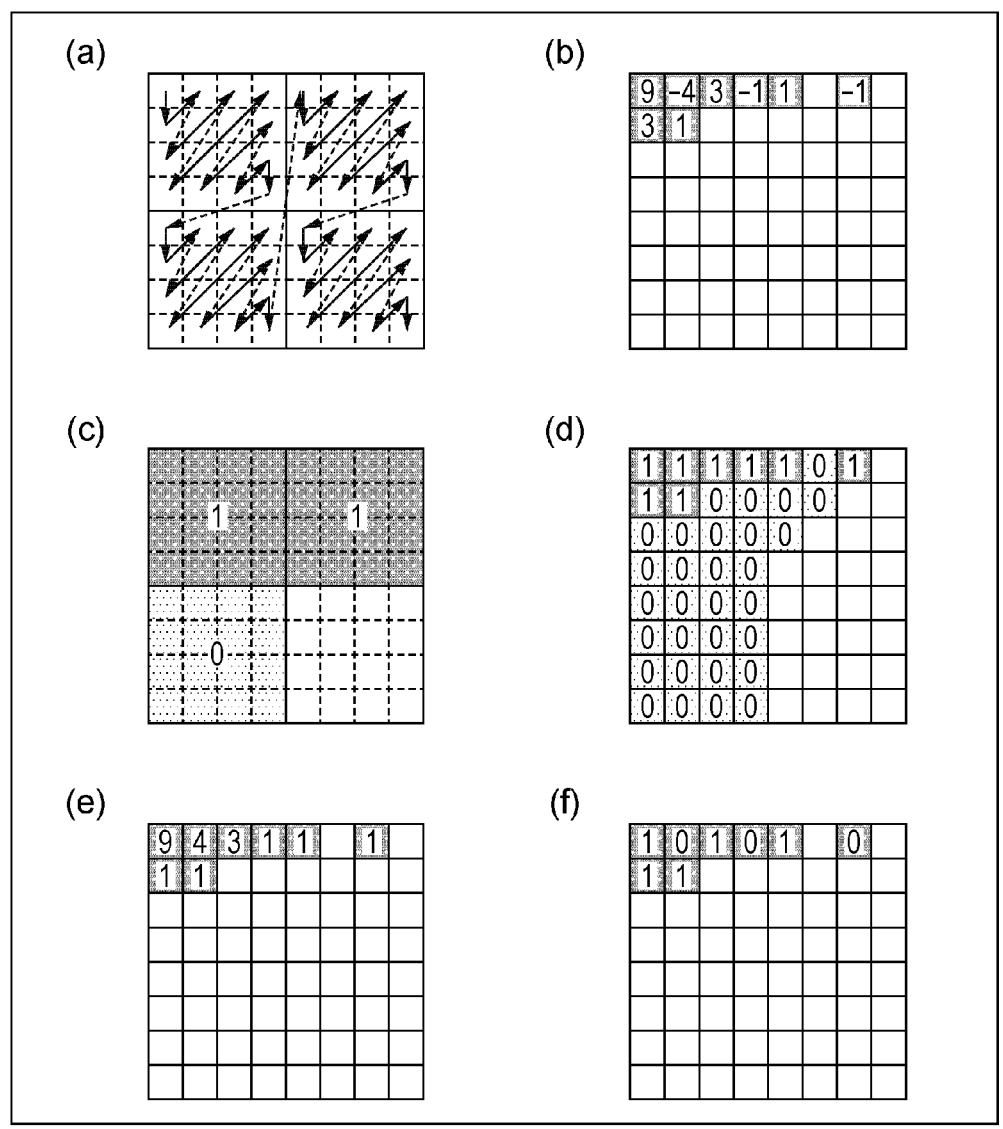

FIG. 8(*a*) is a diagram illustrating a scan order in a case where a block having a TU size of 8×8 is split into sub-blocks each having a size of 4×4, and respective frequency components (or respective pixels) are scanned in the forward scan.

FIG. 8(*b*) is a diagram exemplifying non-zero coefficients in a frequency domain including 8×8 frequency components (or a pixel domain including 8×8 components). In a case of the example illustrated in FIG. 8(*b*), last_significant_coeff_x is 6, and last_significant_coeff_y is 0.

FIG. 8(*c*) is a diagram illustrating each value of the sub-block coefficient presence/absence flag significant_coeff_group_flag which is decoded for each sub-block in a case where decoding target transform coefficients are ones illustrated in FIG. 8(*b*). A value of significant_coeff_group_flag regarding a sub-block including at least one non-zero coefficient is set to 1, and a value of significant_coeff_group_flag regarding a sub-block including no non-zero coefficient is set to 0.

FIG. 8(*d*) is a diagram illustrating each value of the syntax significant_coeff_flag indicating the presence or absence of a non-zero coefficient in a case where decoding target transform coefficients are ones illustrated in FIG. 8(*b*). For a sub-block in which significant_coeff_group_flag is 1, significant_coeff_flag is decoded in the backward scan order, and for a sub-block in which significant_coeff_group_flag is 0, significant_coeff_flag for all the frequency components (or pixels) included in the sub-block is set to 0 without decoding significant_coeff_flag (a lower left sub-block of FIG. 8(*d*)).

FIG. 8(*e*) is a diagram illustrating each value obtained by decoding the syntaxes coeff_abs_level_greater1_flag, coeff_abs_level_greater2_flag, and coeff_abs_level_remaining in a case where decoding target transform coefficients are ones illustrated in FIG. 8(*b*).

FIG. 8(*f*) is a diagram illustrating the syntax coeff_sign_flag in a case where decoding target transform coefficients are ones illustrated in FIG. 8(*b*).

Decoding of the syntaxes coeff_abs_level_greater1_flag, coeff_abs_level_greater2_flag, and coeff_abs_level_remaining indicating a value of each transform coefficient changes depending on a mode (high throughput mode). The high throughput mode is turned off at the time of start of a sub-block, and the high throughput mode is turned on at the time when the number of non-zero coefficients in a sub-block is equal to or larger than a predetermined constant. In the high throughput mode, decoding of some of the syntaxes are skipped.

The syntax coeff_abs_level_greater1_flag is a flag indicating whether or not an absolute value of a transform coefficient exceeds 1, and is coded for a frequency component in which a value of the syntax significant_coeff_flag is 1. In a case where a value of a transform coefficient exceeds 1, a value of coeff_abs_level_greater1_flag is 1, and, otherwise, a value of coeff_abs_level_greater1_flag is 0. In addition, decoding of coeff_abs_level_greater1_flag is skipped in the high throughput mode.

The syntax coeff_abs_level_greater2_flag is a flag indicating whether or not an absolute value of a transform coefficient exceeds 2, and is coded when a value of coeff_abs_level_greater1_flag is 1. In a case where an absolute value of a transform coefficient exceeds 2, a value of coeff_abs_level_greater2_flag is 1, and, otherwise, a value of coeff_abs_level_greater2_flag is 0. In addition, decoding of coeff_abs_level_greater2_flag is skipped after the first time in each sub-block, and in a case of the high throughput mode.

In a case where an absolute value of a transform coefficient is a predetermined base level baseLevel, the syntax coeff_abs_level_remaining is a syntax for designating an absolute value of the transform coefficient. In a case where decoding of coeff_abs_level_greater1_flag is skipped, coeff_abs_level_greater2_flag is skipped, and in a case where coeff_abs_level_greater1_flag is 1, coeff_abs_level_greater2_flag is coded when a value thereof is 1. A value of the syntax coeff_abs_level_remaining is obtained by subtracing baseLevel from an absolute value of a transform coefficient. For example, coeff_abs_level_remaining=1 indicates that an absolute value of a transform coefficient is baseLevel+1. In addition, baseLevel is determined as follows.

baseLevel=1 (in a case where decoding of coeff_abs_level_greater1_flag is skipped)

baseLevel=2 (in a case where decoding of coeff_abs_level_greater2_flag is skipped in cases other than the above-described case)

baseLevel=3 (in a case where decoding of coeff_abs_level_greater2_flag is 1 in cases other than the above-described cases)

The syntax coeff_sign_flag is a flag indicating a sign (positive or negative) of a transform coefficient, and is coded for a frequency component in which a value of the syntax significant_coeff_flag is 1 except for a case of performing sign hiding. The syntax coeff_sign_flag takes 1 if a transform coefficient is positive, and takes 0 if a transform coefficient is negative.

In addition, the sign hiding refers to a method in which a sign of a transform coefficient is not explicitly coded but is calculated through computation.

The variable length code decoding unit 11 included in the moving image decoding apparatus 1 can generate a transform coefficient Coeff (xC, yC) for each frequency component (or each pixel) by decoding the syntaxes last_significant_coeff_x, last_significant_coeff_y, significant_coeff_flag, coeff_abs_level_greater1_flag, coeff_abs_level_greater2_flag, and coeff_sign_flag, coeff_abs_level_remaining.

In addition, a set of non-zero coefficients in a specific domain (for example, a TU) is also referred to a significance map in some cases.

Details of decoding processes of the various syntaxes will be described later, and a configuration of the moving image decoding apparatus 1 will now be described.

(Moving Image Decoding Apparatus 1)

Hereinafter, a description will be made of the moving image decoding apparatus 1 according to the present embodiment with reference to the drawings. The moving image decoding apparatus 1 is a decoding apparatus which employs the technique proposed in High-Efficiency Video Coding (HEVC) which is a succeeding codec of the H. 264/MPEG-4 AVC standard.

Figure 9:
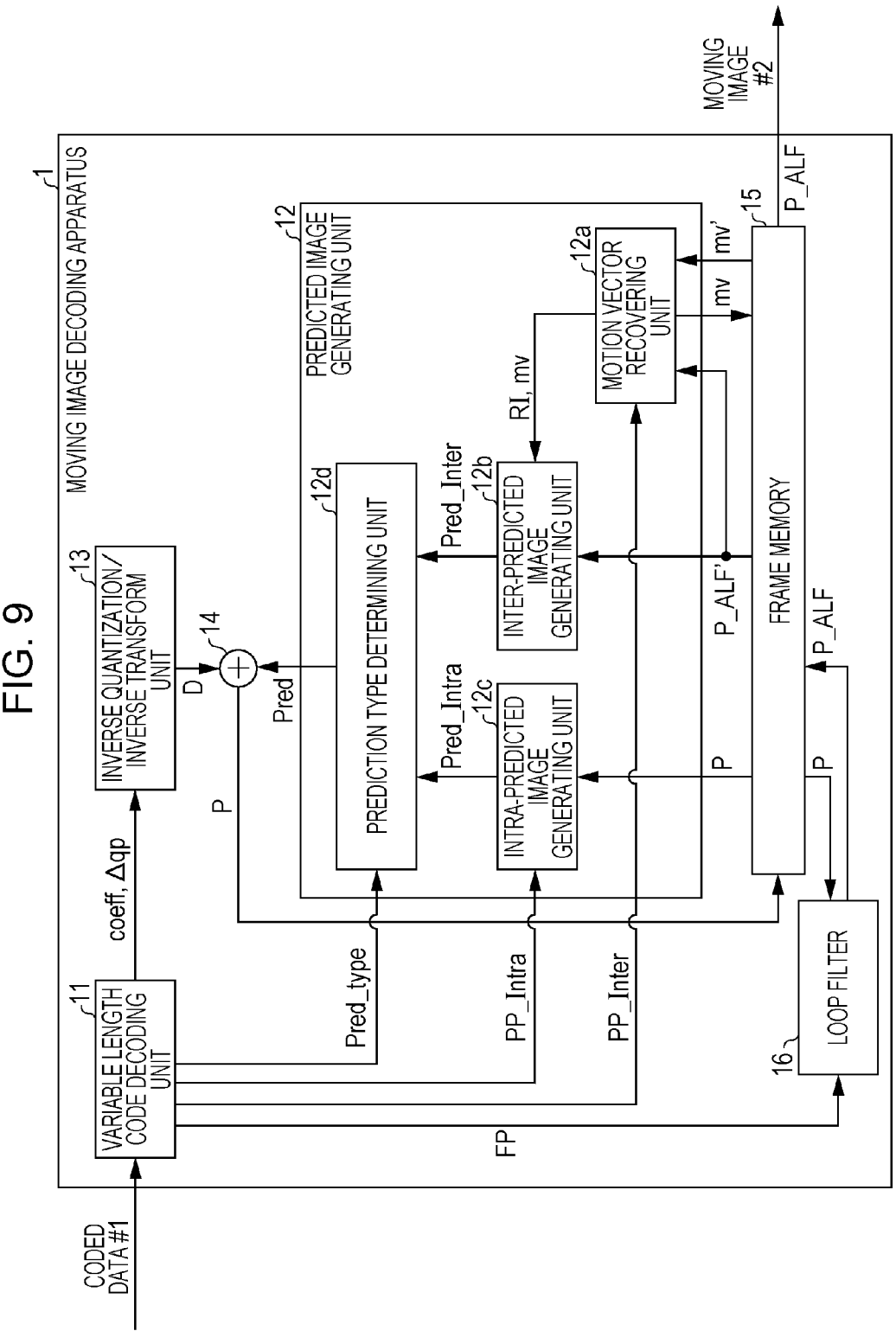
FIG. 9 is a block diagram illustrating a configuration of the moving image decoding apparatus according to the embodiment.

FIG. 9 is a block diagram illustrating a configuration of the moving image decoding apparatus 1. As illustrated in FIG. 9, the moving image decoding apparatus 1 includes the variable length code decoding unit 11, a predicted image generating unit 12, an inverse quantization/inverse transform unit 13, an adder 14, a frame memory 15, and a loop filter 16. In addition, as illustrated in FIG. 9, the predicted image generating unit 12 includes a motion vector recovering unit 12*a*, an inter-predicted image generating unit 12*b*, an intra-predicted image generating unit 12*c*, and a prediction type determining unit 12*d*. The moving image decoding apparatus 1 is an apparatus which generates a moving image #2 by decoding the coded data #1.

(Variable Length Code Decoding Unit 11)

Figure 10:
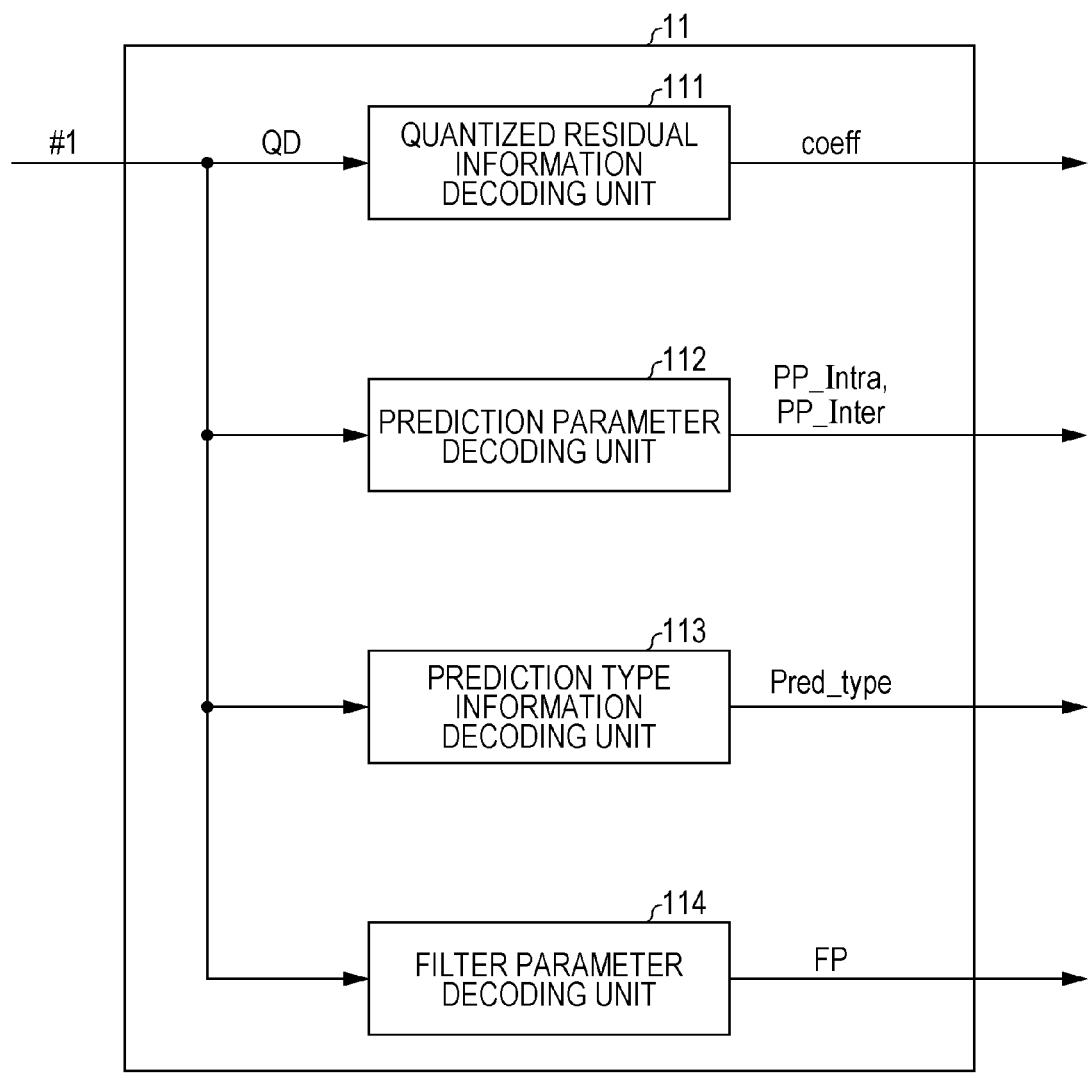
FIG. 10 is a block diagram illustrating a configuration of a variable length code decoding unit included in the moving image decoding apparatus according to the embodiment.

FIG. 10 is a block diagram illustrating a main part configuration of the variable length code decoding unit 11. As illustrated in FIG. 10, the variable length code decoding unit 11 includes a quantized residual information decoding unit 111, a prediction parameter decoding unit 112, a prediction type information decoding unit 113, and a filter parameter decoding unit 114.

The variable length code decoding unit 11 decodes a prediction parameter PP regarding each partition from the coded data #1 in the prediction parameter decoding unit 112 and supplies the prediction parameter PP to the predicted image generating unit 12. Specifically, the prediction parameter decoding unit 112 decodes inter-prediction parameters PP_Inter including a reference image index, an estimation motion vector index, and a motion vector difference from the coded data #1 in relation to an inter-prediction partition, and supplies the inter-prediction parameters to the motion vector recovering unit 12*a*. On the other hand, in relation to an intra-prediction partition, intra-prediction parameters PP_Intra including an estimated prediction mode flag, an estimated prediction mode index, and a remaining prediction mode index are decoded from the coded data #1, and are supplied to the intra-predicted image generating unit 12*c*.

In addition, the variable length code decoding unit 11 decodes the prediction type information Pred_type for each partition from the coded data #1 in the prediction type information decoding unit 113, and supplies the prediction type information to the prediction type determining unit 12*d*. Further, the variable length code decoding unit 11 decodes the quantized residual information QD regarding a block, and the quantization parameter difference Δpq regarding TU including the block, from the coded data #1 in the quantized residual information decoding unit 111, and supplies the decoded information to the inverse quantization/inverse transform unit 13. Furthermore, the variable length code decoding unit 11 decodes the filter parameter FP from the coded data #1 in the filter parameter decoding unit 114 and supplies the filter parameter to the loop filter 16. Moreover, a specific configuration of the quantized residual information decoding unit 111 will be described later, and thus description thereof is omitted here.

(Predicted Image Generating Unit 12)

The predicted image generating unit 12 identifies whether each partition is an inter-prediction partition on which inter-prediction is to be performed or an intra-prediction partition on which intra-prediction is to be performed on the basis of the prediction type information Pred_type for each partition. In addition, in the former case, an inter-predicted image Pred_Inter is generated, and the generated inter-predicted image Pred_Inter is supplied to the adder 14 as a predicted image Pred, and, in the latter case, an intra-predicted image Pred_Intra is generated, and the generated intra-predicted image Pred_Intra is supplied to the adder 14. Further, in a case where a skip mode is applied to a process target PU, the predicted image generating unit 12 omits decoding of other parameters which belongs to the PU.

(Motion Vector Recovering Unit 12*a*)

The motion vector recovering unit 12*a* recovers a motion vector my regarding each inter-prediction partition on the basis of a motion vector difference regarding the partition and a recovered motion vector my' regarding another partition. Specifically, (1) an estimation motion vector is derived from the recovered motion vector my' according to an estimation method designated by the estimation motion vector index, and (2) the motion vector my is obtained by adding the derived estimation motion vector to the motion vector difference. In addition, the recovered motion vector my' regarding another partition may be read from the frame memory 15. The motion vector recovering unit 12*a* supplies the recovered motion vector my to the inter-predicted image generating unit 12*b* along with a corresponding reference image index RI.

(Inter-Predicted Image Generating Unit 12*b*)

The inter-predicted image generating unit 12*b* generates a motion compensation image mc regarding each inter-prediction partition through inter-frame prediction. Specifically, the motion compensation image mc is generated from an adaptive filtered decoded image P_ALF' designated by the reference image index RI which is supplied from the motion vector recovering unit 12*a*, by using the motion vector my supplied from the motion vector recovering unit 12*a*. Here, the adaptive filtered decoded image P_ALF' is an image obtained by the loop filter 16 performing a filter process on a decoded image in which decoding of all frames have already been completed, and the inter-predicted image generating unit 12*b* may read a pixel value of each pixel forming the adaptive filtered decoded image P_ALF' from the frame memory 15. The motion compensation image mc generated by the inter-predicted image generating unit 12*b* is supplied to the prediction type determining unit 12*d* as the inter-predicted image Pred_Inter.

(Intra-Predicted Image Generating Unit 12*c*)

The intra-predicted image generating unit 12*c* generates a predicted image Pred_Intra regarding each intra-prediction partition. Specifically, first, a prediction mode is specified on the basis of the intra-prediction parameters PP_Intra supplied from the variable length code decoding unit 11, and assigns the specified prediction mode to a target partition, for example, in a raster scan order.

Here, the specification of a prediction mode based on the intra-prediction parameters PP_Intra may be performed as follows. (1) The estimated prediction mode flag is decoded, and, in a case where the estimated prediction mode flag indicates that a prediction mode for a process target partition is the same as prediction modes assigned to peripheral partitions of the target partition, the prediction mode which is assigned to the peripheral partitions of the target partition is assigned to the target partition. (2) On the other hand, in a case where the estimated prediction mode flag indicates that a prediction mode for a process target partition is not the same as prediction modes assigned to peripheral partitions of the target partition, the remaining prediction mode index is decoded, and a prediction mode indicated by the remaining prediction mode index is assigned to the target partition.

The intra-predicted image generating unit 12c generates the predicted image Pred_Intra from a (locally) decoded image P through inter-frame prediction according to a prediction method indicated by the prediction mode assigned to the target partition. The intra-predicted image Pred_Intra generated by the intra-predicted image generating unit 12c is supplied to the prediction type determining unit 12d. In addition, the intra-predicted image generating unit 12c may generate the predicted image Pred_Intra from the adaptive filtered decoded image P_ALF through intra-frame prediction.

Figures 11, 12:
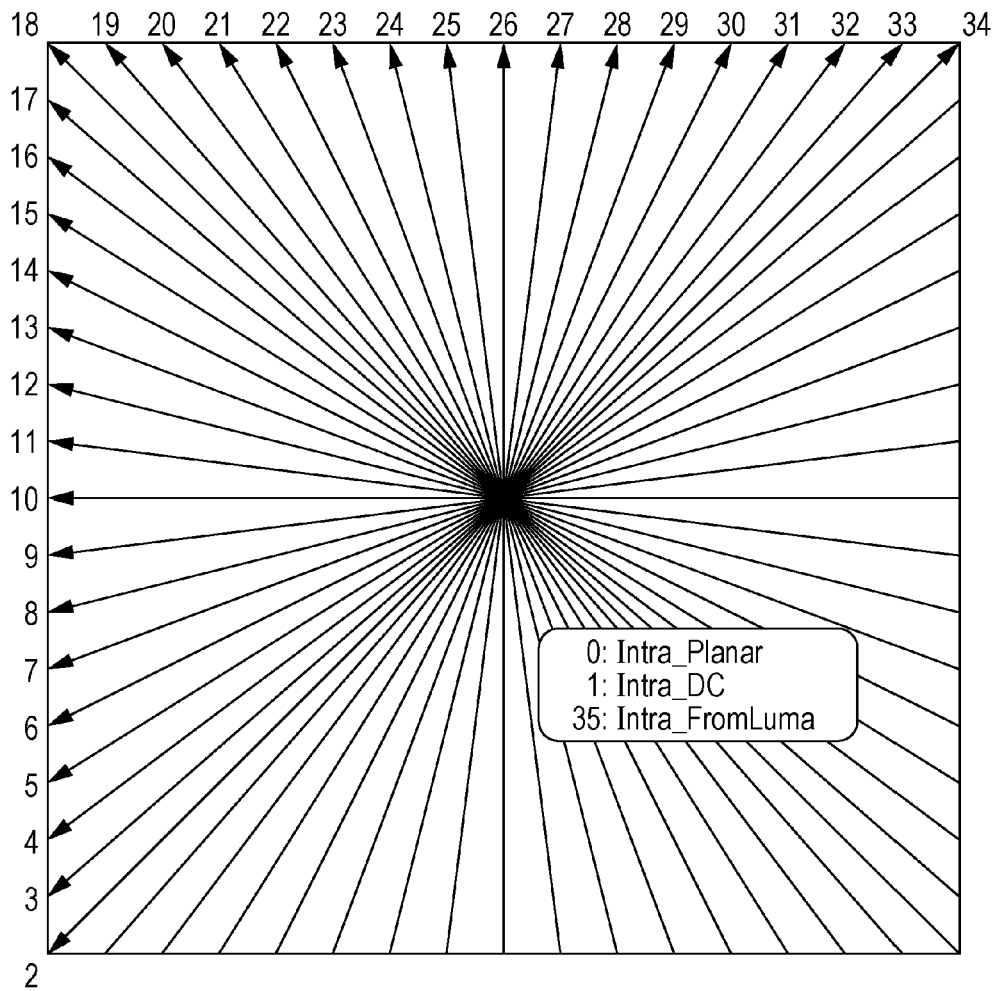
FIG. 11 is a diagram illustrating directions of intra-prediction which can be used in the moving image decoding apparatus according to the embodiment.
FIG. 12 is a diagram illustrating intra-prediction modes and the names correlated with corresponding intra-prediction modes.

With reference to FIG. 11, definition of the prediction mode will be described. FIG. 11 illustrates a definition of the prediction mode. As illustrated in FIG. 11, thirty-six types of prediction modes are defined, and the prediction modes are specified by numbers of "0" to "35" (intra-prediction mode indexes). In addition, as illustrated in FIG. 12, the following name is assigned to each prediction mode. In other words, "0" is "Intra_Planar (planar prediction mode)", "1" is "Intra DC (intra-DC prediction mode)", "2" to "34" are "Intra Angular (direction prediction)", and "35" is "Intra From Luma". "35" is specific to a chroma prediction mode, and is a mode for performing chroma prediction on the basis of prediction of luminance. In other words, the chroma prediction mode "35" is a prediction mode using a luminance pixel value and a chroma pixel value. The chroma prediction mode "35" is also referred to as an LM mode. The number of prediction modes (intraPredModeNum) is "35" regardless of a size of a target block.

(Prediction Type Determining Unit 12d)

The prediction type determining unit 12d determines whether each partition is an inter-prediction partition on which inter-prediction is to be performed or an intra-prediction partition on which intra-prediction is to be performed on the basis of the prediction type information Pred_type for a PU to which each partition belongs. In addition, in the former case, the inter-predicted image Pred_Inter generated in the inter-predicted image generating unit 12b is supplied to the adder 14 as a predicted image Pred, and, in the latter case, the intra-predicted image Pred_Intra is generated in the intra-predicted image generating unit 12c is supplied to the adder 14 as a predicted image Pred.

(Inverse Quantization/Inverse Transform Unit 13)

In a normal case (the transform skip is not performed (transform_skip_flag==0), and the transform/quantization bypass is not performed (transquant_bypass_flag==0)), the inverse quantization/inverse transform unit 13 (1) inversely quantizes the transform coefficient Coeff which has been decoded from the quantized residual information QD of the coded data #1, (2) performs inverse frequency transform such as inverse discrete cosine transform (DCT) on a transform coefficient Coeff_IQ obtained through the inverse quantization, and (3) supplies a prediction residual D obtained through the inverse frequency transform to the adder 14. In addition, in a case where the transform/quantization bypass is performed (transquant_bypass_flag==1), the inverse quantization/inverse transform unit 13 (1) supplies the transform coefficient Coeff (equivalent to the prediction residual D) which has been decoded from the quantized residual information QD of the coded data #1 to the adder 14. Further, in a case where the transform skip is performed (transform_skip_flag==1), the inverse quantization/inverse transform unit 13 (1) inversely quantizes the transform coefficient Coeff which has been decoded from the quantized residual information QD of the coded data #1, and (2) supplies the transform coefficient Coeff_IQ (equivalent to the prediction residual D) obtained through the inverse quantization to the adder 14. Furthermore, in a case where the transform coefficient Coeff decoded from the quantized residual information QD is inversely quantized, the inverse quantization/inverse transform unit 13 derives a quantization step QP from the quantization parameter difference Δqp supplied from the variable length code decoding unit 11. The quantization parameter qp may be derived by adding the quantization parameter difference Δqp to a quantization parameter qp' regarding a TU which is previously subject to inverse quantization and inverse frequency transform, and the quantization step QP may be derived from the quantization parameter qp by, for example, $QP=2^{qp/6}$. In addition, the generation of the prediction residual D by the inverse quantization/inverse transform unit 13 is performed in the unit of TU or in the units of blocks into which the TU is split.

In addition, for example, if a size of a target block is 8×8 pixels, a position of a pixel in the target block is set to (i, j) (where 0≤i≤7 and 0≤j≤7), a value of the prediction residual D at the position (i, j) is indicated by D(i, j), and a transform coefficient which is inversely quantized in a frequency component (u, v) (where 0≤u≤7 and 0≤v≤7) is indicated by Coeff_IQ(u, v), the inverse DCT performed by the inverse quantization/inverse transform unit 13 is given by, for example, the following Equation (1).

[Math. 1]

$$D(i, j) = \frac{1}{4}\sum_{u=0}^{7}\sum_{v=0}^{7}C(u)C(v)\text{Coeff\_IQ}(u, v)\cos\left\{\frac{(2i+1)u\pi}{16}\right\}\cos\left\{\frac{(2j+1)v\pi}{16}\right\} \quad (1)$$

Here, (u, v) are variables corresponding to the above-described (xC, yC). C(u) and C(v) are given as follows.

$C(u)=1/\sqrt{2}$ (u=0)
$C(u)=1$ (u≠0)
$C(v)=1/\sqrt{2}$ (v=0)
$C(v)=1$ (v≠0)

In addition, in a case where the transform skip is performed, inverse frequency transform is not performed, and thus the prediction residual D(i, j) at the position (i, j) of the pixel in the corresponding target block is equivalent to the inversely quantized transform coefficient Coeff_IQ(u, v) as in the following equation.

$D(i,j)=\text{Coeff\_IQ}(u,v)$ (where $i=u$ and $j=v$)

In addition, in a case where the transform/quantization bypass is performed, inverse quantization and inverse frequency transform are not performed, and thus the prediction residual D(i, j) at the position (i, j) of the pixel in the corresponding target block is equivalent to the transform coefficient Coeff (u, v) as in the following equation.

$D(i,j)=\text{Coeff}(u,v)$ (where $i=u$ and $j=v$)

(Adder 14)

The adder 14 generates a decoded image P by adding the predicted image Pred supplied from the predicted image generating unit 12 to the prediction residual D supplied from the inverse quantization/inverse transform unit 13. The generated decoded image P is stored in the frame memory 15.

(Loop Filter 16)

The loop filter 16 functions (1) as a deblocking filter (DF) which performs smoothing (deblock process) on a peripheral image on a block boundary or a partition boundary in the decoded image P, and (2) as an adaptive loop filter (ALF) of performing an adaptive filter process on the image to which the deblocking filter has been applied, by using the filter parameter FP.

(Quantized Residual Information Decoding Unit 111)

The quantized residual information decoding unit 111 has a configuration for decoding the quantized transform coefficient Coeff (xC, yC) for each coefficient position (or each frequency component or each pixel) (xC, yC) from the quantized residual information QD included in the coded data #1. Here, xC and yC are indexes indicating a position of each frequency component in a frequency domain or a pixel domain, and are indexes which respectively correspond to the horizontal frequency u and the vertical frequency v in the frequency domain, or the horizontal pixel position u and the vertical pixel position v in the pixel domain. Hereinafter, the quantized transform coefficient Coeff may also be simply referred to as a transform coefficient Coeff.

Figure 1:
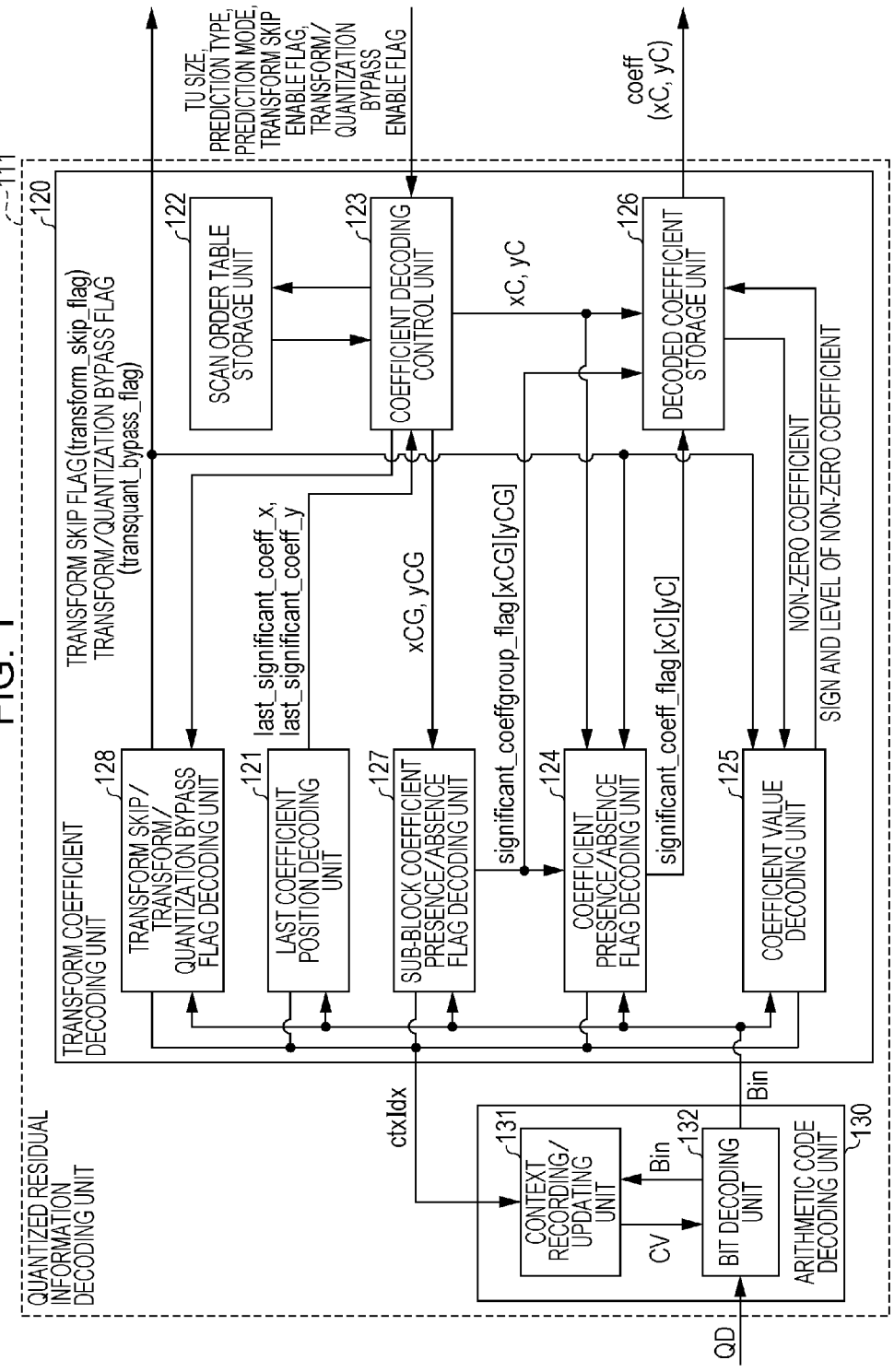
FIG. 1 is a block diagram illustrating a configuration of a quantized residual information decoding unit included in a moving image decoding apparatus according to an embodiment of the present invention.

FIG. 1 is a block diagram illustrating a configuration of the quantized residual information decoding unit 111. As illustrated in FIG. 1, the quantized residual information decoding unit 111 includes a transform coefficient decoding unit 120 and an arithmetic code decoding unit 130.

(Arithmetic Code Decoding Unit 130)

The arithmetic code decoding unit 130 has a configuration for decoding each bit included in the quantized residual information QD by referring to context, and includes a context recording/updating unit 131 and a bit decoding unit 132 as illustrated in FIG. 1.

[Context Recording/Updating Unit 131]

The context recording/updating unit 131 has a configuration for recording and updating a context variable CV which is managed by each context index ctxIdx. Here, the context variable CV includes (1) a superior symbol MPS (most probable symbol) of which an occurrence probability is high, and (2) a probability state index pStateIdx for designating an occurrence probability of the superior symbol MPS.

The context recording/updating unit 131 updates the context variable CV by referring to the context index ctxIdx supplied from each constituent element included in the transform coefficient decoding unit 120 and a value of a Bin decoded by the bit decoding unit 132, and records the updated context variable CV until updated next. In addition, the superior symbol MPS is 0 or 1. Further, the superior symbol MPS and the probability state index pStateIdx are updated whenever the bit decoding unit 132 decodes a single Bin.

In addition, the context index ctxIdx may directly designate a context regarding each coefficient position (each frequency component or each pixel), and may be an increment value from an offset of a context index which is set for each process target TU (this is also the same for the following).

[Bit Decoding Unit 132]

The bit decoding unit 132 decodes each bit (also referred to as a Bin) included in the quantized residual information QD by referring to the context variable CV which is recorded in the context recording/updating unit 131. In addition, a value of the Bin obtained through the decoding is supplied to each constituent element included in the transform coefficient decoding unit 120. Further, a value of the Bin obtained through the decoding is also supplied to the context recording/updating unit 131 so as to be referred to for updating the context variable CV.

(Transform Coefficient Decoding Unit 120)

As illustrated in FIG. 1, the transform coefficient decoding unit 120 includes a last coefficient position decoding unit 121, a scan order table storage unit 122, a coefficient decoding control unit 123, a coefficient presence/absence flag decoding unit, a coefficient value decoding unit 125, a decoded coefficient storage unit 126, a sub-block coefficient presence/absence flag decoding unit 127, and a transform skip/transform/quantization bypass flag decoding unit 128.

[Last Coefficient Position Decoding Unit 121]

The last coefficient position decoding unit 121 interprets the decoded bit (Bin) supplied from the bit decoding unit 132 so as to decode the syntaxes last_significant_coeff_x and last_significant_coeff_y. The decoded syntaxes last_significant_coeff_x and last_significant_coeff_y are supplied to the coefficient decoding control unit 123. In addition, the last coefficient position decoding unit 121 calculates the context index ctxIdx for determining context used to decode Bins of the syntaxes last_significant_coeff_x and last_significant_coeff_y in the arithmetic code decoding unit 130. The calculated context index ctxIdx is supplied to the context recording/updating unit 131.

[Scan Order Table Storage Unit 122]

The scan order table storage unit 122 stores a table which provides a position of a process target frequency component in a frequency domain or a pixel domain by using a size of a process target TU (block), a scan index indicating the type of scan direction, and a frequency component identification index which is given according to a scan order, as arguments.

An example of such a scan order table may include ScanOrder as illustrated in FIGS. 4 and 5. ScanOrder illustrated in FIGS. 4 and 5 is a table for obtaining a position (xC, yC) of a process target transform block in a frequency domain on the basis of a width size log 2TrafoWidth of a process target TU, a height size log 2TrafoHeight of the process target TU, a scan index scanIdx, and a frequency component identification index n which is given according to a scan order. In addition, in a case where the transform skip or the transform/quantization bypass is applied, ScanOrder is a table for obtaining a position (xC, yC) of a process target transform block in a pixel domain on the basis of a width size log 2TrafoWidth of a process target TU, a height size log 2TrafoHeight of the process target TU, a scan index scanIdx, and a frequency component identification index n which is given according to a scan order. Further, hereinafter, a position (xC, yC) of a process target transform block in a frequency domain or a pixel domain may be simply referred to as a coefficient position (xC, yC).

Further, the table stored in the scan order table storage unit 122 is designated by a size of a process target TU (block) and the scan index scanIdx associated with a prediction mode index of an intra-prediction mode. In a case where a prediction method used for a process target TU is intra-prediction, the coefficient decoding control unit 123 refers to a table which is designated by a size of the TU and the scan index scanIdx associated with a prediction mode of the TU, so as to determine a scan order of transform blocks.

FIG. 13 illustrates an example of the scan index scanIdx which is designated by an intra-prediction mode index IntraPredMode and a value log 2TrafoSize for designating a TU size. In FIG. 13, log 2TrafoSize−2=0 indicates that a TU size is 4×4 (corresponding to 4×4 pixels), and log 2TrafoSize−2=1 indicates that a TU size is 8×8 (corresponding to 8×8 pixels). As illustrated in FIG. 13, for example, in a case where the TU size is 4×4, and the intra-prediction mode index is 1, the scan index of 0 is used, and, in a case where the TU size is 4×4, and the intra-prediction mode index is 6, the scan index of 2 is used.

FIG. 14(a) illustrates a scan type ScanType designated by each value of the scan index scanIdx. As illustrated in FIG. 14(a), in a case where the scan index is 0, an up-right diagonal scan is designated; in a case where the scan index is 1, a horizontal fast scan is designated; and in a case where the scan index is 2, a vertical fast scan is designated.

In addition, FIG. 14(b) illustrates a scan order of each scan in the horizontal fast scan, the vertical fast scan, and the up-right diagonal scan in a case where a TU size is 4×4. In FIG. 14(b), numbers given to the respective coefficient positions indicate an order in which the coefficient positions are scanned. Further, each example illustrated in FIG. 14(b) shows a forward scan direction. Furthermore, the scan of FIG. 14(b) is not limited to the 4×4 TU size, and may be used in a 4×4 sub-block. Moreover, the same scan may be used in a TU or a sub-block having a larger size than 4×4.

FIG. 14(c) illustrates another example of the horizontal fast scan and the vertical fast scan. In this example, the scans are used in a TU size or a sub-block of 8×2 or 2×8.

[Sub-Block Scan Order Table]

In addition, the scan order table storage unit 122 stores a sub-block scan order table for designating a scan order of sub-blocks. The sub-block scan order table is designated by a size of a process target TU (block) and the scan index scanIdx associated with a prediction mode index (prediction direction) of an intra-prediction mode. In a case where a prediction method used for a process target TU is intra-prediction, the coefficient decoding control unit 123 refers to a table which is designated by a size of the TU and the scan index scanIdx associated with a prediction mode of the TU, so as to determine a scan order of sub-blocks.

[Coefficient Decoding Control Unit 123]

The coefficient decoding control unit 123 has a configuration for controlling an order of a decoding process in each constituent element included in the quantized residual information decoding unit 111.

The coefficient decoding control unit 123 includes a sub-block splitting unit 129 (not illustrated). The sub-block splitting unit 129 splits a TU into sub-blocks. Details of the sub-block splitting unit 129 will be described later.

The coefficient decoding control unit 123 specifies a position of the last non-zero coefficient according to the forward scan by referring to the syntaxes last_significant_coeff_x and last_significant_coeff_y supplied from the last coefficient position decoding unit 121, and supplies a position (xCG, yCG) of each sub-block to the sub-block coefficient presence/absence flag decoding unit 127 in a backward scan order of a scan order which uses a position of a sub-block including the specified position of the last non-zero coefficient as a starting point and is given by the sub-block scan order table stored in the scan order table storage unit 122.

Further, in relation to a process target sub-block, the coefficient decoding control unit 123 supplies a position (xC, yC) of each frequency component included in the process target sub-block to the coefficient presence/absence flag decoding unit 124 and the decoded coefficient storage unit 126 in a backward scan order of a scan order which is given by the scan order table stored in the scan order table storage unit 122. Here, as a scan order of each coefficient (each frequency component or each pixel) included in the process target sub-block, in a case of intra-prediction, a scan order (any one of the horizontal fast scan, the vertical fast scan, and the up-right diagonal scan) indicated by a scan index scanIdx which is designated by the intra-prediction mode index IntraPredMode and a value log 2TrafoSize for designating a TU size may be used, and, in a case of inter-prediction, the up-right diagonal scan may be used.

As mentioned above, the coefficient decoding control unit 123 has a configuration of setting a sub-block scan order according to a prediction direction of intra-prediction in a case where a prediction method which is applied to a process target unit domain (a block or a TU) is the intra-prediction.

Generally, since an intra-prediction mode and a bias of a transform coefficient are correlated with each other, a scan order is changed according to the intra-prediction mode, and a scan suitable for biases of the sub-block coefficient presence/absence flag and the coefficient presence/absence flag can be performed. Consequently, it is possible to reduce a code amount of the sub-block coefficient presence/absence flag and the coefficient presence/absence flag which are coding and decoding targets, and thus to reduce a processing amount and to improve coding efficiency.

[Sub-Block Splitting Unit 129]

The sub-block splitting unit 129 derives a sub-block size in accordance with a scan order and a TU size, and splits a TU into sub-blocks by splitting the TU in the derived sub-block size. Hereinafter, a method of deriving a sub-block size will be sequentially described. In addition, as described above, in a case where a scan order is determined by the CU prediction type information PredMode, a TU size, and the intra-prediction mode index IntraPredMode, a sub-block size can also be derived by using the CU prediction type information PredMode, the TU size, and the intra-prediction mode index IntraPredMode.

(Configuration of Deriving Sub-Block Size by Using CU Prediction Type Information PredMode, TU Size, and Intra-Prediction Mode Index IntraPredMode)

FIG. 27 is a diagram illustrating a method of deriving a sub-block size by using the CU prediction type information PredMode, a TU size, and the intra-prediction mode index IntraPredMode. In a case where the CU prediction type information PredMode is intra-prediction, as illustrated in FIG. 13, on the basis of a TU size and the intra-prediction mode indexIntraPredMode, a sub-block size of 8×2 is used if the horizontal fast scan is used; a sub-block size of 2×8 is used if the vertical fast scan is used; and a sub-block of 4×4 is used if other scans (the up-right diagonal scan) are used.

In a case where the CU prediction type information PredMode is inter-prediction, a sub-block size of 4×4 is used if a width and a height of a TU size are the same as each other. In a case where a width and a height of a TU size are not the same as each other, and the width of the TU size is larger than the height thereof, a sub-block size of 8×2 is used. On the other hand, in a case where the height of the TU size is larger than the width thereof, a sub-block size of 2×8 is used. In addition, in a case of the inter-prediction, a sub-block size may be 4×4 regardless of a TU size.

Split into sub-blocks is performed according to the configuration. Thus, a CU is suitably split into sub-blocks in accordance with a bias of a transform coefficient can be performed both in a case of intra-prediction and in a case of inter-prediction, and therefore coding efficiency is improved.

[Transform Skip/Transform/Quantization Bypass Flag Decoding Unit 128]

The transform skip/transform/quantization bypass flag decoding unit 128 interprets a decoded bit (Bin) supplied from the bit decoding unit 132 so as to decode the syntaxes transquant_bypass_flag and transform_skip_flag. The decoded syntaxes transquant_bypass_flag and transform_skip_flag are supplied to the coefficient presence/absence flag decoding unit 124, the coefficient value decoding unit 125, and the inverse quantization/inverse transform unit 13. In addition, the transform skip/transform/quantization bypass flag decoding unit 128 calculates a context index ctxIdx which is used for the arithmetic code decoding unit 130 to decode Bins of the syntaxes transquant_bypass_flag and transform_skip_flag. The calculated context index ctxIdx is supplied to the context recording/updating unit 131.

Hereinafter, with reference to FIG. 19, a decoding process of the transform/quantization bypass flag and the transform skip flag will be described in detail.

<<Decoding Process 1 of Transform/Quantization Bypass Flag and Transform Skip Flag>>

Figure 19:
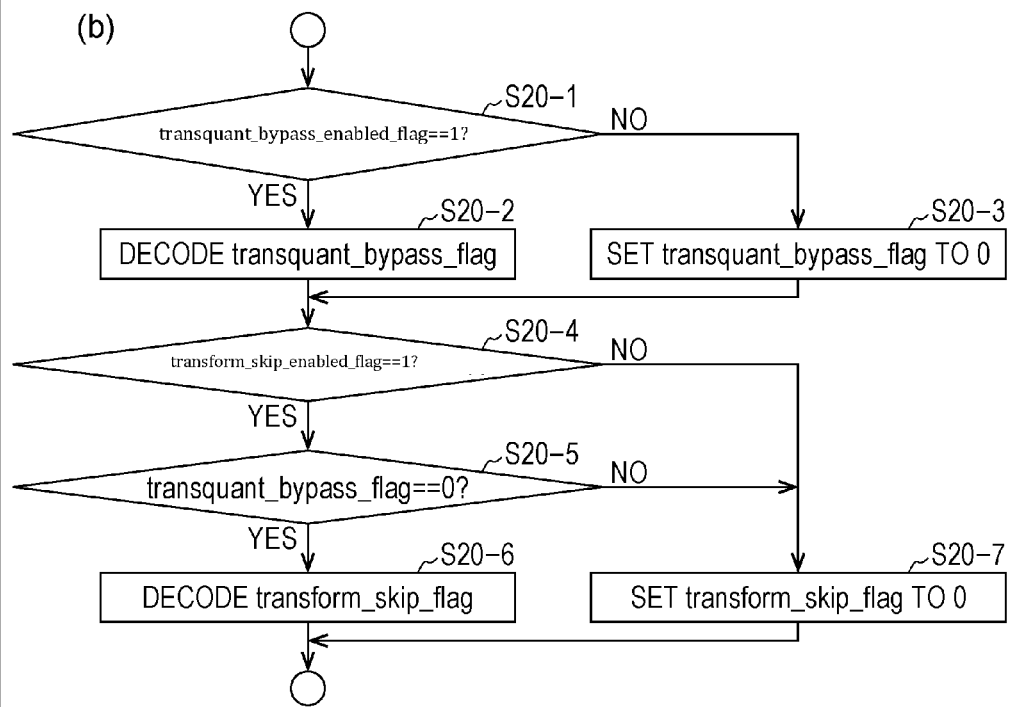

FIG. 19(*a*) illustrates syntax examples of the transform/quantization bypass flag and the transform skip flag, and FIG. 19(*b*) is a flowchart more specifically illustrating the decoding process.

(Step S20-1)

First, the transform skip/transform/quantization bypass flag decoding unit 128 determines whether or not the transform/quantization bypass enabled flag (transquant_bypass_enabled_flag) which is input from an external device is 1. In a case where the transform/quantization bypass enabled flag is 1 (Yes in step S20-1), the flow proceeds to step S20-2. In other cases (No in step S20-1), the flow proceeds to step S20-3.

(Step S20-2)

The transform skip/transform/quantization bypass flag decoding unit 128 decodes the transform/quantization bypass flag (transquant_bypass_flag) from coded data in relation to a target TU, and the flow proceeds to step S20-4.

(Step S20-3)

The transform skip/transform/quantization bypass flag decoding unit 128 implicitly interprets the transform/quantization bypass flag (transquant_bypass_flag) as 0 in relation to the target TU and sets a value thereof to 0, and the flow proceeds to step S20-4.

(Step S20-4)

The transform skip/transform/quantization bypass flag decoding unit 128 determines whether or not the transform skip enabled flag (transform_skip_enabled_flag) which is input from an external device is 1. In a case where the transform skip enabled flag is 1 (Yes in step S20-4), the flow proceeds to step S20-5. In other cases (No in step S20-4), the flow proceeds to step S20-7.

(Step S20-5)

The transform skip/transform/quantization bypass flag decoding unit 128 determines whether or not the transform bypass flag is 0. In a case where the transform bypass flag is 0 (Yes in step S20-5), the flow proceeds to step S20-6. In other cases, the flow proceeds to step S20-7.

(Step S20-6)

The transform skip/transform/quantization bypass flag decoding unit 128 decodes the transform skip flag (transform_skip_flag) from coded data in relation to the target TU.

(Step S20-7)

The transform skip/transform/quantization bypass flag decoding unit 128 implicitly interprets the transform/quantization bypass flag (transquant_bypass_flag) as 0 in relation to the TU and sets a value thereof to 0.

In addition, a decoding process of the transform skip flag and the transform/quantization bypass flag is not limited to the above-described procedures, and procedures may be changed in a scope in which the process can be performed. Further, the transform skip/transform/quantization bypass flag decoding unit 128 may decode only the transform skip flag from coded data in relation to a target TU (may omit decoding only the transform/quantization bypass flag).

Figure 20:
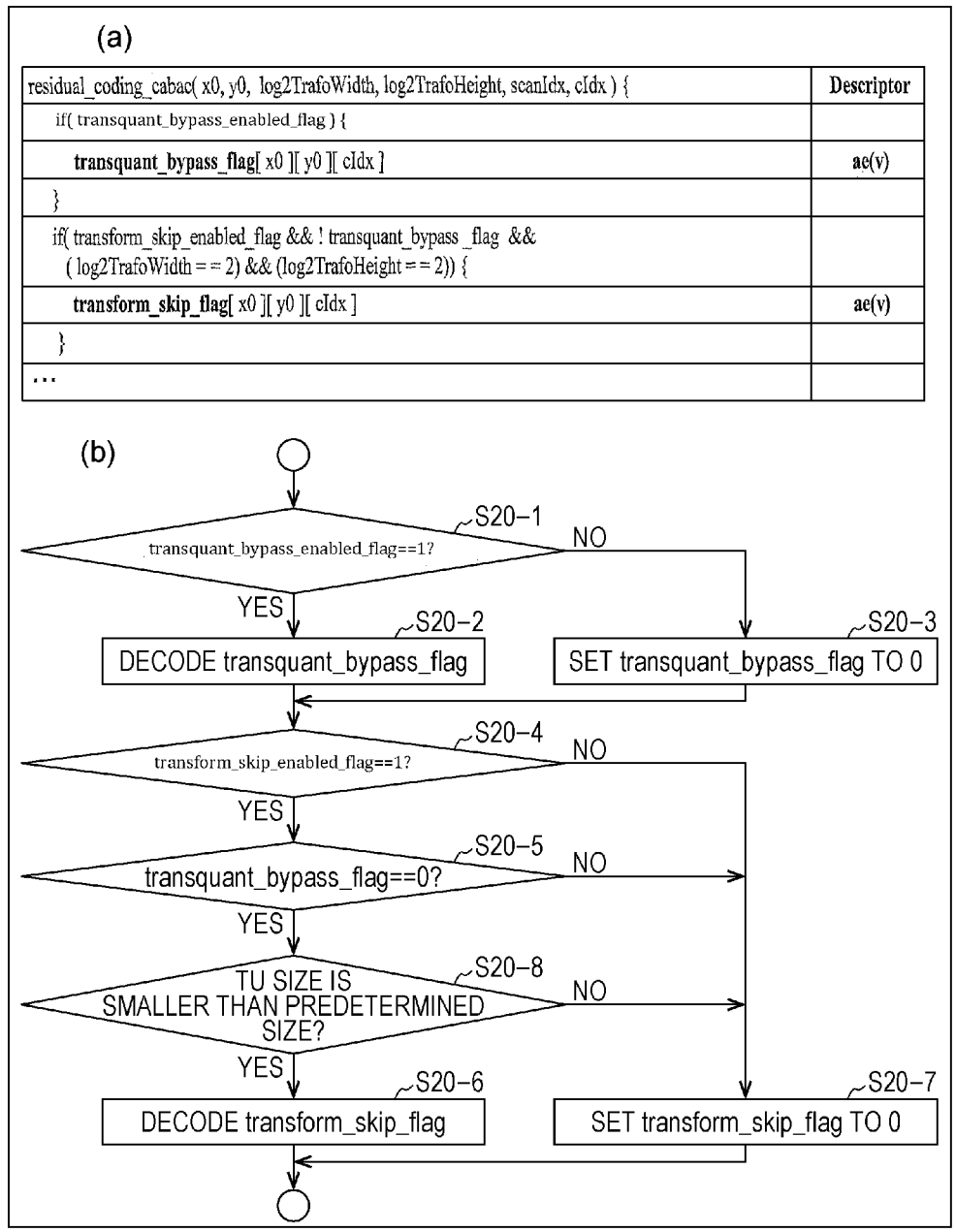

For example, as illustrated in FIG. 20, after step S20-5, it may be determined that a TU size is smaller than a predetermined size (step S20-8), and the flow may proceed to step S20-6 or step S20-7.

Figure 21:
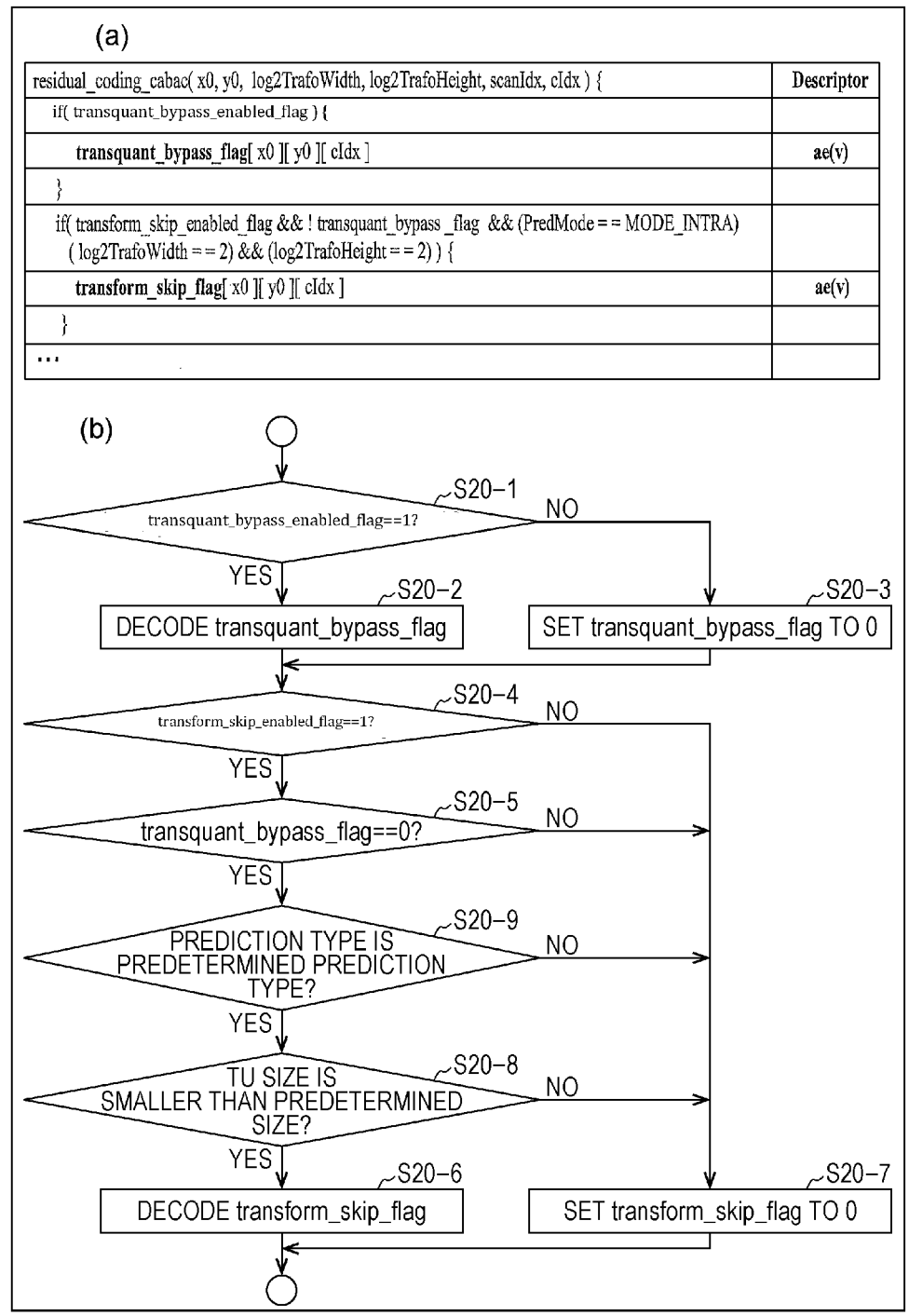

As mentioned above, according to the transform skip/transform/quantization bypass flag decoding unit 128, when compared with the related art (refer to FIG. 21), whether or not the transform skip is performed can be appropriately selected for each TU regardless of a TU size or a prediction mode. For this reason, since a code amount of transform coefficients regarding a TU which is a coding and decoding target can be reduced, a processing amount is reduced, and coding efficiency is improved. In addition, since a branch process regarding whether or not the transform skip flag is decoded can be reduced, a processing amount related to decoding of a transform coefficient can be reduced.

[Sub-Block Coefficient Presence/Absence Flag Decoding Unit 127]

The sub-block coefficient presence/absence flag decoding unit 127 interprets each Bin supplied from the bit decoding unit 132, so as to decode a syntax significant_coeff_group_flag[xCG][yCG] designated by each sub-block position (xCG, yCG). In addition, the sub-block coefficient presence/absence flag decoding unit 127 calculates a context index ctxIdx for determining context which is used for the arithmetic code decoding unit 130 to decode a Bin of the syntax significant_coeff_group_flag[xCG][yCG]. The calculated context index ctxIdx is supplied to the context recording/updating unit 131. Here, the syntax significant_coeff_group_flag[xCG][yCG] takes 1 in a case where at least one non-zero coefficient is included in a sub-block designated by the sub-block position (xCG, yCG), and takes 0 in a case where no non-zero coefficient is included therein. A value of the decoded syntax significant_coeff_group_flag[xCG][yCG] is stored in the decoded coefficient storage unit 126.

In addition, a more specific configuration of the sub-block coefficient presence/absence flag decoding unit 127 will be described later.

[Coefficient Presence/Absence Flag Decoding Unit 124]

The coefficient presence/absence flag decoding unit 124 according to the present embodiment decodes a syntax significant_coeff_flag[xC][yC] designated by each coefficient position (xC, yC). A value of the decoded syntax significant_coeff_flag[xC][yC] is stored in the decoded coefficient storage unit 126. In addition, the coefficient presence/absence flag decoding unit 124 calculates a context index ctxIdx for determining context which is for the arithmetic code decoding unit 130 to decode a Bin of the syntax significant_coeff_flag[xC][yC]. The calculated context index ctxIdx is supplied to the context recording/updating unit 131. A specific configuration of the coefficient presence/absence flag decoding unit 124 will be described later.

[Coefficient Value Decoding Unit 125]

The coefficient value decoding unit 125 interprets each Bin supplied from the bit decoding unit 132 so as to decode the syntaxes coeff_abs_level_greater1_flag, coeff_abs_level_greater2_flag, coeff_sign_flag, and coeff_abs_level_remaining, and derives a value of each coefficient position (a transform coefficient (more specifically, a non-zero coefficient) in a process target frequency component or a pixel position), on the basis of results of decoding the syntaxes. In addition, the context index ctxIdx which has been used to decode the various syntaxes is supplied to the context recording/updating unit 131. The derived value of the transform coefficient is stored in the decoded coefficient storage unit 126. A specific configuration of the coefficient value decoding unit 125 will be described later.

[Decoded Coefficient Storage Unit 126]

The decoded coefficient storage unit 126 has a configuration for storing each value of a transform coefficient decoded by the coefficient value decoding unit 125. In addition, the decoded coefficient storage unit 126 stores each value of the syntax significant_coeff_flag decoded by the coefficient presence/absence flag decoding unit 124. Each value of the transform coefficient stored in the decoded coefficient storage unit 126 is supplied to the inverse quantization/inverse transform unit 13.

(Configuration Example of Sub-Block Coefficient Presence/Absence Flag Decoding Unit 127)

Hereinafter, with reference to FIG. 15, a specific configuration example of the sub-block coefficient presence/absence flag decoding unit 127 will be described.

Figure 15:
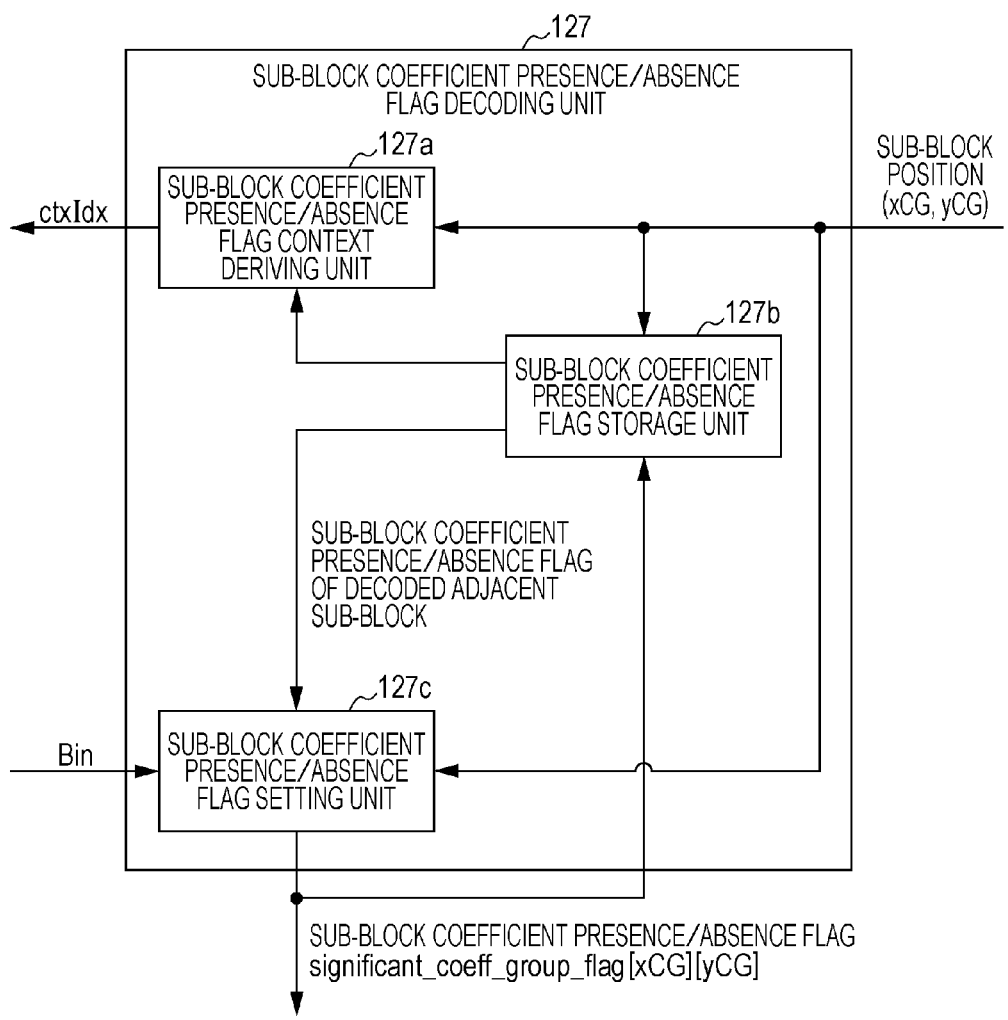
FIG. 15 is a block diagram illustrating a configuration of a sub-block coefficient presence/absence flag decoding unit according to the embodiment.

FIG. 15 is a block diagram illustrating a configuration example of the sub-block coefficient presence/absence flag decoding unit 127. As illustrated in FIG. 15, the sub-block coefficient presence/absence flag decoding unit 127 includes a sub-block coefficient presence/absence flag context deriving unit 127*a*, a sub-block coefficient presence/absence flag storage unit 127*b*, and a sub-block coefficient presence/absence flag setting unit 127*c*.

Hereinafter, the sub-block coefficient presence/absence flag decoding unit 127 will be described by exemplifying a case where a sub-block position (xCG, yCG) is supplied from the coefficient decoding control unit 123 to the sub-block coefficient presence/absence flag decoding unit 127 in a backward scan order. In addition, in this case, the sub-block position (xCG, yCG) is supplied to a configuration of a coding apparatus side corresponding to the sub-block coefficient presence/absence flag decoding unit 127 in a forward scan order.

(Sub-Block Coefficient Presence/Absence Flag Context Deriving Unit 127*a*)

The sub-block coefficient presence/absence flag context deriving unit 127*a* included in the sub-block coefficient presence/absence flag decoding unit 127 derives a context index assigned to a sub-block which is designated by each sub-block position (xCG, yCG). The context index assigned to the sub-block is used to decode a Bin indicating the syntax significant_coeff_group_flag for the sub-block. In addition, in a case where the context index is derived, a value of the decoded sub-block coefficient presence/absence flag stored in the sub-block coefficient presence/absence flag storage unit 127*b* is referred to. The sub-block coefficient presence/absence flag context deriving unit 127*a* supplies the derived context index to the context recording/updating unit 131.

Specifically, the context index assigned to the sub-block is derived as follows by using the sub-block position (xCG, yCG) and a value of the decoded sub-block coefficient presence/absence flag stored in the sub-block coefficient presence/absence flag storage unit 127*b*.

The context index is set as follows by referring to a value of the decoded sub-block coefficient presence/absence flag significant_coeff_group_flag[xCG+1][yCG] which is decoded for the sub-block (xCG+1, yCG) located to be adjacent to the right side of the sub-block position (xCG, yCG) and a value of the decoded sub-block coefficient presence/absence flag siginificant_coeff_group_flag[xCG][yCG+1] which is decoded for the sub-block (xCG, yCG+1) located on the lower side of the sub-block position (xCG, yCG).

*ctxIdx=ctxIdx*Offset+Min ((significant_coeff_group_flag[*xCG*+1][*yCG*]+significant_coeff_group_flag[*xCG*][*yCG*+1]),1)

In addition, the initial value ctxIdxOffset is determined by cIdx indicating a color space. Further, in a case where a decoded sub-block located at (xCG+1, yCG) or (xCG, yCG+1) is not present, a value of a sub-block coefficient presence/absence flag located at (xCG+1, yCG) or (xCG, yCG+1) is treated as zero.

(Sub-Block Coefficient Presence/Absence Flag Storage Unit 127*b*)

The sub-block coefficient presence/absence flag storage unit 127*b* stores each value of the syntax significant_coeff_group_flag which is decoded or is set by the sub-block coefficient presence/absence flag setting unit 127*c*. The sub-block coefficient presence/absence flag setting unit 127*c* may read the syntax significant_coeff_group_flag assigned to an adjacent sub-block from the sub-block coefficient presence/absence flag storage unit 127*b*.

(Sub-Block Coefficient Presence/Absence Flag Setting Unit 127*c*)

The sub-block coefficient presence/absence flag setting unit 127*c* decodes or sets the syntax significant_coeff_group_flag[xCG][yCG] by interpreting each Bin supplied from the bit decoding unit 132. More specifically, the sub-block coefficient presence/absence flag setting unit 127*c* decodes or sets the syntax significant_coeff_group_flag[xCG][yCG] by referring to the sub-block position (xCG, yCG) and the syntax significant_coeff_group_flag assigned to a sub-block (also referred to as an adjacent sub-block) adjacent to a sub-block designated by the sub-block position (xCG, yCG). In addition, a value of the decoded or set syntax significant_coeff_group_flag[xCG][yCG] is supplied to the coefficient presence/absence flag decoding unit 124.

Figure 16:
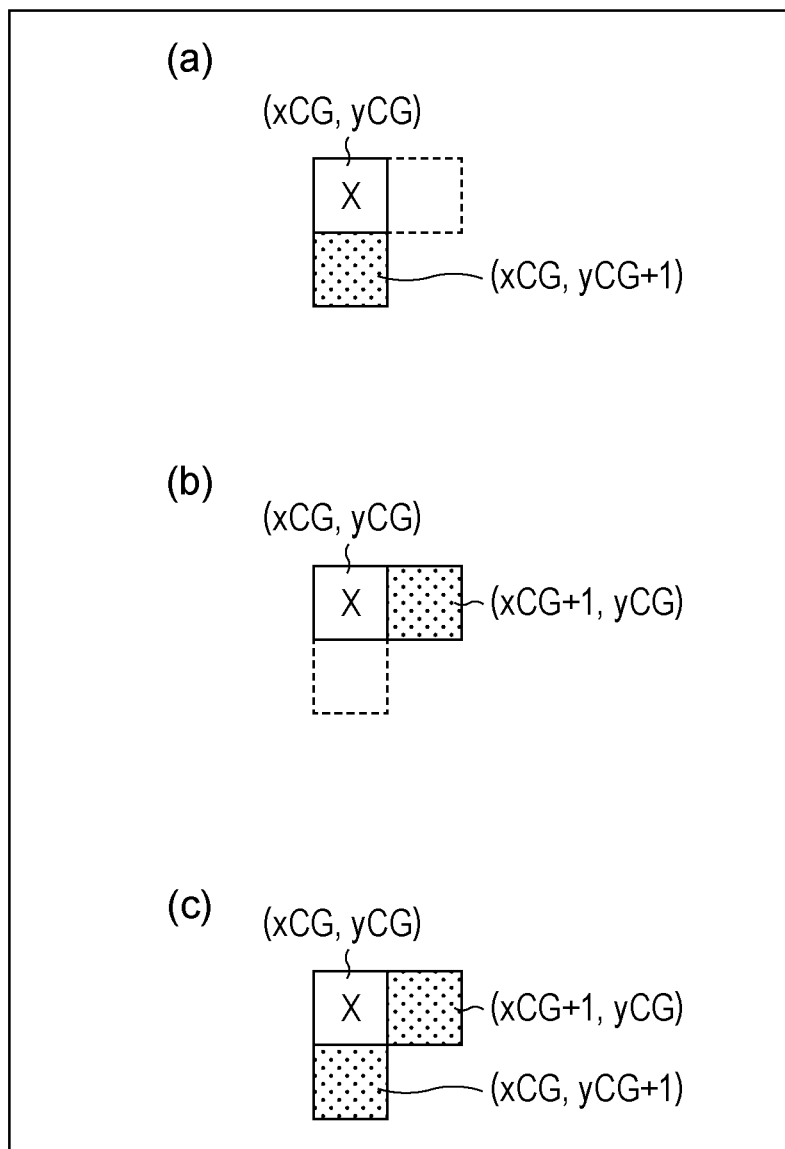

As illustrated in FIG. 16(*c*), the sub-block coefficient presence/absence flag setting unit 127*c* refers to a value of the sub-block coefficient presence/absence flag significant_coeff_group_flag[xCG+1][yCG] assigned to the sub-block (xCG+1, yCG) adjacent to the sub-block position (xCG, yCG) and a value of the sub-block coefficient presence/absence flag significant_coeff_group_flag[xCG][yCG+1] assigned to the sub-block (xCG, yCG+1), so as to derive a context index used to decode the sub-block coefficient presence/absence flag significant_coeff_group_flag[xCG][yCG+1].

In addition, in a block in which the sub-block coefficient presence/absence flag is set to 0, decoding of the coefficient presence/absence flag significant_coeff_flag is skipped, and thus a decoding process is simplified.

Figure 17:
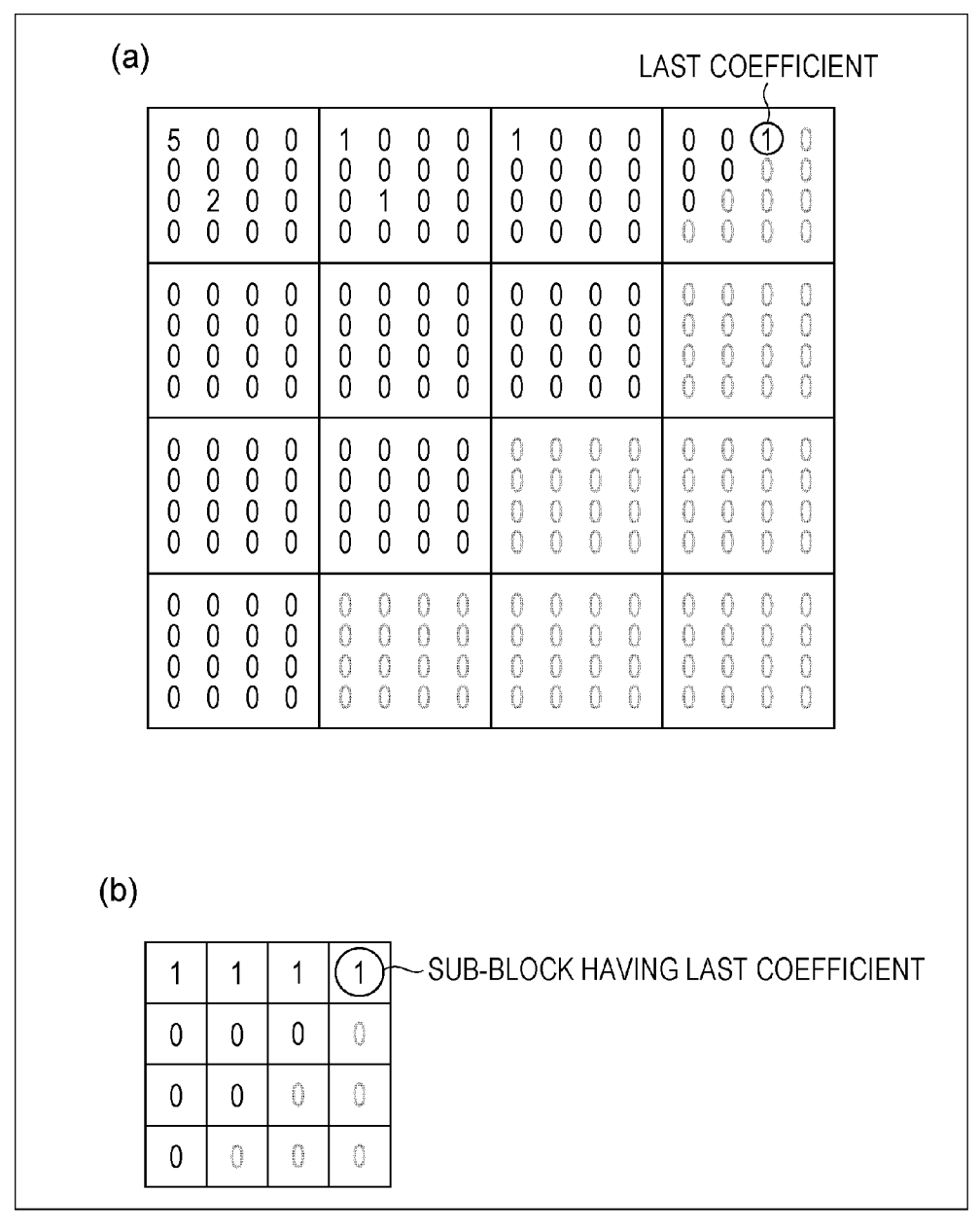

With reference to FIG. 17, a specific example thereof will be described. In a case where transform coefficients are distributed as illustrated in FIG. 17(*a*), a sub-block coefficient presence/absence flag assigned to each sub-block is as illustrated in FIG. 17(*b*). In other words, among 4×4 sub-blocks, a non-zero coefficient is present in the sub-blocks of the first row, but a non-zero coefficient is not present in the sub-blocks of the second row and thereafter.

Therefore, in the example illustrated in FIG. 17(*b*), the coefficient presence/absence flag decoding unit 124 can skip decoding of the coefficient presence/absence flag significant_coeff_flag in decoding of the sub-blocks of the second row and thereafter.

<<Configuration Example of Coefficient Presence/Absence Flag Decoding Unit 124>>

Hereinafter, a specific configuration of the coefficient presence/absence flag decoding unit 124 will be described with reference to FIG. 18.

Figure 18:
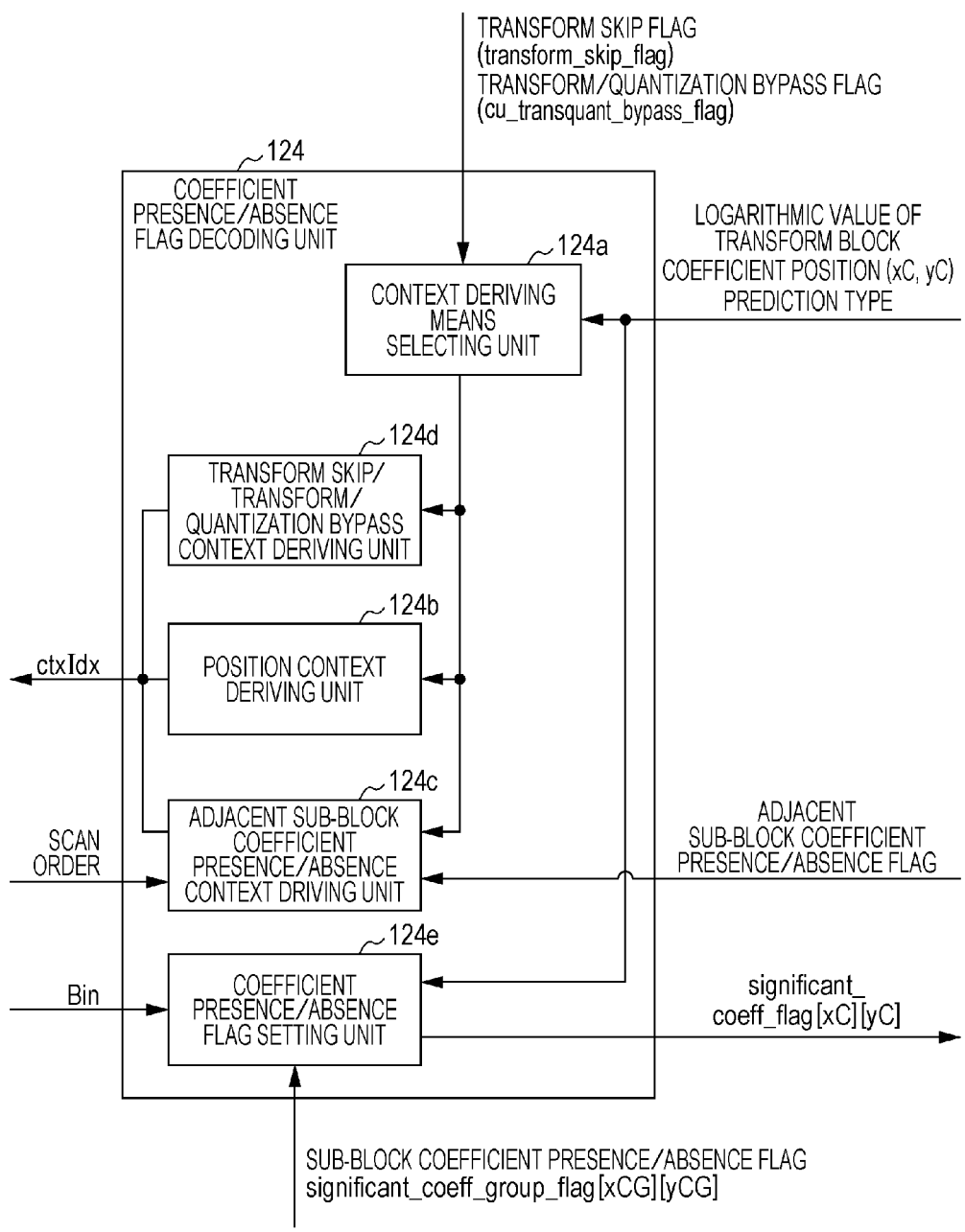
FIG. 18 is a block diagram illustrating a configuration of a coefficient presence/absence flag decoding unit according to an embodiment.

FIG. 18 is a block diagram illustrating a configuration example of the coefficient presence/absence flag decoding unit 124. As illustrated in FIG. 18, the coefficient presence/absence flag decoding unit 124 includes a context deriving means selecting unit 124a, a position context deriving unit 124b, an adjacent sub-block coefficient presence/absence context deriving unit 124c, a transform skip/transform/quantization bypass context deriving unit 124d, and a coefficient presence/absence flag setting unit 124e.

(Coefficient Presence/Absence Flag Setting Unit 124e)

The coefficient presence/absence flag setting unit 124e interprets each Bin supplied from the bit decoding unit 132 so as to set the syntax significant_coeff_flag[xC][yC]. The set syntax significant_coeff_flag[xC][yC] is supplied to the decoded coefficient storage unit 126.

In a case where a target transform block (a target frequency domain or a target pixel domain) is split into sub-blocks, the coefficient presence/absence flag setting unit 124e refers to the syntax significant_coeff_group_flag[xCG][yCG] assigned to a target sub-block, and sets significant_coeff_flag[xC][yC] for all coefficient positions included in the target sub-block to 0 in a case where a value of significant_coeff_group_flag[xCG][yCG] is 0.

(Context Deriving Means Selecting Unit 124a)

A frequency component or a pixel position (also referred to as a coefficient position) (xC, yC) which is a process target, and logarithmic values (log 2TrafoWidth and log 2TrafoHeight) of a transform block are input to the context deriving means selecting unit 124a. On the basis of the logarithmic value sizes, a width and a height of the transform block is calculated by using (1<<log 2TrafoWidth) and (1<<log 2Trafo Height). In addition, instead of the logarithmic value sizes, a width and a height of the transform block may be directly input. Further, the transform skip flag (transform_skip_flag) and the transform/quantization bypass flag (transquant_bypass_flag) are input to the context deriving means selecting unit 124a.

The context deriving means selecting unit 124a selects the position context deriving unit 124b, the adjacent sub-block coefficient presence/absence context deriving unit 124c, or the transform skip/transform/quantization bypass context deriving unit 124d, in accordance with a transform skip flag, a transform/quantization bypass flag, a target TU size, and a position of a decoding target coefficient. The selected context deriving unit derives a context index ctxIdx.

Hereinafter, a context deriving means selecting process performed by the context deriving means selecting unit 124a will be described in detail with reference to FIG. 30.

Figure 30:
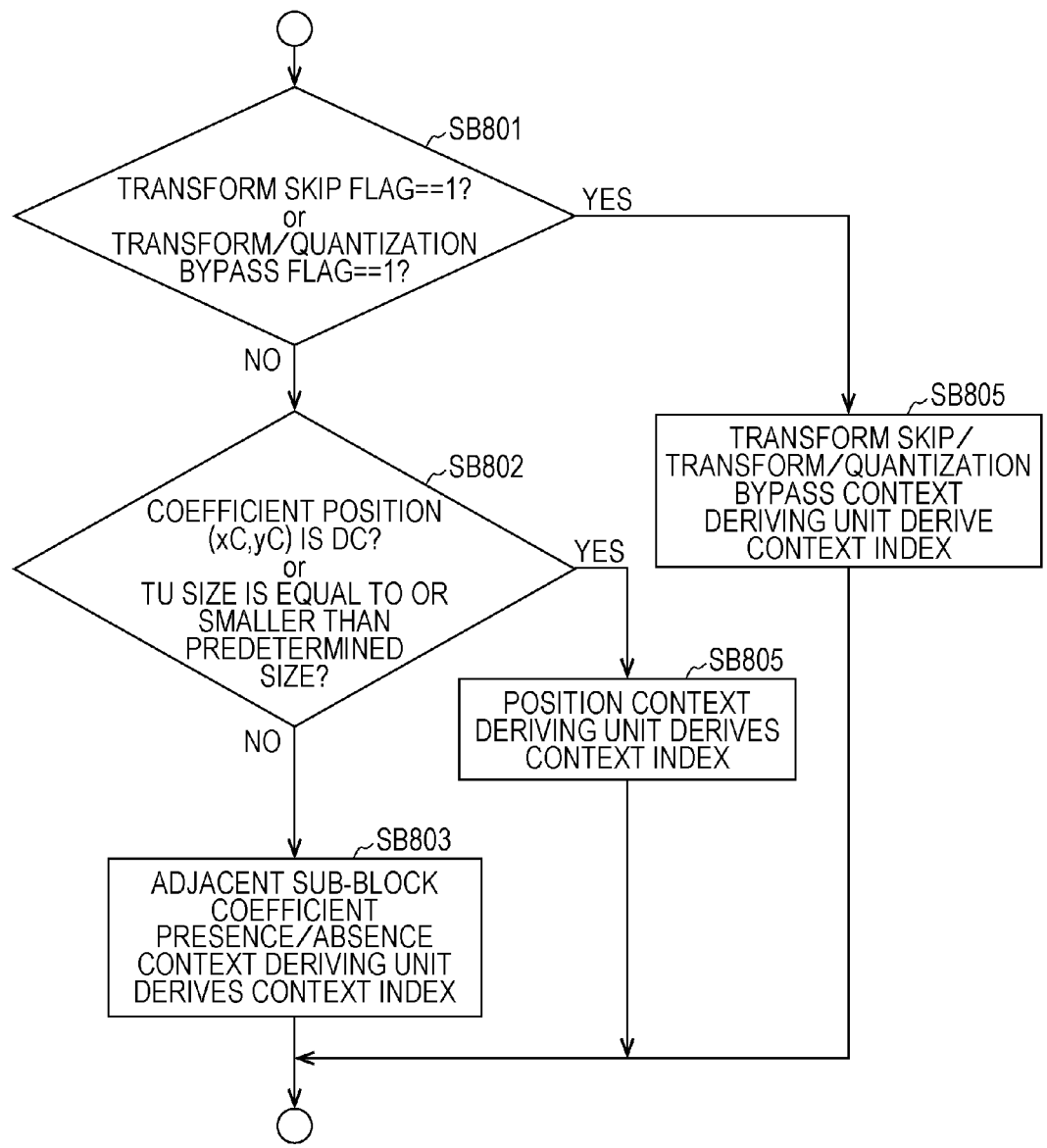
FIG. 30 is a flowchart illustrating a context deriving means selecting process performed by a context deriving means selecting part.

First, it is determined whether the transform skip is to be performed or the transform/quantization bypass is to be performed (step SB801 in FIG. 30). In a case where a transform skip flag indicates that the transform skip is to be performed (transform_skip_flag==1), or a transform/quantization bypass flag indicates that the transform/quantization bypass is to be performed (transquant_bypass_flag==1) (Yes in step SB801), the context derivation selecting means selects the transform skip/transform/quantization bypass context deriving unit (step SB805). In addition, in a case where the transform skip or the transform/quantization bypass is to be performed, an inverse transform process is skipped, and thus a position of a coefficient becomes a position of a pixel in a TU.

In a case where the above-described condition is not satisfied (No in step SB801), the context deriving means selecting unit 124a selects either the position context deriving unit 124b or the adjacent sub-block coefficient presence/absence context deriving unit 124c.

First, it is determined whether or not a target coefficient position is a DC (xC+yC==0) in a frequency domain, or a TU size is equal to or smaller than a predetermined size (for example, a 4×4 TU or an 8×8 TU) (step SB802). In a case where the target coefficient position is the DC in the frequency domain, or the TU size is equal to or smaller than the predetermined size (Yes in step SB802), the context deriving means selecting unit 124a selects the position context deriving unit 124b.

In a case where the above-described condition is not satisfied (No in step SB802), the context deriving means selecting unit 124a selects the adjacent sub-block coefficient presence/absence context deriving unit 124c (step SB803).

In addition, the context deriving means selecting unit 124a is not limited to the above-described configuration, and may have a configuration of deriving a context index ctxIdx which is common to TU sizes of a 4×4 TU to a 32×32 TU. In other words, the context deriving means selecting unit 124a may have a configuration of fixedly selecting either one of the position context deriving unit 124b and the adjacent sub-block coefficient presence/absence context deriving unit 124c regardless of a TU size.

(Position Context Deriving Unit 124b)

The position context deriving unit 124b derives a context index ctxIdx for a target frequency component on the basis of a position (xC, yC) of the target frequency component in a frequency domain. In addition, in a case where a context index ctxIdx which is a fixed value is derived regardless of a position of a frequency component, the position context deriving unit 124b may perform the derivation process.

FIG. 22 illustrates an example in which the position context deriving unit 124b derives a context index regarding each coefficient position in a case where a TU size is equal to or smaller than predetermined size (for example, a 4×4 TU or an 8×8 TU). FIG. 22(a) illustrates a case of the 4×4 TU, and FIG. 22(b) illustrates a case of the 8×8 TU.

(Adjacent Sub-Block Coefficient Presence/Absence Context Deriving Unit 124c)

The adjacent sub-block coefficient presence/absence context deriving unit 124c selects a context derivation pattern according to whether or not a non-zero coefficient is present in an adjacent sub-block, and derives a context index for a decoding target frequency component from coordinates of the process target frequency component in a sub-block according to the selected derivation pattern.

First, the adjacent sub-block coefficient presence/absence context deriving unit 124c refers to the right adjacent sub-block illustrated in FIG. 16(b) and the lower adjacent sub-block illustrated in FIG. 16(a), and obtains a pattern index idxCG which is an index for specifying a context derivation pattern, from the sub-block coefficient presence/absence flag in each of the adjacent sub-blocks, by using the following Equation (A).

$$idxCG = \text{significant\_coeff\_group\_flag}[xCG+1][yCG] + (\text{significant\_coeff\_group\_flag}[xCG][yCG+1] << 1) \quad (A)$$

In the above Equation (A), significant_coeff_group_flag is a flag indicating that at least one non-zero coefficient is present in a sub-block as described above. In a case where at least one non-zero coefficient is present in a sub-block, a value of significant_coeff_group_flag is "1", and in a case where no non-zero coefficient is present in a sub-block, a value of significant_coeff_group_flag is "0".

Figure 29:
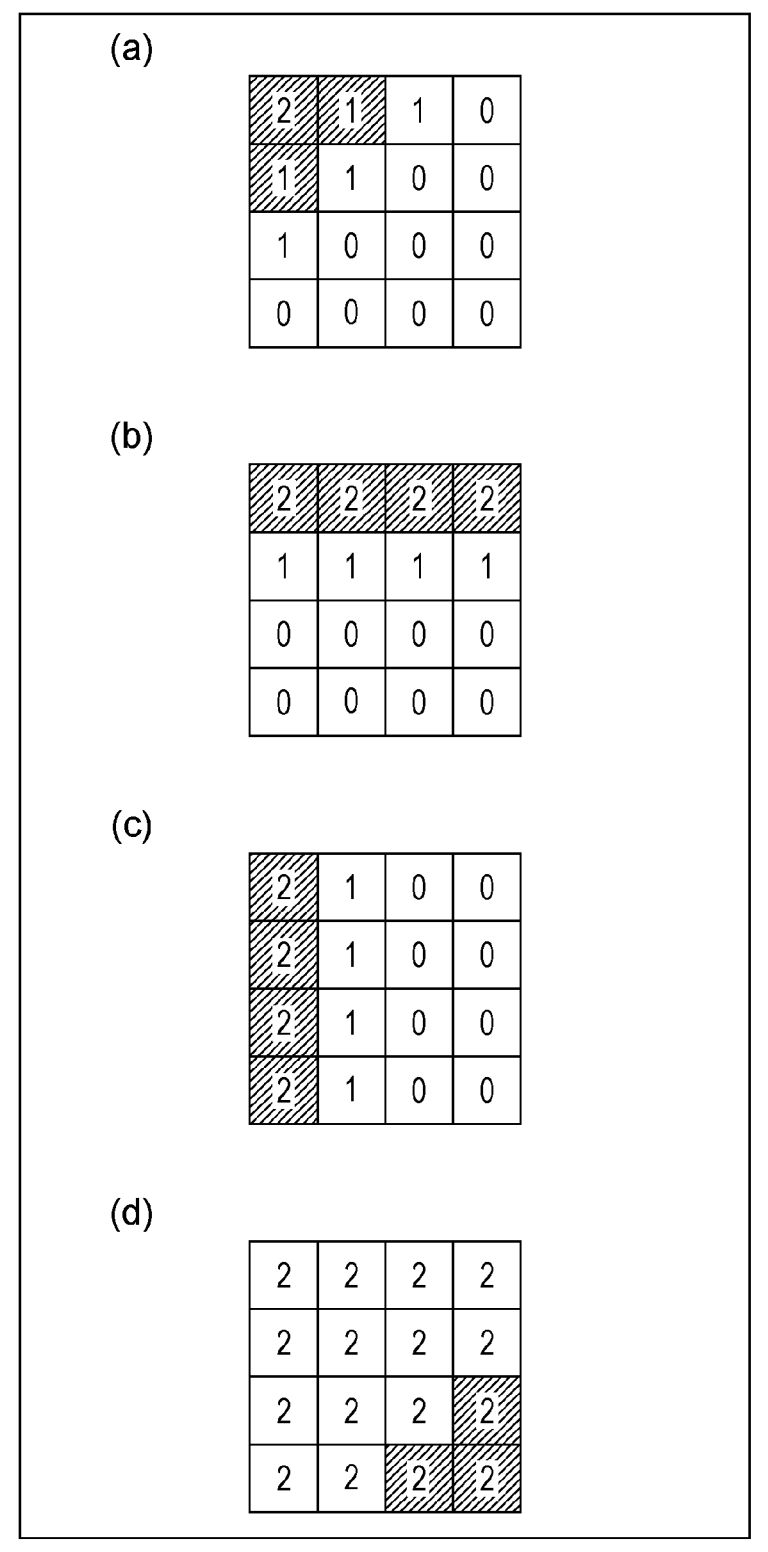

FIG. 41 illustrates a pseudo-code for deriving a context index ctxIdx (sigCtx) which is assigned to each frequency component of a target sub-block on the basis of the pattern index idxCG. In addition, FIG. 42 illustrates arrangements of context indexes in respective pattern indexes idxCG, obtained by using the pseudo-code illustrated in FIG. 41. FIG. 42(a) illustrates a case of pattern index idxCG=0, FIG. 42(b) illustrates a case of pattern index idxCG=1, FIG. 42(c) illustrates a case of pattern index idxCG=2, and FIG. 42(d) illustrates a case of pattern index idxCG=3. Further, a context index corresponding to each pattern index idxCG is not limited to the pseudo-code illustrated in FIG. 41, and may be derived by using a pseudo-code illustrated in FIG. 28. FIG. 29 illustrates arrangements of context indexes in respective pattern indexes idxCG, obtained by using the pseudo-code illustrated in FIG. 28. FIG. 29(a) illustrates a case of pattern index idxCG=0, FIG. 29(b) illustrates a case of pattern index idxCG=1, FIG. 29(c) illustrates a case of pattern index idxCG=2, and FIG. 29(d) illustrates a case of pattern index idxCG=3.

(Transform Skip/Transform/Quantization Bypass Context Deriving Unit 124d)

(Example 1)

The transform skip/transform/quantization bypass context deriving unit 124d derives a context index ctxIdx for a coefficient in a pixel domain of a target transform block on the basis of a predetermined method during the transform skip or the transform/quantization bypass. For example, a context index is derived on the basis of a relative context index corresponding to a width size of a TU and a height size of the TU.

A description will be made of a specific deriving process of a context index ctxIdx with reference to FIG. 31(a). FIG. 31(a) illustrates a table TBL_CTX_IDX[log 2TrafoWidth−2][log 2TrafoHeight−2] of a logarithmic value log 2TrafoWidth of a TU width size, a logarithmic value log 2TrafoHeight of a TU height size, and a corresponding relative context index. The context index ctxIdx is derived from the following equation by referring to the table.

$$ctxIdx=TBL\_CTX\_IDX[\log 2TrafoWidth-2][\log 2TrafoHeight-2]+offset \quad \text{(eq. A-1)}$$

In the above Equation (eq. A-1), the variable offset is a predetermined offset value for differentiation from context indexes derived by the position context deriving unit 124b and the adjacent sub-block coefficient presence/absence context deriving unit 124c, and indicates a starting point of a context index in a case where the transform skip or the transform/quantization bypass is applied (this is also the same for the following Equations (eq. A-2) to (eq. A-6)).

In a case where the transform skip or the transform/quantization bypass is performed, a decoding target coefficient presence/absence flag is a non-zero coefficient in a pixel domain. Since an appearance probability of a non-zero coefficient at each coefficient position in a pixel domain and an appearance probability of a non-zero coefficient in a frequency domain are different from each other, it is preferable to differentiate contexts regarding coefficient presence/absence flags from each other in the pixel domain and the frequency domain.

As described above, according to the transform skip/transform/quantization bypass context deriving unit 124d, a fixed context index is used in a TU or a sub-block in a case where the transform skip is performed. Accordingly, during the transform skip, a context index can be derived regardless of a position in the TU or in the sub-block, and thus a process can be easily performed. In addition, during the transform skip, a context having a property in which an appearance probability of a coefficient in the TU or the sub-block is uniform is used, and thus it is possible to achieve an effect of improving coding efficiency.

Further, also in the same manner for a case where the transform/quantization bypass is performed, the same (also referred to as "fixed") context index can be derived regardless of a position in a TU or a position in a sub-block, and thus a process can be easily performed. Furthermore, during the transform/quantization bypass, a context having a property in which an appearance probability of a coefficient in the TU or the sub-block is uniform is used, and thus it is possible to achieve an effect of improving coding efficiency.

In addition, in the above-described configuration, the same context index is used in a case where the transform skip is performed and a case where the transform/quantization bypass is performed. Consequently, contexts used in a case where the transform skip is performed and contexts used in a case where the transform/quantization bypass is performed are shared, and thus it is possible to achieve an effect of minimizing the number of contexts. Generally, in a picture using lossless coding, blocks which do not use lossless coding are also coded in low QP (small number of quantization steps) so that the entire picture uniformly has high image quality. In this case, since coefficients of the transform/quantization bypass which is mainly used for lossless coding have the same appearance probability as that of coefficients of the transform skip, contexts can be shared between the transform skip and the transform/quantization bypass.

In addition, in the configuration, also in a pixel domain, since appearance probabilities of a non-zero coefficient are different depending on a TU size, it is preferable to differentiate contexts regarding coefficient presence/absence flags from each other for respective TU sizes. In other words, according to the transform skip/transform/quantization bypass context deriving unit 124d, it is possible to derive a context index which is suitable for a non-zero coefficient in the pixel domain for each TU size. For this reason, since a code amount of a non-zero coefficient can be further reduced in a TU which is a coding and decoding target, it is possible to achieve effects of reducing a processing amount related to decoding of the non-zero coefficient and also of improving coding efficiency.

(Modification Example 1-A)

In addition, the transform skip/transform/quantization bypass context deriving unit 124d may derive a context index ctxIdx on the basis of a logarithmic value log 2TrafoSize (=(log 2TrafoWidth+log 2TrafoHeight)>>1) of a TU size instead of the logarithmic value log 2TrafoWidth of a TU width size and the logarithmic value log 2TrafoHeight of a TU height size, during the transform skip or the transform/quantization bypass. For example, a context index is derived from the following equation by referring to a table TBL_CTX_IDX[log 2TrafoSize−2] of a logarithmic value log 2TrafoSize of a TU size and a relative context index, illustrated in FIG. 31(b).

$$ctxIdx=TBL\_CTX\_IDX[\log 2TrafoSize-2]+offset \quad \text{(eq. A-2)}$$

Generally, an appearance probability of a non-square TU size is lower than that of a square TU size. For this reason, there is a slight reduction in the improvement achieved as a result of sharing contexts of non-zero coefficients in the pixel domain between a non-square TU size and a square TU size having the same number of elements.

As mentioned above, according to the transform skip/transform/quantization bypass context deriving unit 124*d*, it is possible to minimize the number of contexts regarding non-zero coefficient presence/absence flag in a pixel domain, newly used for the transform skip or the transform/quantization bypass, and also to achieve an effect of improving coding efficiency.

(Modification Example 1-B)

The transform skip/transform/quantization bypass context deriving unit 124*d* may derive a context index ctxIdx for a coefficient in a pixel domain of a target transform block on the basis of a prediction type PredType, a TU width size, a TU height size, and a corresponding relative context index, during the transform skip or the transform/quantization bypass. For example, a context index is derived from the following equation by referring to a table TBL_CTX_IDX[PredType][log 2TrafoWidth−2][log 2TrafoHeight−2] of a prediction type PredType, a logarithmic value log 2TrafoWidth of a TU width size, a logarithmic value log 2TrafoHeight of a TU height size, and a corresponding relative context index, illustrated in FIG. 32.

$$ctxIdx = TBL\_CTX\_IDX[\text{PredType}][\log 2\textit{Trafo}\text{Width}-2][\log 2\textit{Trafo}\text{Height}-2]+\text{offset} \quad (\text{eq. A-3})$$

Here, it is assumed that in a case of intra-prediction, a value of the prediction type PredType is 0, and, in a case of inter-prediction, a value thereof is 1.

Generally, in a case where the transform skip or the transform/quantization bypass is performed, since appearance probabilities of a non-zero coefficient in a decoding target pixel domain are different from each other in the intra-prediction and the inter-prediction, it is preferable to differentiate contexts regarding coefficient presence/absence flags from each other for respective prediction types.

As described above, according to the transform skip/transform/quantization bypass context deriving unit 124*d*, it is possible to derive a context index suitable for a non-zero coefficient in a pixel domain for each prediction type and each TU size. For this reason, since a code amount of a non-zero coefficient can be reduced in a TU which is a coding and decoding target, it is possible to achieve effects of reducing a processing amount related to decoding of the non-zero coefficient and also of improving coding efficiency.

(Modification Example 1-C)

The transform skip/transform/quantization bypass context deriving unit 124*d* may derive a context index ctxIdx on the basis of a logarithmic value log 2TrafoSize (=(log 2TrafoWidth+log 2TrafoHeight)>>1) of a TU size and a prediction type instead of the logarithmic value log 2TrafoWidth of a TU width size and the logarithmic value log 2TrafoHeight of a TU height size, during the transform skip or the transform/quantization bypass. For example, a context index is derived from the following equation by referring to a table TBL_CTX_IDX[PredType][log 2TrafoSize−2] of the prediction type PredType, a logarithmic value log 2TrafoSize of a TU size, and a relative context index illustrated in FIG. 33.

$$ctxIdx = TBL\_CTX\_IDX[\text{PredType}][\log 2\textit{Trafo}\text{Size}-2]+\text{offset} \quad (\text{eq. A-4})$$

Generally, an appearance probability of a non-square TU size is lower than that of a square TU size. For this reason, there is a slight reduction in the improvement achieved as a result of sharing contexts of non-zero coefficients in the pixel domain between a non-square TU size and a square TU size having the same number of elements.

As mentioned above, according to the transform skip/transform/quantization bypass context deriving unit 124*d*, it is possible to achieve effects of minimizing the number of contexts regarding non-zero coefficient presence/absence flag in a pixel domain, newly used for the transform skip or the transform/quantization bypass for each prediction type, and also of improving coding efficiency.

(Modification Example 1-D)

As mentioned above, a description has been made of an example in which the transform skip/transform/quantization bypass context deriving unit 124*d* derives a separate context index in accordance with a TU size or a prediction type, but is not limited to. For example, the transform skip/transform/quantization bypass context deriving unit 124*d* may assign a fixed context index to a coefficient in a pixel domain of a target transform block during the transform skip or the transform/quantization bypass.

$$\text{That is, } ctxIdx = \text{offset} \quad (\text{eq. A-5})$$

Consequently, it is possible to achieve effects of minimizing the number of contexts regarding non-zero coefficient presence/absence flag in a pixel domain, newly used for the transform skip or the transform/quantization bypass, and also of improving coding efficiency.

(Modification Example 1-E)

In the transform skip/transform/quantization bypass context deriving unit 124*d*, context indexes regarding non-zero coefficient presence/absence flags are common to the transform skip and the transform/quantization bypass, but separate context indexes may be assigned in the transform skip and the transform/quantization bypass. Generally, since appearance probabilities of a non-zero coefficient in a decoding target pixel domain are different from each other in the transform skip and the transform/quantization bypass, it is preferable to differentiate contexts regarding coefficient presence/absence flags from each other for respective prediction types. For example, a context index is derived from the following equation by referring to a table TBL_CTX_IDX[PredType][log 2TrafoSize−2] of an identifier index for identifying the transform skip and the transform/quantization bypass from each other, a logarithmic value log 2TrafoSize of a TU size, and a relative context index, illustrated in FIG. 34.

$$ctxIdx = TBL\_CTX\_IDX[\text{index}][\log 2\textit{Trafo}\text{Size}-2]+\text{offset} \quad \text{eq. A-6}$$

In addition, it is assumed that a value of the identifier index in the above equation is 0 in the transform skip, and is 1 in the transform/quantization bypass.

In use circumstances in which a variation in image quality in a picture is allowed, quantization having a relatively large quantization step may be performed on blocks which lossless coding is not applied. In this case, since an appearance probability of a coefficient in the transform/quantization bypass which is mainly used for lossless coding is different from an appearance probability in the transform skip (an appearance probability thereof is low in a case of the transform skip in which quantization is performed), it is preferable to differentiate contexts regarding coefficient presence/absence flags from each other.

As mentioned above, according to the transform skip/transform/quantization bypass context deriving unit 124*d*, it is possible to derive a context index which is suitable for a non-zero coefficient in a pixel domain for each of the transform skip and the transform/quantization bypass. For this reason, since a code amount of a non-zero coefficient can be reduced in a TU which is a coding and decoding target, it is possible to achieve effects of reducing a processing amount related to decoding of the non-zero coefficient and also of improving coding efficiency.

As mentioned above, a description has been made of a case where contexts regarding non-zero coefficient presence/absence flags are differentiated from each other with respect to a coefficient in a frequency domain and a coefficient in a pixel domain in a case where the transform skip is to be performed or the transform/quantization bypass is to be performed, but, also in relation to the GR1 flag (coeff_abs_level_greater1_flag) and GR2 flag (coeff_abs_level_greater2_flag), a context regarding the GR1 flag and a context regarding the GR2 flag may be differentiated from each other with respect to a coefficient in a frequency domain and a pixel in a pixel domain in a case where the transform skip or the transform/quantization bypass is to be performed.

<<Another Configuration Example of Coefficient Presence/Absence Flag Decoding Unit 124>>

Hereinafter, with reference to FIG. 59, another configuration example of the coefficient presence/absence flag decoding unit 124 will be described.

Figure 59:
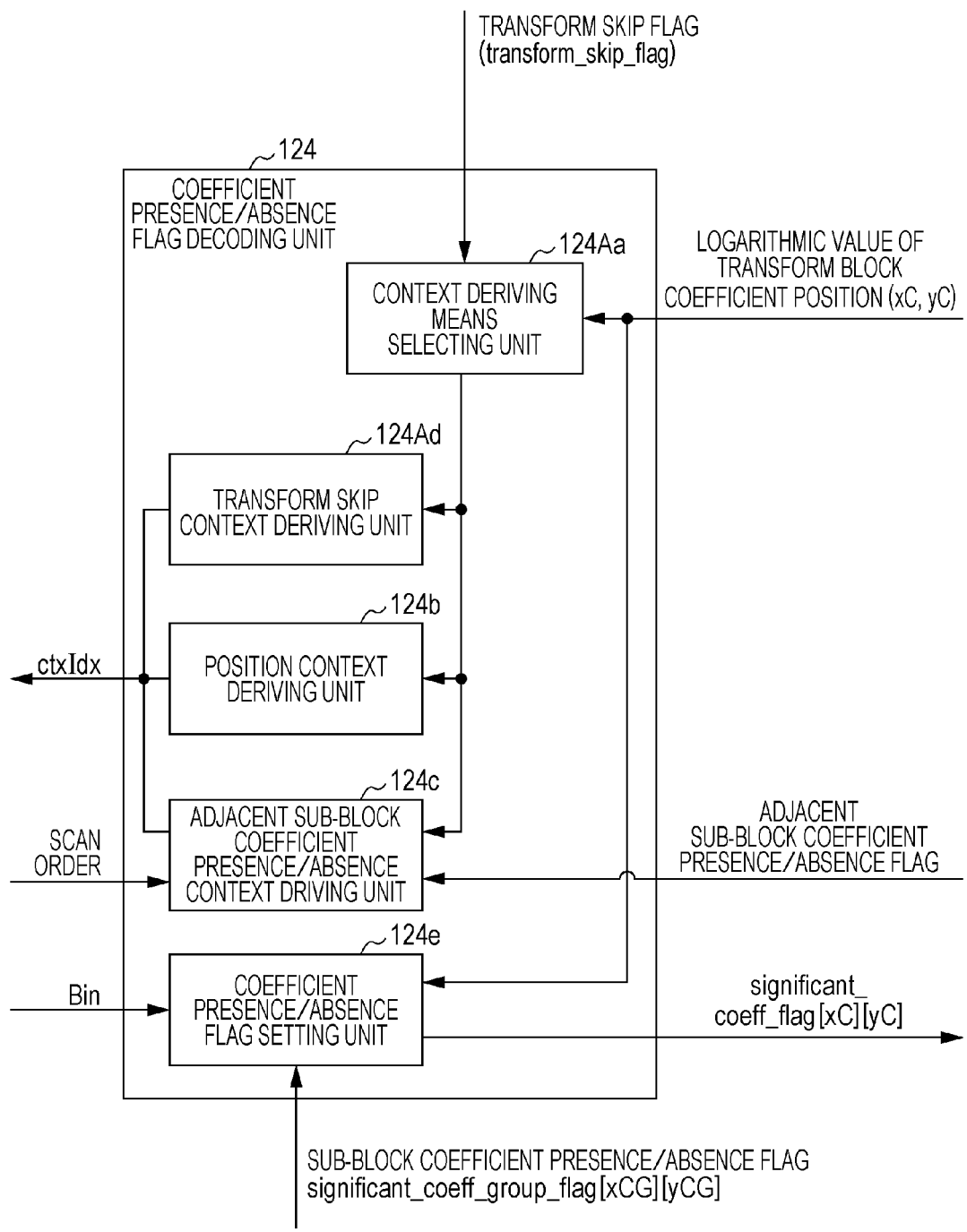
FIG. 59 is a block diagram illustrating another configuration example of the coefficient presence/absence flag decoding unit.

FIG. 59 is a block diagram illustrating another configuration example of the coefficient presence/absence flag decoding unit 124. As illustrated in FIG. 59, the coefficient presence/absence flag decoding unit 124 includes a context deriving means selecting unit 124Aa, a position context deriving unit 124b, an adjacent sub-block coefficient presence/absence context deriving unit 124c, a transform skip context deriving unit 124Ad, and a coefficient presence/absence flag setting unit 124e. In addition, the position context deriving unit 124b, the adjacent sub-block coefficient presence/absence context deriving unit 124c, and the coefficient presence/absence flag setting unit 124e have the same functions as the corresponding constituent elements of FIG. 18 and are thus given the same reference numerals, and description thereof will be omitted.

(Context Deriving Means Selecting Unit 124Aa)

At least a process target coefficient position (xC, yC), logarithmic values (log 2TrafoWidth and log 2TrafoHeight) of a transform block size, and a transform skip flag (transform_skip_flag) are input to the context deriving means selecting unit 124Aa.

The context deriving means selecting unit 124Aa selects the position context deriving unit 124b, the adjacent sub-block coefficient presence/absence context deriving unit 124c, or the transform skip/transform/quantization bypass context deriving unit 124d, in accordance with the transform skip flag, the target transform block size, and the target coefficient position. The selected context deriving unit derives a context index ctxIdx which is referred to when a coefficient presence/absence flag at the target coefficient position is decoded.

Figure 60:
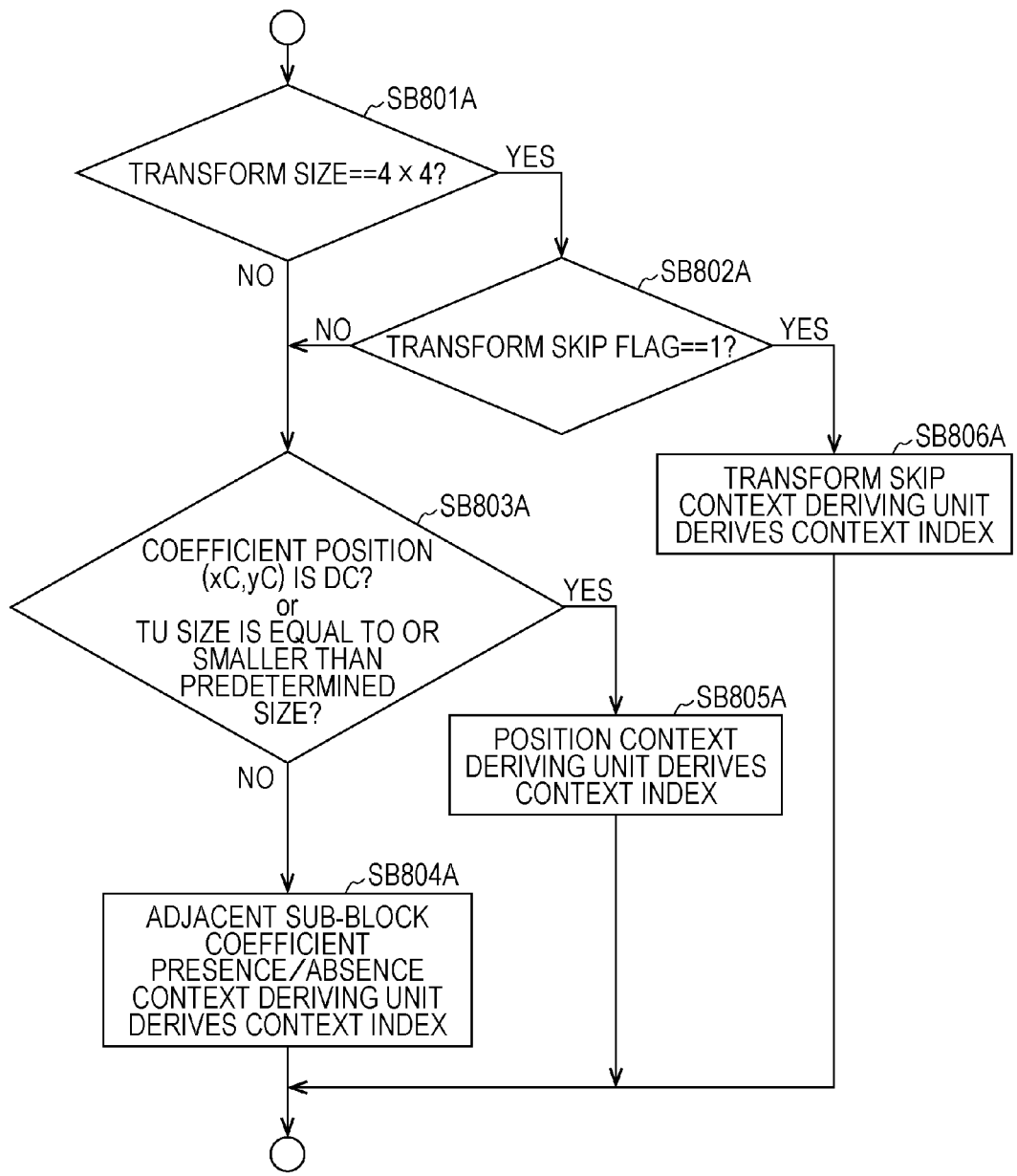
FIG. 60 is a flowchart illustrating context deriving means selecting process performed by a context deriving means selecting part.

Hereinafter, a context deriving means selecting process performed by the context deriving means selecting unit 124Aa will be described in detail with reference to FIG. 60.

First, it is determined whether or not a transform size is 4×4 in step SB801A. In a case where the transform size is 4×4 (Yes in step SB801A), the flow proceeds to step SB802A, and, otherwise (No in step SB801A), the flow proceeds to step SB803A.

In step SB802A, it is determined whether or not the transform skip is applied to a target block. In a case where the transform skip is applied (the transform skip flag is 1) (Yes in step SB802A), the flow proceeds to step SB806A. In a case where the transform skip is not applied (No in step SB802A), the flow proceeds to step SB803A.

In step SB803A, in a case where the target coefficient position is a position of a DC component in a frequency domain or the target transform block size is equal to or smaller than a predetermined size (8×8 or smaller), the flow proceeds to step SB805A. In other cases, the flow proceeds to step S804A.

In step SB804A, the context derivation selecting means selects the adjacent sub-block coefficient presence/absence context deriving means, so as to derive a context index, and finishes the process.

In step SB805A, the context derivation selecting means selects the position context deriving means so as to derive a context index, and finishes the process.

In step SB806A, the context derivation selecting means selects the transform skip context deriving means so as to derive a context index, and finishes the process.

(Transform Skip Context Deriving Unit 124Ad)

The transform skip context deriving unit 124Ad derives a context (context index ctxIdx) which is referred to when a coefficient presence/absence flag in a target coefficient is decoded during the transform skip. The context derived here is a single context regardless of a position of the target coefficient in a sub-block. Here, a separate context may be set as the single context. Specifically, the context may be a context which is different from contexts which are derived by the other context deriving parts (the position context deriving unit 124b and the adjacent sub-block coefficient presence/absence context deriving unit 124c).

In a case where the transform skip is performed, a decoding target coefficient presence/absence flag indicates a non-zero coefficient in a pixel domain. On the other hand, in a case where the transform skip is not applied, the coefficient presence/absence flag indicates a non-zero coefficient in a frequency domain. Since an appearance probability of a non-zero coefficient in the pixel domain and an appearance probability of a non-zero coefficient in the frequency domain are different from each other, it is preferable to differentiate contexts regarding coefficient presence/absence flags from each other in the pixel domain and the frequency domain. In addition, an appearance probability of a non-zero coefficient in the pixel domain has lower relevance with a coefficient position in a transform block or a sub-block than that of an appearance probability of a non-zero coefficient in a frequency domain are different from each other. For this reason, a context which corresponds to the appearance probability of a non-zero coefficient in the pixel domain and is referred to for decoding a coefficient presence/absence flag when the transform skip is applied, may be determined without depending on a coefficient position in a transform block or a sub-block. In this case, it is possible to further reduce the number of contexts than in a case of selecting from among a plurality of contexts depending on a coefficient position.

In addition, in the above description, in the transform skip context deriving unit 124Ad, an example in which a separate context is set as a single context which is referred to for decoding a coefficient presence/absence flag, but a context may be derived which is referred to for decoding a coefficient presence/absence flag in a case where the transform skip is not applied. In other words, a context in a case of applying the transform skip and a context in a case of not applying the transform skip may be shared. In this case, there is an advantage in that a total number of contexts does not increase.

Here, a description will be made of a specific example of sharing contexts in cases of the transform skip is applied and is not applied. A context which is derived in a case where the transform skip is applied is preferably derived for a coefficient presence/absence flag at a position of a high frequency component by the position context deriving unit 124b. More specifically, a context which is derived for a coefficient presence/absence flag of a high frequency domain indicated by '8' in FIG. 22(*a*) may be derived as a context for a coefficient presence/absence flag in a case where the transform skip is applied. The dependency of a coefficient presence/absence flag at a position of a high frequency component in the frequency domain on a coefficient position is lower than the dependency of a coefficient presence/absence flag at a position of a low frequency component on a coefficient position. In a case where the transform skip is applied, since a coefficient presence/absence flag in a spatial domain has the relatively low dependency on a coefficient position, if a context is to be shared, a context in a high frequency component is preferably shared.

As mentioned above, according to the transform skip/transform/quantization bypass context deriving unit 124d, it is possible to derive a context which is suitable for a non-zero coefficient in a pixel domain in a case where the transform skip is applied. For this reason, since a code amount of a non-zero coefficient can be reduced in a TU which is a coding and decoding target, it is possible to achieve effects of reducing a processing amount related to decoding of the non-zero coefficient and also of improving coding efficiency.

(Configuration Example of Coefficient Value Decoding Unit 125)

Figure 43:
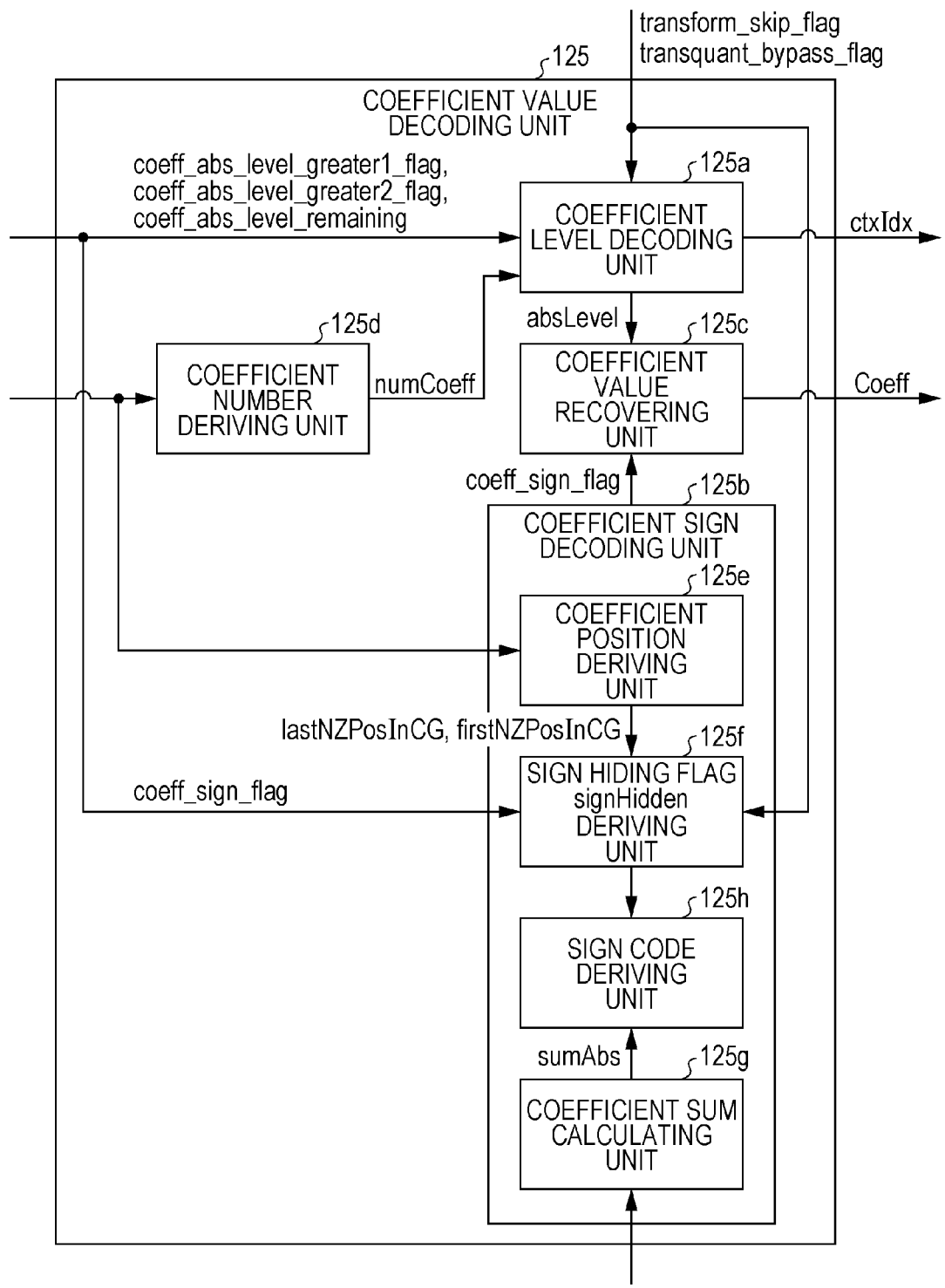
FIG. 43 is a block diagram illustrating a configuration example of a coefficient value decoding unit.

FIG. 43 is a block diagram illustrating a configuration example of the coefficient value decoding unit 125. As illustrated in FIG. 43, the coefficient value decoding unit 125 includes a coefficient level decoding unit 125a, a coefficient sign decoding unit 125b, a coefficient value recovering unit 125c, and a coefficient number deriving unit 125d. The coefficient sign decoding unit 125b includes a coefficient position deriving unit 125e, a sign hiding flag deriving unit 125f, a coefficient sum calculating unit 125g, and a sign code deriving unit 125h.

The coefficient level decoding unit 125a decodes the syntaxes coeff_abs_level_greater1_flag, coeff_abs_level_greater2_flag, and coeff_abs_level_remaining, and decodes an absolute value absLevel of a transform coefficient. In a case where the number numCoeff of non-zero coefficients in a sub-block, supplied from the coefficient number deriving unit 125d, is equal to or larger than a predetermined threshold value TH, transition to a high throughput mode is performed.

The coefficient value recovering unit 125c decodes a value of the transform coefficient from the absolute value absLevel of the transform coefficient supplied from the coefficient level decoding unit 125a and a sign coeff_sign_flag of the transform coefficient supplied from the coefficient sign decoding unit 125b by using the following equation.

Coeff=absLevel(1−2*coeff_sign_flag)

A value of coeff_sign_flag is 0 in a case where a sign is positive, and is 1 in a case where a sign is negative.

The coefficient number deriving unit 125d derives the number numCoeff of non-zero transform coefficients in a sub-block, and supplies the number thereof to the coefficient level decoding unit 125a. In addition, the number thereof is also supplied to the coefficient sign decoding unit 125b in a case where the number numCoeff of non-zero transform coefficients in a sub-block is used for the coefficient sign decoding unit 125b to derive the sign hiding flag signHidden.

The coefficient sign decoding unit 125b decodes or derives a sign coeff_sign of the transform coefficient from coded data.

The coefficient position deriving unit 125e obtains a position lastNZPosInCG of the last non-zero coefficient in a scan order and a position firstNZPosInCG of the initial non-zero coefficient in the scan order, and supplies the obtained results to the sign hiding flag deriving unit 125f. The sign hiding flag deriving unit 125f derives a flag signHidden indicating whether or not sign hiding is to be performed in a target sub-block, and supplies the flag to the sign code deriving unit 125h. The coefficient sum calculating unit 125g calculates a coefficient absolute value sum sumAbs of the target sub-block, and supplies the coefficient absolute value sum to the sign code deriving unit 125h.

The sign code deriving unit 125h calculates the sign coeff_sign of the transform coefficient at the position firstNZPosInCG from the coefficient absolute value sum sumAbs of the target sub-block by using the following equation, in a case where the sign hiding is performed.

coeff_sign=(sumAbs %2)==1?−1:1

In a case where the sign hiding is not performed, a sign of the transform coefficient is decoded by decoding the syntax coeff_sign_flag from coded data.

Figure 44:
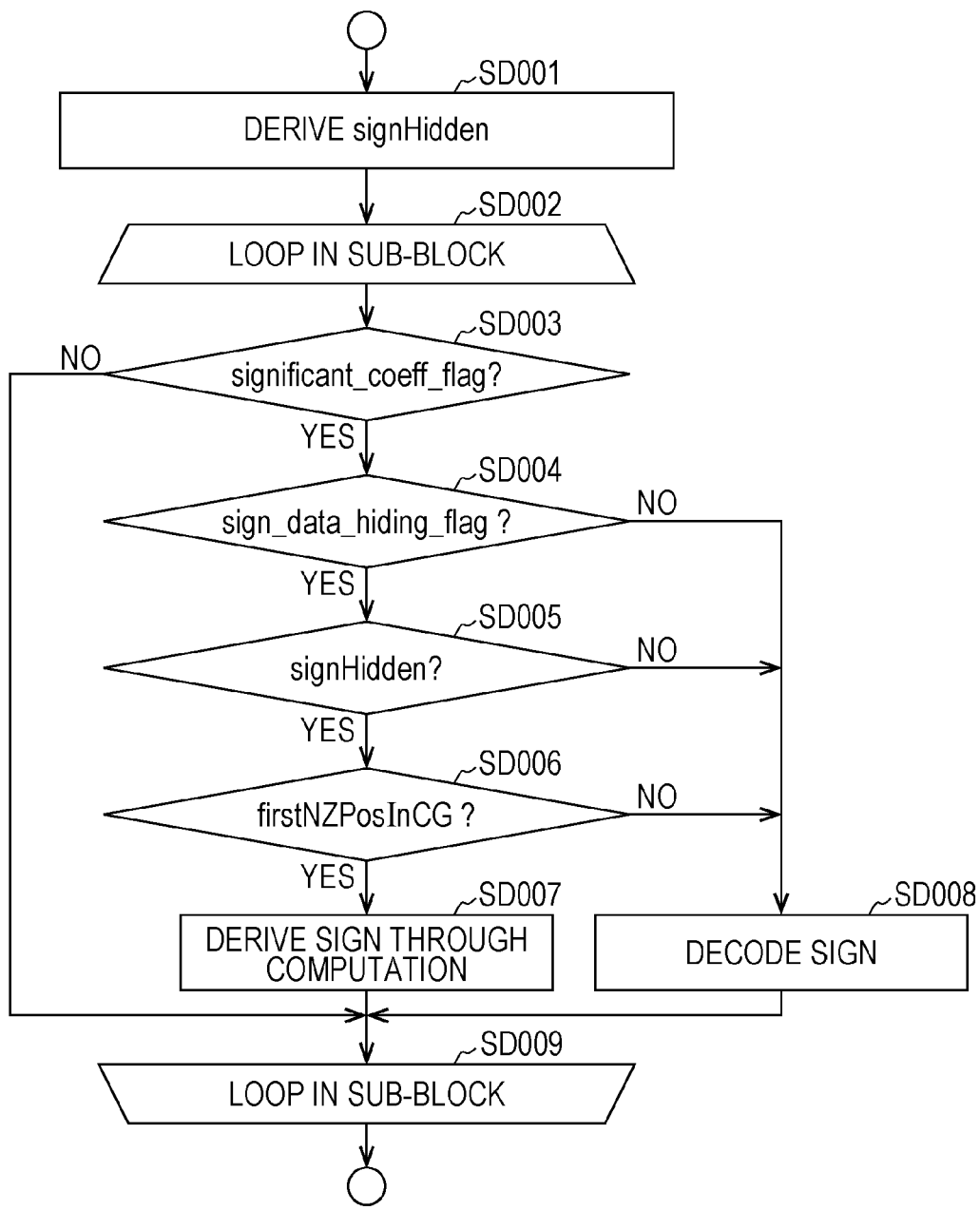
FIG. 44 is a flowchart illustrating an operation of a coefficient sign decoding unit according to the embodiment.

FIG. 44 is a flowchart illustrating an operation of the coefficient sign decoding unit 125b according to the embodiment.

(Step SD001)

The sign hiding flag deriving unit 125f derives the sign hiding flag signHidden. The sign hiding flag signHidden indicates whether or not sign hiding is to be performed in a corresponding sub-block. The derivation of signHidden is performed once in a sub-block. Details of a derivation method thereof will be described later.

(Step SD002)

A loop in a target sub-block is started. The loop is a loop having a coefficient position as the unit.

(Step SD003)

It is determined whether or not a non-zero coefficient is present at a position of a target transform coefficient.

(Step SD004)

In a case where the non-zero coefficient is present (Yes in step SD003), it is determined whether or not a sign hiding enable flag sign_data_hiding_flag is 1. The sign hiding enable flag sign_data_hiding_flag is a flag indicating whether or not sign hiding is allowed to be performed in a sequence, a picture, or all slices, and is coded in a parameter set such as an SPS or a PPS, or a slice header.

(Step SD005)

In a case where the sign hiding enable flag sign_data_hiding_flag is 1 (Yes in step SD004), it is determined whether or not the sign hiding flag signHidden is 1.

(Step SD006)

In a case where the sign hiding flag signHidden is 1 (Yes in step SD005), it is determined whether or not a target transform coefficient of the sign hiding flag signHidden is the initial non-zero coefficient (firstNZPosInCG?) (the last non-zero coefficient in a backward scan order) in the sub-block in a scan order.

(Step SD007)

In a case where the target transform coefficient is the initial non-zero coefficient in the sub-block in the scan order (Yes in step SD006), the sign code deriving unit 125h derives a sign through computation.

(Step SD008)

In a case where, among the determinations of whether or not the sign hiding is to be performed, any one determination result is negative (No), the sign code deriving unit 125*h* decodes a sign from coded data.

(Step SD009)

The loop in the sub-block is finished.

Figure 45:
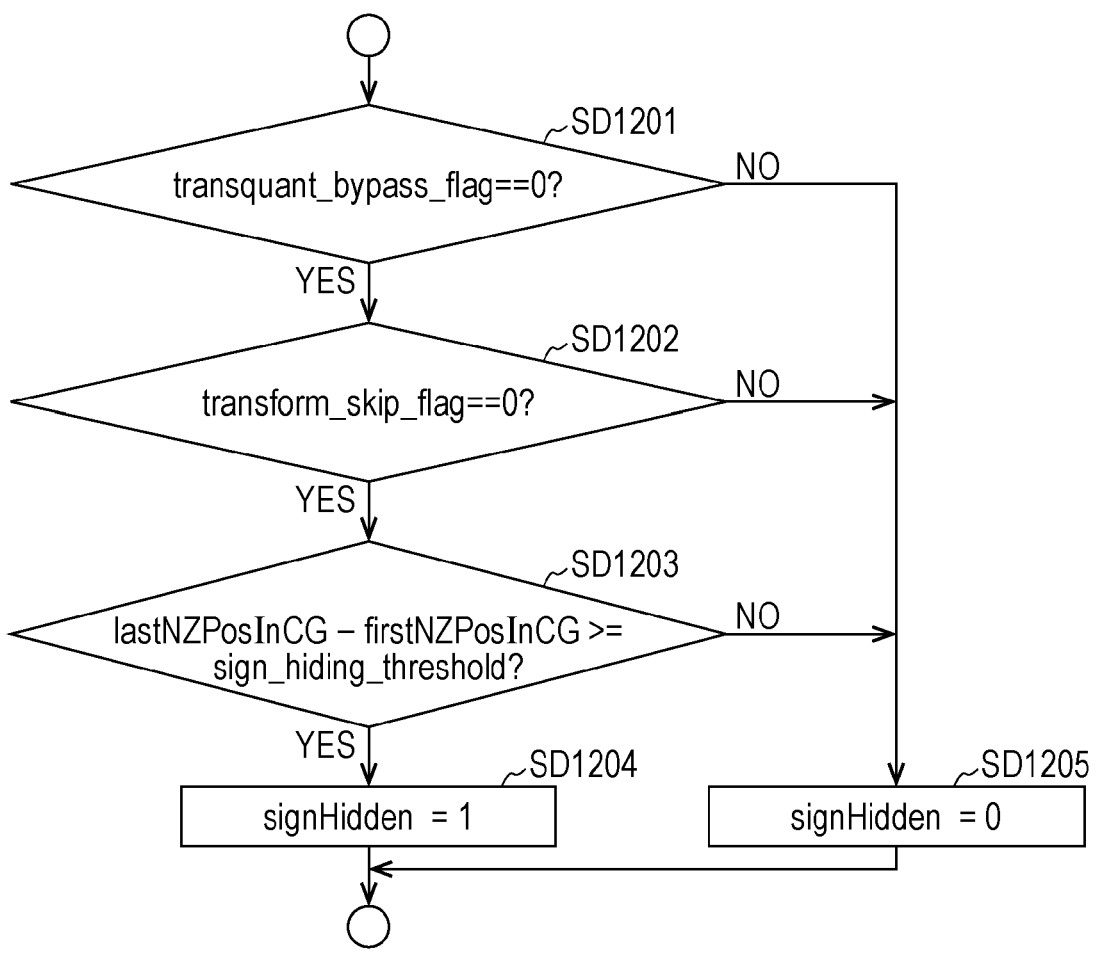
FIG. 45 is a flowchart illustrating a flow of a sign hiding flag deriving process performed by a sign hiding flag deriving unit.

FIG. 45 is a flowchart illustrating the deriving process (step SD001) of the sign hiding flag signHidden performed by the sign hiding flag deriving unit 125*f*.

(Step SD1201)

It is determined whether or not the transform/quantization bypass is to be performed. In a case where the transform/quantization bypass is not performed (transquant_bypass_flag==0) (Yes in step SD1201), the flow proceeds to step SD1202. In other cases (No in step SD1201), the flow proceeds to step SD1205.

(Step SD1202)

It is determined whether or not the transform skip is performed. In a case where the transform skip is not performed (transform_skip_flag==0) (Yes in step SD1202), the flow proceeds to step SD1203. In other cases, the flow proceeds to step SD1205.

(Step SD1203)

It is determined whether or not a difference between a position lastNZPosInCG of a non-zero coefficient which appears last in a scan order (initially appears in a backward scan order) in the sub-block and a position firstNZPosInCG of a non-zero coefficient which initially appears in the scan order (appears last in a backward scan order) is equal to or greater than a predetermined threshold value sign_hiding_threshold. In a case where the difference in the scan process is equal to or greater than the predetermined threshold value (Yes in step SD1201), the flow proceeds to step S1204. In other cases (No in step SD1203), the flow proceeds to step S1205.

(Step SD1204)

The sign hiding flag signHidden is set to 1 which indicates that sign hiding is to be performed.

(Step SD1205)

The sign hiding flag signHidden is set to 0 which indicates that sign hiding is not to be performed.

Here, in step SD1203, whether or not sign hiding is to be performed is determined by using the threshold value sign_hiding_threshold, and the threshold value preferably uses 4 as a specific example.

The processes in steps SD1202 to SD1205 are represented by the following equation.

signHidden=(last*NZPosInCG*–first*NZPosInCG*>=
sign_hiding_threshold)&&!transquant_
bypass_flag &&!transform_skip_flag?1:0

In a case where the transform skip is performed, or the transform/quantization bypass is to be performed, performing sign hiding which is accompanied by correction of a coefficient level value on a coefficient of a pixel domain may possibly cause deterioration in subjective image quality, and thus the sign hiding is preferably prohibited. As mentioned above, in this configuration, by prohibiting sign hiding in the transform skip or the transform/quantization bypass, it is possible to achieve an effect of improving subjective image quality.

In addition, the sign hiding flag deriving unit 125*f* derives the sign hiding flag signHidden on the basis of whether or not the transform skip is to be performed, whether or not the transform/quantization bypass is to be performed, and whether or not a difference between a position of a non-zero coefficient which initially appears in a scan order and a position of a non-zero coefficient which appears last in the scan order is the predetermined threshold value sign_hiding_threshold, but is not limited thereto. For example, the sign hiding flag signHidden may be derived on the basis of whether or not a position of a non-zero coefficient which appears last in a scan order is the predetermined threshold value sign_hiding_threshold.

In other words, signHidden=(last*NZPosInCG*>=
sign_hiding_threshold)&&!transquant_
bypass_flag &&!transform_skip_flag?1:0

(Another Configuration Example of Coefficient Value Decoding Unit 125)

Figure 46:
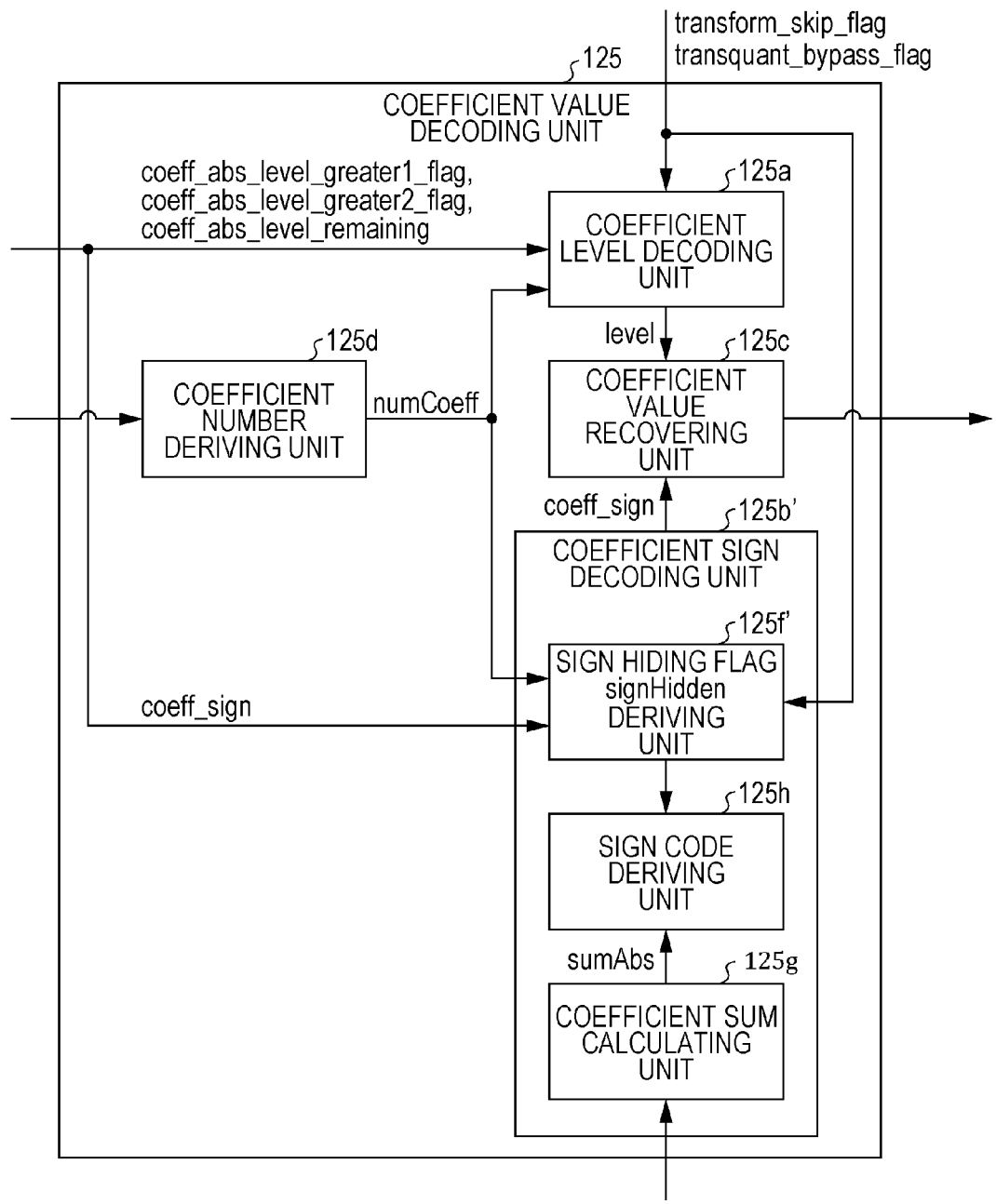
FIG. 46 is a block diagram illustrating another configuration example of the coefficient value decoding unit.

FIG. 46 is a block diagram illustrating another configuration example of the coefficient value decoding unit 125. As illustrated in FIG. 46, the coefficient value decoding unit 125 includes a coefficient level decoding unit 125*a*, a coefficient sign decoding unit 125*b'*, a coefficient value recovering unit 125*c*, and a coefficient number deriving unit 125*d*. The coefficient sign decoding unit 125*b'* includes a coefficient position deriving unit 125*e*, a sign hiding flag deriving unit 125*f'*, a coefficient sum calculating unit 125*g*, and a sign code deriving unit 125*h*. Unlike the configuration illustrated in FIG. 43, the coefficient position deriving unit 125*e* is omitted.

In a case of the configuration, the sign hiding flag deriving unit 125*f'* derives the sign hiding flag signHidden on the basis of whether or not the transform skip is to be performed, whether or not the transform/quantization bypass is to be performed, and whether or not the number numCoeff of non-zero coefficients in a sub-block is equal to or larger than the predetermined threshold value sign_hiding_threshold.

In other words, signHidden=(numSigCoeff>=
sign_hiding_threshold)&&!transquant_bypass_
flag &&!transform_skip_flag?1:0

In this determination, since the number numCoeff of non-zero coefficients in a sub-block is a variable which is also counted in level decoding, a particular process for sign hiding is not necessary, and thus it is possible to achieve an effect of simplifying processes.

(Sign Computation Process in Sign Hiding)

Figure 47:
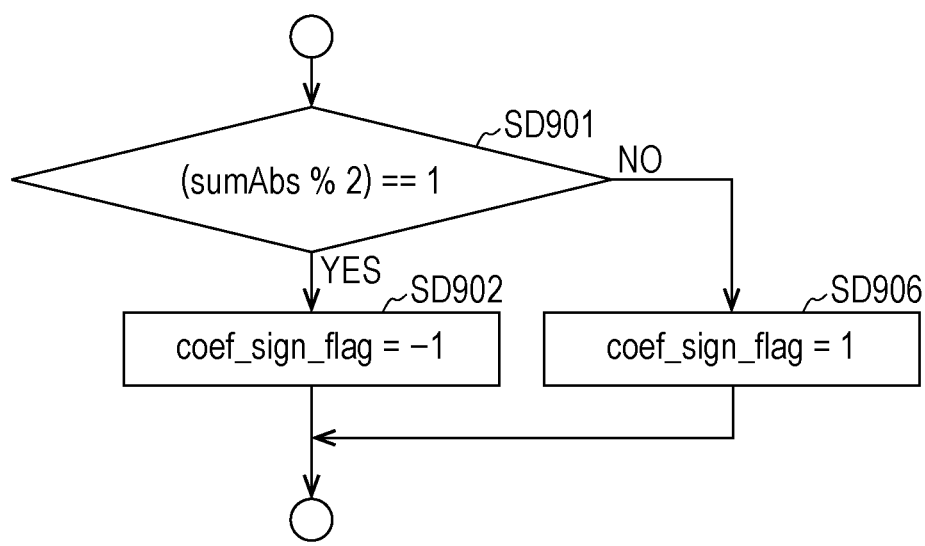
FIG. 47 is a flowchart illustrating a flow of a specific operation of a sign computation process of sign hiding performed by a sign code deriving unit.

FIG. 47 is a flowchart illustrating a specific operation of the sign computation process (step SD007) in the sign hiding performed by the sign code deriving unit 125*h*.

(Step SD901)

The sign code deriving unit 125*h* determines whether or not the coefficient absolute value sum sumAbs in a target sub-block is an odd number.

(Step SD902)

In a case where the coefficient absolute value sum sumAbs in a target sub-block is an odd number (Yes in step SD901), a sign of a target transform coefficient is derived as being negative. The absolute value absLevel which has already been decoded is inversed.

(Step SD903)

In a case where the coefficient absolute value sum sumAbs in the target sub-block is an even number (No in step SD901), a sign of a target transform coefficient is derived as being positive. The absolute value absLevel which has already been decoded is used without being inversed.

(Configuration of not Using Coefficient Absolute Value Sum sumAbs in Sign Hiding)

Figure 48:
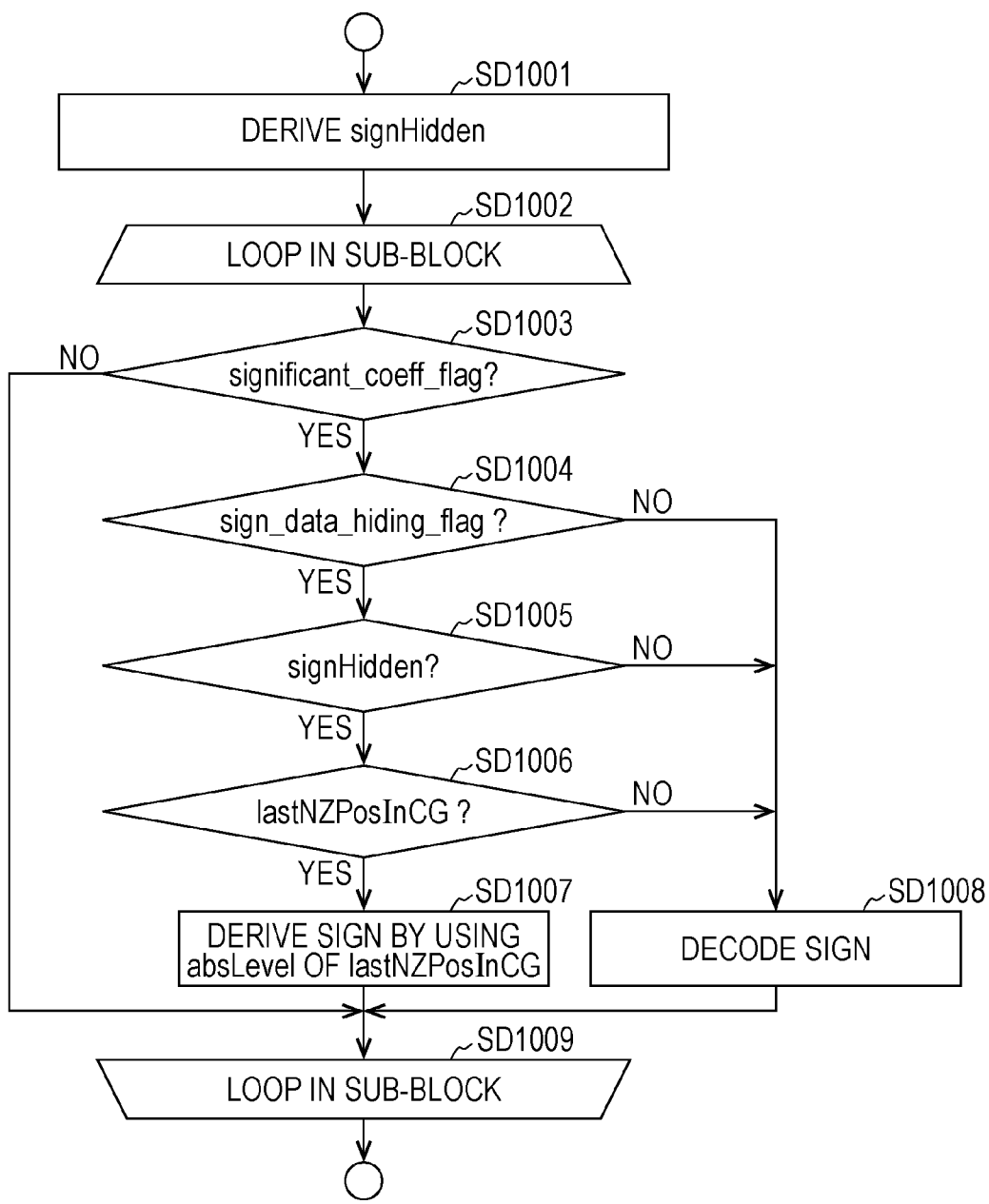
FIG. 48 is a flowchart illustrating an operation of the coefficient sign decoding unit in a case where a coefficient absolute value sum sumAbs is not used.

FIG. 48 is a flowchart illustrating an operation of the coefficient sign decoding unit 125*b* in a case where the coefficient absolute value sum sumAbs is not used. Operations in step SD1001 to step SD1005, and step SD1007 and step SD1008 are the same as the operations in step SD001 to step SD005, and step SD007 and step SD008 of FIG. 44, and thus description thereof will be omitted.

(Step SD1006)

In a case where the sign hiding flag signHidden is 1 (Yes in step SD1005), it is determined whether or not a target transform coefficient of the sign hiding flag signHidden is the last (highest frequency side) non-zero coefficient (last-NZPosInCG?) in the sub-block in a scan order.

(Step SD1007)

In a case where the target transform coefficient is the last non-zero coefficient in the sub-block in the scan order (Yes in step SD1006), the sign code deriving unit 125h derives a sign from an absolute value of the last non-zero coefficient in the scan order through computation.

Figure 49:
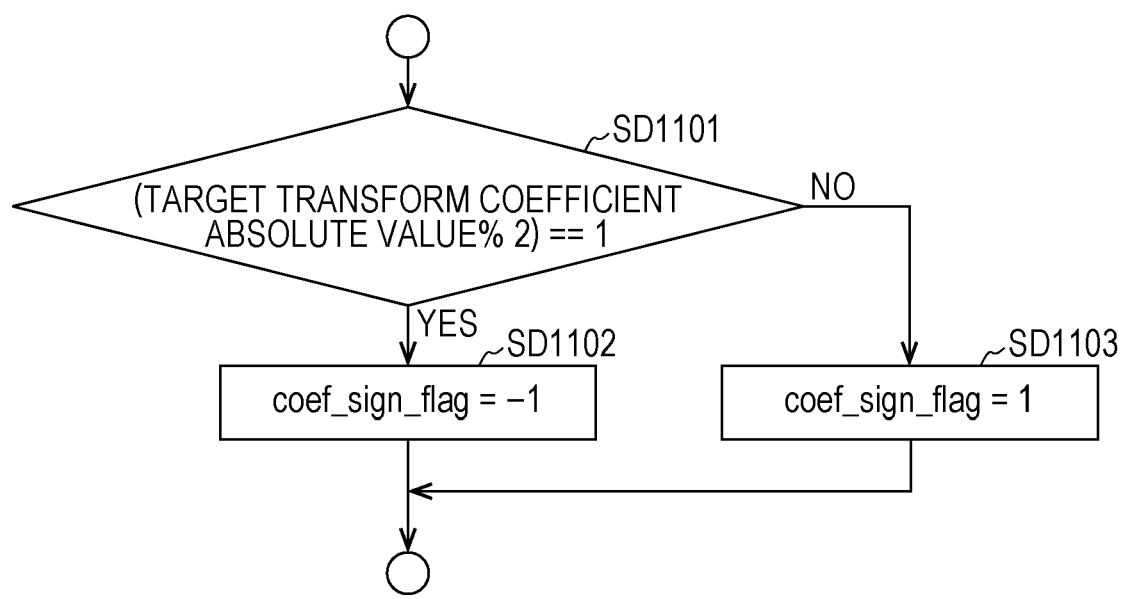
FIG. 49 is a flowchart illustrating a flow of a specific operation of a sign computation process of sign hiding performed by the sign code deriving unit in a configuration in which a coefficient absolute value sum sumAbs is not used.

FIG. 49 is a flowchart illustrating a specific operation of the sign computation process (step SD1007) in the sign hiding performed by the sign code deriving unit 125h in the configuration of not using the coefficient absolute value sum sumAbs.

(Step SD1101)

The sign code deriving unit 125h determines whether or not the coefficient absolute value absLevel of a transform coefficient which is a sign hiding target is an odd number.

(Step SD1102)

In a case where the coefficient absolute value absLevel of the target coefficient an odd number (Yes in step SD1101), a sign of the target transform coefficient is derived as being negative. The absolute value absLevel which has already been decoded is inversed.

(Step SD1103)

In a case where the coefficient absolute value absLevel of the target coefficient an odd number (No in step SD1101), a sign of the target transform coefficient is derived as being positive. The absolute value absLevel which has already been decoded is used without being inversed.

(Example 3)

Hereinafter, a description will be made of decoding processes of the GR1 flag, the GR2 flag, and a remaining coefficient level performed by the coefficient level decoding unit 125a.

(Decoding Process of GR1 Flag)

Figure 35:
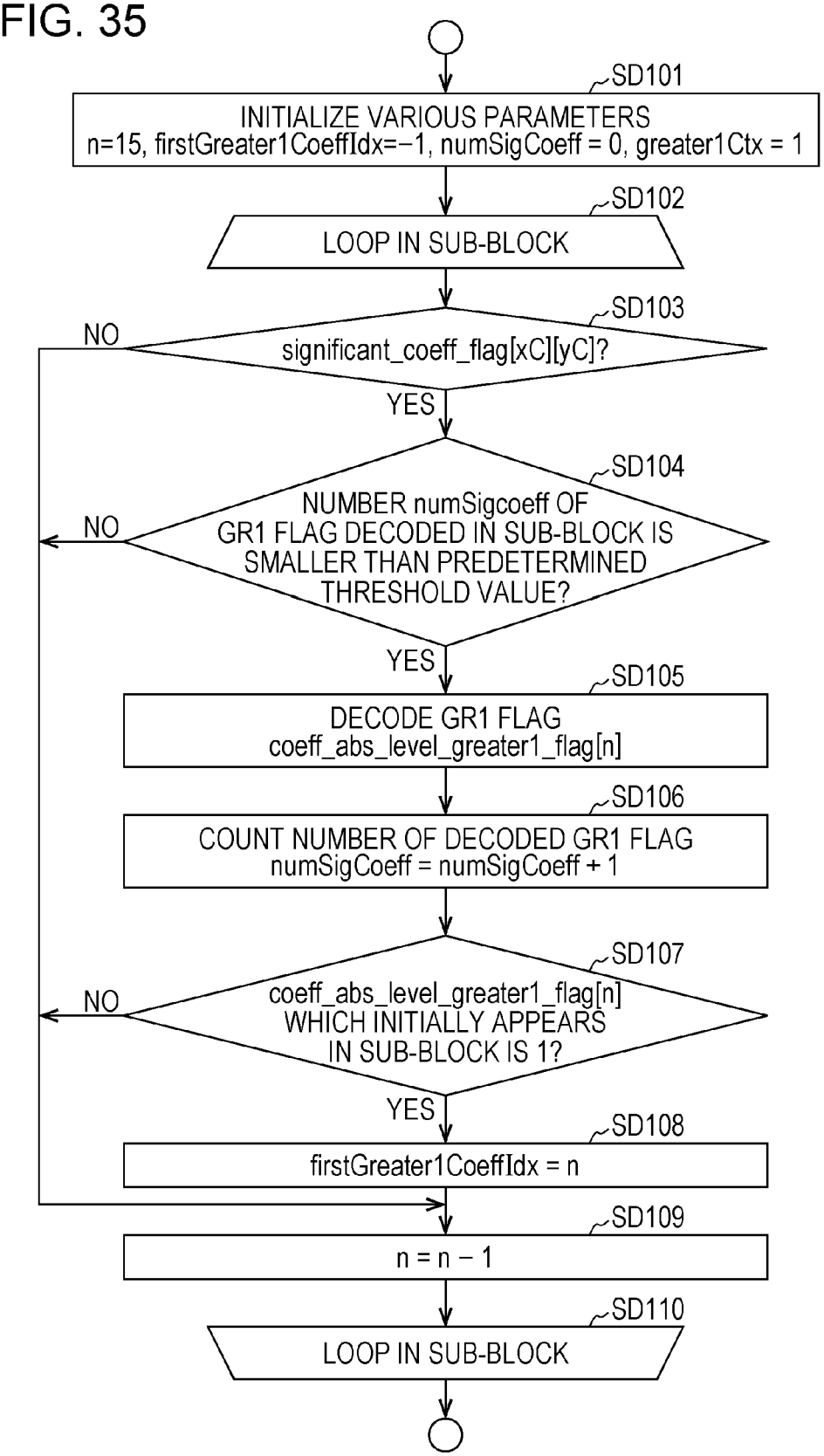
FIG. 35 is a flowchart illustrating a decoding process of a GR1 flag.

Hereinafter, a description will be made of a decoding process of the GR1 flag performed by the coefficient level decoding unit 125a. FIG. 35 is a flowchart illustrating the decoding process of the GR1 flag.

It is assumed that coeff_abs_level_greatr1_flag[n] which stores a value of the GR1 flag is initialized in advance.

(Step SD101)

The coefficient level decoding unit 125a initializes various parameters related to the decoding of the GR1 flag.

A coefficient position identification index n is set to 15 (n=15).

A coefficient number numSigCoeff is set to 0 (numSigCoeff=0).

A coefficient position firstGreater1 CoeffIdx at which a value of the GR1 flag initially appearing in a sub-block is 1 is set to −1 (firstGreatr1 CoeffIdx=−1).

In a case where a position (subset) of a decoding target sub-block corresponds to a sub-block including the last coefficient, a variable greatr1Ctx indicating the number of decoded GR1 flags having a value of 0 is initialized to 1 (that is, greater1Ctx=1).

In addition, in a case where a position (subset) of decoding target sub-block corresponds to a sub-block which does not include the last coefficient, the variable greatr1Ctx indicating the number of decoded GR1 flags having a value of 0 is updated by using the following equation.

$$greater1Ctx = greater1Ctx >> 1$$

(Step SD102)

A loop in a target sub-block is started. The loop is a loop having a coefficient position as the unit.

(Step SD103)

It is determined whether or not a coefficient position (xC, yC) specified by the coefficient position identification index n is a non-zero coefficient. In a case of the non-zero coefficient (significant_coeff_flag[xC][yC]==1) (Yes in step SD103), the flow proceeds to step SD104. In other cases (significant_coeff_flag[xC][yC]==0) (No in step SD103), the flow proceeds to step SD109.

(Step SD104)

It is determined whether or not the number numSigCoeff of the GR1 flags which are decoded in the sub-block is equal to or smaller than a predetermined threshold value. In a case where the number numSigCoeff of the GR1 flags which are decoded in the sub-block is equal to or smaller than the predetermined threshold value (Yes in step SD104), the flow proceeds to step SD104. In other cases (No in step S104), the flow proceeds to step SD109.

(Step SD105)

The GR1 flag of the coefficient position identification index n is decoded. In addition, a context index which is referred to for decoding the GR1 flag is calculated as follows.

(Case where Neither Transform Skip Nor Transform/Quantization Bypass is Performed)

In a case where neither the transform skip nor the transform/quantization bypass is performed, a context index regarding the GR1 flag at each coefficient position in a frequency domain is derived by using the following equation.

$$ctxIdx = 4*ctxset + \min(3, greater1ctx) \qquad (eq.\ B\text{-}1)$$

Here, in Equation (eq. B-1), the variable ctxset is a value defined by the number numGreater1 of coefficients whose transform coefficient level abslevel in a sub-block which has been decoded before the target sub-block in a decoding target transform block is equal to or higher than 2 (a value of the GR1 flag is 1), a position (subset) of the decoding target sub-block, and a color space cIdx.

First, the variable ctxset is initialized in advance by using the following equation before starting decoding of the GR1 flag in the decoding target sub-block.

$$ctxset = (subset > 0\ \&\&\ cIdx == 0) ? 2 : 0 \qquad (eq.\ B\text{-}2)$$

In other words, in a case where the color space cIdx indicates luminance (Y) (cIdx==0), and the position subset of the decoding target sub-block corresponds to a sub-block which does not include a DC coefficient (subset>0), the variable ctxset is set to 2. In other cases (subset==0||cIdx>0), that is, in a case where the position subset of the target sub-block corresponds to a sub-block including a DC coefficient (subset==0), or the color space cIdx indicates chroma (U,V), the variable ctxset is set to 0.

In addition, after the variable ctxset is initialized according to the above Equation (eq. B-2), a value of the variable ctxset is updated on the basis of the variable numGrater1 and the transform skip flag transform_skip or the transform/quantization bypass flag transquant_bypass_flag, before starting decoding of the GR1 flag in the decoding target sub-block.

if (!transform_skip_flag &&!transquant_bypass_flag)
{ctxset=(numGreater1>0)?ctxset+1:ctxset}  (eq. B-3)

In addition, in Equation (eq. B-3), the variable greater1Ctx is a value defined by the GR1 flag (lastGrater1Ctx) decoded in SD105, the transform skip flag, and the transform/quantization bypass flag.

if(!transform_skip_flag &&!transquant_bypass_flag)
{greater1Ctx=(lastGreater1Ctx==1)?0:
greatr1Ctx+1}  (eq. B-4)

Here, in (eq. B-4), the variable lastGreater1Ctx indicates a value of the GR1 flag which is previously decoded. In addition, in the above Equations (eq. B-3) and (eq. B-4), in a case where the transform skip or the transform/quantization bypass is performed, values of the variables ctxset and greater1Ctx are not updated. This is because, in a case where the transform skip or the transform/quantization bypass is performed, the GR1 flag is a transform coefficient in a pixel domain, and, if a variable used to derive a context for the GR1 flag regarding a transform coefficient in a frequency domain is updated, a state of the context for the GR1 flag regarding a transform coefficient in a frequency domain is not appropriately updated, and coding efficiency may be reduced.

(Case where Transform Skip or Transform/Quantization Bypass is Performed)

In a case where the transform skip or the transform/quantization bypass is performed, a context index regarding the GR1 flag at each coefficient position in a pixel domain is derived on the basis of a predetermined method. A specific derivation method will be described later.

(Step SD106)

The number of decoded GR1 flags is counted (that is, numSigCoeff=numSigCoeff+1).

In addition, in a case where a coefficient level value of the decoded coefficient position (xC, yC) is equal to or higher than 2 (a value of the GR1 flag is 1), the variable numGreater1 is updated on the basis of the transform skip flag and the transform/quantization bypass flag.

In other words, if(!transform_skip_flag &&!transquant_bypass_flag){numGreater1=coeff_abs_level_greater1_flag[n]==1?numGreater1+1:
numGreater1}  (eq. B-5)

Here, in Equation (eq. B-5), in a case where the transform skip or the transform/quantization bypass is performed, the variable numGreater1 is not updated. This is because, in a case where the transform skip or the transform/quantization bypass is performed, the GR1 flag and the GR2 flag are transform coefficients in a pixel domain, and, if variables used to derive contexts for the GR1 flag and the GR2 flag regarding transform coefficients in a frequency domain are updated, states of the contexts for the GR1 flag and the GR2 flag regarding transform coefficients in a frequency domain are not appropriately updated, and coding efficiency may be reduced.

(Step SD107)

It is determined whether or not a coefficient position is a coefficient position where a value of the GR1 flag initially appearing in the sub-block is 1. In a case where whether or not the coefficient position is a coefficient position where a value of the GR1 flag initially appearing in the sub-block is 1 (Yes in step SD107), the flow proceeds to step SD108. In other cases, the flow proceeds to step SD109.

(Step SD108)

The coefficient position (coefficient position identification index) where a value of the GR1 flag initially appearing in the sub-block is 1 is set to the variable firstGreater1 CoeffIdx (that is, firstGreater1 CoeffIdx=n).

(Step SD109)

The coefficient position identification index n is updated (that is, n=n−1).

(Step SD110)

The loop in the sub-block is finished.

(Decoding Process of GR2 Flag)

Figure 36:
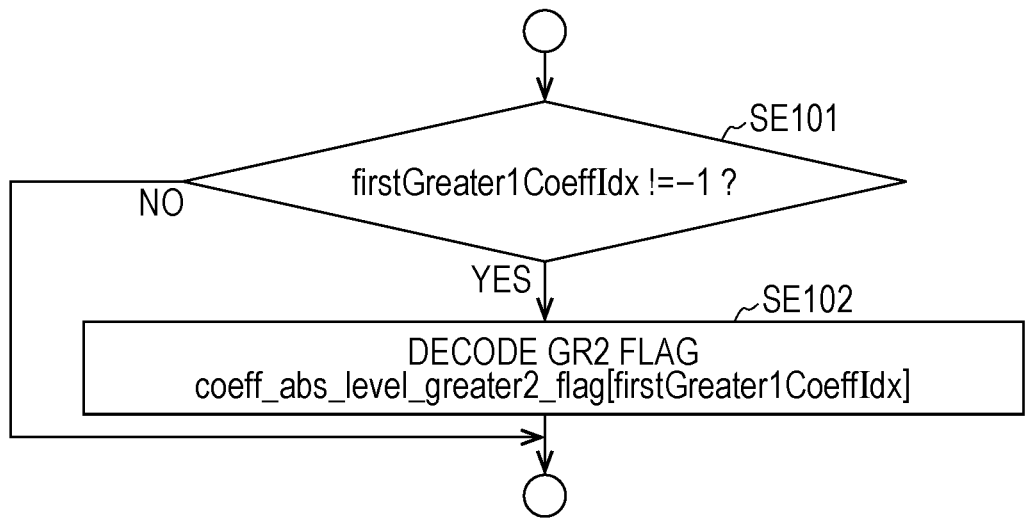
FIG. 36 is a flowchart illustrating a decoding process of a GR2 flag.

Hereinafter, a description will be made of a decoding process of the GR2 flag performed by the coefficient level decoding unit 125a. FIG. 36 is a flowchart illustrating the decoding process of the GR2 flag.

It is assumed that coeff_abs_level_greatr2_flag[n] which stores a value of the GR2 flag is initialized in advance.

(Step SE101)

It is determined whether or not there is a coefficient in which a value of the GR1 flag initially appearing in the sub-block, obtained in the decoding process of the GR1 flag, is 1. In other words, it is determined whether or not the variable firstGreater1 CoeffIdx is −1. Here, in a case where the variable firstGreater1 CoeffIdx is not −1 (Yes in step SE101), the flow proceeds to step S102. In other cases (No in step SE101), the GR2 flag is not decoded, and the decoding process of the GR2 flag is finished.

(Step SE102)

The GR2 flag (coeff_abs_level_greater2_flag[firstGreatr1 CoeffIdx]) at a coefficient position indicated by the variable firstGreatr1 CoeffIdx is decoded.

In addition, a context index which is referred to for decoding the GR2 flag is calculated as follows.

(Case where Neither Transform Skip Nor Transform/Quantization Bypass is Performed)

In a case where neither the transform skip nor the transform/quantization bypass is performed, a context index regarding the GR2 flag at each coefficient position in a frequency domain is derived by using the following equation.

ctxIdx=(cIdx==0)?ctxset:ctxset+4  (eq. C-1)

Here, in Equation (eq. C-1), the variable ctxset is a value defined by the number numGreater1 of coefficients whose transform coefficient level abslevel in a sub-block which has been decoded before the target sub-block in a decoding target transform block is equal to or higher than 2, a position (subset) of the decoding target sub-block, and a color space cIdx. In addition, a derivation method of ctxset has already been described, and thus description thereof will be omitted.

(Case where Transform Skip or Transform/Quantization Bypass is Performed)

In a case where the transform skip or the transform/quantization bypass is performed, a context index regarding the GR2 flag at each coefficient position in a pixel domain is derived on the basis of a predetermined method. A specific derivation method will be described later.

(Decoding Process of Remaining Coefficient Level)

Figure 37:
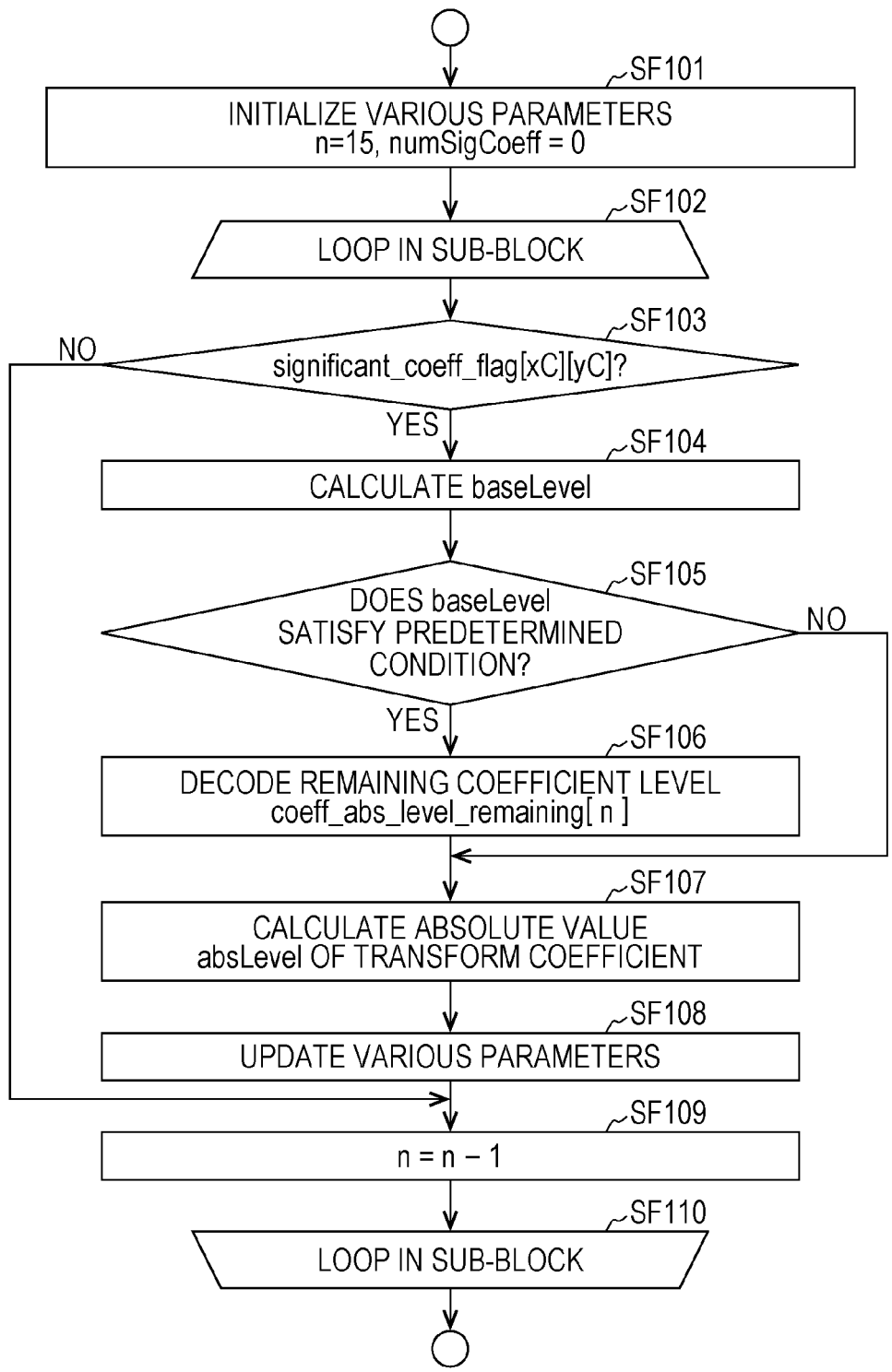
FIG. 37 is a flowchart illustrating a decoding process of a remaining coefficient level.

Hereinafter, a description will be made of a decoding process of a remaining coefficient level performed by the coefficient level decoding unit 125a. FIG. 37 is a flowchart illustrating the decoding process of the remaining coefficient level.

(Step SF101)

The coefficient level decoding unit 125a initializes various parameters related to the decoding of the remaining coefficient level.

A coefficient position identification index n is set to 15 (n=15).

A coefficient number numSigCoeff is set to 0 (numSig-Coeff=0).

(Step SF102)

A loop in a target sub-block is started. The loop is a loop having a coefficient position as the unit.

(Step SF103)

It is determined whether or not a coefficient position (xC, yC) specified by the coefficient position identification index n is a non-zero coefficient. In a case of the non-zero coefficient (significant_coeff_flag[xC][yC]==1) (Yes in step SF103), the flow proceeds to step SF104. In other cases (significant_coeff_flag[xC][yC]==0) (No in step SF103), the flow proceeds to step SF109.

(Step SF104)

A base level baseLevel of a transform coefficient at the coefficient position (xC, yC) is calculated by using the following equation.

baseLevel=1+coeff_abs_level_greater1_flag[*n*]+
    coeff_abs_level_greater2_flag[*n*]    (eq. E-1)

(Step SF105)

It is determined whether or not the base level baseLevel of the transform coefficient at the coefficient position (xC, yC) satisfies a predetermined value. The predetermined value is represented by the following equation.

baseLevel==(numSigCoeff<*TH*)?((*n*==firstGreater1
    Coeff*Idx*)?3:2):1    (eq. E-2)

In other words, 1) in a case where the coefficient number numSigCoeff is equal to or larger than a predetermined threshold value TH (numSigCoeff>=TH), it is determined whether or not baseLevel is 1.

2) In a case where the coefficient number numSigCoeff is smaller than the predetermined threshold value TH (numSigCoeff<TH), and the coefficient position identification index n is not firstGreater1 CoeffIdx, it is determined whether or not baseLevel is 2.

3) In a case where the coefficient number numSigCoeff is smaller than the predetermined threshold value TH (numSigCoeff<TH), and the coefficient position identification index n is firstGreater1 CoeffIdx, it is determined whether or not baseLevel is 3.

As mentioned above, in a case where baseLevel is the same as the value taken in the above-described condition (Yes in step SF105), the flow proceeds to step SF106. In other cases (No in step SF105), the decoding of the remaining coefficient level coeff_abs_level_remaining is skipped (treated as coeff_abs_level_remaining[n]=0), and the flow proceeds to step SF107.

(Step SF106)

The remaining coefficient level coeff_abs_level_remaining[n] of the transform coefficient at the coefficient position (xC, yC) is decoded.

(Step SF107)

A coefficient level value absLevel of the transform coefficient at the coefficient position (xC, yC) is calculated by using the following equation.

absLevel=coeff_abs_level_remaining[*n*]+baseLevel    eq. E-3

(Step SF108)

The decoded coefficient number numSigCoeff is updated (that is, numSigCoeff=numSigCoeff+1).

(Step SF109)

The coefficient position identification index n is updated (that is, n=n−1).

(Step SF110)

The loop in the sub-block is finished.

(As to Context Index Derivation of GR1 Flag/GR2 Flag During Transform Skip or Transform/Quantization Bypass)

In a case where the transform skip or the transform/quantization bypass is applied, the coefficient level decoding unit 125a derives context indexes ctxIdx regarding the GR1 flag and the GR2 flag, for example, on the basis of a relative context index corresponding to a TU width size and a TU height size.

A specific deriving process of the context index ctxIdx will be described with reference to FIG. 31(*a*). FIG. 31(*a*) illustrates a table TBL_CTX_IDX[log 2TrafoWidth−2][log 2TrafoHeight−2] of a logarithmic value log 2TrafoWidth of a TU width size, a logarithmic value log 2TrafoHeight of a TU height size, and a corresponding relative context index. The context index ctxIdx is derived from the following equation by referring to the table.

ctxIdx=TBL_CTX_IDX[log 2*Trafo*Width−2][log
    2*Trafo*Height−2]+offset    (eq. C-1)

In the above Equation (eq. C-1), in a case of the GR1 flag, the variable offset is a predetermined offset value for differentiating a context index for the GR1 flag in a frequency domain from a context index for the GR1 flag in a case where the transform skip or the transform/quantization bypass is applied. Similarly, in a case of the GR2 flag, the variable offset is a predetermined offset value for differentiating a context index for the GR2 flag in a frequency domain from a context index for the GR2 flag in a case where the transform skip or the transform/quantization bypass is applied, and indicates a starting point of a context index regarding the GR1 flag or the GR2 flag in a case where the transform skip or the transform/quantization bypass is applied. This is also the same for the variable offset in the following Equations (eq. C-2) to (eq. C-6).

In a case where the transform skip or the transform/quantization bypass is to be performed, the GR1 flag and the GR2 flag which are decoding targets are transform coefficients in a pixel domain. Since an appearance probability of the GR1 flag and the GR2 flag at each coefficient position in a pixel domain and an appearance probability of the GR1 flag and the GR2 flag in a frequency domain are different from each other, it is preferable to differentiate contexts regarding the GR1 flag and the GR2 flag from each other in the pixel domain and the frequency domain.

As mentioned above, according to the coefficient level decoding unit 125a, in a case where the transform skip or the transform/quantization bypass is performed, it is possible to derive context indexes suitable for the GR1 flag and the GR2 flag in a pixel domain. For this reason, since a code amount of the GR1 flag and the GR2 flag can be reduced in a TU which is a coding and decoding target, it is possible to achieve effects of reducing a processing amount related to decoding of the GR1 flag and the GR2 flag and also of improving coding efficiency.

In addition, also in a pixel domain, since appearance probabilities of a non-zero coefficient are different depending on a TU size, it is preferable to differentiate contexts regarding the GR1 flag and the GR2 flag from each other for respective TU sizes. In other words, according to the coefficient level decoding unit 125a, it is possible to derive context indexes suitable for the GR1 flag and the GR2 flag in the pixel domain for each TU size. For this reason, since a code amount of a the GR1 flag and the GR2 flag can be further reduced in a TU which is a coding and decoding target, it is possible to achieve effects of further reducing a processing amount related to decoding of the GR1 flag and the GR2 flag and also of improving coding efficiency.

In addition, in the above description, a description has been made of a case where the transform skip or the transform/quantization bypass is performed, that is, an example in which a context for the GR1 flag is differentiated from a context in a frequency domain with respect to a transform coefficient in a pixel domain, but the present invention is not limited thereto. For example, in a case where the transform skip is performed, a context different from a context in a frequency domain may be used, and, in a case where the transform/quantization bypass is performed, a context in the frequency domain may be shared and used.

In a case where the transform/quantization bypass is applied, a transform coefficient is not quantized, and thus a code amount of the transform coefficient increases. For this reason, a code amount of the GR1 flag which is a flag indicating whether or not a value of a quantized transform coefficient is greater than 1 is low in a ratio of occupying a code amount of a transform coefficient. For this reason, even if a code amount of the GR1 flag is reduced by using a context different from a context in a frequency domain, there is a probability that an overall code amount of coded data may no be greatly reduced. On the other hand, in a case where the transform skip is applied, since a transform coefficient is quantized, and thus a code amount of the transform coefficient is smaller than in a case where the transform/quantization bypass is applied. Therefore, if a code amount of the GR1 flag is reduced by using a context different from a context in a frequency domain, it is possible to relatively considerably reduce an overall code amount of coded data. Consequently, in a case where the transform skip is applied, the GR1 flag is coded with a context different from a context in a frequency domain, and, in a case where the transform/quantization bypass is applied, the GR1 flag is coded with a context which is shared with the frequency domain. Thus, it is possible to achieve an effect of reducing a code amount without greatly increasing the number of contexts.

The above discussion is also applicable to the GR2 flag. In a case where the transform skip is applied, the GR2 flag is coded with a context different from a context in a frequency domain, and, in a case where the transform/quantization bypass is applied, the GR2 flag is coded with a context which is shared with the frequency domain. Thus, it is possible to achieve an effect of reducing a code amount without greatly increasing the number of contexts.

(Modification Example 3-A)

In addition, the coefficient level decoding unit 125*a* may derive a context index ctxIdx on the basis of a logarithmic value log 2TrafoSize (=(log 2TrafoWidth+log 2TrafoHeight)>>1) of a TU size instead of the logarithmic value log 2TrafoWidth of a TU width size and the logarithmic value log 2TrafoHeight of a TU height size, during the transform skip or the transform/quantization bypass. For example, a context index is derived from the following equation by referring to the table TBL_CTX_IDX[log 2TrafoSize−2] of a logarithmic value log 2TrafoSize of a TU size and a relative context index, illustrated in FIG. 31(*b*).

$$ctxIdx=TBL\_CTX\_IDX[\log 2\mathit{Trafo}\text{Size}-2]+\text{offset} \quad (\text{eq. C-2})$$

In the above Equation (eq. C-2), in a case of the GR1 flag, the variable offset is a predetermined offset value for differentiating a context index for the GR1 flag in a frequency domain from a context index for the GR1 flag in a case where the transform skip or the transform/quantization bypass is applied. Similarly, in a case of the GR2 flag, the variable offset is a predetermined offset value for differentiating a context index for the GR2 flag in a frequency domain from a context index for the GR2 flag in a case where the transform skip or the transform/quantization bypass is applied.

Generally, an appearance probability of a non-square TU size is lower than that of a square TU size. For this reason, there is a slight reduction in the improvement achieved as a result of sharing contexts for the GR1 flag and the GR2 flag in the pixel domain between a non-square TU size and a square TU size having the same number of elements. Therefore, it is possible to minimize the number of contexts regarding the GR1 flag and the GR2 flag in a pixel domain, newly used for the transform skip or the transform/quantization bypass, and also to achieve an effect of improving coding efficiency.

(Modification Example 3-B)

The coefficient level decoding unit 125*a* may derive context indexes ctxIdx for the GR1 flag and the GR2 flag in a pixel domain of a target transform block on the basis of a prediction type PredType, a TU width size, a TU height size, and a corresponding relative context index, during the transform skip or the transform/quantization bypass. For example, context indexes for the GR1 flag and the GR2 flag is derived from the following equation by referring to the table TBL_CTX_IDX[PredType][log 2TrafoWidth−2][log 2TrafoHeight−2] of a prediction type PredType, a logarithmic value log 2TrafoWidth of a TU width size, a logarithmic value log 2TrafoHeight of a TU height size, and a corresponding relative context index, illustrated in FIG. 32.

$$ctxIdx=TBL\_CTX\_IDX[\text{PredType}][\log 2\mathit{Trafo}\text{Width}-2][\log 2\mathit{Trafo}\text{Height}-2]+\text{offset} \quad (\text{eq. C-3})$$

In the above Equation (eq. C-3), in a case of the GR1 flag, the variable offset is a predetermined offset value for differentiating a context index for the GR1 flag in a frequency domain from a context index for the GR1 flag in a case where the transform skip or the transform/quantization bypass is applied. Similarly, in a case of the GR2 flag, the variable offset is a predetermined offset value for differentiating a context index for the GR2 flag in a frequency domain from a context index for the GR2 flag in a case where the transform skip or the transform/quantization bypass is applied.

Here, it is assumed that in a case of intra-prediction, a value of the prediction type PredType is 0, and, in a case of inter-prediction, a value thereof is 1.

Generally, in a case where the transform skip or the transform/quantization bypass is performed, since appearance probabilities of the GR1 flag and the GR2 flag in a pixel domain which is a decoding target are different from each other in the intra-prediction and the inter-prediction, it is preferable to differentiate contexts regarding the GR1 flag and the GR2 flag from each other for respective prediction types. In other words, according to the coefficient level decoding unit 125*a*, it is possible to derive a context index suitable for the GR1 flag or the GR2 flag in a pixel domain for each prediction type and each TU size. For this reason, since a code amount of the GR1 flag and the GR2 flag can be reduced in a TU which is a coding and decoding target, it is possible to achieve effects of reducing a processing amount related to decoding of the GR1 flag and the GR2 flag and also of improving coding efficiency.

(Modification Example 3-C)

In addition, the coefficient level decoding unit 125a may derive a context index ctxIdx on the basis of a logarithmic value log 2TrafoSize (=(log 2TrafoWidth+log 2TrafoHeight)>>1) of a TU size and a prediction type instead of the logarithmic value log 2TrafoWidth of a TU width size and the logarithmic value log 2TrafoHeight of a TU height size, during the transform skip or the transform/quantization bypass. For example, a context index is derived from the following equation by referring to the table TBL_CTX_IDX [PredType][log 2TrafoSize−2] of the prediction type PredType, a logarithmic value log 2TrafoSize of a TU size, and a relative context index illustrated in FIG. 33.

$$ctxIdx=TBL\_CTX\_IDX[PredType][\log 2TrafoSize-2]+offset \quad (eq.\ C\text{-}4)$$

In the above Equation (eq. C-4), in a case of the GR1 flag, the variable offset is a predetermined offset value for differentiating a context index for the GR1 flag in a frequency domain from a context index for the GR1 flag in a case where the transform skip or the transform/quantization bypass is applied. Similarly, in a case of the GR2 flag, the variable offset is a predetermined offset value for differentiating a context index for the GR2 flag in a frequency domain from a context index for the GR2 flag in a case where the transform skip or the transform/quantization bypass is applied.

Generally, an appearance probability of a non-square TU size is lower than that of a square TU size. For this reason, there is a slight reduction in the improvement achieved as a result of sharing contexts of the GR1 flag and the GR2 flag in the pixel domain between a non-square TU size and a square TU size having the same number of elements. As mentioned above, it is possible for the coefficient level decoding unit 125a to minimize the number of contexts regarding the GR1 flag and the GR2 flag in a pixel domain, newly used for the transform skip or the transform/quantization bypass, and also to achieve an effect of improving coding efficiency.

(Modification Example 3-D)

As mentioned above, a description has been made of an example in which the coefficient level decoding unit 125a derives a separate context index for the GR1 flag and the GR2 flag in accordance with a TU size or a prediction type, but is not limited to. For example, the coefficient level decoding unit 125a may assign a fixed context index to the GR1 flag and the GR2 flag in a pixel domain of a target transform block during the transform skip or the transform/quantization bypass.

$$\text{That is, } ctxIdx=\text{offset} \quad (eq.\ C\text{-}5)$$

In the above Equation (eq. C-5), in a case of the GR1 flag, the variable offset is a predetermined offset value for differentiating a context index for the GR1 flag in a frequency domain from a context index for the GR1 flag in a case where the transform skip or the transform/quantization bypass is applied. Similarly, in a case of the GR2 flag, the variable offset is a predetermined offset value for differentiating a context index for the GR2 flag in a frequency domain from a context index for the GR2 flag in a case where the transform skip or the transform/quantization bypass is applied.

Therefore, it is possible to achieve effects of minimizing the number of newly used contexts regarding the GR1 flag and the GR2 flag in a pixel domain and also of improving coding efficiency.

(Modification Example 3-E)

In the coefficient level decoding unit 125a, context indexes regarding the GR1 flag and the GR2 flag are common to the transform skip and the transform/quantization bypass, but separate context indexes may be assigned in the transform skip and the transform/quantization bypass. Generally, since appearance probabilities of the GR1 flag and the GR2 flag in a pixel domain which is a decoding target are different from each other in the transform skip and the transform/quantization bypass, it is preferable to differentiate contexts regarding the GR1 flag and the GR2 flag from each other in the transform skip and the transform/quantization bypass. For example, a context index is derived from the following equation by referring to the table TBL_CTX_IDX[PredType][log 2TrafoSize−2] of an identifier index for identifying the transform skip and the transform/quantization bypass from each other, a logarithmic value log 2TrafoSize of a TU size, and a relative context index, as illustrated in FIG. 34.

$$ctxIdx=TBL\_CTX\_IDX[index][\log 2TrafoSize-2]+offset \quad eq.\ C\text{-}6$$

In addition, it is assumed that a value of the identifier index in the above equation is 0 in the transform skip, and is 1 in the transform/quantization bypass.

In the above Equation (eq. C-6), in a case of the GR1 flag, the variable offset is a predetermined offset value for differentiating a context index for the GR1 flag in a frequency domain from a context index for the GR1 flag in a case where the transform skip or the transform/quantization bypass is applied. Similarly, the variable offset is a predetermined offset value for differentiating a context index for the GR2 flag in a frequency domain from a context index for the GR2 flag in a case where the transform skip or the transform/quantization bypass is applied.

As mentioned above, according to the coefficient level decoding unit 125a, it is possible to derive context indexes suitable for the GR1 flag and the GR2 flag in a pixel domain for each of the transform skip and the transform/quantization bypass. For this reason, since a code amount of the GR1 flag and the GR2 flag can be reduced in a TU which is a coding and decoding target, it is possible to achieve effects of reducing a processing amount related to decoding of the GR1 flag and the GR2 flag and also of improving coding efficiency.

(Modification Example 3-F)

In addition, the coefficient level decoding unit 125a derives a context index separately from the GR1 flag and the GR2 flag in a frequency domain, in relation to both the GR1 flag and the GR2 flag, during the transform skip or the transform/quantization bypass, but is not limited thereto.

The coefficient level decoding unit 125a may derive a context separately from the GR1 flag in a frequency domain according to any one of the methods of Modification Example 3-A to Modification Example 3-E in relation to at least the GR1 flag during the transform skip or the transform/quantization bypass, and may also use a context for the GR2 flag in the frequency domain during the transform skip or the transform/quantization bypass in relation to the GR2 flag. In other words, in the same method (the above Equations (eq. C-1) and (eq. B-2)) as in the GR2 flag in the frequency domain, a context index ctxIdx is derived.

This is because, in the coefficient level decoding unit 125a, a plurality of GR1 flags may occur in a symbol, but at most one GR2 flag appears in the sub-block (that is, an appearance frequency of the GR2 flag is low). For this reason, there is a slight reduction in the improvement achieved as a result of using a context for the GR2 flag in the frequency domain as a context for a context for the GR2 flag during the transform skip or the transform/quantization bypass. For this reason, since a code amount of the GR1 flag and the GR2 flag can be reduced while an increase in the number of contexts for the GR2 flag is minimized, it is possible to achieve effects of reducing a processing amount related to decoding of the GR1 flag and the GR2 flag and also of improving coding efficiency.

(Modification Example 3-G)

In a case where the transform skip or the transform/quantization bypass is not performed, context indexes regarding the GR1 flag and the GR2 flag in a frequency domain are derived in accordance with the number numGreater1 of coefficients whose transform coefficient level abslevel in a sub-block which has been decoded before the target sub-block in a decoding target transform block is equal to or higher than 2 (a value of the GR1 flag is 1), and the number of the variable greatr1Ctx indicating the number of decoded GR1 flags having a value of 0. For this reason, each context index for the GR1 flag and the GR2 flag cannot be determined unless a GR1 flag previous to a GR1 flag which is a decoding target is decoded. In other words, there is a problem in that context indexes regarding the GR1 flag and the GR2 flag at respective coefficient positions in a sub-block cannot be derived in parallel.

Hereinafter, in relation to derivation of context indexes for the GR1 flag and the GR2 flag in the coefficient level decoding unit 125a, a description will be made of an example in which a derivation pattern is selected depending on whether or not a non-zero coefficient is present in an adjacent sub-block, and context indexes for the GR1 flag and the GR2 flag are derived from a position in a sub-block according to the selected derivation pattern. In this case, the coefficient level decoding unit 125a is provided with an adjacent sub-block coefficient presence/absence context deriving unit 124c (not illustrated).

In relation to a process target sub-block X, the following pattern is obtained from a state of a non-zero transform coefficient in a sub-block A adjacent to the right side of the sub-block X and a sub-block B adjacent to the lower side thereof.

(Pattern 0) A case where a value of a sub-block coefficient presence/absence flag is 0 in both the right adjacent sub-block (xCG+1, yCG) and the lower adjacent sub-block (xCG, yCG+1)

(Pattern 1) A case where a value of the sub-block coefficient presence/absence flag is 1 in the right adjacent sub-block (xCG+1, yCG), a value of the sub-block coefficient presence/absence flag is 0 in the lower adjacent sub-block (xCG, yCG+1)

(Pattern 2) A case where a value of the sub-block coefficient presence/absence flag is 0 in the right adjacent sub-block (xCG+1, yCG), a value of the sub-block coefficient presence/absence flag is 1 in the lower adjacent sub-block (xCG, yCG+1)

(Pattern 3) A case where a value of the sub-block coefficient presence/absence flag is 1 in both the right adjacent sub-block (xCG+1, yCG) and the lower adjacent sub-block (xCG, yCG+1)

In addition, a pattern index indicating the pattern is obtained by using the following Equation (X).

$$idxCG = \text{significant\_coeff\_group\_flag}[xCG+1][yCG] + (\text{significant\_coeff\_group\_flag}[xCG][yCG+1] << 1) \quad (X)$$

In addition, a context index is derived by using coordinates (xB, yB) in the sub-block X in a method illustrated in FIG. 41 in accordance with the pattern index idxCG. With reference to FIG. 41, a description will be made of a value of a context index which is derived in each case of the patterns 0 to 3.

(Case of Pattern 0)

In a case of the pattern 0, a context index is derived by $sigCtx = (xB+yB<=2)?1:0$.

Values of the context indexes are arranged as illustrated in FIG. 42(*a*).

(Case of Pattern 1)

In a case of the pattern 1, a context index is derived by $sigCtx = (yB<=1)?1:0$.

Therefore, as illustrated in FIG. 42(*b*), values of the context indexes are 1 in the first and second rows of the sub-block, and values of the context indexes are 0 in the third and fourth rows of the sub-block.

(Case of Pattern 2)

In a case of the pattern 2, a context index is derived by $sigCtx = (xB<=1)?1:0$.

Therefore, as illustrated in FIG. 42(*c*), values of the context indexes are 1 in the first and second columns of the sub-block, and values of the context indexes are 0 in the third and fourth columns of the sub-block.

(Case of Pattern 3)

In a case of the pattern 3, a context index is derived by $sigCtx = (xB+yB<=4)?2:1$.

Therefore, in a case of the pattern 3, if a sum of the coordinate xB in the horizontal direction and the coordinate yB in the vertical direction of the coordinates (xB, yB) in the sub-block is 4 or less, a value of the context index is "1", and, otherwise, a value of the context index is "0".

Therefore, values of the context indexes are arranged as illustrated in FIG. 42(*d*).

In addition, there may be the following configuration.

With reference to FIGS. 28 and 29, a description thereof will be made. FIG. 28 is a diagram illustrating an example of a pseudo-code for deriving a context index regarding the GR1 flag and the GR2 flag from coordinates of a process target frequency component in a sub-block according to a pattern index idxCG. FIG. 29 illustrates arrangements of values of context indexes in a context index derivation method using the pseudo-code illustrated in FIG. 28.

With reference to FIGS. 28 and 29, a description will be made of a value of a context index which is derived in each case of patterns 0 to 3. In addition, hatched parts illustrated in FIG. 29 are parts which are changed from the arrangements of values of context indexes illustrated in FIG. 42.

(Case of Pattern 0)

In a case of the pattern 0, the adjacent sub-block coefficient presence/absence context deriving unit 124c derives a context index as follows according to a value of xB+yB.

In a case where xB+yB is equal to or smaller than 0, the adjacent sub-block coefficient presence/absence context deriving unit 124c derives sigCtx=2. In addition, in a case where xB+yB is greater than 1 and is equal to or smaller than 2, the adjacent sub-block coefficient presence/absence context deriving unit 124c derives sigCtx=1. In other cases, the adjacent sub-block coefficient presence/absence context deriving unit 124c derives sigCtx=0. Consequently, values of context indexes are arranged as illustrated in FIG. 29(*a*).

(Case of Pattern 1)

In a case of the pattern 1, the adjacent sub-block coefficient presence/absence context deriving unit 124c derives a context index as follows according to a value of yB.

In a case where yB is equal to or smaller than 0, the adjacent sub-block coefficient presence/absence context deriving unit 124c derives sigCtx=2. In addition, in a case where yB is greater than 0 and is equal to or smaller than 1, the adjacent sub-block coefficient presence/absence context deriving unit 124c derives sigCtx=1. In other cases, the adjacent sub-block coefficient presence/absence context deriving unit 124c derives sigCtx=0. Consequently, values of context indexes are arranged as illustrated in FIG. 29(b).

In other words, as illustrated in FIG. 29(b), values of the context indexes are 2 in the first row of the sub-block, and values of the context indexes are 1 in the second row of the sub-block. In addition, values of the context indexes are 0 in the third row and the fourth row of the sub-block.

(Case of Pattern 2)

In a case of the pattern 2, the adjacent sub-block coefficient presence/absence context deriving unit 124c derives a context index as follows according to a value of xB.

In a case where xB is equal to or smaller than 0, the adjacent sub-block coefficient presence/absence context deriving unit 124c derives sigCtx=2. In addition, in a case where xB is greater than 0 and is equal to or smaller than 1, the adjacent sub-block coefficient presence/absence context deriving unit 124c derives sigCtx=1. In other cases, the adjacent sub-block coefficient presence/absence context deriving unit 124c derives sigCtx=0. Consequently, values of context indexes are arranged as illustrated in FIG. 29(c).

In other words, as illustrated in FIG. 29(c), values of the context indexes are 2 in the first column of the sub-block, and values of the context indexes are 1 in the second column of the sub-block. In addition, values of the context indexes are 0 in the third column and the fourth column of the sub-block.

(Case of Pattern 3)

In a case of the pattern 3, as illustrated in FIG. 29(d), the adjacent sub-block coefficient presence/absence context deriving unit 124c equally derives sigCtx=2 in the sub-block regardless of values of xB and yB.

As mentioned above, according to the configuration, it is possible to select a derivation pattern depending on whether or not a non-zero coefficient is present in an adjacent sub-block, and to derive context indexes for the GR1 flag and the GR2 flag from a position in a sub-block according to the selected derivation pattern. For this reason, in relation to context indexes regarding the GR1 flag and the GR2 flag, it is possible to achieve an effect of deriving the context indexes regarding the GR1 flag and the GR2 flag at respective coefficient positions in a sub-block in parallel regardless of a GR1 flag previous to a GR1 flag which is a decoding target.

<Flow of Process by Transform Coefficient Decoding Unit 120>

Hereinafter, with reference to FIGS. 23 to 26, a description will be made of a flow of a process performed by the transform coefficient decoding unit 120.

Figure 24:
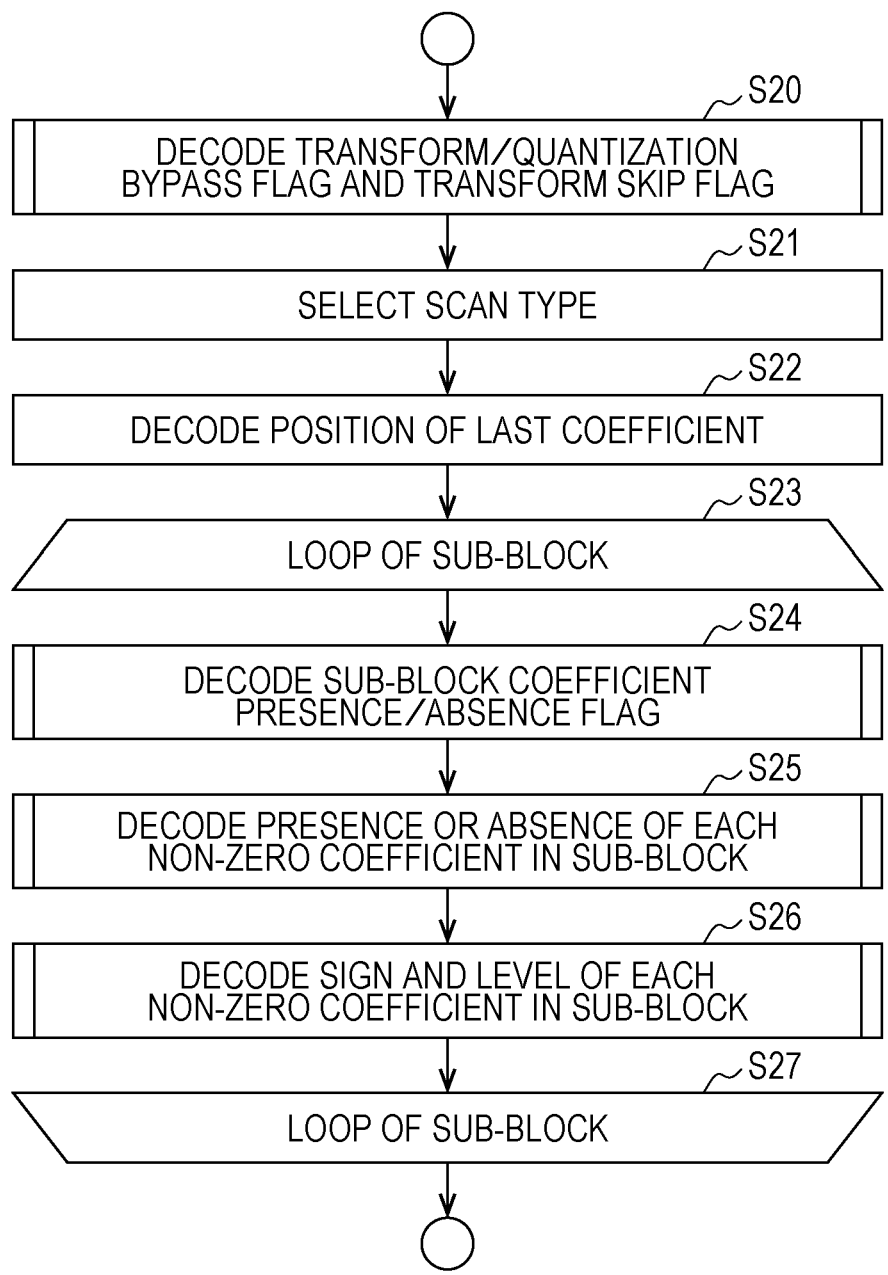
FIG. 24 is a flowchart illustrating a flow of a process in which the transform coefficient decoding unit according to the embodiment decodes a transform coefficient.

FIG. 24 is a flowchart illustrating a flow of a transform coefficient decoding process performed by the transform coefficient decoding unit 120 in a case where a TU size is larger than a predetermined size.

(Step S20)

First, the transform skip/transform/quantization bypass flag decoding unit 128 included in the transform coefficient decoding unit 120 decodes the syntax transquant_bypass_flag indicating whether or not the transform/quantization bypass is to be performed and the syntax transform_skip_flag indicating whether or not the transform skip is to be performed. In addition, a specific decoding process has already been described, and thus description thereof will be omitted.

(Step S21)

Next, the coefficient decoding control unit 123 included in the transform coefficient decoding unit 120 selects a scan type SCanType.

(Step S22)

Next, the last coefficient position decoding unit 121 included in the transform coefficient decoding unit 120 decodes the syntaxes last_significant_coeff_x and last_significant_coeff_y indicating a position of the last transform coefficient according to a scan order.

(Step S23)

Next, the coefficient decoding control unit 123 starts a loop in the units of sub-blocks. In addition, with a sub-block having the last coefficient as a starting position of the loop, a decoding process is performed in the sub-block units in a backward scan order of a sub-block scan.

(Step S24)

Next, the sub-block coefficient presence/absence flag decoding unit 127 included in the transform coefficient decoding unit 120 decodes the sub-block coefficient presence/absence flag significant_coeff_group_flag.

(Step S25)

Next, the coefficient presence/absence flag decoding unit 124 included in the transform coefficient decoding unit 120 decodes each coefficient presence/absence flag significant_coeff_flag in a target sub-block.

(Step S26)

Next, the coefficient value decoding unit 125 included in the transform coefficient decoding unit 120 decodes a sign and a level of a non-zero coefficient in a target small group. This is performed by the respective syntaxes coeff_abs_level_greater1_flag, coeff_abs_level_greater2_flag, coeff_sign_flag, and coeff_abs_level_remaining.

(Step S27)

This step is a terminal end of the loop having the sub-block as the unit (a terminal end of the loop having the sub-block of step S23 as the unit).

<<Scan Index Setting Process>>

Figure 23:
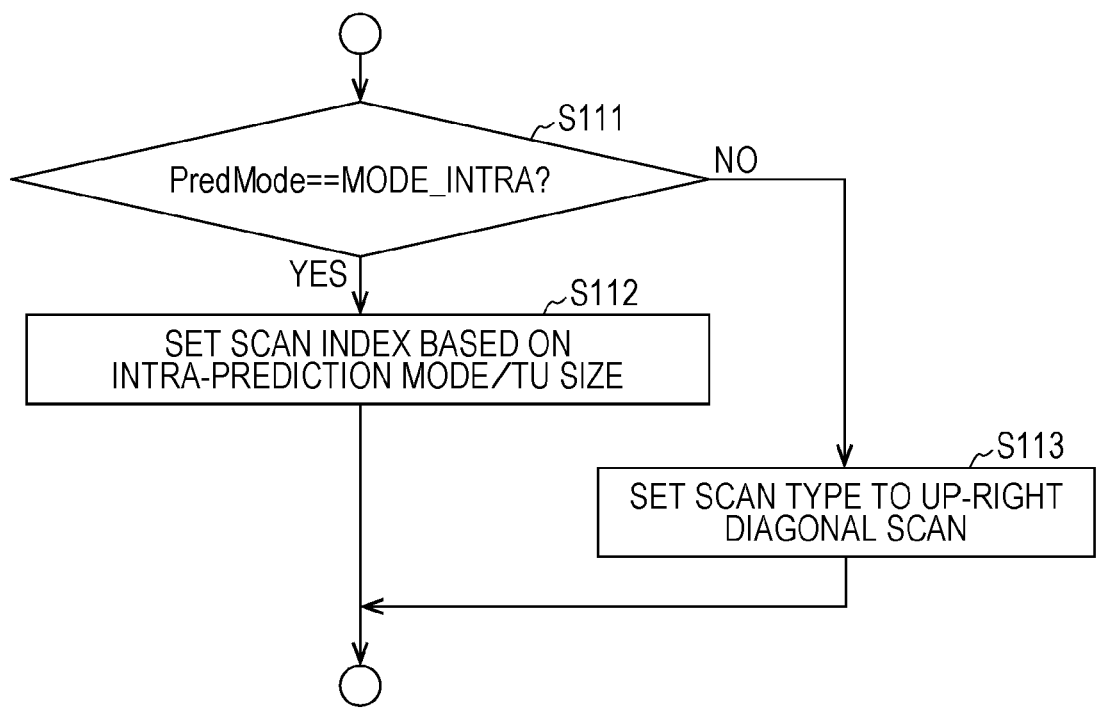
FIG. 23 is a flowchart illustrating a flow of a process in which a transform coefficient decoding unit selects a scan type according to the embodiment.

FIG. 23 is a flowchart more specifically illustrating the process (step S21) of selecting a scan type.

(Step S111)

First, the coefficient decoding control unit 123 included in the transform coefficient decoding unit 120 determines whether or not prediction type information PredMode indicates an intra-prediction type MODE_INTRA.

(Step S112)

If the prediction type is the intra-prediction type (Yes in step S111), the coefficient decoding control unit 123 included in the transform coefficient decoding unit 120 sets a scan type on the basis of the intra-prediction mode (prediction direction) and a target TU size (a size in a frequency domain). A specific setting process of a scan type has already been described, and thus description thereof will be omitted here.

On the other hand, if the prediction type is not the intra-prediction type (No in step S111), the coefficient decoding control unit 123 included in the transform coefficient decoding unit 120 sets a scan type to the up-right diagonal scan.

<<Decoding Process of Sub-Block Coefficient Presence/Absence Flag>>

Figure 25:
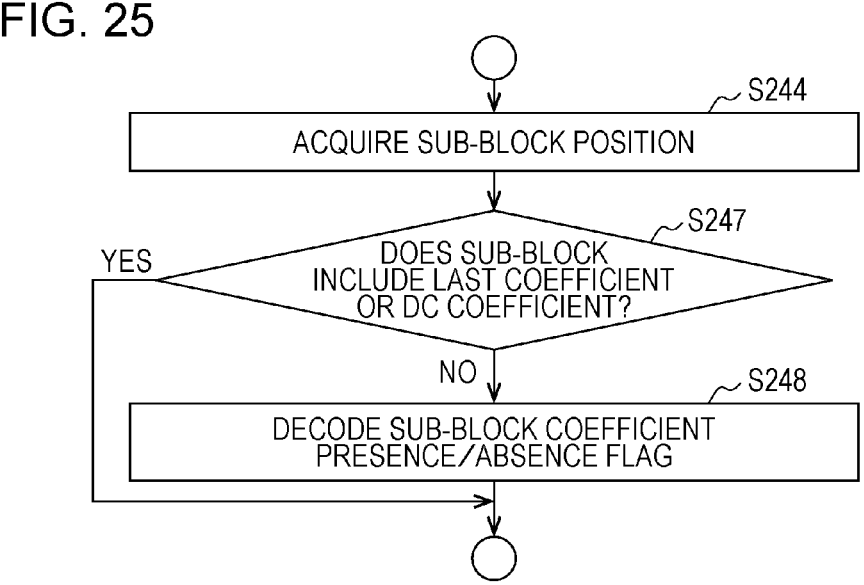
FIG. 25 is a flowchart illustrating a flow of a process in which the transform coefficient decoding unit according to the embodiment decodes a sub-block coefficient presence/absence flag.

FIG. 25 is a flowchart more specifically illustrating the process (step S24) of decoding the sub-block coefficient presence/absence flag.

The sub-block coefficient presence/absence flag decoding unit 127 initializes a value of the sub-block coefficient presence/absence flag significant_coeff_group_flag included in a target frequency domain before starting a loop of the sub-block. This initialization process is performed by setting a sub-block coefficient presence/absence flag of a sub-block including a DC coefficient and a sub-block coefficient presence/absence flag of a sub-block including the last coefficient to 1, and by setting other sub-block coefficient presence/absence flags to 0.

(Step S244)

The sub-block coefficient presence/absence flag decoding unit 127 acquires a position of the sub-block.

(Step S247)

The coefficient presence/absence flag decoding unit 127 determines whether or not the target sub-block is a sub-block including the last coefficient or a DC coefficient.

(Step S248)

In a case where the target sub-block is not a sub-block including the last coefficient or the DC coefficient (No in step S247), the coefficient presence/absence flag decoding unit 124 decodes the sub-block coefficient presence/absence flag significant_coeff_group_flag.

<<Decoding Process on Coefficient Presence/Absence Flag>>

Figure 26:
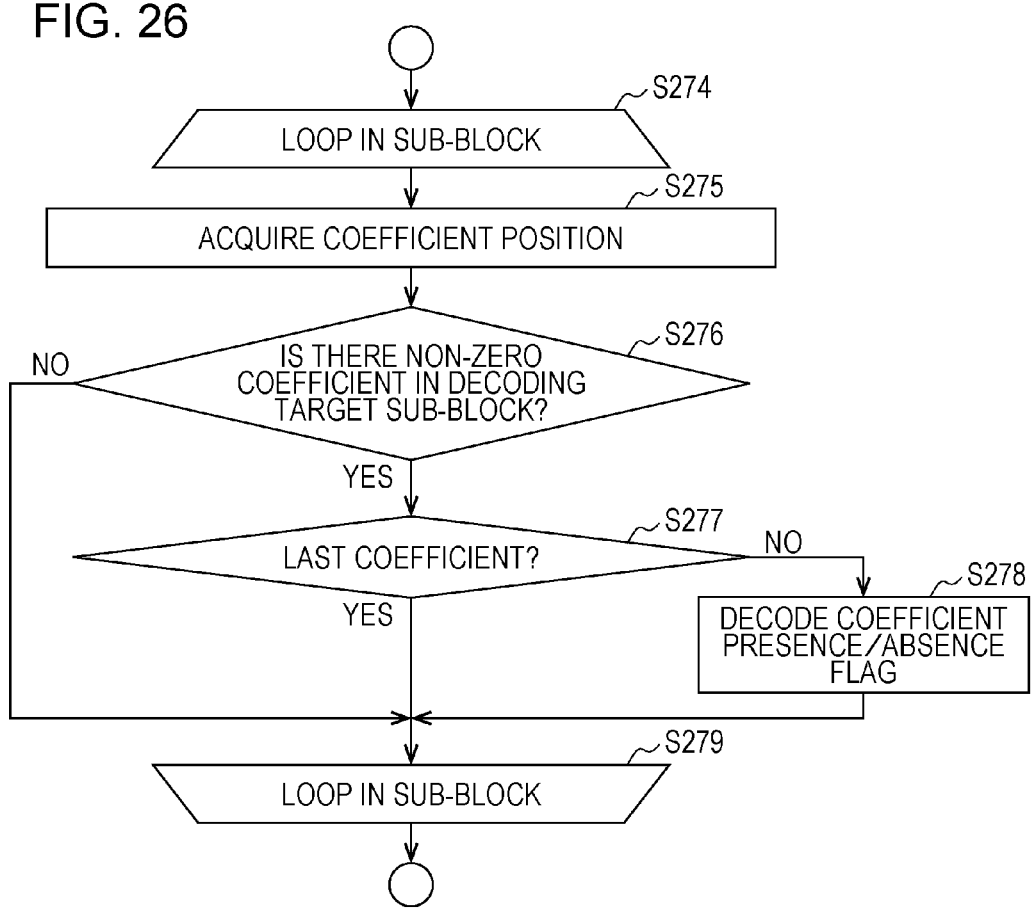
FIG. 26 is a flowchart illustrating a flow of a process in which the transform coefficient decoding unit according to the embodiment decodes each coefficient presence/absence flag significant_coeff_flag in a sub-block.

FIG. 26 is a flowchart more specifically illustrating the process (step S27 of FIG. 24) of decoding each coefficient presence/absence flag significant_coeff_flag in the sub-block.

(Step S274)

Next, the coefficient presence/absence flag decoding unit 124 starts a loop in the target sub-block. The loop is a loop having a frequency component as the unit.

(Step S275)

Next, the coefficient presence/absence flag decoding unit 124 acquires a position of a transform coefficient.

(Step S276)

Next, the coefficient presence/absence flag decoding unit 124 determines whether or not a non-zero coefficient is present in the target sub-block.

(Step S277)

In a case where a non-zero coefficient is present in the target sub-block (Yes in step S276), the coefficient presence/absence flag decoding unit 124 determines whether or not the position of the transform coefficient is the last position.

(Step S278)

In a case where the position of the transform coefficient is the last position (No in step S277), the coefficient presence/absence flag decoding unit 124 decodes the coefficient presence/absence flag significant_coeff_flag.

(Moving Image Coding Apparatus 2)

With reference to the drawings, a description will be made of a configuration of the moving image coding apparatus 2 according to the present embodiment. The moving image coding apparatus 2 is a coding apparatus which employs the technique used in the H. 264/MPEG-4 AVC standard, and the technique proposed in High-Efficiency Video Coding (HEVC) which is a succeeding codec thereof. In the following, the same parts as described above are given the same reference numerals, and description thereof will be omitted.

Figure 50:
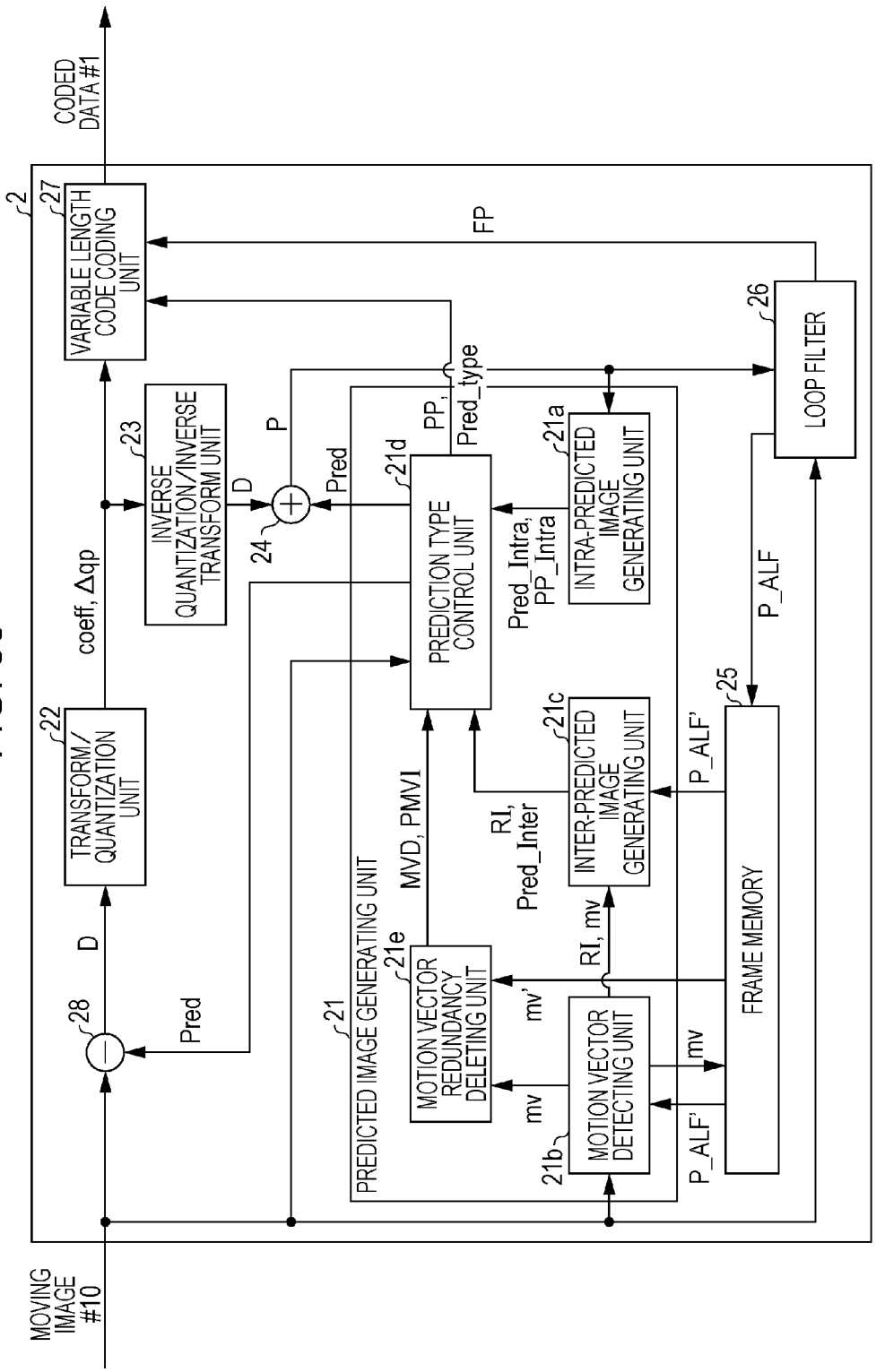
FIG. 50 is a block diagram illustrating a configuration of a moving image coding apparatus according to the embodiment.

FIG. 50 is a block diagram illustrating a configuration of the moving image coding apparatus 2. As illustrated in FIG. 50, the moving image coding apparatus 2 includes a predicted image generating unit 21, a transform/quantization unit 22, an inverse quantization/inverse transform unit 23, an adder 24, a frame memory 25, a loop filter 26, a variable length code coding unit 27, and a subtractor 28. In addition, as illustrated in FIG. 50, the predicted image generating unit 21 includes an intra-predicted image generating unit 21a, a motion vector detecting unit 21b, an inter-predicted image generating unit 21c, a prediction type control unit 21d, and a motion vector redundancy deleting unit 21e. The moving image coding apparatus 2 is an apparatus which codes a moving image #10 (coding target image) so as to generate the coded data #1.

(Predicted Image Generating Unit 21)

The predicted image generating unit 21 recursively splits a process target LCU into one or a plurality of lower CUs, and further splits each leaf CU into one or a plurality of partitions, so as to generate an inter-predicted image Pred_Inter using inter-frame prediction or an intra-predicted image Pred_Inra using intra-frame prediction. The generated inter-predicted image Pred_Intra and intra-predicted image Pred_Intra are supplied to the adder 24 and the subtractor 28 as predicted images Pred.

In addition, the predicted image generating unit 21 omits decoding of other parameters belonging to a PU in relation to the PU to which a skip mode is applied. Further, (1) an aspect of split into lower CUs and partitions in a target LCU, (2) whether or not a skip mode is applied, and (3) whether an inter-predicted image Pred_Inter or an intra-predicted image Pred_Intra is generated for each partition, are determined so as to optimize coding efficiency.

(Intra-Predicted Image Generating Unit 21a)

The intra-predicted image generating unit 21a generates a predicted image Pred_Intra regarding each partition by using intra-frame prediction. Specifically, (1) a prediction mode used for intra-prediction in each partition is selected, and (2) a predicted image Pred_Intra is generated from a decoded image P by using the selected prediction mode. The intra-predicted image generating unit 21a supplies the generated intra-predicted image Pred_Intra to the prediction type control unit 21d.

In addition, the intra-predicted image generating unit 21a determines an estimated prediction mode for a target partition from a prediction mode which is assigned to a peripheral partition of the target partition, and supplies an estimated prediction mode flag indicating whether or not the estimated prediction mode is the same as a prediction mode which is actually selected for the target partition, to the variable length code coding unit 27 via the prediction type control unit 21d as part of an intra-prediction parameter PP_Intra. The variable length code coding unit 27 includes the flag in the coded data #1.

Further, in a case where the estimated prediction mode for the target partition is different from the prediction mode which is actually selected for the target partition, the intra-predicted image generating unit 21a supplies a remaining prediction mode index indicating a prediction mode for the target partition, to the variable length code coding unit 27 via the prediction type control unit 21d as part of the intra-prediction parameter PP_Intra. The variable length code coding unit 27 includes the remaining prediction mode index in the coded data #1.

In addition, in a case where the predicted image Pred_Intra is generated, the intra-predicted image generating unit 21a selects a prediction mode which causes coding efficiency to be further improved, from among the prediction modes illustrated in FIG. 11, and applies the selected prediction mode.

(Motion Vector Detecting Unit 21b)

The motion vector detecting unit 21b detects a motion vector my regarding each partition. Specifically, (1) an adaptive filtered decoded image P_ALF' used as a reference image is selected, and (2) a space which is most approximate to the target partition in the selected adaptive filtered decoded image P_ALF' is searched, so that the motion vector my regarding the target partition is detected. Here, the adaptive filtered decoded image P_ALF' is an image obtained by the loop filter 26 performing a filter process on a decoded image in which decoding of all frames have already been completed, and the motion vector detecting unit 21*b* may read a pixel value of each pixel forming the adaptive filtered decoded image P_ALF' from the frame memory 25. The motion vector detecting unit 21*b* supplies the detected motion vector my to the inter-predicted image generating unit 21*c* and the motion vector redundancy deleting unit 21*e* along with a reference image index RI for designating the adaptive filtered decoded image P_ALF' used as a reference image.

(Inter-Predicted Image Generating Unit 21*c*)

The inter-predicted image generating unit 21*c* generates a motion compensation image mc regarding each inter-prediction partition through inter-frame prediction. Specifically, the motion compensation image mc is generated from the adaptive filtered decoded image P_ALF' designated by the reference image index RI which is supplied from the motion vector detecting unit 21*b*, by using the motion vector my supplied from the motion vector detecting unit 21*b*. In the same manner as the motion vector detecting unit 21*b*, the inter-predicted image generating unit 21*c* may read a pixel value of each pixel forming the adaptive filtered decoded image P_ALF' from the frame memory 25. The inter-predicted image generating unit 21*c* supplies the generated motion compensation image mc (inter-predicted image Pred_Inter) to the prediction type control unit 21*d* along with the reference image index RI supplied from the motion vector detecting unit 21*b*.

(Prediction Type Control Unit 21*d*)

The prediction type control unit 21*d* compares the intra-predicted image Pred_Intra and the inter-predicted image Pred_Inter with a coding target image, and selects whether intra-prediction or inter-prediction is performed. In a case where the intra-prediction is selected, the prediction type control unit 21*d* supplies the intra-predicted image Pred_Intra to the adder 24 and the subtractor 28 as a predicted image Pred, and also supplies the intra-prediction parameter PP_Intra which is supplied from the intra-predicted image generating unit 21*a*, to the variable length code coding unit 27. On the other hand, in a case where the inter-prediction is selected, the prediction type control unit 21*d* supplies the inter-predicted image Pred_Inter to the adder 24 and the subtractor 28 as a predicted image Pred, and also supplies, to the variable length code coding unit 27, the reference image index RI, and an estimated motion vector index PMVI and a motion vector difference MVD which are supplied from the motion vector redundancy deleting unit 21*e* described later, as inter-prediction parameters PP_Inter. In addition, the prediction type control unit 21*d* supplies prediction type information Pred_type indicating which one of the intra-predicted image Pred_Intra and the inter-predicted image Pred_Inter has been selected, to the variable length code coding unit 27.

(Motion Vector Redundancy Deleting Unit 21*e*)

The motion vector redundancy deleting unit 21*e* deletes redundancy from the motion vector my which has been detected by the motion vector detecting unit 21*b*. Specifically, (1) an estimation method used to estimate the motion vector my is selected, (2) an estimated motion vector pmv is derived according to the selected estimation method, and (3) the motion vector difference MVD is generated by subtracting the estimated motion vector pmv from the motion vector mv. The motion vector redundancy deleting unit 21*e* supplies the generated motion vector difference MVD to the prediction type control unit 21*d* along with the estimated motion vector index PMVI indicating the selected estimation method.

(Transform/Quantization Unit 22)

In a normal case (the transform skip is not performed (transform_skip_flag==0), and the transform/quantization bypass is not performed (transquant_bypass_flag==0)), the transform/quantization unit 22 (1) performs frequency transform such as discrete cosine transform (DCT) on a prediction residual D obtained by subtracting the predicted image Pred from the coding target image, for each block (transform unit), (2) quantizes a transform coefficient Coeff_IQ which is obtained through the frequency transform, and (3) supplies the transform coefficient Coeff obtained through the quantization to the variable length code coding unit 27 and the inverse quantization/inverse transform unit 23. In addition, in a case where the transform skip is to be performed (transform_skip_flag==1), the transform/quantization unit 22 (1) supplies a prediction residual D obtained by subtracting the predicted image Pred from the coding target image, for each block (transform unit), to the variable length code coding unit 27 and the inverse quantization/inverse transform unit 23. Further, in a case where the transform skip is performed (transform_skip_flag==1), the transform/quantization unit 22 (1) quantizes a prediction residual D obtained by subtracting the predicted image Pred from the coding target image, for each block (transform unit), and (2) supplies the transform coefficient Coeff (quantized prediction residual D) obtained through the quantization to the variable length code coding unit 27 and the inverse quantization/inverse transform unit 23.

In addition, the transform/quantization unit 22 (1) selects a quantization step QP used for the quantization for each TU, (2) supplies a quantization parameter difference Δqp indicating a size of the selected quantization step QP to the variable length code coding unit 27, and (3) supplies the selected quantization step QP to the inverse quantization/inverse transform unit 23. Here, the quantization parameter difference Δqp indicates a difference value obtained by subtracting a value of a quantization parameter qp' regarding a TU which has previously undergone frequency transform and quantization from a quantization parameter qp (for example, $QP=2^{qp/6}$) regarding a TU which undergoes frequency transform and quantization.

In addition, the transform/quantization unit 22 determines whether or not the transform skip is to be performed and the transform/quantization bypass is to be performed. In a case where the transform skip is to be performed, a value of the transform skip flag (transform_skip_flag) is set to 1. In a case where the transform skip is not to be performed, a value of the transform skip flag is set to 0. Further, in a case where the transform/quantization bypass is to be performed, the transform/quantization bypass flag (transquant_bypass_flag) is set to 1. In a case where the transform/quantization bypass is to be performed, the transform/quantization bypass flag is set to 0. Furthermore, the transform skip flag and the transform/quantization bypass flag are supplied to the variable length code coding unit 27 and the inverse quantization/inverse transform unit 23.

In addition, the DCT performed by the transform/quantization unit 22 is given by, for example, the following Equation (2) in a case where a size of a target block is 8×8 pixels, and an unquantized transform coefficient for a horizontal frequency u and a vertical frequency v is denoted by Coeff_IQ(u, v) (where $0 \le u \le 7$ and $0 \le v \le 7$).

[Math. 2]

$$\text{Coeff\_IQ}(u, v) = \frac{1}{4} C(u) C(v) \sum_{i=0}^{7} \sum_{j=0}^{7} D(i, j) \cos\left\{\frac{(2i+1)u\pi}{16}\right\} \cos\left\{\frac{(2j+1)v\pi}{16}\right\} \quad (2)$$

Here, D(i, j) (where 0≤i≤7 and 0≤j≤7) indicates a prediction residual D at a position (i, j) in a target block. In addition, C(u) and C(v) are given as follows.
C(u)=1/√2 (u=0)
C(u)=1 (u≠0)
C(v)=1/√2 (v=0)
C(v)=1 (v≠0)

In addition, in a case where the transform skip is performed, frequency transform is not performed, and thus the prediction residual D(i, j) at position (i, j) of the pixel in the corresponding target block is equivalent to the unquantized transform coefficient Coeff_IQ(u, v) as in the following equation.

$$\text{Coeff\_IQ}(u,v) = D(i,j) \text{ (where } i=u \text{ and } j=v\text{)}$$

In addition, in a case where the transform/quantization bypass is performed, frequency transform and quantization are not performed, and thus the prediction residual D(i, j) at the position (i, j) of the pixel in the corresponding target block is equivalent to the transform coefficient Coeff (u, v) as in the following equation.

$$\text{Coeff}(u,v) = D(i,j) \text{ (where } u=i \text{ and } v=j\text{)}$$

(Inverse Quantization/Inverse Transform Unit 23)

In a normal case (the transform skip is not performed (transform_skip_flag==0), and the transform/quantization bypass is not performed (transquant_bypass_flag==0)), the inverse quantization/inverse transform unit 23 (1) inversely quantizes the quantized transform coefficient Coeff, (2) performs inverse frequency transform such as inverse discrete cosine transform (DCT) on a transform coefficient Coeff_IQ obtained through the inverse quantization, and (3) supplies a prediction residual D obtained through the inverse frequency transform to the adder 24. In addition, in a case where the transform/quantization bypass is performed (transquant_bypass_flag==1), the inverse quantization/inverse transform unit 23 (1) supplies the transform coefficient Coeff (equivalent to the prediction residual D) to the adder 24. Further, in a case where the transform skip is performed (transform_skip_flag==1), the inverse quantization/inverse transform unit 23 (1) inversely quantizes the quantized transform coefficient Coeff (equivalent to the quantized prediction residual D), and (2) supplies the transform coefficient Coeff_IQ (equivalent to the prediction residual D) obtained through the inverse quantization to the adder 14. The quantization step QP which is supplied from the transform/quantization unit 22 is used to inversely quantize the quantized transform coefficient Coeff. In addition, the prediction residual D which is output from the inverse quantization/inverse transform unit 23 is obtained by adding a quantization error to the prediction residual D which is input to the transform/quantization unit 22, but, here, for simplification, the common name is used. More specific operations of the inverse quantization/inverse transform unit 23 are substantially the same as the inverse quantization/inverse transform unit 13 included in the moving image decoding apparatus 1.

(Adder 24)

The adder 24 adds the predicted image Pred selected in the prediction type control unit 21d to the prediction residual D generated in the inverse quantization/inverse transform unit 23, so as to generate a (local) decoded image P. The generated (local) decoded image P generated in the adder 24 is supplied to the loop filter 26 and is also stored in the frame memory 25 so as to be used as a reference image in intra-prediction.

(Variable Length Code Coding Unit 27)

The variable length code coding unit 27 performs variable length coding on (1) the quantized transform coefficient Coeff and Δqp which are supplied from the transform/quantization unit 22, (2) the quantization parameters PP (the inter-predicted image PP_Inter and the intra-predicted image PP_Intra) supplied from the prediction type control unit 21d, (3) the prediction type information Pred_type, and (4) a filter parameter FP supplied from the loop filter 26, so as to generate the coded data #1.

Figure 51:
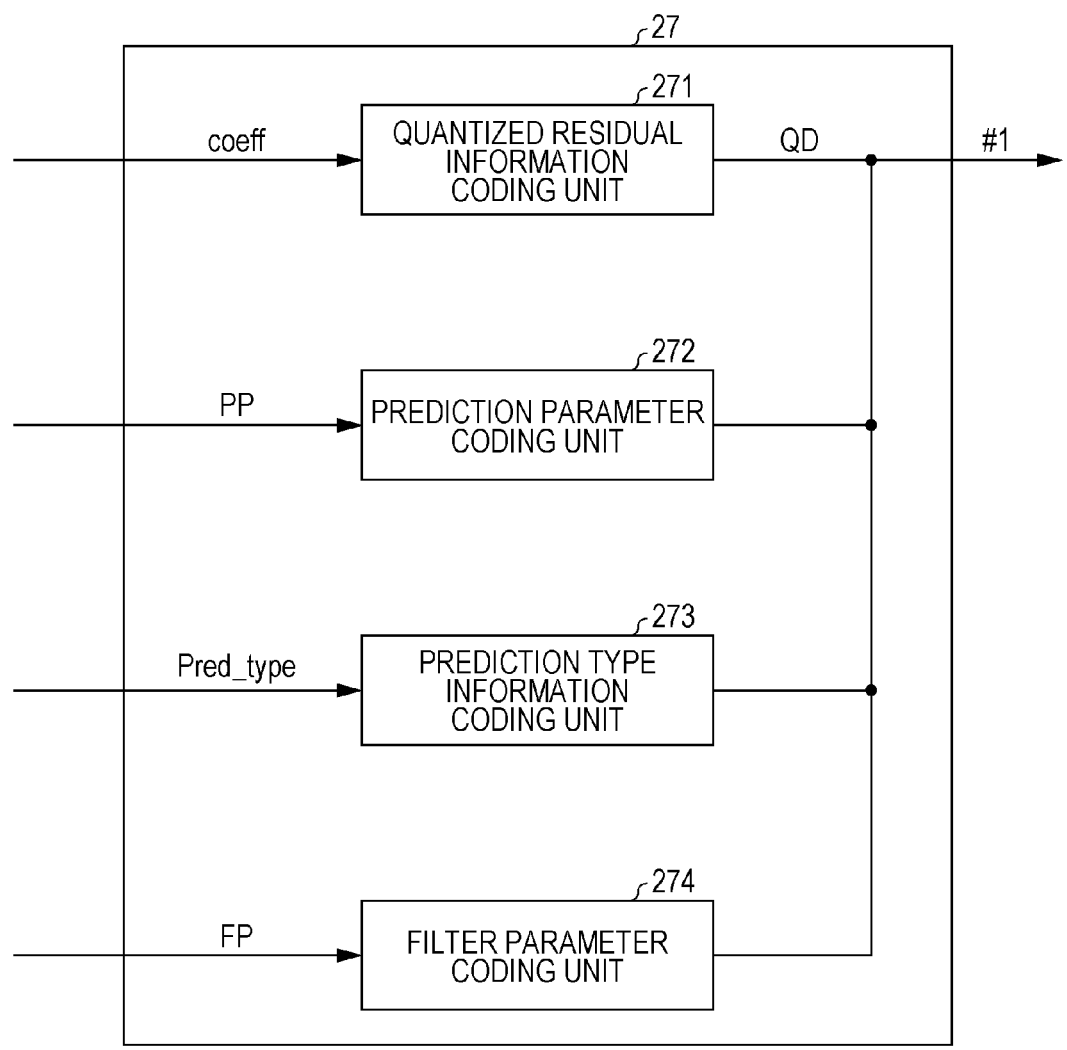
FIG. 51 is a block diagram illustrating a configuration of a variable length code coding unit included in the moving image coding apparatus according to the embodiment.

FIG. 51 is a block diagram illustrating a configuration of the variable length code coding unit 27. As illustrated in FIG. 51, the variable length code coding unit 27 includes a quantized residual information coding unit 271 which codes the quantized transform coefficient Coeff, a prediction parameter coding unit 272 which codes the prediction parameter PP, a prediction type information coding unit 273 which codes the prediction type information Pred_type, and a filter parameter coding unit 274 which codes the filter parameter FP. A specific configuration of the quantized residual information coding unit 271 will be described later, and thus description thereof will be omitted here.

(Subtractor 28)

The subtractor 28 subtracts the predicted image Pred selected in the prediction type control unit 21d from the coding target image so as to generate the prediction residual D. The prediction residual D generated in the subtractor 28 undergoes frequency transform and quantization in the transform/quantization unit 22.

(Loop Filter 26)

The loop filter 26 functions (1) as a deblocking filter (DF) which performs smoothing (deblock process) on a peripheral image on a block boundary or a partition boundary in the decoded image P, and (2) as an adaptive loop filter (ALF) of performing an adaptive filter process on the image to which the deblocking filter has been applied, by using the filter parameter FP.

(Quantized Residual Information Coding Unit 271)

The quantized residual information coding unit 271 performs context-based adaptive binary arithmetic coding (CABAC) on the quantized transform coefficient Coeff (xC, yC) so as to generate quantized residual information QD. Syntaxes included in the quantized residual information QD which is generated are as described above.

In addition, xC and yC are indexes indicating a position of each frequency component in a frequency domain, and are indexes corresponding to the above-described horizontal frequency u and vertical frequency v. Further, hereinafter, the quantized transform coefficient Coeff is simply referred to as a transform coefficient Coeff in some cases.

(Quantized Residual Information Coding Unit 271)

Figure 52:
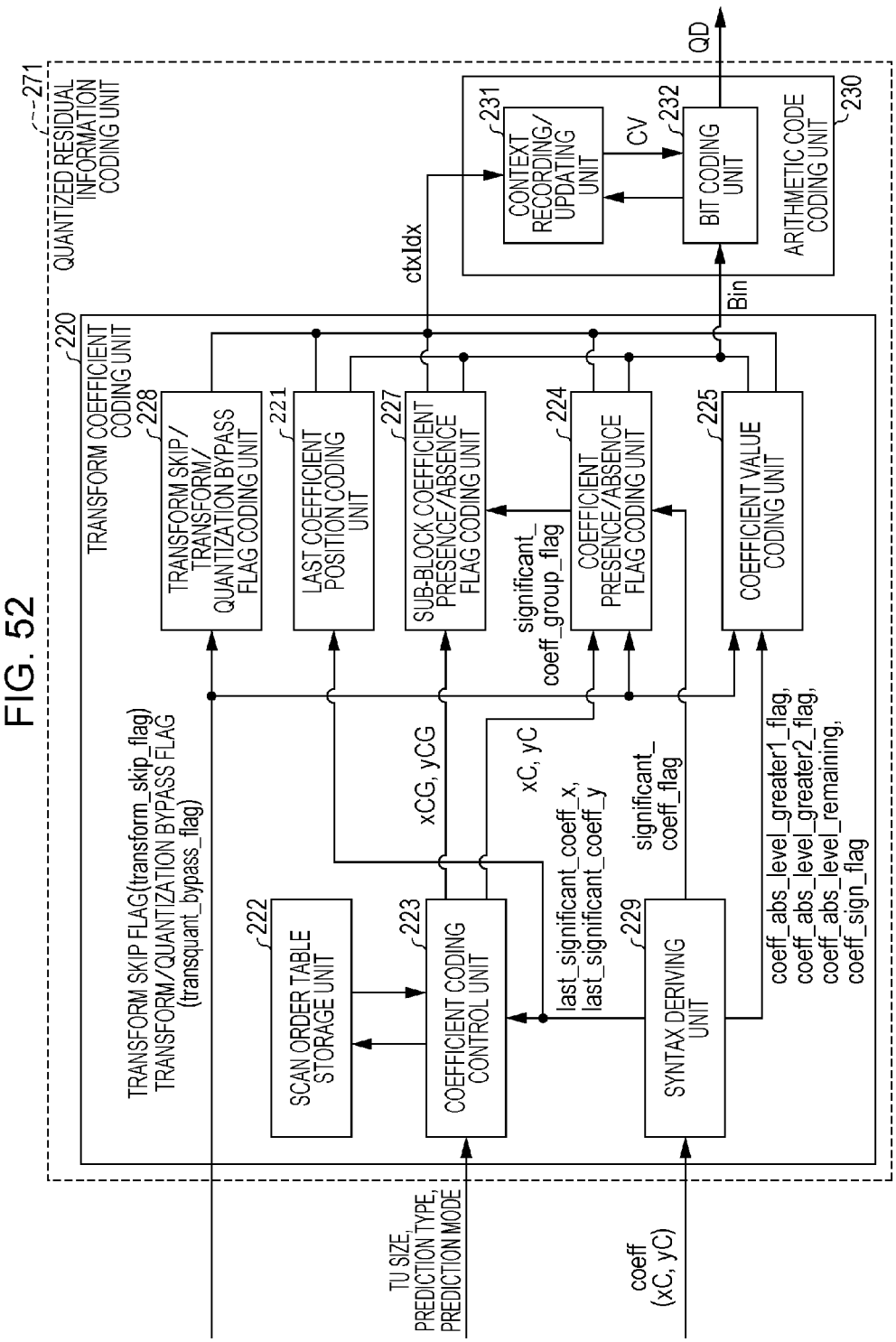
FIG. 52 is a block diagram illustrating a configuration of a quantized residual information coding unit included in the moving image coding apparatus according to the embodiment of the present invention.

FIG. 52 is a block diagram illustrating a configuration of the quantized residual information coding unit 271. As illustrated in FIG. 52, the quantized residual information coding unit 271 includes a transform coefficient coding unit 220 and an arithmetic code coding unit 230.

(Arithmetic Code Coding Unit 230)

The arithmetic code coding unit 230 codes each Bin supplied from the transform coefficient coding unit 220 by referring to a context, so as to generate the quantized residual information QD, and includes a context recording/updating unit 231 and a bit coding unit 232 as illustrated in FIG. 52.

(Context Recording/Updating Unit 231)

The context recording/updating unit 231 has a configuration for recording and updating a context variable CV which is managed by each context index ctxIdx. Here, the context variable CV includes (1) a superior symbol MPS (most probable symbol) of which an occurrence probability is high, and (2) a probability state index pStateIdx for designating an occurrence probability of the superior symbol MPS.

The context recording/updating unit 231 updates the context variable CV by referring to the context index ctxIdx supplied from each constituent element included in the transform coefficient coding unit 220 and a value of a Bin coded by the bit coding unit 232, and records the updated context variable CV until the context variable is updated next. In addition, the superior symbol MPS is 0 or 1. Further, the superior symbol MPS and the probability state index pStateIdx are updated whenever the bit coding unit 232 decodes a single Bin.

In addition, the context index ctxIdx may directly designate context for each frequency component (or each pixel), and may be an increment value from an offset of a context index which is set for each process target TU (this is also the same for the following).

(Bit Coding Unit 232)

The bit coding unit 232 codes each Bin supplied from each constituent element included in the transform coefficient coding unit 220 by referring to the context variable CV which is recorded in the context recording/updating unit 231, so as to generate the quantized residual information QD. In addition, a value of the coded Bin is also supplied to the context recording/updating unit 231 so as to be referred to for updating the context variable CV.

(Transform Coefficient Coding Unit 220)

As illustrated in FIG. 52, the transform coefficient coding unit 220 includes a last coefficient position coding unit 221, a scan order table storage unit 222, a coefficient coding control unit 223, a coefficient presence/absence flag coding unit 224, a coefficient value coding unit 225, a coded coefficient storage unit 226, a sub-block coefficient presence/absence flag coding unit 227, a transform skip/transform/quantization bypass flag coding unit 228, and a syntax deriving unit 229.

[Transform Skip/Transform/Quantization Bypass Flag Coding Unit 228]

The transform skip/transform/quantization bypass flag coding unit 228 generates Bins indicating the syntaxes, the transform skip flag transform_skip_flag, and the transform/quantization bypass flag transquant_bypass_flag, supplied from the transform/quantization unit 22. In addition, the generated each Bin is supplied to the bit coding unit 232. Further, a context index ctxIdx for designating a context which is referred to for coding the Bins of the syntaxes transform_skip_flag and transquant_bypass_flag is supplied to the context recording/updating unit 231.

<<Coding Process 1 of Transform/Quantization Bypass Flag and Transform Skip Flag>>

Hereinafter, with reference to FIG. 53, a coding process of the transform/quantization bypass flag and the transform skip flag will be described in detail. In addition, the coding process 1 is a process corresponding to the decoding process 1 of the transform/quantization bypass flag and the transform skip flag in the transform skip/transform/quantization bypass flag decoding unit 128 included in the moving image decoding apparatus 1.

Figure 53:
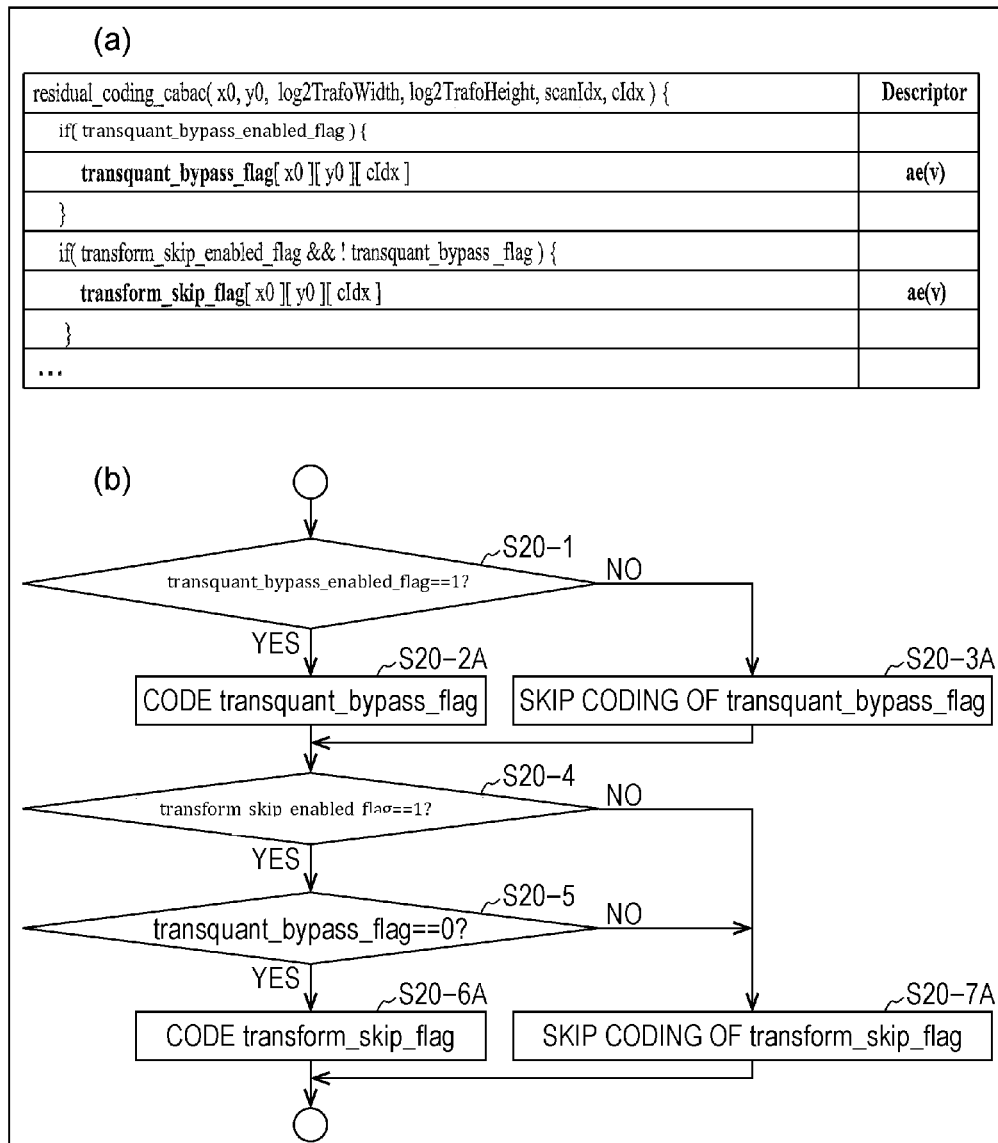

FIG. 53(*a*) illustrates syntax examples of the transform/quantization bypass flag and the transform skip flag, and FIG. 53(*b*) is a flowchart more specifically illustrating the decoding process.

(Step S20-1)

First, the transform skip/transform/quantization bypass flag coding unit 228 determines whether or not the transform/quantization bypass enabled flag (transquant_bypass_enabled_flag) which is input from an external device is 1. In a case where the transform/quantization bypass enabled flag is 1 (Yes in step S20-1), the flow proceeds to step S20-2A. In other cases (No in step S20-1), the flow proceeds to step S20-3A.

(Step S20-2A)

The transform skip/transform/quantization bypass flag coding unit 228 explicitly codes the transform/quantization bypass flag transquant_bypass_flag in relation to a target TU, and the flow proceeds to step S20-4.

(Step S20-3)

The transform skip/transform/quantization bypass flag coding unit 228 implicitly interprets the transform/quantization bypass flag (transquant_bypass_flag) as 0 in relation to the TU and skips coding of the transform/quantization bypass flag, and the flow proceeds to step S20-4.

(Step S20-4)

The transform skip/transform/quantization bypass flag coding unit 228 determines whether or not the transform skip enabled flag (transform_skip_enabled_flag) which is input from an external device is 1. In a case where the transform skip enabled flag is 1 (Yes in step S20-4), the flow proceeds to step S20-5. In other cases (No in step S20-4), the flow proceeds to step S20-7A.

(Step S20-5)

The transform skip/transform/quantization bypass flag coding unit 228 determines whether or not the transform bypass flag is 0. In a case where the transform bypass flag is 0 (Yes in step S20-5), the flow proceeds to step S20-6A. In other cases, the flow proceeds to step S20-7A.

(Step S20-6A)

The transform skip/transform/quantization bypass flag coding unit 228 explicitly codes the transform_skip_flag (transform_skip_flag) in relation to the target TU.

(Step S20-7A)

The transform skip/transform/quantization bypass flag coding unit 228 implicitly interprets the transform/quantization bypass flag (transquant_bypass_flag) as 0 in relation to the TU and skips coding of the transform skip flag.

Figure 54:
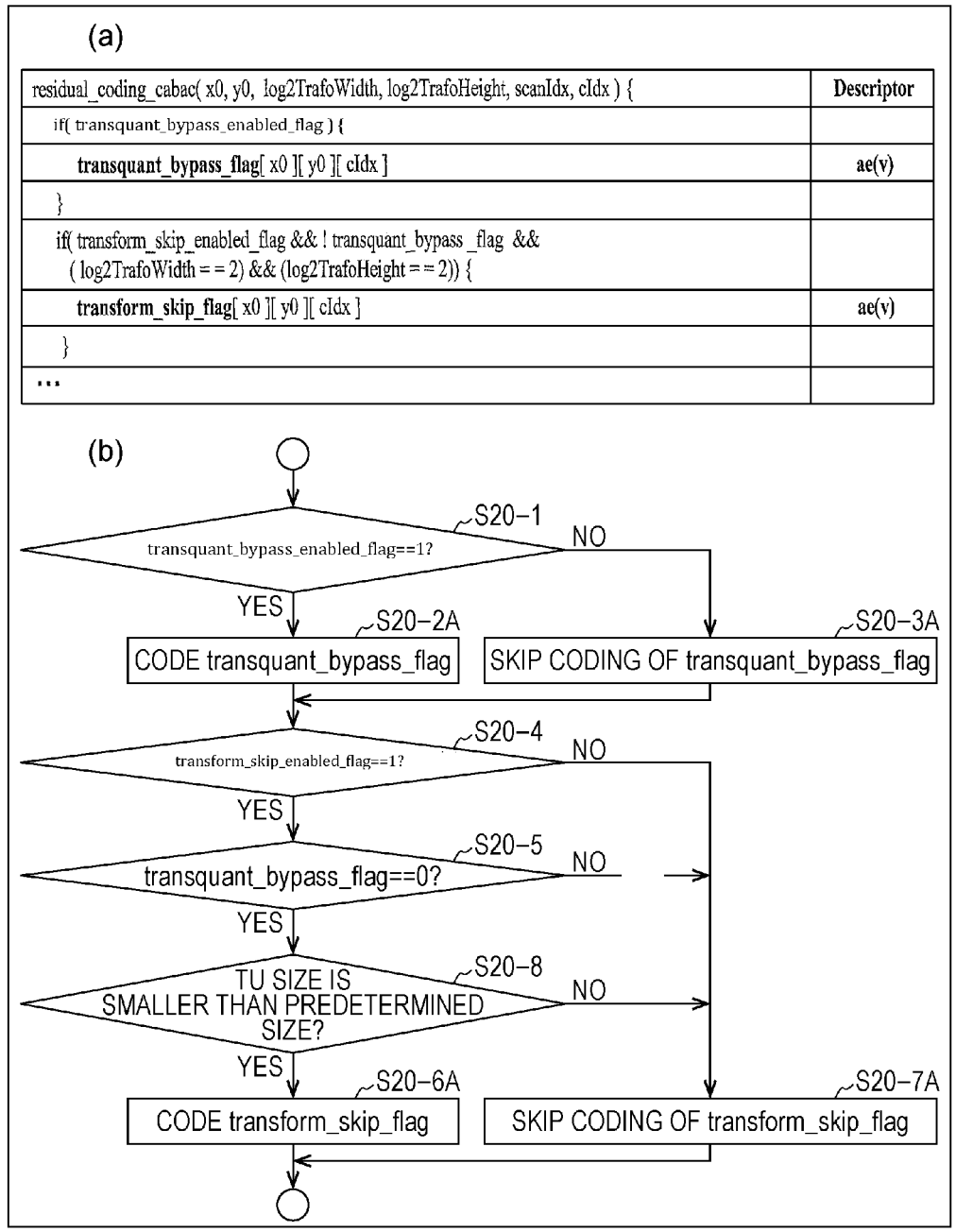

In addition, a coding process of the transform skip flag and the transform/quantization bypass flag is not limited to the above-described procedures, and procedures may be changed in a scope in which the process can be performed. For example, as illustrated in FIG. 54, after step S20-5, it may be determined that a TU size is smaller than a predetermined size (step S20-8), and the flow may proceed to step S20-6A or step S20-7A.

Figure 55:
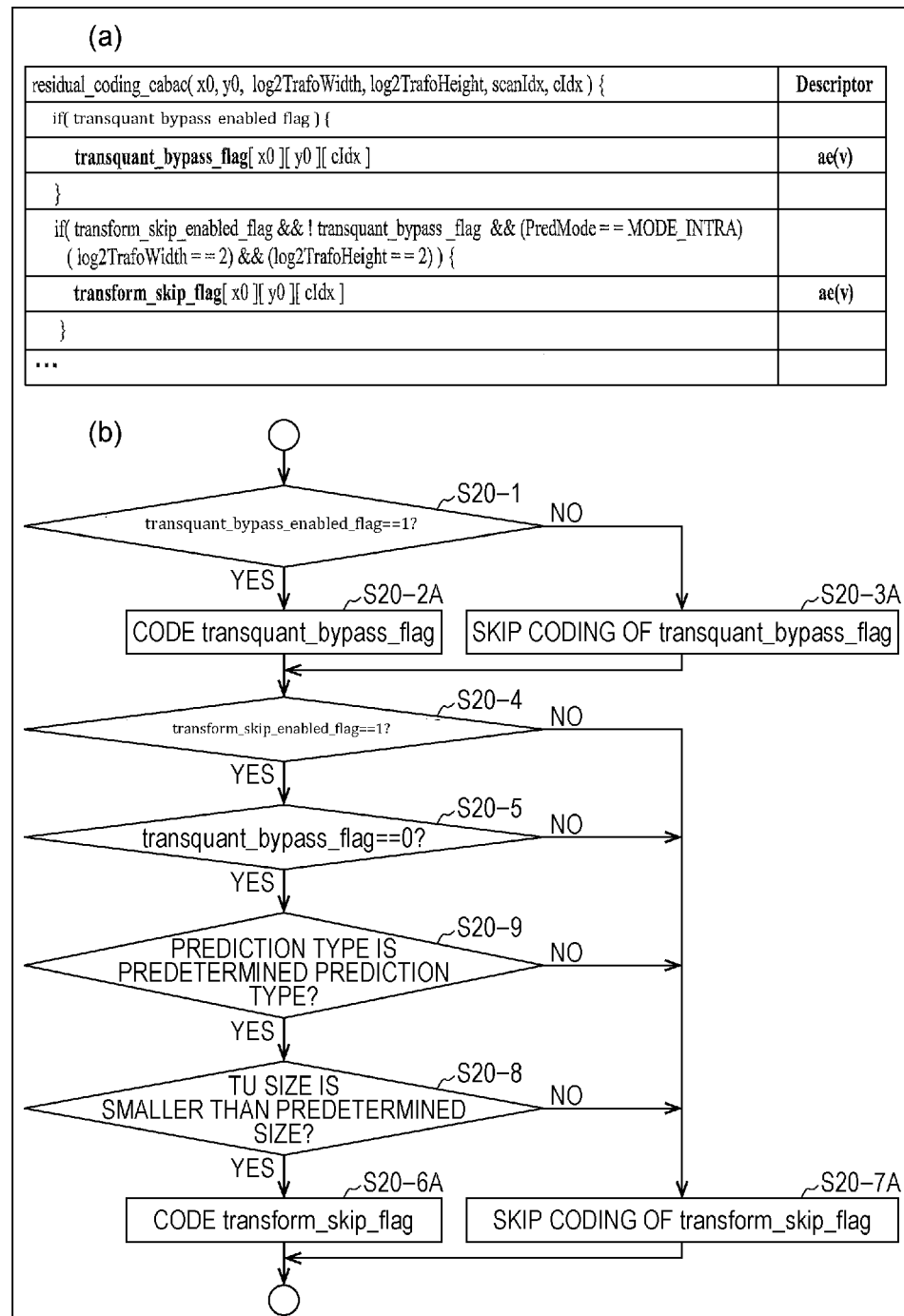

As mentioned above, according to the transform skip/transform/quantization bypass flag coding unit 228, when compared with the related art (refer to FIG. 55), whether or not the transform skip is performed can be appropriately selected for each TU regardless of a TU size or a prediction mode. For this reason, since a code amount of transform coefficients regarding a TU which is a coding and decoding target can be reduced, a processing amount is reduced, and coding efficiency is improved. In addition, since a branch process regarding whether or not the transform_skip_flag is decoded can be reduced, a processing amount related to coding of a transform coefficient can be reduced.

[Syntax Deriving Unit 229]

The syntax deriving unit 229 refers to each value of the transform coefficient Coeff (xC, yC), and derives each value of the syntaxes last_significant_coeff_x, last_significant_coeff_y, significant_coeff_flag, coeff_abs_level_greater1_flag, coeff_abs_level_greater2_flag, coeff_sign_flag, and coeff_abs_level_remaining, for specifying the transform coefficient in a target frequency domain. The derived each syntax is supplied to the coded coefficient storage unit 226. In addition, among the derived syntaxes, last_significant_coeff_x and last_significant_coeff_y are also supplied to the coefficient coding control unit 223 and the last coefficient position coding unit 221. Further, among the derived syntaxes, significant_coeff_flag is also supplied to the coefficient presence/absence flag coding unit 224. Furthermore, the content indicated by each syntax has been described above, and thus description thereof will be omitted here.

(Configuration Example of Coefficient Value Syntax Deriving Unit 2285)

The syntax deriving unit 229 is provided with a coefficient value syntax deriving unit 2285 (not illustrated). The coefficient value syntax deriving unit 2285 derives each value of significant_coeff_flag, coeff_abs_level_greater1_flag, coeff_abs_level_greater2_flag, coeff_sign_flag, and coeff_abs_level_remaining.

Figure 58:
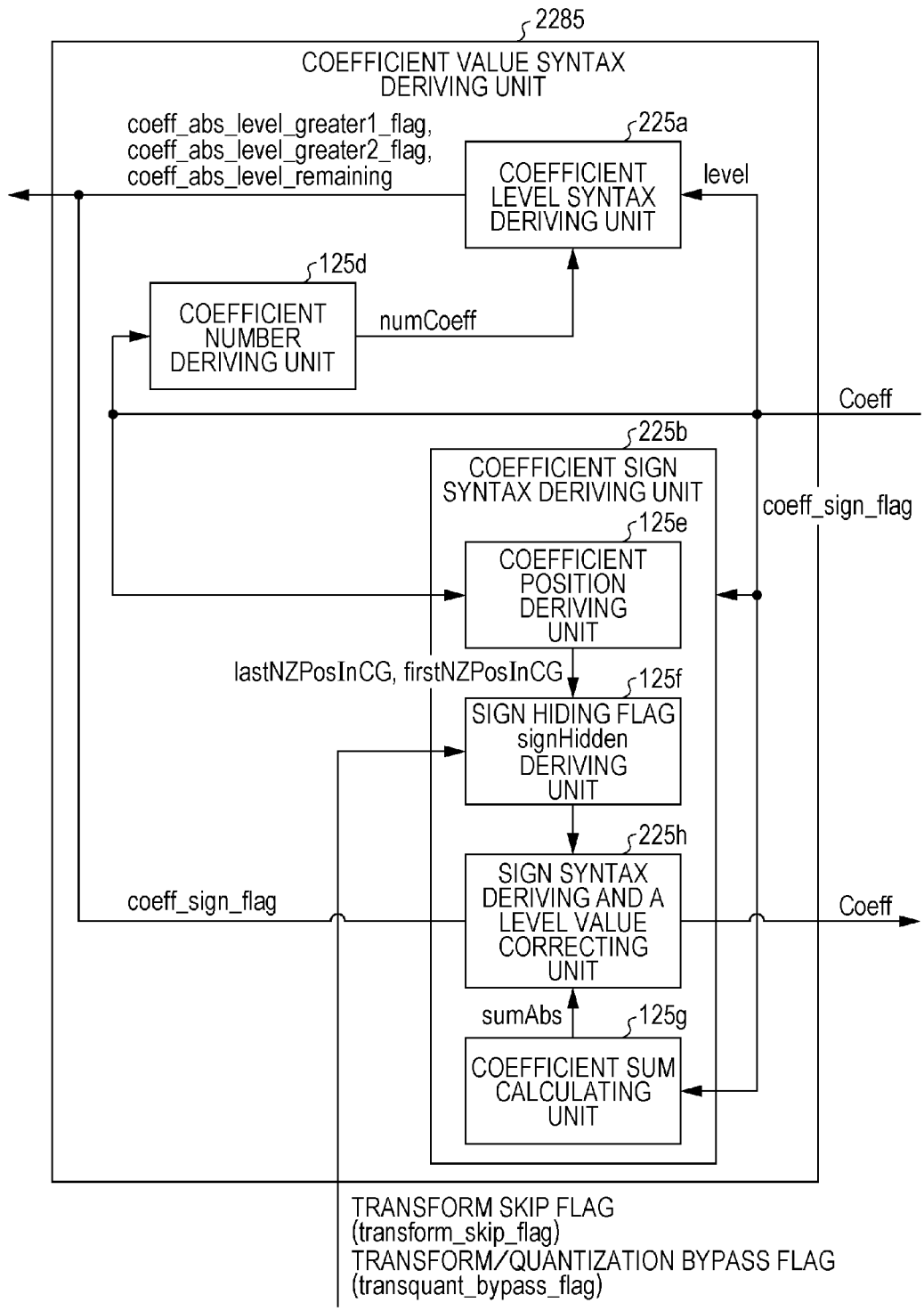
FIG. 58 is a block diagram illustrating a configuration example of a coefficient value syntax deriving unit according to the embodiment.

FIG. 58 is a block diagram illustrating a configuration example of the coefficient value syntax deriving unit 2285. As illustrated in FIG. 58, the coefficient value syntax deriving unit 2285 includes a coefficient level syntax deriving unit 225a, a coefficient sign syntax deriving unit 225b, and a coefficient number deriving unit 125d. The coefficient sign syntax deriving unit 225b includes a coefficient position deriving unit 125e, a sign hiding flag deriving unit 125f, a sign syntax deriving and a level value correcting unit 225h, and a coefficient sum calculating unit 125g. The coefficient number deriving unit 125d, the coefficient position deriving unit 125e, the sign hiding flag deriving unit 125f, and the coefficient sum calculating unit 125g have the same functions as the blocks with the same names described in the moving image decoding apparatus 1, and thus description thereof will be omitted here.

The coefficient level syntax deriving unit 225a derives the syntaxes coeff_abs_level_greater1_flag, coeff_abs_level_greater2_flag, and coeff_abs_level_remaining by referring to each value of the transform coefficient Coeff (xC, yC).

The coefficient sign syntax deriving unit 225b derives coeff_sign_flag by referring to each value of the transform coefficient Coeff (xC, yC). The sign syntax deriving and a level value correcting unit 225h derives coeff_sign_flag of the number obtained by subtracting 1 from the number of sub-blocks in a case where it is determined that sign hiding is to be performed in the sign hiding flag deriving unit 225f. In a case where the sign hiding is not to be performed, coeff_sign_flag of the number of sub-blocks is derived.

In addition, in a case where it is determined that the sign hiding is to be performed, the sign syntax deriving and a level value correcting unit 225h compares a sign of a transform coefficient at a position firstNZPosInCG of the initial non-zero coefficient in a scan order in each sub-block with a sign defined by a coefficient sum sumAbs derived from the coefficient sum calculating unit 125g. If the two signs are the same as each other, a value of a target transform coefficient is not corrected. If the two signs are different from each other, correction is performed by setting an absolute value of any one of transform coefficients in a target sub-block to −1 or +1. In a case where it is determined that the sign hiding is not to be performed, this correction is not performed.

[Last coefficient position coding unit 221] The last coefficient position coding unit 221 generates Bins indicating the syntaxes last_significant_coeff_x and last_significant_coeff_y supplied from the syntax deriving unit 228. In addition, the generated each Bin is supplied to the bit coding unit 232. Further, a context index ctxIdx for designating a context which is referred to for coding the Bins of the syntaxes last_significant_coeff_x and last_significant_coeff_y is supplied to the context recording/updating unit 231.

[Scan Order Table Storage Unit 222]

The scan order table storage unit 222 stores a table which provides a position of a process target frequency component in a frequency domain, or a position of a pixel in a process target pixel domain, by using a size of a process target TU (block), a scan index indicating the type of scan direction, and a frequency component identification index which is given according to a scan order, as arguments. An example of such a scan order table may include ScanOrder illustrated in FIGS. 7 and 8.

In addition, the scan order table storage unit 222 stores a sub-block scan order table for designating a scan order of sub-blocks. Here, the sub-block scan order table is designated by a size of a process target TU (block) and the scan index scanIdx associated with a prediction mode index of an intra-prediction mode.

The scan order table and sub-block scan order table stored in the scan order table storage unit 222 are the same as those stored in the scan order table storage unit 122 of the moving image decoding apparatus 1, and thus description thereof will be omitted here.

[Coefficient Coding Control Unit 223]

The coefficient coding control unit 223 has a configuration for controlling an order of a coding process in each constituent element included in the quantized residual information coding unit 271.

The coefficient coding control unit 223 specifies a position of the last non-zero coefficient according to a forward scan by referring to the syntaxes last_significant_coeff_x and last_significant_coeff_y supplied from the syntax deriving unit 228, and supplies a position (xCG, yCG) of each sub-block to the sub-block coefficient presence/absence flag coding unit 227 in a backward scan order of a scan order which uses the specified position of the last non-zero coefficient as a starting point and is given by the sub-block scan order table stored in the scan order table storage unit 222.

Further, in relation to a process target sub-block, the coefficient coding control unit 223 supplies a position (xC, yC) of each frequency component included in the process target sub-block to the coefficient presence/absence flag coding unit 224 in a backward scan order given by the scan order table stored in the scan order table storage unit 222. Here, as a scan order of each coefficient position (each frequency component or each pixel) included in the process target sub-block, in a case of intra-prediction, a scan order (any one of the horizontal fast scan, the vertical fast scan, and the up-right diagonal scan) indicated by a scan index scanIdx which is designated by the intra-prediction mode index IntraPredMode and a value log 2TrafoSize for designating a TU size may be used, and, in a case of inter-prediction, the up-right diagonal scan may be used.

As mentioned above, the coefficient coding control unit 223 changes a scan order for each intra-prediction mode. Generally, since an intra-prediction mode and a bias of a transform coefficient are correlated with each other, a scan order is changed according to the intra-prediction mode, and a scan suitable for biases of the sub-block coefficient presence/absence flag and the coefficient presence/absence flag can be performed. Consequently, it is possible to reduce a code amount of the sub-block coefficient presence/absence flag and the coefficient presence/absence flag which are coding and decoding targets, and thus to reduce a processing amount and to improve coding efficiency.

[Coefficient Value Coding Unit 225]

The coefficient value coding unit 225 generates Bins indicating the syntaxes coeff_abs_level_greater1_flag, coeff_abs_level_greater2_flag, coeff_sign_flag, and coeff_abs_level_remaining, supplied from the syntax deriving unit 228. In addition, each generated Bin is supplied to the bit coding unit 232. Further, the context index ctxIdx for designating a context which is referred to for coding the Bins of the syntaxes is supplied to the context recording/updating unit 231. Furthermore, decoding processes of the GR1 flag (coeff_abs_level_greater1_flag), the GR2 flag (coeff_abs_level_greater2_flag), and the remaining coefficient level (coeff_abs_level_remaining) in a coefficient level coding unit corresponding to the coefficient level decoding unit 125a included in the moving image decoding apparatus 1 will be described later.

[Coefficient Presence/Absence Flag Coding Unit 224]

The coefficient presence/absence flag coding unit 224 according to the present embodiment codes the syntax significant_coeff_flag[xC][yC] designated by each position (xC, yC). More specifically, a Bin indicating the syntax significant_coeff_flag[xC][yC] designated by each position (xC, yC) are generated. The generated Bin is supplied to the bit coding unit 232. In addition, the coefficient presence/absence flag coding unit 224 calculates the context index ctxIdx for determining a context which is used for the arithmetic code coding unit 230 to code the Bin of the syntax significant_coeff_flag[xC][yC]. The calculated context index ctxIdx is supplied to the context recording/updating unit 231.

Figure 56:
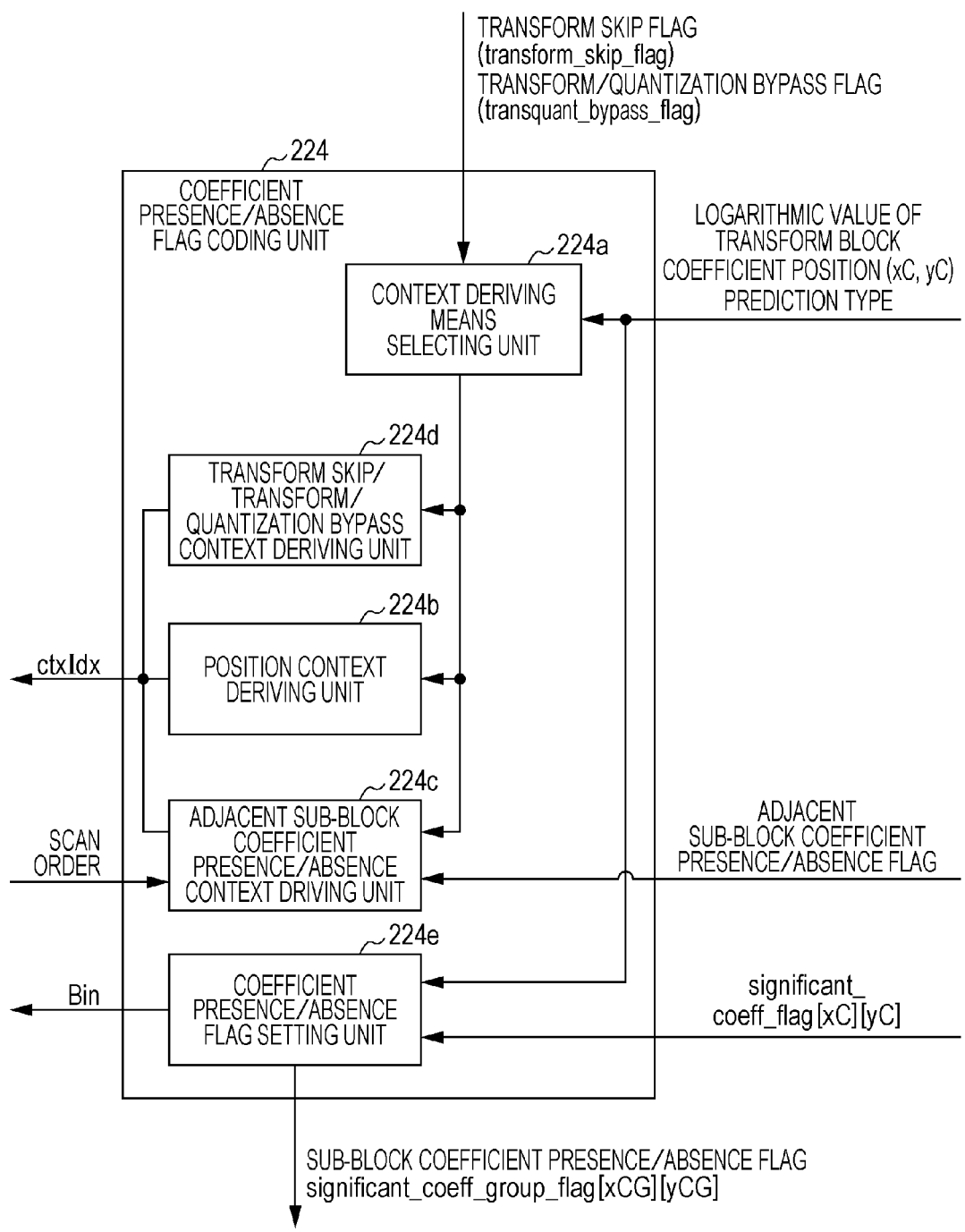
FIG. 56 is a block diagram illustrating a second configuration example of the coefficient presence/absence flag coding unit according to the embodiment.

FIG. 56 is a block diagram illustrating a configuration of the coefficient presence/absence flag coding unit 224. As illustrated in FIG. 56, the coefficient presence/absence flag coding unit 224 includes a context deriving means selecting unit 224a, a position context deriving unit 224b, an adjacent sub-block coefficient presence/absence context deriving unit 224c, a transform skip/transform/quantization bypass context deriving unit 224d, and a coefficient presence/absence flag setting unit 224e.

(Context Deriving Means Selecting Unit 224a)

A frequency component or a pixel position (also referred to as a coefficient position) (xC, yC) which is a process target, and logarithmic values (log 2TrafoWidth and log 2TrafoHeight) of a transform block are input to the context deriving means selecting unit 224a. On the basis of the logarithmic value sizes, a width and a height of the transform block is calculated by using (1<<log 2TrafoWidth) and (1<<log 2Trafo Height). In addition, instead of the logarithmic value sizes, a width and a height of the transform block may be directly input. Further, the transform skip flag (transform_skip_flag) and the transform/quantization bypass flag (transquant_bypass_flag) are input to the context deriving means selecting unit 224a.

The context deriving means selecting unit 224a selects the position context deriving unit 224b, the adjacent sub-block coefficient presence/absence context deriving unit 224c, or the transform skip/transform/quantization bypass context deriving unit 224d, in accordance with a transform skip flag, a transform/quantization bypass flag, a target TU size, and a position of a decoding target coefficient. The selected context deriving unit derives a context index ctxIdx.

A specific process in the context deriving means selecting unit 224a is the same as that in the context deriving means selecting unit 124a included in the moving image decoding apparatus 1, and thus description thereof will be omitted here.

(Position Context Deriving Unit 224b)

The position context deriving unit 224b derives a context index ctxIdx for a target frequency component on the basis of a position of the target frequency component in a frequency domain.

Other specific processes in the position context deriving unit 224b are the same as those in the position context deriving unit 124b included in the moving image decoding apparatus 1, and thus description thereof will be omitted here.

(Adjacent Sub-Block Coefficient Presence/Absence Context Deriving Unit 224c)

The adjacent sub-block coefficient presence/absence context deriving unit 224c selects a context derivation pattern according to whether or not a non-zero coefficient is present in an adjacent sub-block, and derives a context index for a decoding target frequency component from coordinates of the process target frequency component in a sub-block according to the selected derivation pattern. A specific process in the adjacent sub-block coefficient presence/absence context deriving unit 224c is the same as that in the adjacent sub-block coefficient presence/absence context deriving unit 124c included in the moving image decoding apparatus 1, and thus description thereof will be omitted here.

(Transform Skip/Transform/Quantization Bypass Context Deriving Unit 224d)

The transform skip/transform/quantization bypass context deriving unit 224d derives a context index ctxIdx for a coefficient in a pixel domain of a target transform block on the basis of a predetermined method during the transform skip or the transform/quantization bypass.

A specific process in the transform skip/transform/quantization bypass context deriving unit 224d is the same as that in the transform skip/transform/quantization bypass context deriving unit 124d included in the moving image decoding apparatus 1, and thus description thereof will be omitted here.

(Coefficient Presence/Absence Flag Setting Unit 224e)

The coefficient presence/absence flag setting unit 224e generates a Bin indicating the syntax significant_coeff_flag[xC][yC] supplied from the syntax deriving unit 228. The generated Bin is supplied to the bit coding unit 232. In addition, the coefficient presence/absence flag setting unit 224e refers to a value of significant_coeff_flag[xC][yC] included in a target sub-block, sets a value of significant_coeff_group_flag[xCG][yCG] regarding the sub-block to 0 in a case where all values of significant_coeff_flag[xCG][yCG] are 0, that is, a non-zero coefficient is not included in the target sub-block, and, otherwise, sets a value of significant_coeff_group_flag[xCG][yCG] regarding the target sub-block to 1. significant_coeff_group_flag[xCG][yCG] given the values as mentioned above is supplied to the sub-block coefficient presence/absence flag coding unit 227.

<<Another Configuration Example of Coefficient Presence/Absence Flag Coding Unit 224>>

Hereinafter, with reference to FIG. 61, another configuration example of the coefficient presence/absence flag coding unit 224 will be described.

Figure 61:
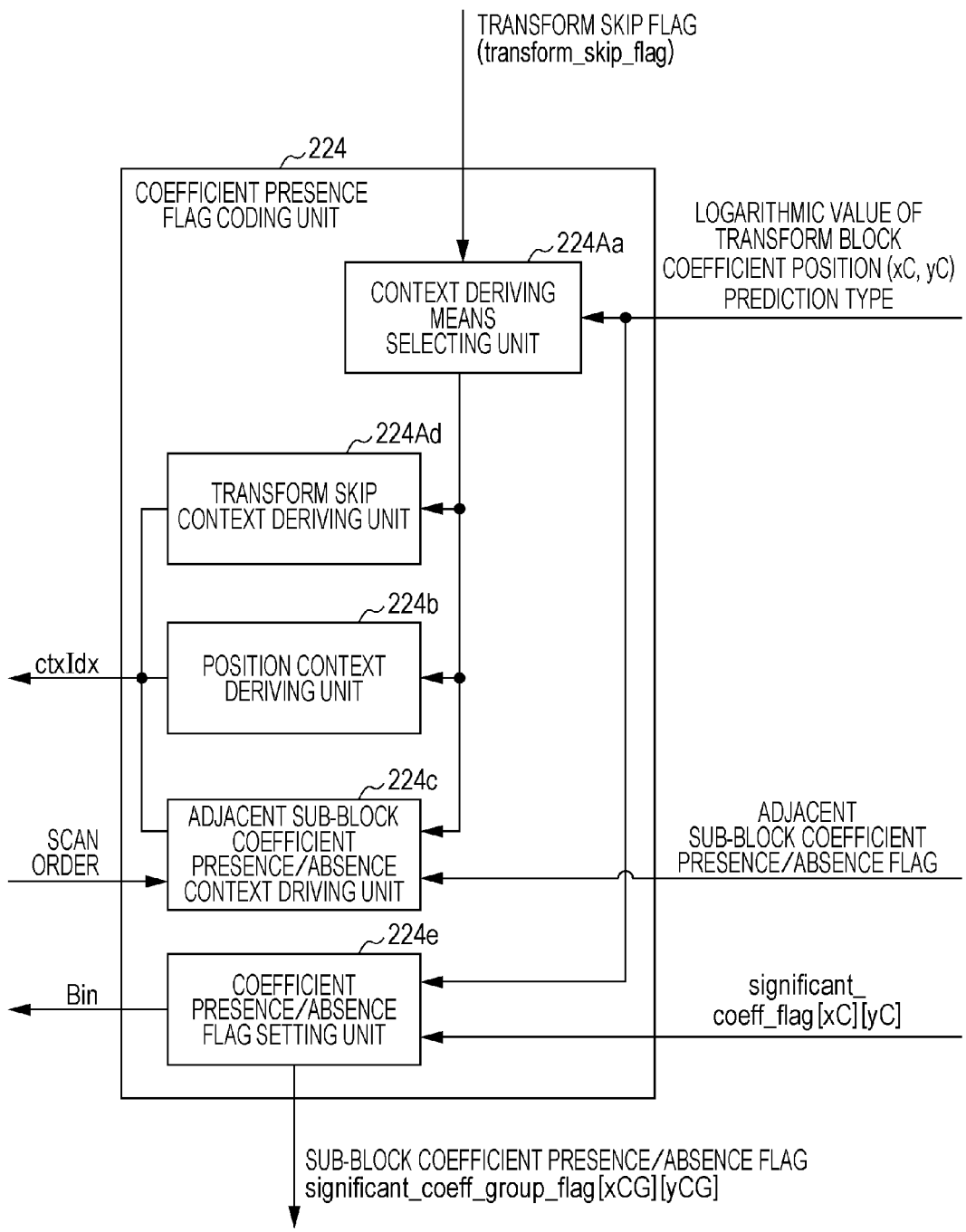
FIG. 61 is a block diagram illustrating another configuration example of the coefficient presence/absence flag coding unit.

FIG. 61 is a block diagram illustrating another configuration example of the coefficient presence/absence flag coding unit 224. As illustrated in FIG. 61, the coefficient presence/absence flag coding unit 224 includes a context deriving means selecting unit 224Aa, a position context deriving unit 224b, an adjacent sub-block coefficient presence/absence context deriving unit 224c, a transform skip context deriving unit 224Ad, and a coefficient presence/absence flag setting unit 224e. In addition, the position context deriving unit 224b, the adjacent sub-block coefficient presence/absence context deriving unit 224c, and the coefficient presence/absence flag setting unit 224e have the same functions as the corresponding constituent elements of FIG. 56 and are thus given the same reference numerals, and description thereof will be omitted.

(Context Deriving Means Selecting Unit 224Aa)

At least a process target coefficient position (xC, yC), logarithmic values (log 2TrafoWidth and log 2TrafoHeight) of a transform block size, and a transform_skip_flag (transform_skip_flag) are input to the context deriving means selecting unit 224Aa.

The context deriving means selecting unit 224Aa selects the position context deriving unit 224b, the adjacent sub-block coefficient presence/absence context deriving unit 224c, or the transform skip context deriving unit 224Ad, in accordance with the transform skip flag, the target transform block size, and the target coefficient position. The selected context deriving unit derives a context index ctxIdx which is referred to when a coefficient presence/absence flag at the target coefficient position is decoded. In addition, a context deriving means electing process in the context deriving means selecting unit 224Aa is the same as that in the context deriving means selecting unit 124Aa included in the moving image decoding apparatus 1, and thus description thereof will be omitted here.

(Transform Skip Context Deriving Unit 224Ad)

The transform skip context deriving unit 224Ad derives a context (context index ctxIdx) which is referred to when a coefficient presence/absence flag in a target coefficient is decoded during the transform skip. The context derived here is a single context regardless of a position of the target coefficient in a sub-block. In addition, a specific process in the transform skip context deriving unit 224Ad is the same as that in the transform skip context deriving unit 124Ad included in the moving image decoding apparatus 1, and thus description thereof will be omitted here.

(Sub-Block Coefficient Presence/Absence Flag Coding Unit 227)

The sub-block coefficient presence/absence flag coding unit 227 codes the syntax significant_coeff_group_flag[xCG][yCG] designated by each sub-block position (xCG, yCG). More specifically, a Bin indicating syntax significant_coeff_group_flag[xCG][yCG] designated by each sub-block position (xCG, yCG) is generated. The generated Bin is supplied to the bit coding unit 232. In addition, the sub-block coefficient presence/absence flag coding unit 227 calculates the context index ctxIdx for determining a context which is used for the arithmetic code coding unit 230 to code the Bin of the syntax significant_coeff_flag[xC][yC]. The calculated context index ctxIdx is supplied to the context recording/updating unit 231.

Figure 57:
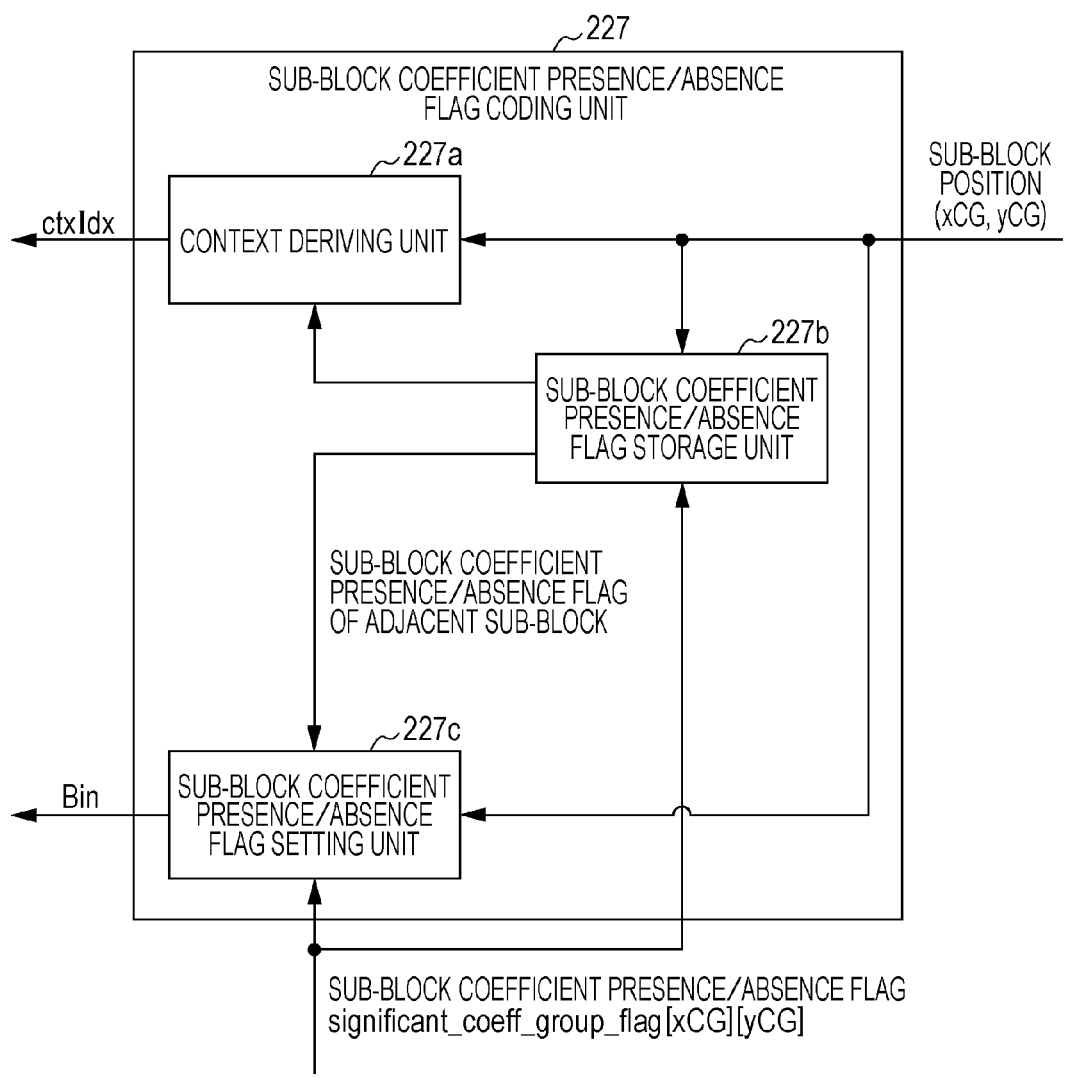
FIG. 57 is a block diagram illustrating a configuration of a sub-block coefficient presence/absence flag coding unit according to the embodiment.

FIG. 57 is a block diagram illustrating a configuration of the sub-block coefficient presence/absence flag coding unit 227. As illustrated in FIG. 57, the sub-block coefficient presence/absence flag coding unit 227 includes a context deriving unit 227a, a sub-block coefficient presence/absence flag storage unit 227b, and a sub-block coefficient presence/absence flag setting unit 227c.

Hereinafter, a description will be described by exemplifying a case where the sub-block position (xCG, yCG) is supplied from the coefficient coding control unit 223 to the sub-block coefficient presence/absence flag coding unit 227 in a forward scan order. In addition, in this case, the sub-block position (xCG, yCG) is preferably supplied to the sub-block coefficient presence/absence flag decoding unit 127 included in the moving image decoding apparatus 1 in a backward scan order.

(Context Deriving Unit 227a)

The context deriving unit 227a included in the sub-block coefficient presence/absence flag coding unit 227 derives a context index assigned to a sub-block which is designated by each sub-block position (xCG, yCG). The context index assigned to a sub-block is used to decode a Bin indicating the syntax significant_coeff_group_flag for the sub-block. In addition, in a case where the context index is derived, a value of the sub-block coefficient presence/absence flag stored in the sub-block coefficient presence/absence flag storage unit 227b is referred to. The context deriving unit 227a supplies the derived context index to the context recording/updating unit 231.

(Sub-Block Coefficient Presence/Absence Flag Storage Unit 227b)

The sub-block coefficient presence/absence flag storage unit 227b stores each value of the syntax significant_coeffgroup_flag supplied from the coefficient presence/absence flag coding unit 224. The sub-block coefficient presence/absence flag setting unit 227c may read the syntax significant_coeff_group_flag assigned to an adjacent sub-block from the sub-block coefficient presence/absence flag storage unit 227b.

(Sub-Block Coefficient Presence/Absence Flag Setting Unit 227c)

The sub-block coefficient presence/absence flag setting unit 227c generates a Bin indicating the syntax significant_coeff_group_flag[xCG][yCG] supplied from the coefficient presence/absence flag coding unit 224. The generated Bin is supplied to the bit coding unit 232.

Hereinafter, a description will be made of coding processes of the GR1 flag, the GR2 flag, and a remaining coefficient level in the coefficient value coding unit 225 corresponding to the coefficient level decoding unit 125a included in the moving image decoding apparatus 1.

(Coding Process of GR1 Flag)

Figure 38:
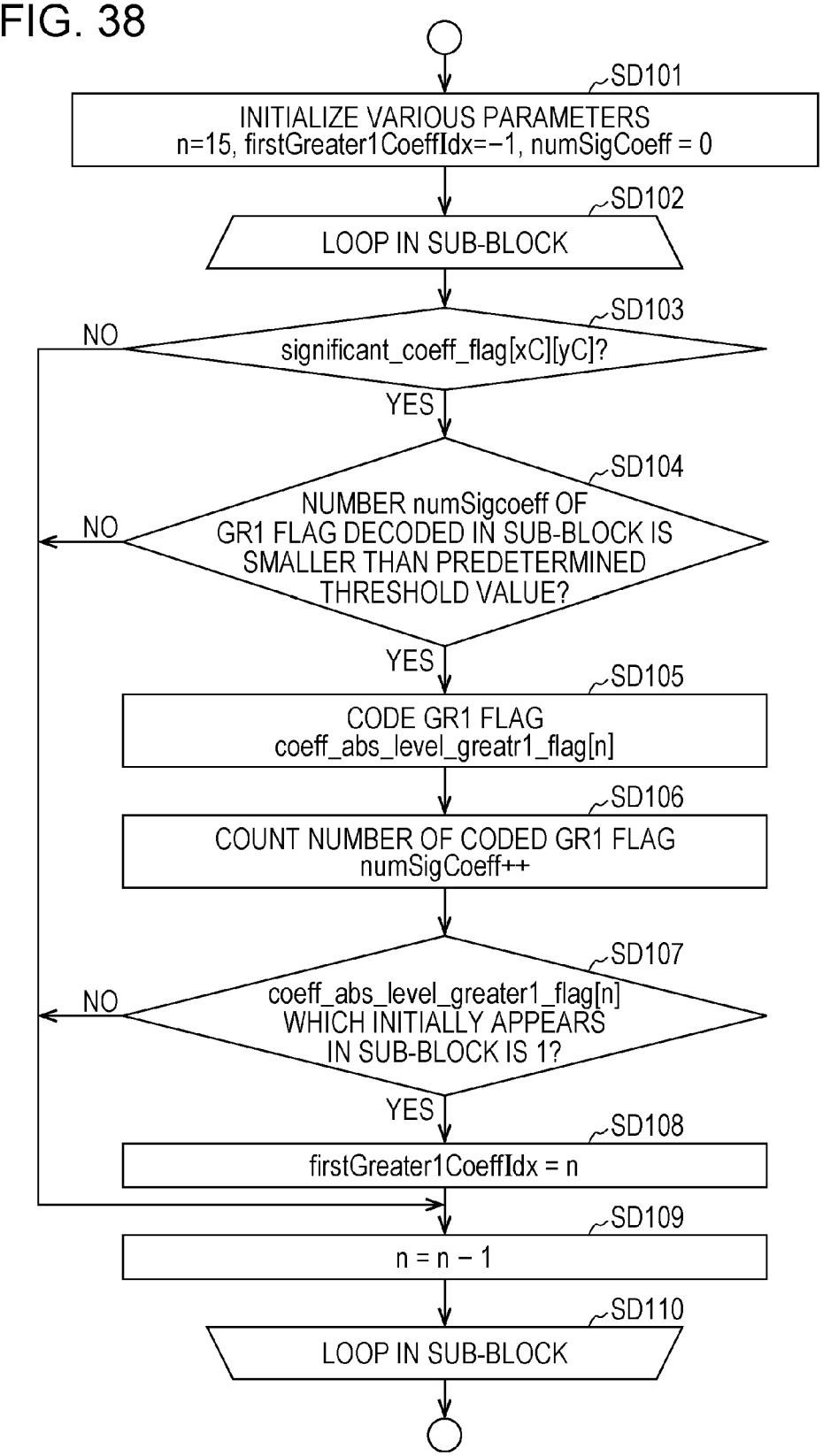
FIG. 38 is a flowchart illustrating a coding process of a GR1 flag.

Hereinafter, a description will be made of a coding process of the GR1 flag performed by the coefficient value coding unit 225. FIG. 38 is a flowchart illustrating the coding process of the GR1 flag.

(Step SD201)

The coefficient value coding unit 225 initializes various parameters related to the decoding of the GR1 flag.

A coefficient position identification index n is set to 15 (n=15).

A coefficient number numSigCoeff is set to 0 (numSigCoeff=0).

A coefficient position firstGreater1 CoeffIdx at which a value of the GR1 flag initially appearing in a sub-block is 1 is set to −1 (firstGreatr1 CoeffIdx=−1).

In a case where a position (subset) of a coding target sub-block corresponds to a sub-block including the last coefficient, a variable greatr1Ctx indicating the number of coded GR1 flags having a value of 0 is initialized to 1 (that is, greater1Ctx=1).

In addition, in a case where a position (subset) of the coding target sub-block corresponds to a sub-block which does not include the last coefficient, the variable greatr1Ctx indicating the number of coded GR1 flags having a value of 0 is updated by using the following equation.

$$greater1Ctx = greater1Ctx >> 1$$

(Step SD202)

A loop in a target sub-block is started. The loop is a loop having a coefficient position as the unit.

(Step SD203)

It is determined whether or not a coefficient position (xC, yC) specified by the coefficient position identification index n is a non-zero coefficient. In a case of the non-zero coefficient (significant_coeff_flag[xC][yC]==1) (Yes in step SD203), the flow proceeds to step SD204. In other cases (significant_coeff_flag[xC][yC]==0) (No in step SD203), the flow proceeds to step SD209.

(Step SD204)

It is determined whether or not the number numSigCoeff of the GR1 flags which are coded in the sub-block is equal to or smaller than a predetermined threshold value. In a case where the number numSigCoeff of the GR1 flags which are decoded in the sub-block is equal to or smaller than the predetermined threshold value (Yes in step SD104), the flow proceeds to step SD204. In other cases (No in step S204), the flow proceeds to step SD209.

(Step SD205)

The GR1 flag of the coefficient position identification index n is coded. In addition, a derivation method of a context index which is referred to for coding the GR1 flag is the same as the derivation method of a context index which is referred to for decoding the GR1 flag, and thus description thereof will be omitted. However, in the derivation method of a context index for decoding the GR1 flag, the term "decoding" is replaced with the term "coding".

(Step SD206)

The number of coded GR1 flags is counted (that is, numSigCoeff=numSigCoeff+1).

In addition, in a case where a coefficient level value of the coded coefficient position (xC, yC) is equal to or higher than 2 (a value of the GR1 flag is 1), the variable numGreater1 is updated on the basis of the transform_skip_flag and the transform/quantization bypass flag.

In other words, if(!transform_skip_flag &&!transquant_bypass_flag)
{numGreater1=coeff_abs_level_
greater1_flag[n]==1?numGreater1+1:
numGreater1}     (eq. B-5)

Here, in Equation (eq. B-5), in a case where the transform skip or the transform/quantization bypass is performed, the variable numGreater1 is not updated. This is because, in a case where the transform skip or the transform/quantization bypass is performed, the GR1 flag and the GR2 flag are transform coefficients in a pixel domain, and, if variables used to derive contexts for the GR1 flag and the GR2 flag regarding transform coefficients in a frequency domain are updated, states of the contexts for the GR1 flag and the GR2 flag regarding transform coefficients in a frequency domain are not appropriately updated, and coding efficiency may be reduced.

(Step SD207)

It is determined whether or not a coefficient position is a coefficient position where a value of the GR1 flag initially appearing in the sub-block is 1. In a case where whether or not the coefficient position is a coefficient position where a value of the GR1 flag initially appearing in the sub-block is 1 (Yes in step SD207), the flow proceeds to step SD208. In other cases, the flow proceeds to step SD209.

(Step SD208)

The coefficient position (coefficient position identification index) where a value of the GR1 flag initially appearing in the sub-block is 1 is set to the variable firstGreater1 CoeffIdx (that is, firstGreater1 CoeffIdx=n).

(Step SD209)

The coefficient position identification index n is updated (that is, n=n−1).

(Step SD210)

The loop in the sub-block is finished.

(Coding Process of GR2 Flag)

Figure 39:
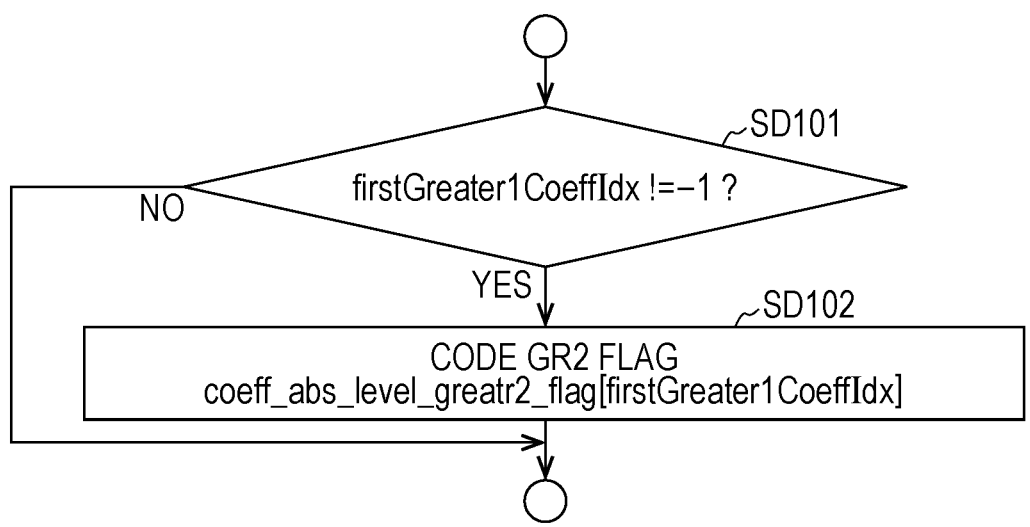
FIG. 39 is a flowchart illustrating a coding process of a GR2 flag.

Hereinafter, a description will be made of a coding process of the GR2 flag performed by the coefficient value coding unit 225. FIG. 39 is a flowchart illustrating the coding process of the GR2 flag.

(Step SE201)

It is determined whether or not there is a coefficient in which a value of the GR1 flag initially appearing in the sub-block, obtained in the decoding process of the GR1 flag, is 1. In other words, it is determined whether or not the variable firstGreater1 CoeffIdx is −1. Here, in a case where the variable firstGreater1 CoeffIdx is not −1 (Yes in step SE201), the flow proceeds to step S202. In other cases (No in step SE101), the GR2 flag is not coded, and the coding process of the GR2 flag is finished.

(Step SE202)

The GR2 flag (coeff_abs_level_greater2_flag[firstGreatr1 CoeffIdx]) at a coefficient position indicated by the variable firstGreatr1 CoeffIdx is coded.

In addition, a derivation method of a context index which is referred to for coding the GR2 flag is the same as the derivation method of a context index which is referred to for decoding the GR2 flag, and thus description thereof will be omitted. However, in the derivation method of a context index for decoding the GR2 flag, the term "decoding" is replaced with the term "coding".

(Coding Process of Remaining Coefficient Level)

Figure 40:
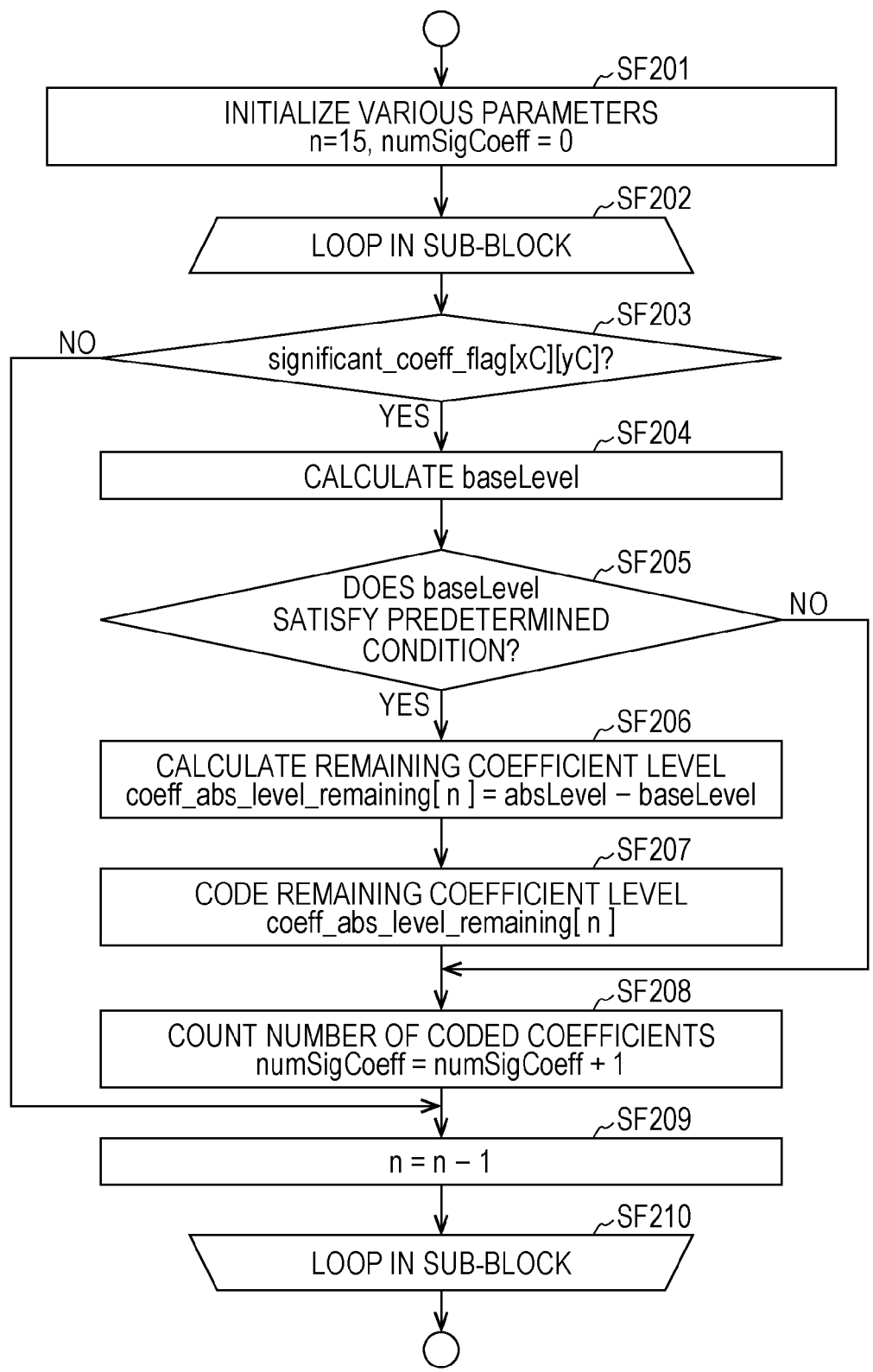
FIG. 40 is a flowchart illustrating a coding process of a remaining coefficient level.

Hereinafter, a description will be made of a decoding process of a remaining coefficient level performed by the coefficient value coding unit 225. FIG. 40 is a flowchart illustrating the coding process of the remaining coefficient level.

(Step SF201)

The coefficient value coding unit 225 initializes various parameters related to the decoding of the remaining coefficient level.

A coefficient position identification index n is set to 15 (n=15).

A coefficient number numSigCoeff is set to 0 (numSigCoeff=0).

(Step SF202)

A loop in a target sub-block is started. The loop is a loop having a coefficient position as the unit.

(Step SF203)

It is determined whether or not a coefficient position (xC, yC) specified by the coefficient position identification index n is a non-zero coefficient. In a case of the non-zero coefficient (significant_coeff_flag[xC][yC]==1) (Yes in step SF203), the flow proceeds to step SF204. In other cases (significant_coeff_flag[xC][yC]==0) (No in step SF203), the flow proceeds to step SF209.

(Step SF204)

A base level baseLevel of a transform coefficient at the coefficient position (xC, yC) is calculated by using the following equation.

baseLevel=1+coeff_abs_level_greater1_flag[*n*]+
coeff_abs_level_greater2_flag[*n*]     (eq. E-1)

(Step SF205)

It is determined whether or not the base level baseLevel of the transform coefficient at the coefficient position (xC, yC) satisfies a predetermined value. The predetermined value is represented by the following equation.

baseLevel==(numSigCoeff<*TH*)?((*n*==firstGreater1
CoeffIdx)?3:2):1     (eq. E-2)

In other words, 1) in a case where the coefficient number numSigCoeff is equal to or larger than a predetermined threshold value TH (numSigCoeff>=TH), it is determined whether or not baseLevel is 1.

2) In a case where the coefficient number numSigCoeff is smaller than the predetermined threshold value (numSigCoeff<TH), and the coefficient position identification index n is not firstGreater1 CoeffIdx, it is determined whether or not baseLevel is 2.

3) In a case where the coefficient number numSigCoeff is smaller than the predetermined threshold value (numSigCoeff<TH), and the coefficient position identification index n is firstGreater1 CoeffIdx, it is determined whether or not baseLevel is 3.

As mentioned above, in a case where baseLevel is the same as the value taken in the above-described condition (Yes in step SF205), the flow proceeds to step SF206. In other cases (No in step SF205), the coding of the remaining coefficient level coeff_abs_level_remaining is skipped (treated as coeff_abs_level_remaining[n]=0), and the flow proceeds to step SF208.

(Step SF206)

The remaining coefficient level coeff_abs_level_remaining[n] of the transform coefficient at the coefficient position (xC, yC) is calculated by using the following equation on the basis of the coefficient level absLevel and the baselevel baseLevel.

coeff_abs_level_remaining[*n*]=absLevel−baseLevel     eq. E-3)

(Step SF207)

A coefficient level value absLevel of the transform coefficient at the coefficient position (xC, yC) is calculated by using the following equation.

absLevel=coeff_abs_level_remaining[*n*]+baseLevel     eq. E-3)

(Step SF208)

The decoded coefficient number numSigCoeff is updated (that is, numSigCoeff=numSigCoeff+1).

(Step SF209)

The coefficient position identification index n is updated (that is, n=n−1).

(Step SF210)

The loop in the sub-block is finished.

(Appendix 1)

The above-described moving image coding apparatus 2 and moving image decoding apparatus 1 may be mounted and used in various items of equipment which perform transmission, reception, recording, and reproducing of moving images. In addition, the moving images may be natural images which are captured by a camera or the like, and may be artificial images (including CG and GUI) generated by a computer or the like.

First, with reference to FIG. 62, a description will be made that the above-described moving image coding apparatus 2 and moving image decoding apparatus 1 can be used for transmission and reception of moving images.

Figure 62:
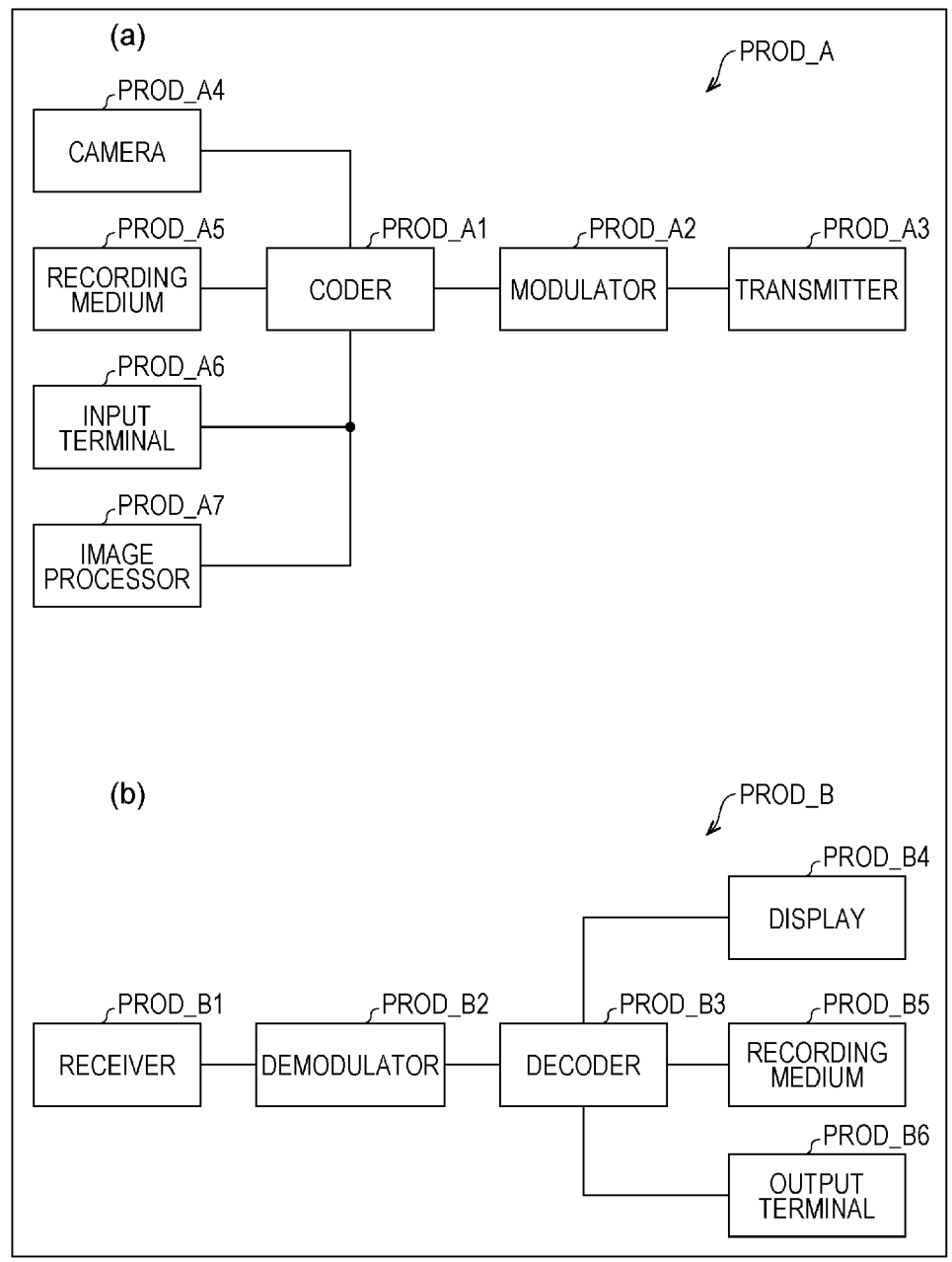

FIG. 62(*a*) is a block diagram illustrating a configuration of transmission equipment PROD_A including the moving image coding apparatus 2 mounted therein. As illustrated in FIG. 62(*a*), the transmission equipment PROD_A includes a coder PROD_A1 which obtains by coding a moving image, a modulator PROD_A2 which obtains a modulated signal by modulating the coded data obtained by the coder PROD_A1, and a transmitter PROD_A3 which transmits the modulated signal obtained by the modulator PROD_A2. The above-described moving image coding apparatus 2 is used as the coder PROD_A1.

The transmission equipment PROD_A may further include a camera PROD_A4 which captures a moving image as a supply source of a moving image which is input to the coder PROD_A1, a recording medium PROD_A5 which records the moving image thereon, an input terminal PROD_A6 for inputting a moving image from an external device, and an image processor A7 which generates or processes an image. FIG. 62(*a*) illustrates a configuration in which the transmission equipment PROD_A includes all the constituent elements, but some of the constituent elements may be omitted.

In addition, the recording medium PROD_A5 may record a moving image which is not coded, and may record a moving image which is coded in a coding method for recording different from a coding method for transmission. In the latter case, a decoder (not illustrated) which decodes coded data read from the recording medium PROD_A5 according to a coding method for recording may be provided between the recording medium PROD_A5 and the coder PROD_A1.

FIG. 62(*b*) is a block diagram illustrating a configuration of reception equipment PROD_B including the moving image decoding apparatus 1 mounted therein. As illustrated in FIG. 62(*b*), the reception equipment PROD_B includes a receiver PROD_B1 which receives a modulated signal, a demodulator PROD_B2 which obtains coded data by demodulating the modulated signal received by the receiver PROD_B1, and a decoder PROD_B3 which obtains a moving image by decoding the coded data obtained by the demodulator PROD_B2. The above-described moving image decoding apparatus 1 is used as the decoder PROD_B3.

The reception equipment PROD_B may further include a display PROD_B4 which displays a moving image as a supply source of the moving image which is output by the decoder PROD_B3, a recording medium PROD_B5 which records a moving image, and an output terminal PROD_B6 which outputs a moving image to an external device. FIG. 62(*b*) illustrates a configuration in which the reception equipment PROD_B includes all the constituent elements, but some of the constituent elements may be omitted.

In addition, the recording medium PROD_B5 may record a moving image which is not coded, and may record a moving image which is coded in a coding method for recording different from a coding method for transmission. In the latter case, a coder (not illustrated) which codes a moving image acquired from the decoder PROD_B3 according to a coding method for recording may be provided between the decoder PROD_B3 and the recording medium PROD_B5.

In addition, a transmission medium for transmitting a modulated signal may be wireless and wired. Further, a transmission aspect of transmitting a modulated signal may be broadcast (here, indicating a transmission aspect in which a transmission destination is not specified in advance) and may be communication (here, indicating a transmission aspect in which a transmission destination is specified in advance). In other words, transmission of a modulated signal may be realized by any one of wireless broadcast, wired broadcast, wireless communication, and wired communication.

For example, a broadcasting station (a broadcasting facility or the like) and a reception station (a television receiver or the like) in terrestrial digital broadcasting are respectively examples of the transmission equipment PROD_A and the reception equipment PROD_B which transmit and receive a modulated signal in wireless broadcast. In addition, a broadcasting station (a broadcasting facility or the like) and a reception station (a television receiver or the like) in cable television broadcasting are respectively examples of the transmission equipment PROD_A and the reception equipment PROD_B which transmit and receive a modulated signal in wired broadcast.

In addition, a server (a workstation or the like) and a client (a television receiver, a personal computer, a smart phone, or the like) in a video on demand (VOD) service or a moving image sharing service using the Internet or the like are respectively examples of the transmission equipment PROD_A and the reception equipment PROD_B which transmit and receive a modulated signal in communication (typically, either a wireless or wired medium is used as a transmission medium in a LAN, and a wired medium is used as a transmission medium in a WAN). Here, the personal computer includes a desktop PC, a laptop PC, and a tablet PC. Further, the smart phone also includes a multifunction mobile phone terminal.

In addition, the client in the moving image sharing service has not only a function of decoding coded data which is downloaded from the server and displaying the data on a display but also a function of coding a moving image captured by a camera and uploading the moving image to the server. In other words, the client in the moving image sharing service functions as both of the transmission equipment PROD_A and the reception equipment PROD_B.

Figure 63:
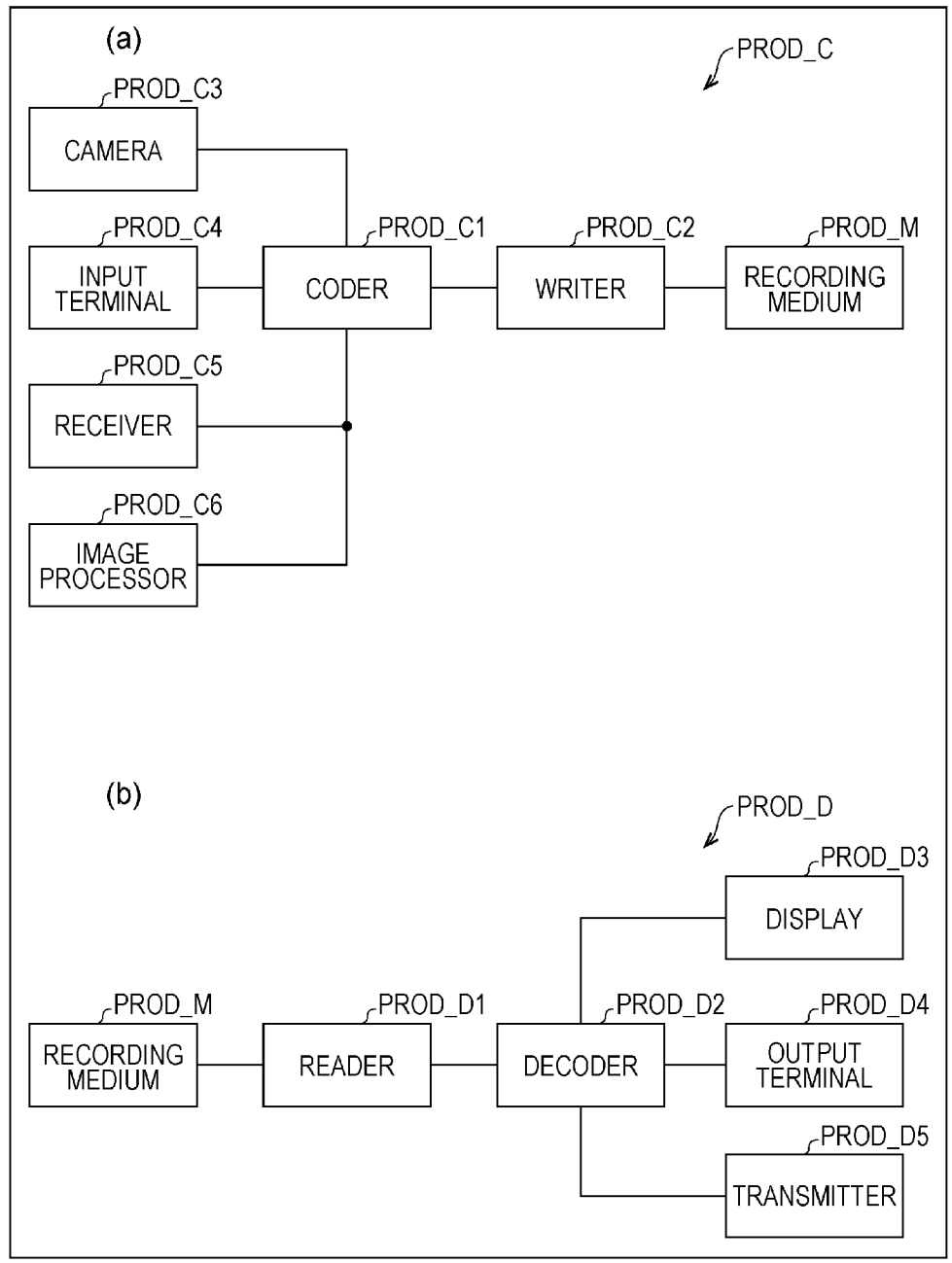

Next, with reference to FIG. 63, a description will be made that the above-described moving image coding apparatus 2 and moving image decoding apparatus 1 can be used for recording and reproducing moving images.

FIG. 63(a) is a block diagram illustrating a configuration of recording equipment PROD_C including the moving image coding apparatus 2 mounted therein. As illustrated in FIG. 63(a), recording equipment PROD_C includes a coder PROD_C1 which obtains by coding a moving image, and writer PROD_C2 which writes the coded data obtained by the coder PROD_C1 on a recording medium PROD_M. The above-described moving image coding apparatus 2 is used as the coder PROD_C1.

In addition, the recording medium PROD_M may be (1) built into the recording equipment PROD_C, such as a hard disk drive (HDD), a solid state drive (SSD), (2) connected to the recording equipment PROD_C, such as a SD memory card or a universal serial bus (USB) flash memory, and (3) loaded in a drive device (not illustrated) built into the recording equipment PROD_C, such as a digital versatile disc (DVD) or a Blu-ray Disc (registered trademark, BD).

In addition, the recording equipment PROD_C may further include a camera PROD_C3 which captures a moving image as a supply source of a moving image which is input to the coder PROD_C1, an input terminal PROD_C4 for inputting a moving image from an external device, a receiver PROD_C5 which receives a moving image, and an image processor C6 which generates or processes an image. FIG. 63(a) illustrates a configuration in which the recording equipment PROD_C includes all the constituent elements, but some of the constituent elements may be omitted.

Further, the receiver PROD_C5 may receive a moving image which is not coded, and may receive a moving image which is coded in a coding method for recording different from a coding method for transmission. In the latter case, a decoder (not illustrated) for transmission which decodes coded data which is coded in a coding method for transmission may be provided between the receiver PROD_C5 and the coder PROD_C1.

The recording equipment PROD_C may include, for example, a DVD recorder, a BD recorder, and a hard disk drive (HDD) recorder (in this case, the input terminal PROD_C4 or the receiver PROD_C5 is a main supply source of a moving image). Further, examples of the recording equipment PROD_C are also a camcorder (in this case, the camera PROD_C3 is a main supply source of a moving image), a personal computer (in this case, the receiver PROD_C5 or the image processor C6 is a main supply source of a moving image), and a smart phone (in this case, the camera PROD_C3 or the receiver PROD_C5 is a main supply source of a moving image).

FIG. 63(b) is a block diagram illustrating a configuration of reproducing equipment PROD_D including the moving image decoding apparatus 1 mounted therein. As illustrated in FIG. 63(b), the reproducing equipment PROD_D includes a reader PROD_D1 which reads coded data which is written on the recording medium PROD_M, and a coder PROD_D2 which obtains a moving image by decoding the coded data read by the reader PROD_D1. The above-described moving image decoding apparatus 1 is used as the decoder PROD_D2.

In addition, the recording medium PROD_M may be (1) built into the reproducing equipment PROD_D, such as an HDD, an SSD, (2) connected to the reproducing equipment PROD_D, such as a SD memory card or a USB flash memory, and (3) loaded in a drive device (not illustrated) built into the reproducing equipment PROD_D, such as a DVD or a BD.

In addition, the reproducing equipment PROD_D may further include a display PROD_D3 which displays a moving image as a supply source of the moving image which is output by the decoder PROD_D2, an output terminal PROD_D4 which outputs a moving image to an external device, and a transmitter PROD_D5 which transmits a moving image. FIG. 63(b) illustrates a configuration in which the reproducing equipment PROD_D includes all the constituent elements, but some of the constituent elements may be omitted.

In addition, the transmitter PROD_D5 may transmit a moving image which is not coded, and may transmit a moving image which is coded in a coding method for transmission different from a coding method for recording. In the latter case, a coder (not illustrated) which codes a moving image in a coding method for transmission may be provided between the decoder PROD_D2 and the transmitter PROD_D5.

The reproducing equipment PROD_D may include, for example, a DVD player, a BD player, and an HDD player (in this case, the output terminal PROD_D4 connected to a television receiver is a main supply source of a moving image). Further, examples of the reproducing equipment PROD_D are also a television receiver (in this case, the display PROD_D3 is a main supply source of a moving image), a digital signage (also called an electronic signboard or an electronic bulletin board; in this case, the display PROD_D3 or the transmitter PROD_D5 is a main supply source of a moving image), a desktop PC (in this case, the output terminal PROD_D4 or the transmitter PROD_D5 is a main supply source of a moving image), a laptop or tablet PC (in this case, the display PROD_D3 or the transmitter PROD_D5 is a main supply source of a moving image), and a smart phone (in this case, the display PROD_D3 or the transmitter PROD_D5 is a main supply source of a moving image).

(Appendix 2)

Each block of the above-described moving image decoding apparatus 1 and moving image coding apparatus 2 may be realized in hardware by using logic circuits formed on an integrated circuit (IC chip), and may be realized in software by using a central processing unit (CPU).

In the latter case, each of the moving image decoding apparatus 1 and the moving image coding apparatus 2 includes a CPU which executes commands of a program, a read only memory (ROM) which stores the program, a random access memory (RAM) on which the program is developed, and a storage device (recording medium) such as a memory which stores the program and various items of data. In addition, the object of the present invention can also be achieved by supplying a recording medium which causes a computer to read program codes (an executable program, an intermediate code program, or a source program) of a control program of each of the moving image decoding apparatus 1 and the moving image coding apparatus 2, which is software for realizing the above-described functions, to the moving image decoding apparatus 1 and the moving image coding apparatus 2, and by the computer (or a CPU or a micro processing unit (MPU)) reading and executing the program codes recorded on the recording medium.

As the recording medium, there may be the use of, for example, tapes such as a magnetic tape or a cassette tape, disks or discs including a magnetic disk such as a floppy (registered trademark) disk or a hard disk and an optical disc such as a compact disc read-only memory (CD-ROM), a magneto-optical (MO), a mini disc (MD), a digital versatile disk (DVD), or a CD-recordable (CD-R), cards such as an IC card (including a memory card) and an optical card, semiconductor memories such as a mask ROM, an erasable programmable read-only memory (EPROM), an electrically erasable and programmable read-only memory (EEPROM) (registered trademark) and a flash ROM, or logic circuits such as a programmable logic device (PLD) and field programmable gate array (FPGA).

In addition, each of the moving image decoding apparatus 1 and the moving image coding apparatus 2 is configured to be connected to a communication network, and the program codes may be supplied thereto via the communication network. The communication network is not particularly limited as long as the program codes can be transmitted. For example, the Internet, an intranet, an extranet, a local area network (LAN), an integrated services digital network (ISDN), a value-added network (VAN), a community antenna television (CATV), a communication network, a virtual private network, a telephone line network, a mobile communication network, and a satellite communication network, may be used. In addition, a transmission medium forming the communication network is not particularly limited to a specific configuration or type as long as the program codes can be transmitted. The transmission medium may use a wired medium such as Institute Of Electrical and Electronic Engineers (IEEE) 1394, a USB, a power line carrier, a cable TV line, a telephone line, or an asymmetric digital subscriber line (ADSL), and a wireless medium such as infrared rays in Infrared Data Association (IrDA) or remote control, Bluetooth (registered trademark), IEEE802.11 wireless, High Data Rate (HDR), near field communication (NFC), Digital Living Network Alliance (DLNA), a mobile station network, a satellite line, or a terrestrial digital network. In addition, the present invention may also be realized in a form of a computer data signal which is implemented by electronically transmitting the program codes and is embedded in a carrier.

The present invention is not limited to each of the above-described embodiments and may have various modifications recited in the claims, and an embodiment obtained by appropriately combining the technical means disclosed in the different embodiments is also included in the technical scope of the present invention.

INDUSTRIAL APPLICABILITY

The present invention can be suitably used for an arithmetic decoding device which decodes coded data which is arithmetically coded, and an arithmetic coding device which generates coded data which is arithmetically coded.

REFERENCE SIGNS LIST

1 MOVING IMAGE DECODING APPARATUS (IMAGE DECODING APPARATUS)
11 VARIABLE LENGTH CODE DECODING UNIT
111 QUANTIZED RESIDUAL INFORMATION DECODING UNIT (ARITHMETIC CODING DEVICE)
120 TRANSFORM COEFFICIENT DECODING UNIT
123 COEFFICIENT DECODING CONTROL UNIT (SUB-BLOCK SPLITTING MEANS, SUB-BLOCK SCAN ORDER SETTING MEANS)
124 COEFFICIENT PRESENCE/ABSENCE FLAG CODING UNIT (CONTEXT INDEX DERIVING MEANS, COEFFICIENT PRESENCE/ABSENCE FLAG DECODING MEANS)
124a, 124Aa CONTEXT DERIVING MEANS SELECTING UNIT
124b POSITION CONTEXT DERIVING UNIT
124c ADJACENT SUB-BLOCK COEFFICIENT PRESENCE/ABSENCE CONTEXT DERIVING UNIT
124d TRANSFORM SKIP/TRANSFORM/QUANTIZATION BYPASS CONTEXT DERIVING UNIT
124Ad TRANSFORM SKIP CONTEXT DERIVING UNIT
124e COEFFICIENT PRESENCE/ABSENCE FLAG SETTING UNIT
125 COEFFICIENT VALUE DECODING UNIT (GR1 FLAG DECODING MEANS, GR2 FLAG DECODING MEANS)
125a COEFFICIENT LEVEL DECODING UNIT
125b COEFFICIENT SIGN DECODING UNIT
125c COEFFICIENT VALUE RECOVERING UNIT
125d COEFFICIENT NUMBER DERIVING UNIT

125e COEFFICIENT POSITION DERIVING UNIT
125f SIGN HIDING FLAG DERIVING UNIT
125g COEFFICIENT SUM CALCULATING UNIT
125h SIGN CODE DERIVING UNIT
127 SUB-BLOCK COEFFICIENT PRESENCE/ABSENCE FLAG DECODING UNIT (SUB-BLOCK COEFFICIENT PRESENCE/ABSENCE FLAG DECODING MEANS)
127a CONTEXT DERIVING UNIT
127b SUB-BLOCK COEFFICIENT PRESENCE/ABSENCE FLAG STORAGE UNIT
127c SUB-BLOCK COEFFICIENT PRESENCE/ABSENCE FLAG SETTING UNIT
128 TRANSFORM SKIP/TRANSFORM/QUANTIZATION BYPASS FLAG DECODING UNIT
130 ARITHMETIC CODE DECODING UNIT
131 CONTEXT RECORDING/UPDATING UNIT
132 BIT DECODING UNIT (SYNTAX DECODING MEANS)
2 MOVING IMAGE CODING APPARATUS (IMAGE CODING APPARATUS)
27 VARIABLE LENGTH CODE CODING UNIT
271 QUANTIZED RESIDUAL INFORMATION CODING UNIT (ARITHMETIC CODING DEVICE)
220 TRANSFORM COEFFICIENT CODING UNIT
223 COEFFICIENT CODING CONTROL UNIT (SUB-BLOCK SPLITTING MEANS, SUB-BLOCK SCAN ORDER SETTING MEANS)
224 COEFFICIENT PRESENCE/ABSENCE FLAG CODING UNIT (CONTEXT INDEX DERIVING MEANS)
224a, 224Aa CONTEXT DERIVING MEANS SELECTING UNIT
224b POSITION CONTEXT DERIVING UNIT
224c ADJACENT SUB-BLOCK COEFFICIENT PRESENCE/ABSENCE CONTEXT DERIVING UNIT
224d TRANSFORM SKIP/TRANSFORM/QUANTIZATION BYPASS CONTEXT DERIVING UNIT
224Ad TRANSFORM SKIP CONTEXT DERIVING UNIT
224e COEFFICIENT PRESENCE/ABSENCE FLAG SETTING UNIT
225 COEFFICIENT VALUE CODING UNIT (GR1 FLAG CODING MEANS, GR2 FLAG CODING MEANS)
2285 COEFFICIENT VALUE SYNTAX DERIVING UNIT
225a COEFFICIENT LEVEL SYNTAX DERIVING UNIT
225b COEFFICIENT SIGN SYNTAX DERIVING UNIT
225h SIGN SYNTAX DERIVING AND A LEVEL VALUE CORRECTING UNIT
227 SUB-BLOCK COEFFICIENT PRESENCE/ABSENCE FLAG CODING UNIT (SUB-BLOCK COEFFICIENT PRESENCE/ABSENCE FLAG CODING MEANS)
227a CONTEXT DERIVING UNIT
227b SUB-BLOCK COEFFICIENT PRESENCE/ABSENCE FLAG STORAGE UNIT
227c SUB-BLOCK COEFFICIENT PRESENCE/ABSENCE FLAG SETTING UNIT
229 SYNTAX DERIVING UNIT
230 ARITHMETIC CODE CODING UNIT
231 CONTEXT RECORDING/UPDATING UNIT
232 BIT CODING UNIT (SYNTAX CODING MEANS)

The invention claimed is:

1. An arithmetic decoding device which decodes coded data of each transform coefficient which is obtained by performing frequency transform on a target image for each unit domain and each transform coefficient obtained through a transform skip or a transform/quantization bypass, the device comprising:
   a context index deriving circuit that derives a context index of a nonzero transform coefficient presence/absence flag indicating whether or not the transform coefficient is 0 in a unit domain; and
   a syntax decoding circuit that arithmetically decodes the non-zero transform coefficient presence/absence flag by referring to the derived context index,
   wherein the context index deriving circuit derives a context index common to non-zero coefficient presence/absence flags corresponding to transform coefficients obtained through the transform skip or the transform/quantization bypass,
   wherein the context index deriving circuit derives separate context indexes for (i) a case where the transform skip flag is 1 or the transform/quantization bypass flag is 1, and (ii) a case where the transform skip flag is 0 and the transform/quantization bypass flag is 0.

* * * * *